United States Patent [19]

Spitzner

[11] 4,319,130

[45] Mar. 9, 1982

[54] DEVICE FOR THE AUTOMATED DIGITAL TRANSCRIPTION AND PROCESSING OF QUANTITIES AND UNITS

[75] Inventor: Alexander Spitzner, Berlin, German Democratic Rep.

[73] Assignee: VEB Applikationszentrum Elektronik Berlin, Berlin, German Democratic Rep.

[21] Appl. No.: 129,536

[22] Filed: Mar. 12, 1980

Related U.S. Application Data

[63] Continuation-in-part of Ser. No. 758,606, Jan. 12, 1977, abandoned.

[30] Foreign Application Priority Data

May 18, 1976 [DD] German Democratic Rep. ... 192895

[51] Int. Cl.³ ........................ G06F 15/02; G06F 3/02

[52] U.S. Cl. .................................... 235/310; 364/709; 364/710

[58] Field of Search ............... 364/705, 709, 710, 715; 235/310

[56] References Cited

U.S. PATENT DOCUMENTS

| | | | |
|---|---|---|---|
| 3,816,731 | 6/1974 | Jennings et al. | 364/715 |
| 3,855,459 | 12/1974 | Hakata | 235/310 |
| 3,973,113 | 8/1976 | Goldsamt | 364/709 |
| 4,100,602 | 7/1978 | Shapiro | 364/715 |
| 4,228,516 | 10/1980 | Johnston, Sr. | 235/310 X |

FOREIGN PATENT DOCUMENTS

| | | | |
|---|---|---|---|
| 2755403 | 6/1979 | Fed. Rep. of Germany | 235/310 |

*Primary Examiner*—Jerry Smith
*Attorney, Agent, or Firm*—Nolte & Nolte

[57] ABSTRACT

A calculator has an alphanumeric keyboard and an alphanumeric display, in order to enable entry and read out of data corresponding to specified physical quantities or the like. Internally, the calculator comprises means for transforming the input quantities as a function of the type of units entered by way of the keyboard, to a given type of unit for processing. The calculator further transforms a type of unit for display either to a specified type of unit or to a unit that either is most readable and understandable to an operator, in accordance with a given relationship, or has the smallest exponential products.

10 Claims, 90 Drawing Figures

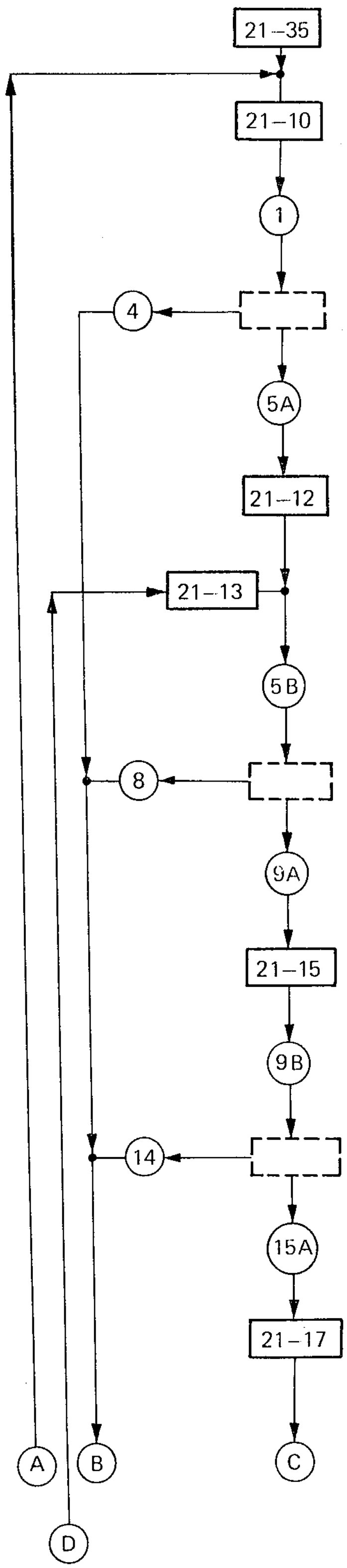

| SYMBOL | OPERATION OR YES-CONDITION | OVER THE LINE, BUS OR ELEMENT |
|---|---|---|
| | 1. CONTROL OF THE INPUT-TRANSFORMATION OF A HOMOSCRIBTIVE UNIT BY CONTROL NETWORK-1 (21) | |
| 21-35 | – PRESS THE START KEY; | |
| 21-10 | – ACTIVATE INPUT-DISKRIMINATOR (2); | 103 |
| | INTERCONNECT CLOCK-LINE (21-11: 21.10); | 102 |
| | – (INPUT AND SEPARATION OF A HOMOSCRIBTIVE QUANTITY) | |
| 21-12 | – ACTIVATE LOGIC NETWORK (9); | 104 |
| | DISCONNECT CLOCK-LINE (21-11: 21.10); | 102 |
| | INTERCONNECT CLOCK-LINE (21-14: 21.11); | 107 |
| 21-13 | – ACTIVATE LOGIC NETWORK (9), | 115 |
| | DISCONNECT CLOCK-LINE (21-20: 21.14); | 117 |
| | INTERCONNECT CLOCK-LINE (21-14: 21.11); | 107 |
| | – (SEPARATION OF A HOMOSCRIBTIVE UNIT) | |
| 21-15 | – ACTIVATE CHECK CODE GENERATOR (10); | 110 |
| | DISCONNECT CLOCK-LINE (21-14: 21.11); | 107 |
| | INTERCONNECT CLOCK-LINE (21-16: 21.12); | 109 |
| | – (SEPARATION OF A STRINGED UNIT) | |
| 21-17 | – ACTIVATE CONTROL NETWORK (21-2) OF THE CONTROL NETWORK-1 (21); | 113 |
| | DISCONNECT CLOCK-LINE (21-16: 21.12); | 109 |
| | INTERCONNECT CLOCK-LINE (21-18: 21.13); | 112 |

FIG. 11 A

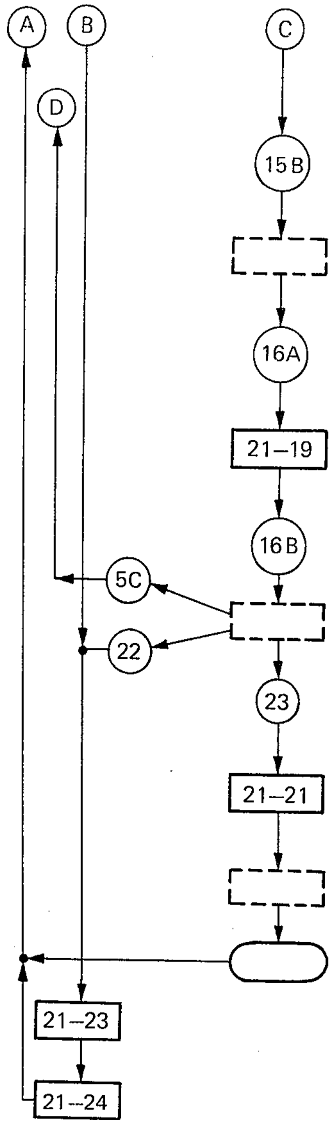

– (BUILDING UP THE NUMERIC VALUE OF THE AUTOSCRIBTIVE QUANTITY)

– ACTIVATE CONTROL NETWORK (21–3) OF THE CONTROL NETWORK–1 (21); 111
DISCONNECT CLOCK–LINE (21–18: 21.13); 112
INTERCONNECT CLOCK–LINE (21–20: 21.14); 117

– (BUILDING UP THE AUTOSCRIBTIVE UNIT OF THE AUTOSCRIBTIVE QUANTITY)

– ACTIVATE EXTERNAL CALL "OUTPUT OF THE AUTOSCRIBTIVE QUANTITY"; 123

– (OUTPUT OF THE AUTOSCRIBTIVE QUANTITY BY EXTERNAL CONTROL)

– IF END OF EXTERNAL CONTROL 125

– ERROR END;

– PRESS THE ERROR KEY;

FIG. 11 B

2. INPUT AND SEPARATION OF A HOMOSCRIBTIVE QUANTITY

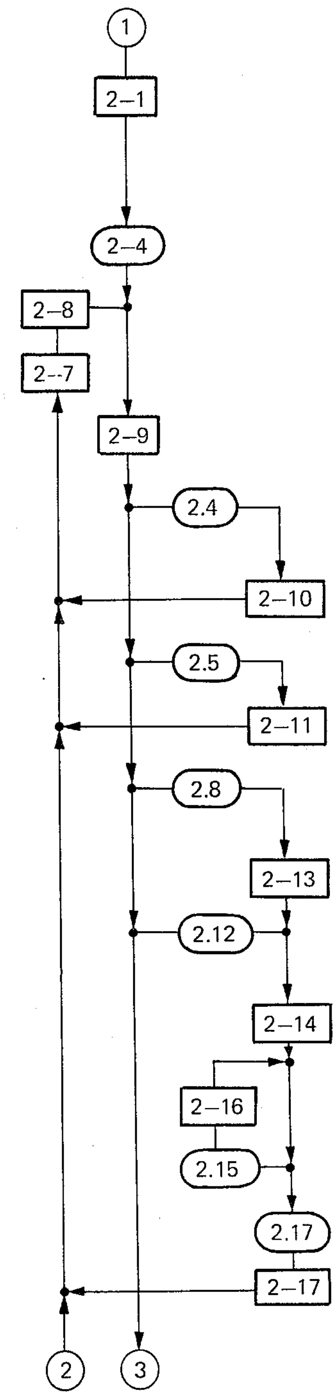

– LOAD COUNTER–1 (2–30) WITH "1001"; 158
SET COND. LATCH "NUMERIC VALUE" (2–3);
SET COND. LATCH "READY FOR QUANTITY–INPUT" (2–5) AND "READY FOR CHARACTER–INPUT" (2–6);
INTERCONNECT BUS (2–2: 1.1) 152

– WAIT FOR QUANTITY–INPUT; RESET COND. LATCH "READY FOR QUANTITY–INPUT" (2–5);

– WAIT FOR CHARACTER–INPUT;

– SET COND. LATCH "READY FOR CHARACTER–INPUT" (2–6)

– RESET COND. LATCH "READY FOR CHARACTER–INPUT" (2–6)

– IF ACTUAL CHARACTER = NUMERAL DIGIT AND 208
COND. LATCH "NUMERIC VALUE" (2–3) SET AND 162
COUNTER–1 (2–30) ≠ "1111" 170

– INCREASE COUNTER–1 (2–30); 160 – 2.17 – 168
SHIFT NUMERIC VALUE–REGISTER (3–1); 160 – 2.18 – 174

– IF ACTUAL CHARACTER = "." AND 211
COND. LATCH "NUMERIC VALUE" (2–3) SET 162

– SHIFT AUXILIARY–REGISTER (2–31); 2.9 – 166
SET COND. LATCH "NUMBER < 1" (2–12);

– IF ACTUAL CHARACTER = "↑" AND 150
COND. LATCH "NUMBER < 1" (2–12) NOT SET AND
COND. LATCH "NUMERIC VALUE" (2–3) SET 162

– SHIFT AUXILIARY–REGISTER (2–31); 2.9 – 166

– IF ACTUAL CHARACTER = "↑" AND 150
COND. LATCH "NUMBER < 1" (2–12) AND
COND. LATCH "NUMERIC VALUE" (2–3) SET

– SET COND. LATCH "EXPONENT" (2–15);
DISCONNECT BUS (2–2: 1.1)

– SHIFT NUMERIC VALUE REGISTER (3–1); 2.18 – 174

– IF COUNTER–1 (2–30) ≠ "1111" 170

– IF COUNTER–1 (2–30) = "1111" 170

– LOAD COUNTER–1 (2–30) WITH "1101"; 167
INTERCONNECT BUS (2–2: 1.1) 152

FIG.11C

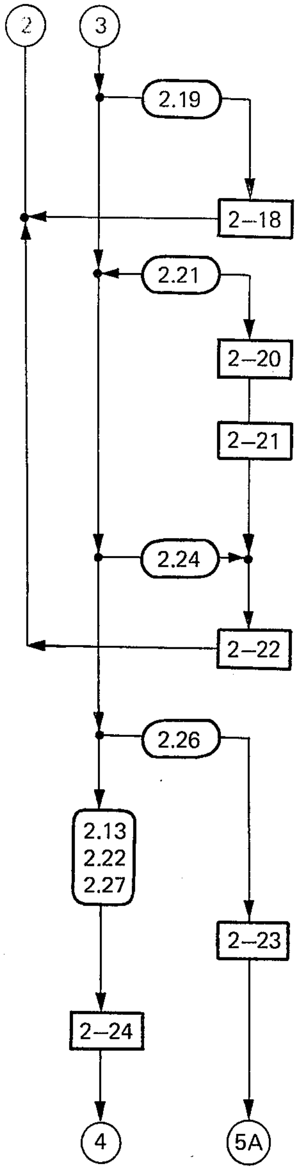

- IF ACTUAL CHARACTER = "–" AND COND. LATCH "EXPONENT" (2–15) SET AND COND. LATCH "NUMERIC VALUE" (2–3) SET — 207 – 9.4 – 9.5 – 9.6 – 9.8
- SET COND. LATCH "NEGATIVE SIGN" (2–19);
- IF ACTUAL CHARACTER = LETTER AND COND. LATCH "NUMERIC VALUE" (2–3) SET — 301 – 9.71
- NORMALIZE EXPONENT BY ARITHMETIK UNIT (14–10); — 178
- WAIT FOR END OF NORMALIZING; — 177
  RESET COND. LATCH "NEGATIVE SIGN" (2–19), "EXPONENT" (2–15) AND "NUMERIC VALUE" (2–3);
  LOAD COUNTER–1 (2–30) WITH "0000"; — 156
- IF ACTUAL CHARACTER ≠ OPERATOR AND COND. LATCH "NUMERIC VALUE" (2–3) NOT SET — 151 – 9.7 – 9.8
- SHIFT REGISTER FOR A HOMOSCRIBTIVE UNIT (5); — 175 – 5.2
  INCREASE COUNTER–1 (2–30); — 2.17 – 168
- IF ACTUAL CHARACTER = OPERATOR AND COND. LATCH "NUMERIC VALUE" (2–3) NOT SET — 151 – 9.7 – 9.8
- IF NONE OF THE CONDITIONS 2.4, 2.5, 2.8, 2.12, 2.19, 2.21, 2.24 OR 2.26 FULFILIED
- SHIFT OPERATOR–REGISTER (14–11); — 101
  DISCONNECT BUS (2–2: 1.1); — 2.29 – 2.12 – 157
  RETURN TO CONTROL NETWORK–1 (21); — 101
- DISCONNECT BUS (2–2: 1.1); — 2.29 – 2.12 – 157
  ERROR–END, RETURN; — 101

FIG.11D

3. SEPARATION OF A HOMOSCRIBTIVE UNIT

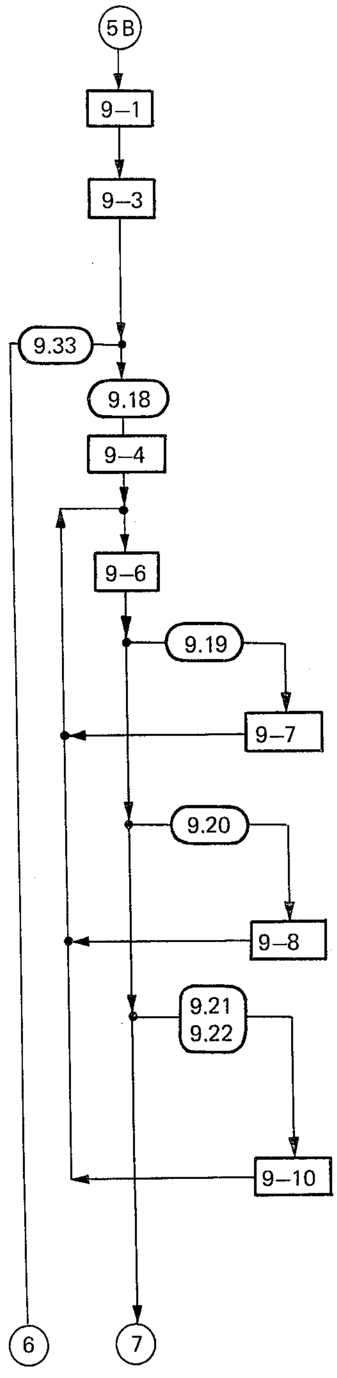

- SET COND. LATCH "FIRST FACTOR" (9–21); SWITCH OFF THE SWITCH ANALYSIS END (22) AND THE SWITCH SIGN NEXT FACTORS (17); — 230
- LOAD COUNTER–1 (2–30) WITH "1001"; SWITCH OFF THE SWITCH EXPONENT SIGN (15) AND THE SWITCH FACTOR–END (19); RESET COND. LATCH "FACTOR EXPONENT" (9–11); — 224
  INTERCONNECT BUS (9–2: 5.1); — 203
- IF ACTUAL CHARACTER ≠ LETTER — 301
- IF ACTUAL CHARACTER = LETTER — 301
- SHIFT REGISTER FOR A STRINGED UNIT (11); — 9.13 – 204 – 11.1
  INCREASE COUNTER–1 (2–30); — 9.13 – 204
  SET COND. LATCH "LETTER STRING" (9–5);
- SHIFT REGISTER FOR A HOMOSCRIBTIVE UNIT (5); — 9.17 – 202
- IF ACTUAL CHARACTER = LETTER AND SETTIN( THE COND. LATCH "LETTER–STRING" (9–5) AND COUNTER–1 (2–30) = "1111" — 9.71
- SHIFT REGISTER FOR A STRINGED UNIT (11); — 9.13 – 204 – 11.1
  INCREASE COUNTER–1 (2–30); — 9.13 – 204
- IF ACTUAL CHARACTER = "–" AND SETTING COND. LATCH "LETTER–STRING" (9–5) — 207 – 9.4 – 9.5 – 9.6 – 9.8
- RESET COND. LATCH "LETTER–STRING" (9–5); SWITCH IN THE SWITCH EXPONENT SIGN (15); — 9.15
- IF ACTUAL CHARACTER = NUMERAL DIGIT AND IF SETTING COND. LATCH "LETTER–STRING" (9–5) OR SWITCHING IN THE SWITCH EXPONENT SIGN (15) — 208 – 9.6 – 9.8
- SHIFT REGISTER FOR A FACTOR EXPONENT (12); — 201
  SHIFT EXPONENT–1–REGISTER (7), IF SETTING COND. LATCH "FIRST FACTOR" (9–21); — 9.16 – 200
  SET COND. LATCH "FACTOR EXPONENT" (9–11);
  RESET COND. LATCH "LETTER–STRING" (9–5); — 9.15

FIG. 11E

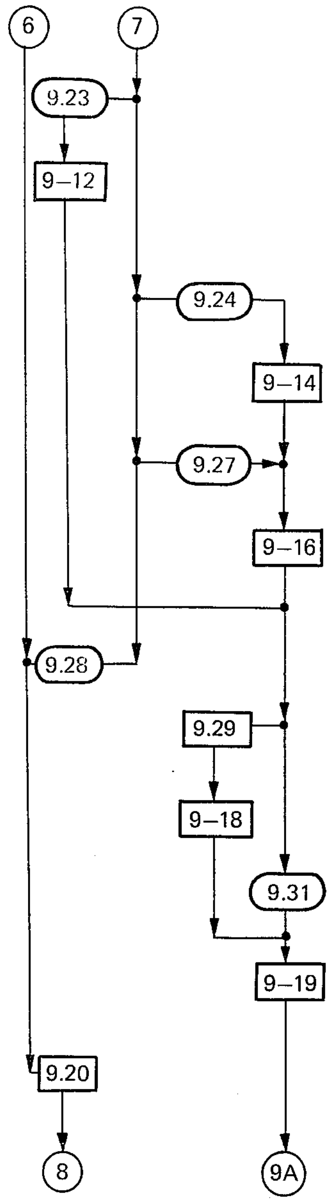

- IF ACTUAL CHARACTER = "/" 209 – 9.1 – 9.5 – 9.6 – 9.8
- SHIFT REGISTER FOR A HOMOSCRIBTIVE UNIT (5); 9.17 – 202
  SWITCH IN THE SWITCH SIGN NEXT FACTORS (17);
- IF ACTUAL CHARACTER = "0" 210 – 9.9 – 9.10 – 9.11
- SWITCH IN THE SWITCH ANALYSIS–END (22);
- IF ACTUAL CHARACTER = "." 211 – 9.2 – 9.5 – 9.6 – 9.8
- SWITCH IN THE SWITCH FACTOR–END (19);
  SHIFT REGISTER FOR A HOMOSCRIBTIVE UNIT (5); 9.17 – 202
- IF CONDITIONS 9.19, 9.20, 9.21 – 9.22, 9.23, 9.24 AND 9.27 NOT FULFILIED
- IF SETTING COND. LATCH "FIRST FACTOR" (9–21)
- RESET COND. LATCH "FIRST FACTOR" (9–21);
- IF NOT SETTING COND. LATCH "FIRST FACTOR" (9–21)
- DISCONNECT BUS (9–2: 5.1); END OF SEPARATION OF A HOMOSCRIBTIVE UNIT
- DISCONNECT BUS (9–2: 5.1); ERROR–END

FIG. 11F

4. SEPARATION OF A STRINGED UNIT

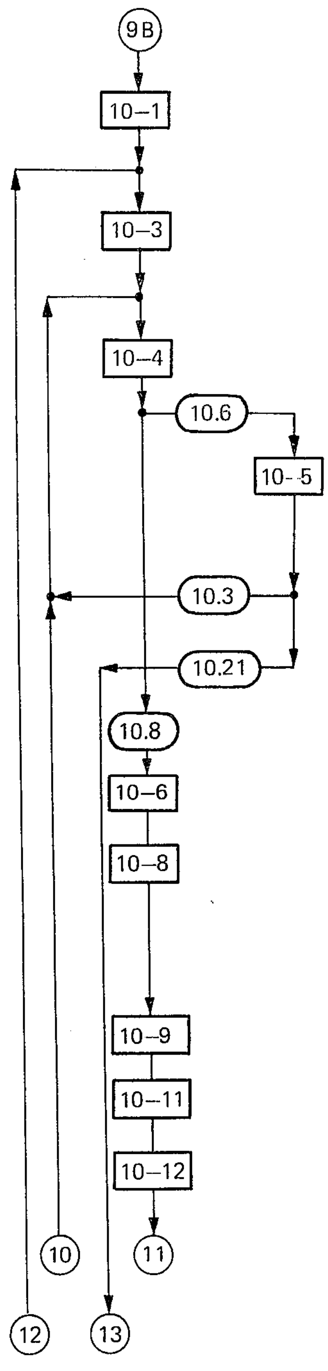

– RESET COUNTER MAXIMAL CHARACTERS (10–50), LETTER–COUNTER (10–30), CYCLE COUNTER (10–40) AND ADDRESS–COUNTER–1 (13–6); 312
INTERCONNECT BUS (10–2: 11.2); 302, 11.3

– SCRATCH THE ADDRESS–REGISTER (13–1, 13–2, 13–3, 13–4); 308
RESET COND. LATCH "PREFIX" (10–19); 308 – 10.5 – 317

–

– IF ACTUAL CHARACTER ≠ LETTER

– SHIFT REGISTER FOR A STRINGED UNIT (11); 10.7 – 303 – 11.1
SHIFT COUNTER MAXIMAL CHARACTERS (10–50); 327

– IF ERROR–SIGNAL (OVERFLOW COUNTER MAXIMAL CHARACTERS (10–50)) NOT SET 325

– IF ERROR–SIGNAL (OVERFLOW COUNTER MAXIMAL CHARACTERS (10–50)) SET 325

– IF ACTUAL CHARACTER = LETTER 301 – 9.71

– INTERCONNECT BUS (10–7: 14.1) 304 – 14.3

– SHIFT ADDRESS–REGISTER (13–1 OR 13–3); 325 – 10.9 – 307
COMBINE BITS TO CHECK–CHARACTER (10–71, 10–72, 10–73 OR 10–74, 10–75 OR 10–76, 10–77, 10–78); 325

– DISCONNECT BUS (10–7: 14.1); 304 – 14.3
INTERCONNECT BUS (10–10: 14.2); 305

– SHIFT ADDRESS–REGISTER (13–2 OR 13–4); 10.9 – 307

– DISCONNECT BUS (10–10: 14.2); 305

FIG.11G

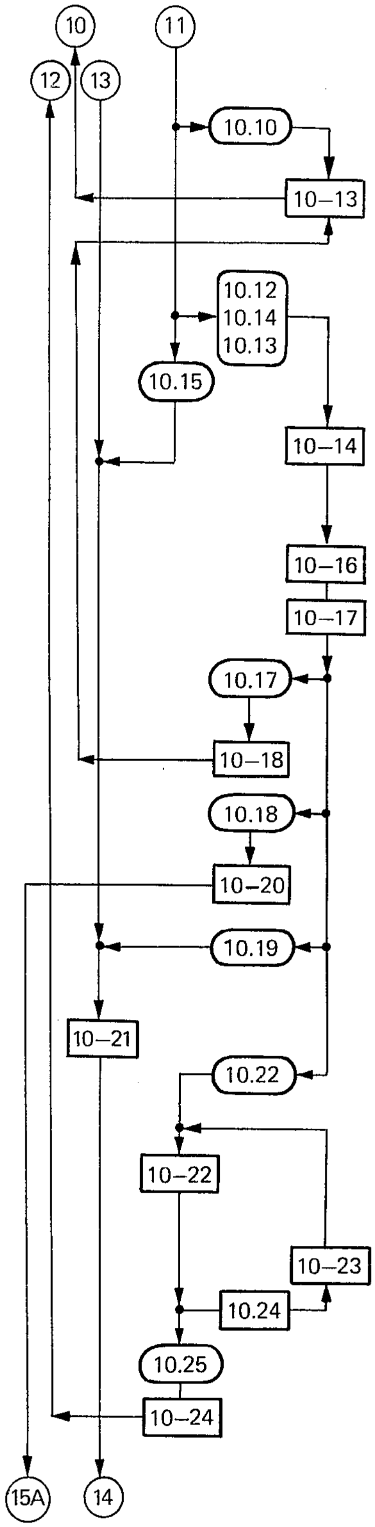

– IF SIGNAL "PREFIX–END" (334) AND SIGNAL "FINAL LETTER" (336) NOT SET

– SHIFT REGISTER FOR A STRINGED UNIT (11); 10.7 – 303 –11.1
SHIFT LETTER–COUNTER (10–30); 318 – 10.26 – 337

– IF NON–EQUIVALENCE BY SIGNAL "PREFIX–END" (334) AND SIGNAL "FINAL LETTER" (336) EXIST

– IF CONDITIONS 10.10 AND 10.12–10.14–10.13 NOT FULFILLED

– INTERCONNECT BUS (10–15: 18.1 OR 16.1) AND TRIP GATES (10–71 . . . 10.78, 10–81 . . . 10–88); 323
DISCONNECT BUS (10–2: 10.2);

– SHIFT LATCH (10–71 . . . 10–78); 310 – (10.41 . . . 10.48)

– DISCONNECT BUS (10–15: 18.1 OR 16.1);
INTERCONNECT BUS (10–2: 11.2)

– IF SIGNAL "CHECK–CHARACTER–EQUIVALENCE" (326) AND SIGNAL "PREFIX–END" (334) SET

– SET COND. LATCH "PREFIX" (10–19);

– IF SIGNAL "CHECK–CHARACTER–EQUIVALENCE" (326) AND SIGNAL "FINAL LETTER" (336) SET

– DISCONNECT BUS (10–2: 11.2); 302 – 11.3
END OF SEPARATION OF A STRINGED UNIT

– IF SIGNAL "CHECK–CHARACTER–EQUIVALENCE" (326) NOT EXIST AND SIGNAL "3–TH SEPARATION–CYCLE" (340) SET

– DISCONNECT BUS (10–2: 11.2); ERROR–END 302, 11.3

– IF SIGNAL "CHECK–CHARACTER–EQUIVALENCE" (326) AND SIGNAL "3–TH SEPARATION–CYCLE" (340) NOT EXIST

– SHIFT REGISTER FOR A STRINGED UNIT (11); 328 – 10.7 – 303 – 11.1
SHIFT LETTER–COUNTER (10–30); 10.26 – 337

–

– IF SIGNAL "FIRST LETTER" NOT SET 338

– IF SIGNAL "FIRST LETTER" SET 338

– SHIFT CYCLE–COUNTER (10–40); 339

FIG.11H

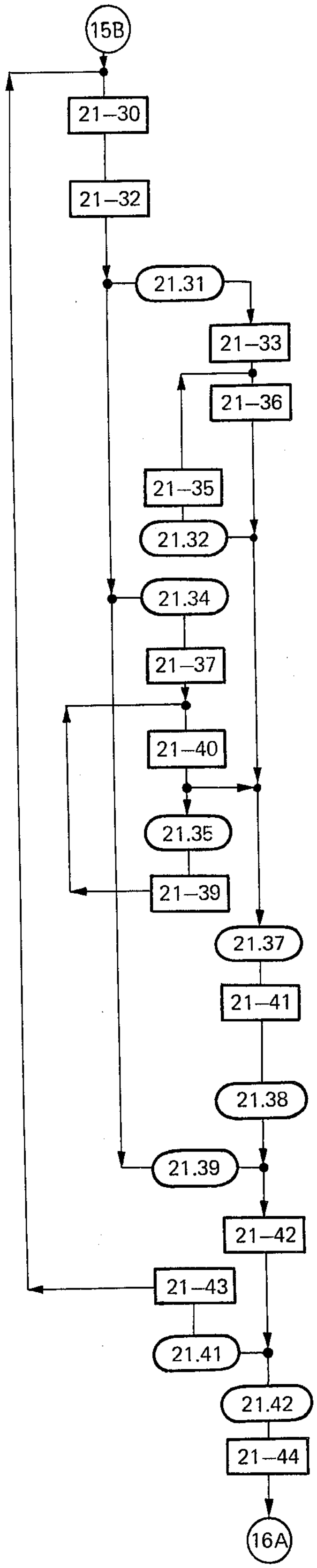

5. BUILDING UP THE NUMERIC VALUE
OF THE AUTOSCRIBTIVE QUANTITY

– INCREASE ADDRESS–COUNTER–1 (13–6); 408
INTERCONNECT BUS (21–31:
16.1 OR 18.1) 409 – 16.4 – (18.2, 16.3 – 16.2)

– SHIFT ADDRESS–REGISTER (13–5); 406
RESET ADDRESS–COUNTER–2 (13–7); 406
DISCONNECT BUS (21–31: 16.1 OR 18.1); 409 – 16.4

– IF 1–ST BIT OF THE ADDRESS–REGISTER
(13–5) NOT SET 405

– INTERCONNECT BUS (21–34: 20.1) 407

– SHIFT NUMERIC VALUE
REGISTER (3–1); 410 – 21.36 – 401
INCREASE ADDRESS–COUNTER–2 (13–7); 410 – 21.36 – 401

–

– IF ADDRESS–COUNTER–2 (13–7) ≠ "000" 13.22 – 403

– IF OF THE ADDRESS–REGISTER (13–5) THE
FIRST BIT SET AND THE SECOND BIT NOT SET

– INTERCONNECT BUS (21–38: 13.26 OR 13.27
OR 13.28); 400 – 13.29, 13.30, 13.31

– SHIFT NUMERIC VALUE REGISTER (3–1); 401
INCREASE ADDRESS–COUNTER–2 (13–7); 401

– IF ADDRESS–COUNTER–2 (13–7) ≠ "000" 13.22 – 403

–

– IF ADDRESS–COUNTER–2 (13–7) = "000"

– ACTIVATE CONTROL CIRCUIT OF THE
ARITHMETIC UNIT (14–10): 413
⟨3–2⟩ := ⟨3–1⟩$^{\langle 14–11 \rangle}$ ; ⟨3–3⟩ := ⟨3–3⟩ X ⟨3–2⟩

– IF SIGNAL "READY" OF THE ARITHMETIC
UNIT (14–10) SET

– IF FIRST AND SECOND BIT OF THE ADDRESS–
REGISTER (13–5) SET 404, 405

–

– RESET COND. LATCH "PREFIX"
(10–19); 311 – 10.5 – 317

– IF COND. LATCH "PREFIX" (10–19) SET 309

– IF COND. LATCH "PREFIX" (10–19) NOT SET 309

– END OF CYCLE "COMPUTE NUMERIC VALUE"

FIG.11I

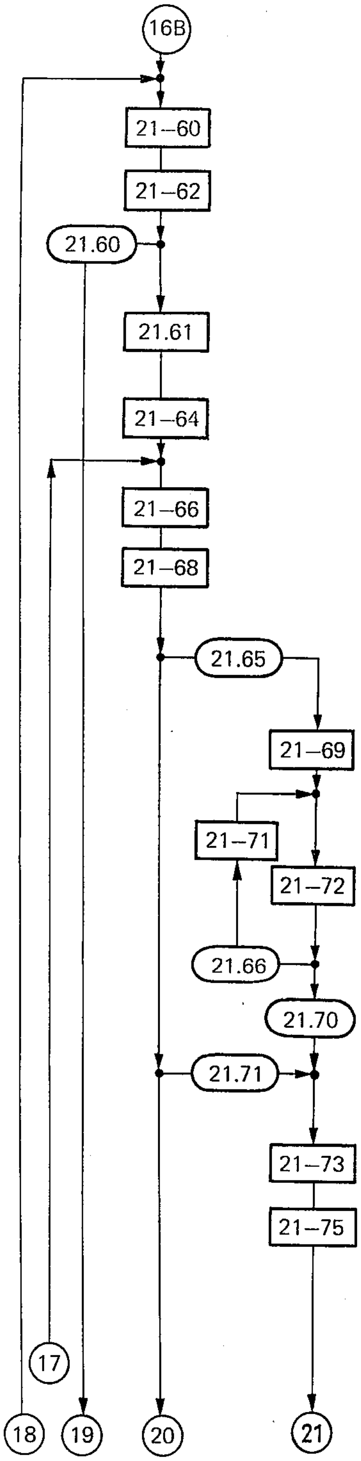

6. BUILDING UP THE AUTOSCRIBTIVE UNIT OF THE AUTOSCRIBTIVE QUANTITY

– INCREASE ADDRESS–COUNTER (13–6); 357
INTERCONNECT BUS (21–61: 16.1); 358 – 16.2

– SHIFT ADDRESS–REGISTER (13–5); 514

– IF THE SWITCH EXPONENT SIGN (15) AND 222
THE SWITCH SIGN NEXT FACTORS (17)
SWITCHED IN 214

– IF THE SWITCH EXPONENT SIGN (15) AND 222
THE SWITCH SIGN NEXT FACTORS (17)
NOT SWITCHED IN 214

– RESET ADDRESS–COUNTER (13–7); 515
INTERCONNECT BUS

– INTERCONNECT BUS (21–67: 23.1, 14.12) 507

– SHIFT ACCUMULATOR–REGISTER (14–3); 21.68 – 510
SHIFT ADDRESS–REGISTER (13–5); 512
SHIFT LATCH (14–4); 21.72 – 503

– IF 4–TH BIT OF THE ACCUMULATOR–
REGISTER (14–3) NOT SET AND 500
COND. LATCH "FACTOR EXPONENT" (9–11) SET 215

– LOAD EXPONENT–COUNTER (12–1); 519

–

– SHIFT ACCUMULATOR–REGISTER (14–3); 21.68 – 510
INCREASE EXPONENT–COUNTER (12–1); 520

– IF EXPONENT–COUNTER (12–1) ≠ 0 518 – 12.2

– IF EXPONENT–COUNTER (12–1) = 0 518 – 12.2

– IF 4–TH BIT OF THE ACCUMULATOR–REGISTER (14–3) 500
AND COND. LATCH "FACTOR–EXPONENT" (9–11) 215
NOT SET

– DISCONNECT BUS (21–70: 14.6); 508

– SHIFT ACCUMULATOR–REGISTER (14–3); 21.68 – 510
INCREASE ADDRESS–COUNTER (13–7); 21.73 – 515 – 13.20
DISCONNECT BUS (21–74: 14.5); 509
INTERCONNECT BUS (21–76: 14.3 OR 14.4); 502

FIG.11J

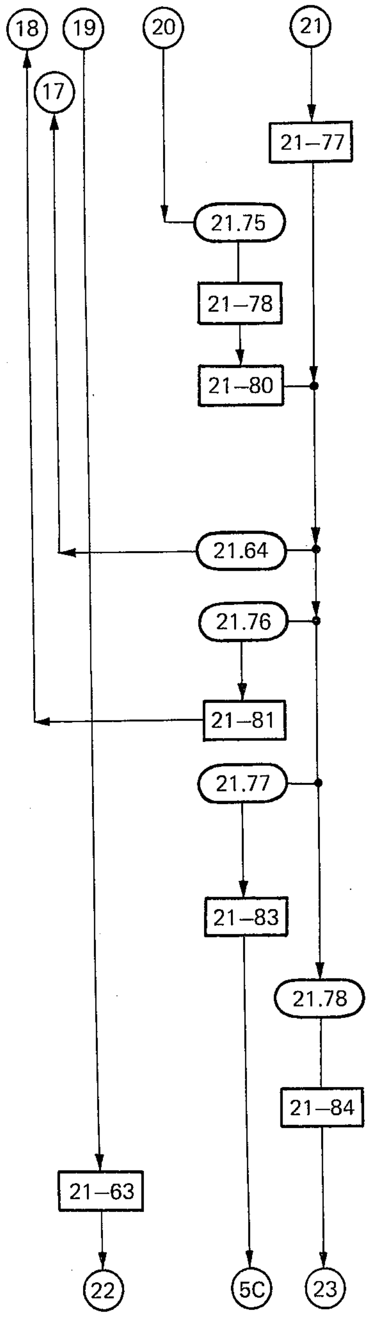

| | |
|---|---|
| – SHIFT REGISTER FOR AN AUTOSCRIBTIVE UNIT (8); | 21.74 – 511 |
| – IF 4–TH BIT OF THE WORKING–REGISTER (8–1) SET | 500 |
| – INTERCONNECT BUS (21–79: 14.5, 14.10) | 21.80 – 509, 501 |
| – SHIFT REGISTER FOR AN AUTOSCRIBTIVE UNIT (8); | 21.74 – 511 |
| INCREASE ADDRESS–COUNTER (13–7); | 21.73 – 515 – 13.20 |
| DISCONNECT BUS (21–79: 14.5, 14.10); | 21.80 – 509, 501 |
| – IF ADDRESS–COUNTER (13–7) ≠ "000" | 517 |
| – IF ADDRESS–COUNTER (13–7) = "000" AND COND. LATCH "DENOMINATOR UNIT" (21–82) NOT SET | 517 |
| – SET COND. LATCH "DENOMINATOR UNIT" (21–82) | |
| – IF ADDRESS–COUNTER (13–7) = "000" AND COND. LATCH "DENOMINATOR UNIT" (21–82) SET AND | 517 |
| THE SWITCH ANALYSIS–END (22) SWITCHED OFF | 213 |
| – GO TO "SEPARATION OF A HOMOSCRIBTIVE UNIT BY FACTORS" | |
| – IF ADDRESS–COUNTER (13–7) = "000" AND COND. LATCH "DENOMINATOR UNIT" (21–82) SET AND | 517 |
| THE SWITCH ANALYSIS–END (22) SWITCHED IN | 213 |
| – END OF "INPUT–TRANSFORMATION OF A HOMOSCRIBTIVE UNIT" | |
| – ERROR–END | |

FIG. 11K

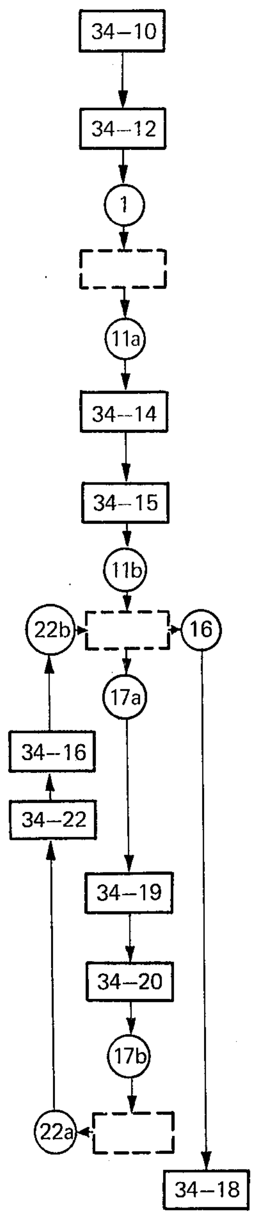

| SYMBOL | OPERATION OR YES–CONDITION | OVER THE LINE, BUS OR ELEMENT |
|---|---|---|
| | 1. CONTROL OF THE OPTIMAL OUTPUT–TRANSFORMATION OF AN AUTOSCRIBTIVE UNIT BY CONTROL NETWORK–4 (34) | |
| 34–10 | – START; | 195 |
| | SET COND. LATCH "EXTERNAL WAIT" (34–11); | 196 |
| | INTERCONNECT CLOCK–LINE (34–13: 34.14); | 201 |
| 34–12 | – ACTIVATE UNIT–GENERATOR–2 (51); | 200 |
| | – (GENERATION OF A HOMOSCRIBTIVE UNIT) | |
| 34–14 | – DISCONNECT CLOCK–LINE (34–13: 34.14); | |
| | INTERCONNECT CLOCK–LINE (34–17: 34.12); | 325 |
| 34–15 | – ACTIVATE CONTROL NETWORK (34–2); | 323 |
| | – (FORMATION OF A HOMOSCRIBTIVE UNIT) | |
| 34–16 | – ACTIVATE CONTROL NETWORK (34–2); | 324 |
| 34–22 | – DISCONNECT CLOCK–LINE (34–21: 34.13); | 430 |
| | INTERCONNECT CLOCK–LINE (34–17: 34.12) | 325 |
| 34–19 | – DISCONNECT CLOCK–LINE (34–17: 34.12) | 325 |
| | INTERCONNECT CLOCK–LINE (34–21: 34.13); | 430 |
| 34–20 | – ACTIVATE PREFIX–GENERATOR (27); | 429 |
| | – (GENERATION OF A PREFIX) | |
| 34–18 | – DISCONNECT CLOCK–LINE (34–17: 34.12) | 325 |
| | RESET COND. LATCH "EXTERNAL WAIT" (34–11); | |
| | (END OF THE OPTIMAL OUTPUT–TRANSFORMATION) | |

FIG.13 A

2. GENERATION OF A HOMOSCRIBTIVE UNIT

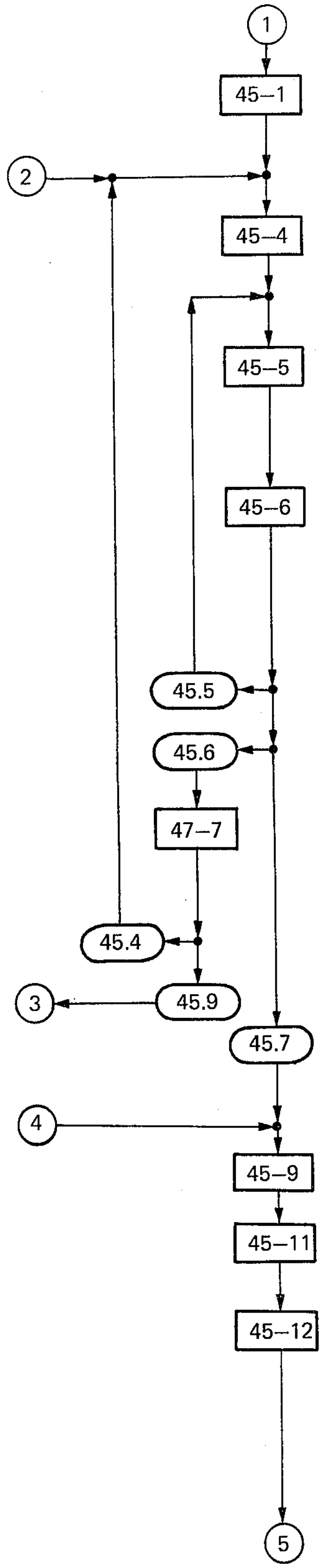

– SET COND. LATCH "FIRST FACTOR" (45–8);
RESET EXPONENT–COUNTER (51–7); 103 – 51.32 – 199
RESET GROUP–COUNTER (51–9); 103
RESET REFERENCE–UNIT–COUNTER (41–1); 103 – 51.25 – 139

– RESET BASE–UNIT–COUNTER (51–8); 117
RESET COND. LATCH "BASE UNIT" (51–1, . . ., 51–6); 104
INTERCONNECT BUS (45–3: 25.1, 25.2); 106 – (51.23 – 156)(51.24 – 157)

– SET COND. LATCH "BASE UNIT" (51–1 OR . . . OR 51–6); 107 – 51.2 – 205
INCREASE EXPONENT–COUNTER (51–7), IF SETTING THE COND. LATCH "FIRST FACTOR" (45–8); 107, 102 – 51.29 – 51.31 – 51.64 – 160

– INCREASE BASE–UNIT–COUNTER (51–8); 108 – 51.20 – 51.30 – 171
SHIFT ACCUMULATOR FOR AN AUTOSCRIBTIVE UNIT (25–1); 108 – 51.22 – 51.62 – 155
SHIFT ACCUMULATOR FOR AN AUTOSCRIBTIVE UNIT (25–2), IF SETTING COND. LATCH "FIRST FACTOR (45–8); 108, 102 – 51.21 – 51.61 – 154

– IF BASE–UNIT–COUNTER (51–8) ≠ 1 115

– IF BASE–UNIT–COUNTER (51–8) = 1 AND SIGNAL "SEPARATION" (173) NOT EXIST 115

– DISCONNECT BUS (45–3: 25.1, 25.2);
INCREASE GROUP–COUNTER (51–9); 109 – 51.37 – 51.66 – 174
RESET COND. LATCH "FIRST FACTOR" (45–8);

– IF GROUP–COUNTER (51–9) ≠ 7 177

– IF GROUP–COUNTER (51–9) = 7 177

– IF BASE–UNIT–COUNTER (51–8) = 1 AND SIGNAL "SEPRATION" (173) EXIST 115

– DISCONNECT BUS (45–3: 25.1, 25.2);

– INTERCONNECT BUS (38.3); 113 – 51.51 – 170
SHIFT DEFICIENCY REGISTER (37) 113 – 51.40 – 164 – 37.2

– SHIFT DEFICIENCY MEMORY (38); 114 – 51.43 – 167 – 38.2
SHIFT DEFICIENCY REGISTER (37); 114 – 51.40 – 164 – 37.2
SHIFT OVERFLOW REGISTER (35); 114 – 51.44 – 168 – 36.2
SHIFT ACCUMULATOR (14–3); 114 – 51.34 – 51.65 – 162
INTERCONNECT BUS (45–25: 25.1, 25.2); 111

FIG.13 B

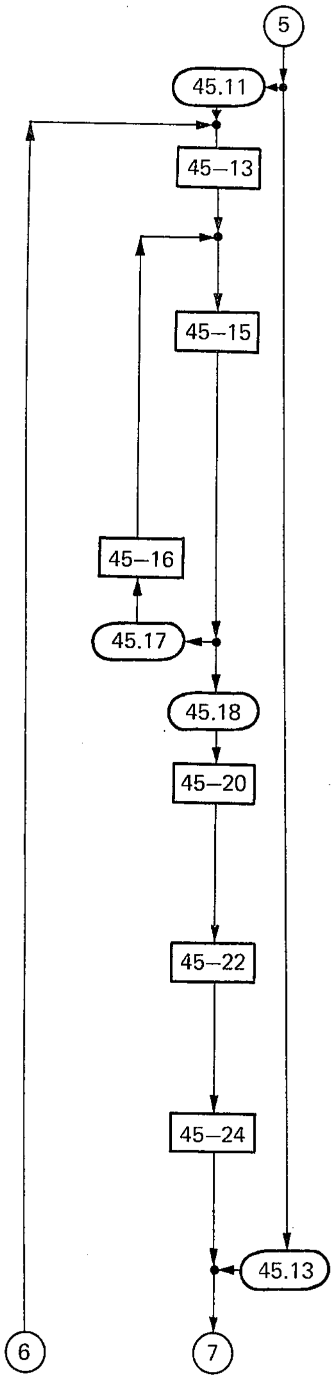

– IF SELECT–SIGNAL (116) SET

– DISCONNECT BUS (45–25: 25.1, 25.2); 178 – 45.21
INTERCONNECT BUS (45–14: 41.6 OR 41.7, 25.1, 25.2, 14.1 OR 14.2, 14.4 OR 14.5, 14.11 OR 14.10); 118 – (51.23 – 156, 51.24 – 157, 51–10 – 161, 14.7 – 14.8)

– SHIFT ACCUMULATOR (14–3),
LOAD COND. LATCH "SIGN" (14–2),
LOAD COND. LATCH "CARRY" (14–1); 119 – 51.34 – 51.65 – 162
DISCONNECT BUS (45–14: 41.6 OR 41.7, 25.1, 25.2, 14.1 OR 14.2, 14.4 OR 14.5, 14.11 OR 14.10);
DISCONNECT BUS (45–17: 14.12);

– INTERCONNECT BUS (45–17: 14.12); 121 – (51.33 – 110, 51.36 – 163)

– IF COND. LATCH "CARRY" (14–1) SET 120

– IF COND. LATCH "CARRY" (14–1) NOT SET 120

– INTERCONNECT BUS (14.12, 37.1 OR 35.1); 123 – (51.36 – 163, 51.46 – 51.41 – 165, 51.48 – 51.45 – 169)
SHIFT DEFICIENCY REGISTER (37) OR SHIFT OVERFLOW REGISTER (35); 123 – 51.46 – 51.40 – 37.2, 123 – 51.48 – 51.44 – 35.2

– INTERCONNECT BUS (37.1, 38.1); 125 – (51.41 – 165, 51.42 – 166)
LOAD COND. LATCHES "DEFICIENCY REGISTER ≠ 0" (37–3), "DEFICIENCY REGISTER < DEFICIENCY MEMORY" (37–1), "DEFICIENCY REGISTER > DEFICIENCY MEMORY" (37–2); 125 – 51.52

– INTERCONNECT BUS (35.1, 36.1); 127 – (51.45 – 169)
LOAD COND. LATCHES "OVERFLOW REGISTER ≠ 0" (35–2), "OVERFLOW REGISTER < OVERFLOW MEMORY" (35–1); 127 – 51.53

– IF SELECT–SIGNAL (116) NOT EXISTING

FIG.13 C

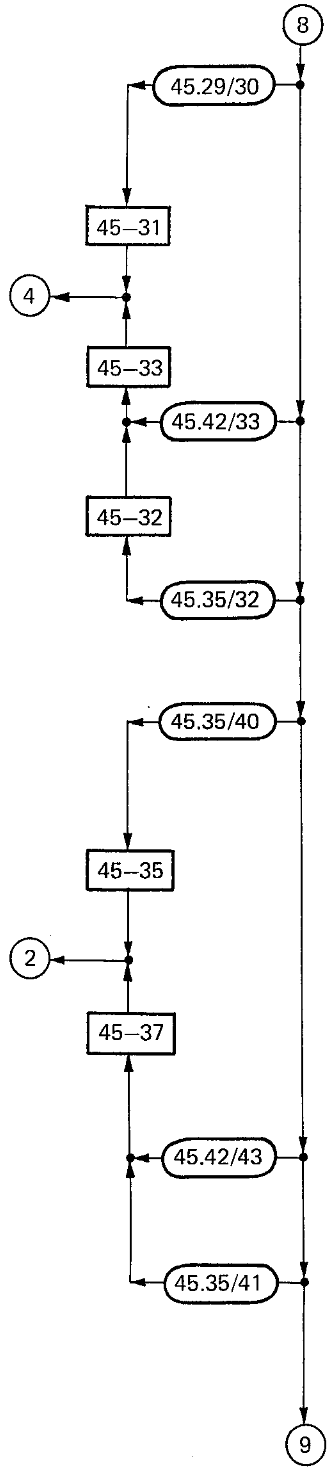

– IF REFERENCE–UNIT–COUNTER (41–1)
≠ "1010" AND 130
SIGNAL "HIGHER GROUPS" (137) EXISTS AND
(COND. LATCH "DEFICIENCY REGISTER ≠ 0" (37–3) OR 147
COND. LATCH "OVERFLOW REGISTER ≠ 0" (35–2)) SET 146

– INCREASE REFERENCE–UNIT–COUNTER
(41–1); 45.36 – 138 – 51.26 – 51.63 – 158

– SET COND. LATCH "RECIPROCAL UNIT" (45–34);

– IF SIGNAL "HIGHER GROUPS" (137) EXISTS AND
SIGNAL "DEFICIENCY MEMORY = M" (148) EXISTS AND:
COND. LATCH "RECIPROCAL UNIT" (45–34) NOT SET

– RESET REFERENCE–UNIT–COUNTER
(41–1); 45.37 – 139 – 51.25 – 135

– IF REFERENCE–UNIT–COUNTER (41–1)
= "1010" AND 130
SIGNAL "DEFICIENCY MEMORY = M" (148) EXISTS AND
COND. LATCH "RECIPROCAL UNIT" (45–34) NOT SET

– IF REFERENCE–UNIT–COUNTER (41–1)
= "1010" AND 130
SIGNAL "DEFICIENCY MEMORY = M" (148) EXISTS AND
SIGNAL "THIRD GROUP" (176) NOT EXISTING AND
COND. LATCH "RECIPROCAL UNIT" (45–34) SET

– RESET REFERENCE–UNIT–COUNTER
(41–1); 45.37 – 139 – 51.25 – 135
RESET COND. LATCH "RECIPROCAL UNIT" (45–34);
INCREASE GROUP–COUNTER
(51–9); 45.42 – 141 – 51.37 – 51.66 – 174

– RESET COND. LATCH "RECIPROCAL UNIT" (45–34);
INCREASE GROUP–COUNTER (51–9);
INCREASE REFERENCE–UNIT–COUNTER
(41–1); 45.36 – 138 – 51.26 – 51.63 – 158

– IF SIGNAL "HIGHER GROUPS" (137) EXISTS AND
SIGNAL "DEFICIENCY MEMORY = M" (148) EXISTS AND
SIGNAL "SEVENTH GROUP" (177) NOT EXISTING AND
COND. LATCH "RECIPROCAL UNIT" (45–34) SET

– IF REFERENCE–UNIT–COUNTER (41–1)
= "1010" AND 130
SIGNAL "DEFICIENCY MEMORY = M" (148) EXISTS AND
SIGNAL "THIRD GROUP" (176) EXISTS AND
COND. LATCH "RECIPROCAL UNIT" (45–34) SET

FIG.13 E

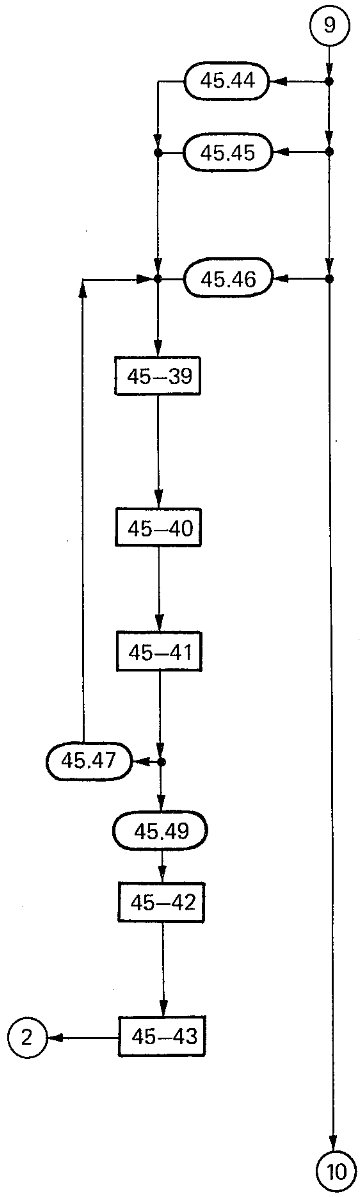

– IF SIGNAL "HIGHER GROUPS" (137) EXISTS AND
COND. LATCH "DEFICIENCY REGISTER < M" (38–2) SET 149

– IF COND. LATCH "DEFICIENCY REGISTER ≠ 0"
(37–3) AND 147
COND. LATCH "OVERFLOW REGISTER ≠ 0"
(35–2) NOT SET 146

– IF REFERENCE–UNIT–COUNTER (41–1)
= "1010" AND 115
COND. LATCH "DEFICIENCY MEMORY < M" (38–2) SET 149

– INTERCONNECT BUS (41.3, 41.6 OR 41.7,
25.1, 14.1 OR 14.2);
SHIFT ACCUMULATOR (14–3); 150 – 51.34 – 51.65 – 162
LOAD COND. LATCH "CARRY"
(14–1); 150 – 51.34 – 51.65 – 162

– INTERCONNECT BUS (14.12); 186 – 51.36 – 163
SHIFT ACCUMULATOR (14–3); 186 – 51.34 – 51.65 – 162
INCREASE BASE–UNIT–COUNTER
(51–8); 186 – 51.20 – 51.30 – 171

– INTERCONNECT BUS (14.12, 25.2); 187 – 51.36 – 163
SHIFT ACCUMULATOR FOR AN
AUTOSCRIBTIVE UNIT (25–1); 187 – 51.22 – 51.62 – 155

– IF BASE–UNIT–COUNTER (51–8) ≠ 1 115

– IF BASE–UNIT–COUNTER (51–8) = 1 115

– INTERCONNECT BUS (42.1); 188 – 51.39 – 184
READ MEMORY OF THE
SEPARATED UNITS (42) 188 – 51.39 – 184
SHIFT ACCUMULATOR (14–3); 188 – 51.34 – 51.65 – 162

– INTERCONNECT BUS (14.12,
42.2, 38.5); 189 – (51.36 – 163, 51.38 – 183)
WRITE MEMORY OF THE
SEPARATED UNITS (42); 189 – 51.38 – 183

FIG.13 F

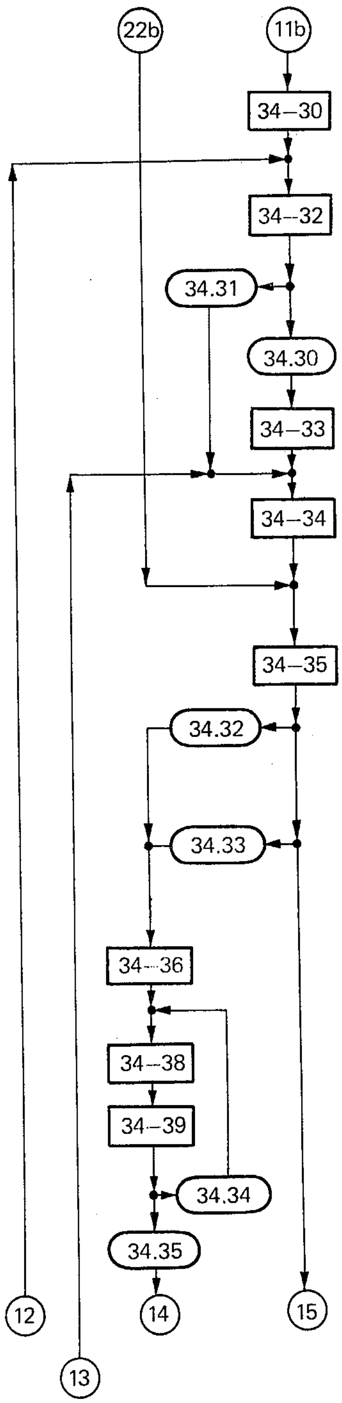

3. FORMATION OF A HOMOSCRIBTIVE UNIT

- RESET SWITCH "NEGATIVE ELEMENTS" (43); 301
  SET COND. LATCH "1. ELEMENT" (5–1);
  RESET CHARACTER–COUNTER (34–6); 301 – 5.10 – 5.17
- RESET REFERENCE–UNIT–COUNTER (41–1); 303 – 51.25 – 135
- IF COND. LATCH "ONLY BASE UNITS" (5–2) NOT SET 319
- IF COND. LATCH "ONLY BASE UNITS" (5–2) SET 319
- SET COND. LATCH "ABBREVIATION OF BASE UNITS" (5–3); 304 – 5.19
- INTERCONNECT BUS (42.1 OR 25.1 OR 25.3); 34.46 – 307, 34.45 – 306
  READ MEMORY OF THE SEPARATED UNITS (42); 305 – 51.39 – 184
  SHIFT EXPONENT–1–REGISTER (7); 305
- SHIFT ACCUMULATOR FOR AN AUTOSCRIBTIVE UNIT (25–1, 25–2);
- IF SWITCHING OFF THE SWITCH "NEGATIVE ELEMENTS" (43) AND 320
  SIGNAL "POSITIVE FACTOR" (317) EXISTS AND
  COND. LATCH "1. ELEMENT" (5–1) NOT SET 316
- IF SWITCHING IN THE SWITCH "NEGATIVE ELEMENTS" (43) AND 320
  SIGNAL "NEGATIVE FACTOR" (315) EXISTS AND
  COND. LATCH "1. ELEMENT" (5–1) NOT SET
- INTERCONNECT BUS (34–37: 5.11 OR 5.12. OR 5.13); 322
- SHIFT REGISTER FOR A HOMOSCRIBTIVE UNIT (5); 309 – 5.3 – 5.1
- INCREASE CHARACTER–COUNTER (34–6); 310 – 5.9 – 5.16
- IF CHARACTER–COUNTER (34–6) ≠ 1 335
- IF CHARACTER–COUNTER (34–6) = 1

FIG.13 H

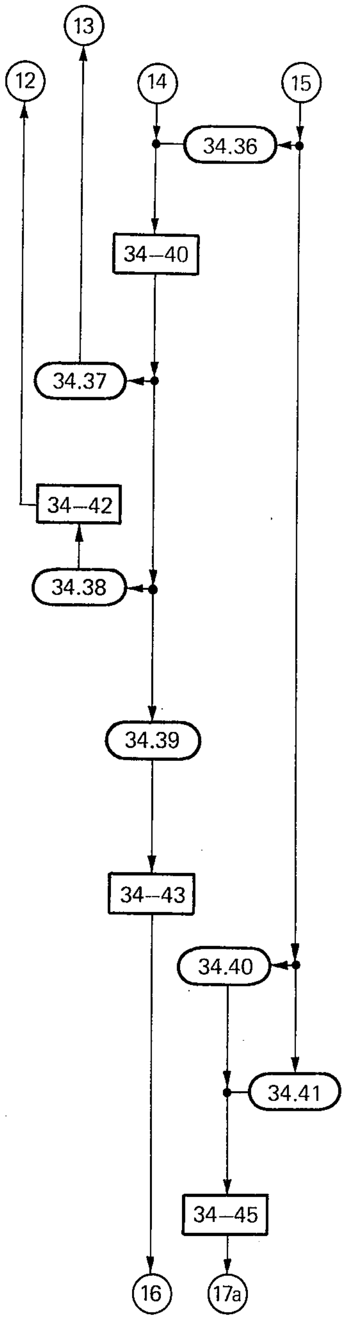

– IF SIGNAL "POSITIVE FACTOR" (317) NOT EXISTING AND SIGNAL "NEGATIVE FACTOR" (315) NOT EXISTING

– DISCONNECT BUS (34–37); RESET COND. LATCH "/" (34–41); INCREASE REFERENCE–UNIT–COUNTER (41–1); 330 – 51.26 – 51.63 – 158

– IF REFERENCE–UNIT–COUNTER (41–1) ≠ "1000" AND COND. LATCH "ABBREVIATION OF BASE UNITS" (5–3) NOT SET 318

– SWITCH IN THE SWITCH "NEGATIVE ELEMENTS" (43); SET COND. LATCH "/" (34–41);

– IF REFERENCE–UNIT–COUNTER (41–1) = "1000" AND COND. LATCH "ABBREVIATION OF BASE UNITS" (5–3) SET AND SWITCHING OFF THE SWITCH "NEGATIVE ELEMENTS" (43) 318

– IF REFERENCE–UNIT–COUNTER (41–1) = "1000" AND COND. LATCH "ABBREVIATION OF BASE UNITS" (5–3) SET AND SWITCHING IN THE SWITCH "NEGATIVE ELEMENTS" (43) 318

– (END OF "OPTIMAL OUTPUT–TRANSFORMATION OF AN AUTOSCRIBTIVE UNIT")

– IF SIGNAL "POSITIVE FACTOR" (317) EXISTS AND SWITCHING OFF THE SWTICH "NEGATIVE ELEMENTS" (43) AND COND. LATCH "1. ELEMENT" (5–1) SET 316

– IF SIGNAL "NEGATIVE FACTOR" (315) EXISTS AND SWITCHING IN THE SWITCH "NEGATIVE ELEMENTS" (43) AND COND. LATCH "1. ELEMENT" (5–1) SET 316

– INTERRUPT (GENERATION OF A PREFIX)

FIG.13 I

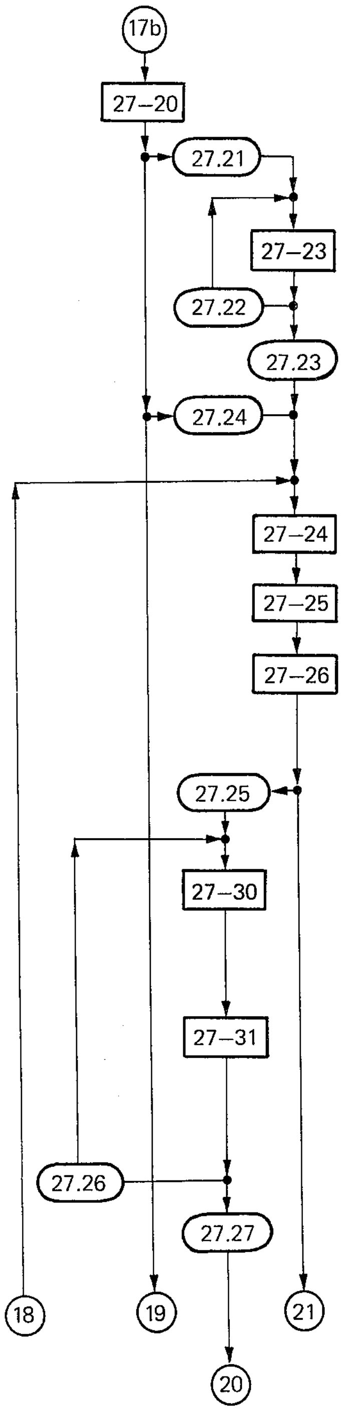

4. GENERATION OF A PREFIX

– RESET PREFIX–COUNTER (27–1);

– IF SIGNAL "EXPONENT–1 = 1" (424) EXISTS AND SIGNAL "EXPONENT OF FACTOR < 6" (409) EXISTS

– INCREASE PREFIX–COUNTER (27–1); 27.49 – 427

– IF PREFIX–COUNTER (27–1) ≠ "00101" 421 – 27.51

– IF PREFIX–COUNTER (27–1) = "00101" 421 – 27.51

– IF SIGNAL "EXPONENT–1 = 1" (424) NOT EXISTING AND SIGNAL "EXPONENT OF FACTOR < 6" (409) EXISTS

– SHIFT NUMERIC VALUE REGISTER (3–1, 3–2); 27.50 – 419 – 3.11

– SHIFT NUMERIC VALUE REGISTER (3–1, 3–2); INTERCONNECT BUS (27–22: 24.10, 3.10) 420

– LOAD COND. LATCH "EXPONENT–1 < Δ–EXPONENT" (27–28);
LOAD COND. LATCH "EXPONENT–1 < Δ–EXPONENT" (27–29);

– IF SIGNAL "EXPONENT–1 < Δ–EXPONENT" (418) EXISTS

– SHIFT NUMERIC VALUE ACCUMULATOR (24–1, 24–2); 47.41 – 428 – 24.11
SHIFT NUMERIC VALUE REGISTER (3–1, 3–2); 47.41 – 428 – 27.50 – 3.11
LOAD COND. LATCH "CARRY" (14–1);

– SHIFT NUMERIC VALUE ACCUMULATOR (24–1, 24–2); 47.41 – 428 – 24.11
SHIFT NUMERIC VALUE REGISTER (3–1, 3–2); 47.41 – 428 – 27.50 – 3.11
LOAD COND. LATCH "CARRY" (14–1);

– IF COND. LATCH "CARRY" (14–1) SET 120

– IF COND. LATCH "CARRY" (14–1) NOT SET 120

FIG.13 J

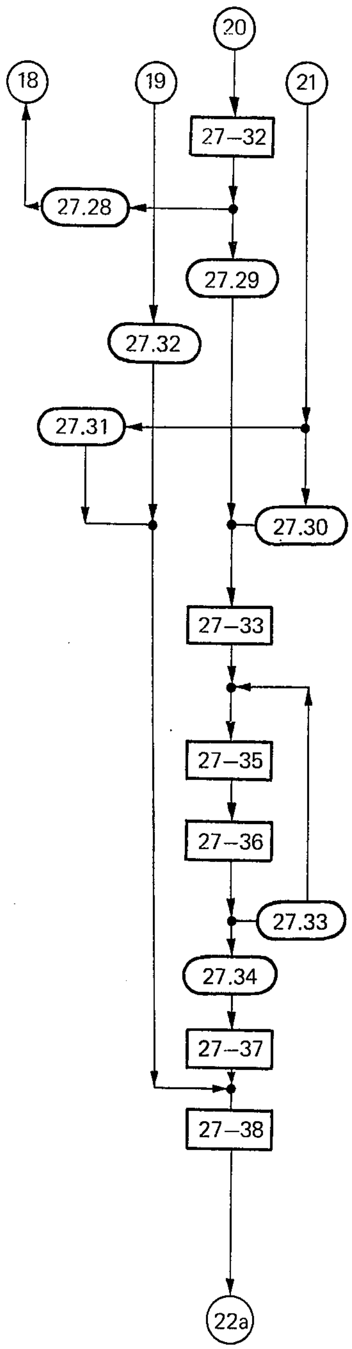

– INCREASE PREFIX–COUNTER (27–1); 402 – 27.49 – 427

– IF PREFIX–COUNTER (27–1) ≠ "10001" 408

– IF PREFIX–COUNTER (27–1) = "10001" 408

– IF SIGNAL "EXPONENT OF FACTOR < 6" (409) NOT EXISTING

– IF SIGNAL "EXPONENT–1 < Δ–EXPONENT" (418) EXISTS AND PREFIX–COUNTER (27–1) = "00000" 407

– IF SIGNAL "EXPONENT–1 < Δ–EXPONENT" (418) EXISTS AND PREFIX–COUNTER (27–1) ≠ "00000" 407

– INTERCONNECT BUS (27–34: 5.14 OR 5.15); 412
INCREASE CHARACTER–COUNTER (34–6); 27.47 – 415 – 5.9 – 5.16

– SHIFT REGISTER FOR A HOMOSCRIBTIVE UNIT (5); 414 – 5.3 – 5.1

– INCREASE CHARACTER–COUNTER (34–6); 27.47 – 415 – 5.9 – 5.16

– IF CHARACTER–COUNTER (34–6) ≠ 2 413

– IF CHARACTER–COUNTER (34–6) = 2 413

– RESET CHARACTER–COUNTER (34–6); 416 – 5.10 – 5.17

– INCREASE CHARACTER–COUNTER (34–6); 27.47 – 415 – 5.9 – 5.16
RESET COND. LATCH "1. ELEMENT" (5–1); 417 – 5.8 – 5.7
(END OF "GENERATION OF A PREFIX")

FIG.13 K

DEVICE FOR THE AUTOMATED DIGITAL TRANSCRIPTION AND PROCESSING OF QUANTITIES AND UNITS

This is a continuation-in-part of my copending application, Ser. No. 758,606, filed Jan. 12, 1977 and now abandoned.

SUMMARY

A device for the automated digital transcription and processing of quantities and units is provided as an extension of the technology of calculators (EDPM, process computers, desk calculators, pocket calculators), data collecting and data output equipment as well as measuring, control and regulating equipment. It is a combination of electronic, sequentially operating individual circuits, which allows all quantities and units of a quantity system, such as e.g. 20 OHM/M, be put in by an alphanumeric keyboard, processed with each other and then read out by an alphanumeric output in the usual representation. When used in programmable equipment, programs of a high universality and transparency arise; e.g., the programmed quantity equation (v·t)/s=1 (v: velocity; t: time; s: path) replaces about 100,000 programmed numeric value equations. The device can be divided into several circuits complementing one another in function: input-transformation, automated processing, and output-transformation. The device can be in the form of LSI circuits. A pocket or desk calculator is described, and FIG. 6 shows the interaction of the most important assemblies.

APPLICATION OF THE INVENTION

The invention relates to a device for the automatic digital transcription and processing of quantities and units by means of a sequentially operating circuit including an alphanumeric input keyboard and an alphanumeric display.

The device is an extension of the hardware technology of calculators (electronic data processing systems, process computing systems, pocket calculators, and the like), measuring, control and regulating equipment, as well as of data collecting and data output devices.

Known technical solutions

In calculators of the usual design for calculating with quantities, a given generally accepted quantity equation is transcribed in a specific numeric value equation; that is, the calculation with quantities by calculators is always transcribed by a calculation with numeral digits tailored to the specific case of application.

For instance, in the quantity equation $$(v \cdot t)/s = 1$$

v: velocity
t: time
s: path the path "s" can be indicated in 19 different units (e.g., micrometer, meter, angstrom etc.), the time in 62 different units (e.g., nanoseconds, years, millions of years) and accordingly, the velocity in 1, 178 different units. In this case, the given quantity equation replaces 96, 596 numeric value equations, such as $$v_x = 3.6 : 10^{-2} \frac{s_x}{t_x} \qquad \frac{v_x}{km/h} \Big| \frac{s_x}{cm} \Big| \frac{t_x}{s}$$

Presently, in measuring, control, and regulating equipment the presetting of defined values via switches and the like and the display with analogously operating measuring instruments, optical recorders, or graphic output devices, permits the specific quantities to be displayed in units which are "coherent" and compatible.

The state of engineering of calculators necessitates the tracing back of each operation with quantities to an operation with numeric values; with the result that:

- Extensive manual preliminary and secondary operations are necessary.
- The established solutions (programmes) generally apply only to a special case.
- The high percentage of manual work introduces a source of misinterpretations and errors.
- Automated separation and stringing together of formulas by a calculator for a system solution is complicated.

Regarding the known state of engineering of measuring, control, and regulating equipment it can be critically stated:

- The presetting or the display of values is directed only to the respective case.
- Presetting or display devices adaptable to a great number of kinds of quantities, in the manner of writing of quantities that the technician is familiar with, are not known.

OBJECT OF THE INVENTION

The invention is directed to the provision of a system enabling the present utilitarian value of calculators, measuring, control, and regulating equipment, as well as of data collecting and data output devices, to be greatly increased by:

- the clearer and more rapidly understandable representation of quantities for and by the equipment;
- the universal use of quantity presetting or display equipment for a great number of kinds of quantities;
- the reduction of the requirements for the manual preliminary and secondary operations for the processing of quantities;
- the rationalization of the programming of calculators due to the programming of quantity equations, as defined by the quantity equation rule;
- the direct processing of quantities without limitation of the kinds of quantities of a quantity system; and
- the potential of automation updating of the parameters of the data processing technology of quantities.

BRIEF SUMMARY OF THE INVENTION

The invention is based on the principle that homoscribtively represented quantities are reversibly unambiguously represented or transferred to autoscribtive quantities and that without further additional instructions autoscribtive quantities can be added, subtracted, multiplied, divided, raised to a power, or the roots can be extracted, by the array.

A homoscribtively represented quantity is a quantity representation form that is very understandable, easily perceptible and impressive for man, and which corresponds to the usual representation of quantities e.g., "96 KM/HR" for 96 kilometers per hour.

An autoscribtive quantity is the representation form for a quantity chosen for a fast and uncomplicated processing with the device, in the form of a sequence of numbers, for the numeric value and the autoscribtive unit of this quantity. An autoscribtive unit can be represented by two numbers as a packed unit or with n numbers as an unpacked unit; where n depends on the number of base units of the selected unit system. The two numbers of the packed unit are called numerator unit and denominator unit. The terms "homoscribtive" and "autoscribtive" are used interchangeably with the terms "homoscriptive" and "autoscriptive" throughout the specification and drawings.

A calculator according to the invention is characterized by the several facts as follows:

That homoscribtive quantities—such as "1 A" (1 Ampere), "50 GOHM" (50 gigaohms), "95 V/M" (95 volts per meter), "130 KA/HAR" (130 kiloamperes per hectare), which according to the generally accepted formation rules for units from elements of a provided set of abbreviations for elementary units (see table 1) and of abbreviations of prefixes (see table 2) are formed and stringed together with a numeric value—can be put into a calculator directly and immediately as one data entry.

That useful operations between quantities or between quantities and numbers are solved by the calculator immediately and independently, as for example:

15 V/3MA=5 KOHM; 15 V/3MA=5 KOHM

With this feature, all those kinds of quantities are allowed, wherein the unit of the quantity is representable with elements of the provided set of elementary units as an exponential product. In the execution of the operations, the calculator uses the autoscribtive representation form of quantities.

That autoscribtive resulting quantities determined by the calculator are read out homoscribtively in an optimal, surveyable and impressive representation form. Thus, the output of "$0.0351\times10^{11}$ WB.S.A." (webers-seconds-amperes) is displayed in form of "3.51 GOHM". For this kind of quantity to be displayed, the calculator generates a homoscribtive unit with a minimum number of factors in the exponential product.

That autoscribtive quantities determined by the calculator for a specified kind of quantity are read out in a preset homoscribtive unit of this kind of quantity. For example, for a resulting quantity of velocity, the unit "KM/HR" (kilometer per hour may be preset, in which case the result is always read out in this unit—regardless of the units, in which the path is given (meters, inches, miles, kilometers, or angstroms . . .) or the time is given (picoseconds, seconds, minutes, hours, days or years . . . ).

That autoscribtive quantities determined by the calculator for a specified kind of quantity in a preset homoscribtive unit of this kind of quantity—with representation of the numeric value as fixed-point digits in the number area 0.001 to 999.999 and determination of a prefix for the homoscribtive unit—are read out. Thus, if for a resulting quantity of frequency the unit "HZ" (Hertz) is preset, the output of the quantity "$3\times10^4\ s^{-1}$", is given in the form of "30 KHZ" (30 kilohertz).

That when operating with quantities, the calculator executes extensive checking measures—e.g. whether useful quantities were made available for processing at all or whether the operations with quantities yield efficient new (measuring) units or kinds of quantities (this function is to be put on a level with the "dimension computing", which engineers and physicists use for checking the corrections of formulas).

A measuring or data collecting device extended according to the invention is characterized by the several facts as follows:

That at its output an autoscribtive quantity in the form of a pulse sequence is available, which represents unambiguously, both quantitatively and qualitatively, the quantity made available for processing.

That the autoscribtive quantity made available at the output of the device in the form of a pulse sequence, without limitation to the kinds of quantities used, can be processed by all assemblies and device units without special programming or matching (the prerequisite is that these devices are designed according to the technique for the automated processing of quantities described in this work).

A measuring or data output device extended according to the invention is characterized by the several facts as follows:

That it represents a given autoscribtive quantity in the form of a pulse sequence for a quantity measured or determined in the system in an optimal, surveyable and impressive homoscribtive representation form.

That a specified kind of quantity resulting in the system for a defined point can be read out a preset homoscribtive unit of this kind of quantity.

That it can read out any quantities, which are representable with a preset set of elementary units.

A control or regulating device according to the invention is characterized by the several facts as follows:

That the presetting of regulating variables, measured value limits and others is performed in the usual homoscribtive representation form.

That input and output assemblies of control and regulating devices are applicable without limitation to the kinds of quantities of the quantity system and therewith are universally applicable.

That the output of homoscribtive quantities is displayed as a character sequence in an optimal and surveyable representation form.

In order to provide the above results, the following requirements must be met:

(1)

The first requirement consists in the use of a defined set of abbreviations for prefixes and abbreviations for elementary units.

Prefixes are independent designations, or independent designations reduced to a few characters ("abbreviations"), for powers of the number 10.

Elementary units are units with independent designations, or independent designations reduced to few characters ("abbreviations"), for coherent or incoherent (measuring) units.

The defined set of abbreviations for prefixes and of abbreviations for elementary units has to meet the following requirements:

Only the characters of a limited character set are used.

The set of prefixes, as well as the set of elementary units, is not to contain homonymous abbreviations.

Abbreviations, which can be formed by the stringing together of an abbreviation of a prefix and an abbreviation of an elementary unit, may not be equal either to an abbreviation of the prefixes, or to an abbreviation of the elementary units; unless, the abbreviation has the same semantic content as its homonym (example: "KG" is the abbreviation of the elementary unit kilogram on the one hand, and, on the other hand, this abbreviation arises from stringing together the abbreviation of the prefix "K" (kilo) with the abbreviation "G" of the elementary unit gram.

In tables 1 and 2, a set of abbreviations for prefixes and of abbreviations for elementary units, which meets the requirement mentioned, is listed as an example—with this set the units of the fields of natural science, engineering, industry and economy can be represented to a large extent.

In table 3, which is a part of the list of table 1, a set of abbreviations for elementary units is set forth. Thus, with the physical-technical prefixes according to table 2; the physical-technical units are all representable.

Homoscribtive quantities can be represented by a defined set of abbreviations for prefixes and abbreviations for elementary units. A homoscribtive quantity is a closed string of characters consisting of a "numeric value" followed by an "abbreviation of the unit".

Example: 22 M/S2

Therefore, for the formation of the abbreviation of the unit the following general rules have to be followed:

All abbreviations of the elementary units according to table 1 or table 3 are allowed as abbreviations of the unit.

Examples: M, S, KG, V, H, HPW

Decimal parts and multiples of elementary units, which are represented by stringing together an abbreviation of a prefix with an abbreviation of an elementary unit, are allowed as abbreviations of the unit; such a unit is also called a "stringed unit" or "stringed-together unit" hereinbelow.

Examples: MM, MYS, KV

Integer powers of elementary or stringed-together units are allowed as abbreviations of the unit; so that in stringed-together units the exponent is related to the prefix, as well as to the elementary unit.

Examples: MM3, S-2

Derived units in form of exponential products are allowed as abbreviations of the unit. They are represented by inserting a period, ".", between the multiplicatively stringed factors of the exponential product.

Examples: OHM.M, A.S., KM.HR-1

Derived units in the form of exponential products can be represented such that on the left side of the character "/" all elements of the exponential product with a positive exponent are given and on the right side of that character all elements with a negative exponent are given, so that the negative sign of the exponent in the element is omitted.

Examples: KM/HR, A/MM2

For the formation of stringed units legal rules, international standards, and the traditional use are to be considered.

(Note: All combinations logically possible of the defined set are correctly interpreted by the device when they are put in; in the output the above mentioned instructions can be followed.)

Example: The unit "horsepower" is not to be stringed-together with decimal prefixes since there is no accepted usage of "microhorsepower", for example.

(2) The second requirement is that, for the defined set of elementary units, there is a basic number B of base units $L$ and each elementary unit $F$ is representable according to the formula $$F_x = L^{n1}{}_1 \cdot L^{n2}{}_2 \cdot \ldots \cdot L^{nk}{}_k$$

with $B = (L_1, \ldots, L_k)$ k: positive integer numeral digit n: integer exponent In table 4, as an example, the pertinent basic set of base units is represented for the set of elementary units defined in table 1.

In table 5, the pertinent basic set of base units is represented for the set of elementary units defined, for example, in table 3.

In table 6, the elementary units determined in table 1, for example, are listed in form of exponential products from base units.

The invention, for the extension of the device technology of calculators, data collecting and data output devices, measuring, control and regulating equipment for the automated digital transcription and processing of quantities and units thereby requires:

That an input device, designated as a circuit for the input transformation of quantities, is designed such that quantities in the form of digital data as homoscribtive quantities are transcribed in a form processable by the equipment or the device as autoscribtive quantity, without changing the content of the data;

That a processing device, designated as a circuit for the automated processing of autoscribtive quantities, is designed such that autoscribtive quantities can be processed with each other, resulting in data with a new content;

That an output device, designated as a circuit for the output transformation of quantities, is designed such that autoscribtive quantities can be transcribed and displayed by the equipment or the device in a form clear, familiar and easily impressive for man, without changing the content of the data.

According to the invention, a device for the automated digital transcription and processing of quantities and units, for the extension of the device technology of calculators, data collecting and data output devices, measuring, control and regulating equipment, comprises a digital, electronic, sequentially operating circuit having the following essential assemblies characterizing their functions (the numbers refer to the reference numerals in the drawings):

A control network 46, a calculating assembly 14,
a logical network 9, a compounder network 31,
a check code generator 10,
a unit generator-1 28 or a unit generator-2 51,
a prefix generator 27,
a register for a homoscribtive unit 5,
a register for an autoscribtive unit 8,
a unit register 47, a coefficient register 48,
a numeric value register 3,
an address register 13,
a numeric value accumulator 24,
an accumulator for an autoscribtive unit 25,
a read-only memory for elementary units 16,
a read-only memory for prefixes 18, a read-only memory for numeric values 20, a read-only memory for
groups of exponents to base units 23,
a display device 50 and an input keyboard 1.
The control network 46 combines the functions
of a control network-1 21,
of a control network-2 26,
of a control network-3 32, as well as
of a control network-4 34.

The character transfers between the assemblies and the character processing in the assemblies are performed bit serially and/or bit parallel.

The assemblies,
control network 46, control network-1 21,
control network-2 26, control network-3 32,
control network-4 34, logic network 9,
compounder network 31, check code generator 10,
unit generator-1 28, unit generator-2 51,
and prefix generator 27,
designed as a digital electronic circuits or logic networks, are also representable by a read-only programming memory and a microprocessor system.

The whole circuit arrangement can be divided into three circuits that complement each other in their functions:

Circuit arrangement for the input transformation of quantities.

Circuit arrangement for the automated processing of autoscribtive quantities.

Circuit arrangement for the output transformation of quantities.

In the circuit arrangement for the output transformation of quantities there are two variants to be distinguished:

Circuit arrangement for the controlled output-transformation of quantities.

Circuit arrangement for the optimal output transformation of quantities.

Thus the assemblies characterizing the function of the invention can be not only an element of all circuit arrangements, but also an element of only one subordinate circuit arrangement. With the circuit arrangements functionally complementing one another, six main functions can be realized.

(1) Representation of a homoscribtive quantity by an autoscribtive quantity with the circuit arrangement for the input transformation of quantities.

(2) Processing of two autoscribtive quantities to an autoscribtive resulting quantity with the circuit arrangement for the automated processing of autoscribtive quantities.

(3) Controlled representation of an autoscribtive quantity by a homoscribtive quantity with the circuit arrangement for the controlled output transformation of quantities, whereby the units of a certain set of kinds of quantities are fixed.

(4) Optimal representation of an autoscribtive quantity by a homoscribtive quantity with the circuit arrangement for the optimal output transformation of quantities, the circuit generating an optimal unit for any kind of quantity in a quantity system.

(5) Parameter-controlled representation of an autoscribtive quantity by a homoscribtive quantity including generation of a prefix for a given unit in dependence on the numeric value of the quantity with the circuit arrangement for the input transformation of quantities and the prefix generator 27.

(6) Parameter-controlled representation of an autoscribtive quantity by a homoscribtive quantity without generation of a prefix for the given unit with the circuit for the input transformation of quantities.

BRIEF DESCRIPTION OF THE DRAWINGS

In order that the invention will be more clearly understood, it will now be disclosed in greater detail with respect to the drawings, in which:

FIGS. 11*a* . . . 11*k*);

FIGS. 13*a* . . . 13*k*).

DETAILED DESCRIPTION OF THE PREFERRED EMBODIMENT

Figure 1:
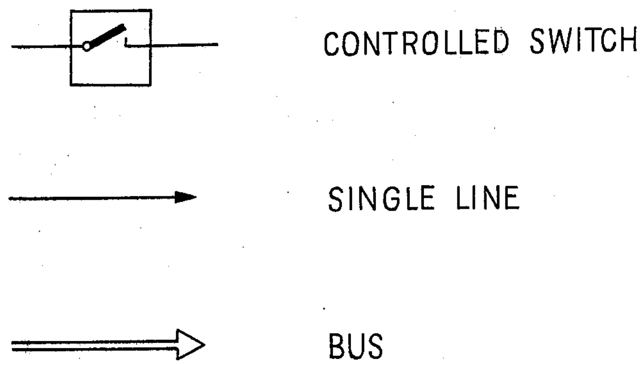
FIG. 1 the representation of the symbols for assemblies of the FIGS. 2 to 6 and FIG. 8.
Figure 2:
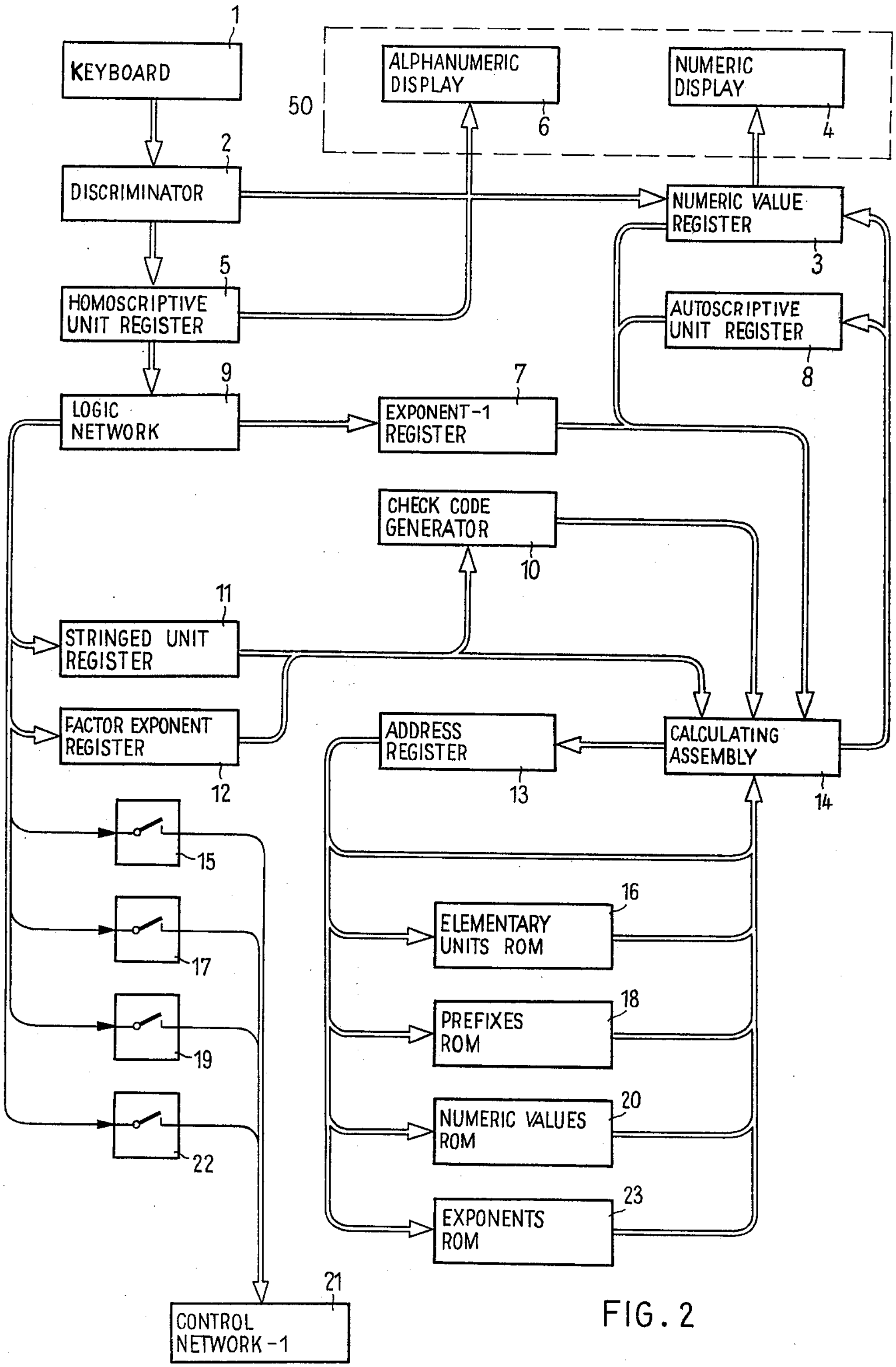
FIG. 2 the circuit arrangement for the input transformation of quantities

The circuit arrangement for the input transformation of quantities, as shown in FIG. 2, is a combination of assemblies such that by operation of the control network-1 21, the calculating assembly 14, the logic network 9, the check code generator 10, the address register 13, the numeric value register 3, the register for an autoscribtive unit 8, the read-only memory for numeric values 20, the read-only memory for elementary units 16, the read-only memory for groups of exponents to base units 23, the read-only memory for prefixes 18, as well as other switches and memories, can be controlled in an ordered sequence, when the register for a homoscribtive unit 5 and the numeric value register 3 are charged and the circuit is activated, e.g., via the input keyboard 1.

The loading of the register for a homoscribtive unit 5 and of the numeric value register 3 is performed via the input keyboard 1. The input keyboard 1 for the sequential character input of a homoscribtive quantity is designed in such a way that for letters a numeric value code is made available, and the letters are distinguishable from numeral digits and special symbols by a special bit. On the input keyboard 1, there are four different classes of keys:

1st class: operation keys (e.g. "+", ":");
2nd class: letter keys ("A" . . . "Z");
3rd class: numeral digit keys ("0" . . . "9") and special symbol keys ".", "-", "/", ";" and
4th class: switching keys (e.g. for switching in case of a multiply occupied key, switching from calculation with quantities to numeric calculating).

The input keyboard 1 is connected with an input disoriminator 2, which in combination with the control network-1 21, controls the input process.

When calculating with quantities,, each data setting has to start with the activation of a sequence of number digit keys. These characters are accepted in the given sequence in the numeric value register 3, designed as a shift register. When a letter key is activated, the input discriminator 2 activates the charging of the register for a homoscribtive unit 5, in which both this letter and all following characters are accepted, provided that the activated keys belong to the second or third classes. By pressing a key of the first or fourth classes the input of a quantity is finished.

The keys of the second or third classes can be used as input keys for programmed instructions at the same time, when the fourth class contains, e.g., a switching key "quantity", which is to be activated before the setting of a quantity and continues to be activated, until a key of the first or fourth class is activated.

Additionally, a display device 50 can be assigned to the input keyboard 1. The keyboard inserts a homoscribtive quantity in a n-digit numeric display 4 representing the numeric value, and into a p-digit alphanumeric display 6 representing the unit of the homoscribtive quantity.

The representation of the content of the register for a homoscribtive unit 5 to an autoscribtive quantity is performed in several timing cycles, which will be explained.

In the first timing cycle sequence, the homoscribtive unit is separated in factors of the exponential product; a factor is always located between two separators ("." or "/" or space). The logic network 9 divides the homoscribtive unit in cycles, character for character. The logic unit 9 controls a register 11 for a stringed-together unit to accept the stringed-together units of a factor and controls a register 12 for a factor exponent to accept the exponent of a factor of the exponential product for an intermediate storage, respectively. An exponent-sign switch 15, a sign-next factors switch 17, a factor-end switch 19, and an analysis-end switch 22 are switched by the logic network 9, as a sequence of the exponential product separation and for controlling the further cycle sequences of the control network-1 21.

The logic network 9 controls the flow such that, in the next shift cycle, the first character of the register 5, designated as shift register for a homoscribtive unit:

(1) is accepted in the shift register 11 for a stringed-together unit when this character is a letter, and when in the running cycle of separation of a factor, only if letters have been transferred up to now or the first character of the factor is concerned;
(2) causes a switching of the exponent sign switch 15 to "L", when this character is a "-", which follows the transfer of a letter;
(3) is accepted in the factor exponent register 12, when this character is a numeral digit, which follows the transfer of a negative sign or a letter;
(4) causes a switching of the sign-next factors switch 17 to "L", prepares the finishing of the representation of an exponential product factor by transfer of the factor-end switch 19 to "L", and the flow control is transferred to the cycle separation of a stringed-together unit, when this character is a "/", which follows the transfer of a letter or a numeral digit;
(5) is not exchanged and prepares the finishing of the representation of an exponential product factor by transfer of the factor-end switch 19 to "L", and the flow control is transferred to the cycle separation of a stringed-together unit, when this character is a ".", following the transfer of a letter or a numeral digit;
(6) is not exchanged and prepares the representation of a homoscribtive quantity by transfer of the analysis-end switch 22 to "L", and the flow control is transferred to the cycle separation of a stringed-together unit, when this character is a space following the transfer of a letter or a numeral digit; and
(7) is not exchanged and the flow control is transferred to the cycle truncation because of a syntactical error, when none of the cases (1) to (6) are concerned.

The exponent of the first factor of the exponential product is already stored in an exponent-1 register 7.

The second timing cycle sequence covers the cycle separation of a stringed-together unit. The stringed-together unit, stored in register 11, is separated into a prefix and an elementary unit. The timing cycle can be passed through multiply in a modified way. Under the control of the control network-1 21 the assemblies check code generator 10, calculating assembly 14, address register 13, and read-only memory 18 for prefixes, perform the separation of the actual stringed-together unit in such a way that by the calculating assembly 14, in a maximum of m subcycles per subcycle i, starting with $i=1$, the i-first characters are added to an ordinal number for the read-only memory 18 for prefixes and by the check code generator 10 from the sequence of i-first characters of the stringed-together unit bits to a check character for the accepted prefix and are compounded according to an established scheme. All characters of the stringed-together unit, from the $(i+1)$ character for an ordinal number for the read-only memory 16 for the elementary units, are timely added in parallel or in series to it and, by the check code generator 10 from the sequence of all characters of the stringed-unit from the $(i+1)$ character bits for a check character for the accepted elementary unit are compounded according to an established scheme.

The i subcycles are passed through as often as necessary, until the check character read from this read-only memory, via the determined ordinal number for the read-only memory 18 for prefixes, is equal to the check character for the separated prefix above, determined by the check code generator 10, and also when the check character read from this read-only memory, determined via the ordinal number for the read-only memory 16 for elementary units, is equal to the check character for the separated elementary unit, determined above by the check code generator 10.

The scheme for the generation of the check character (bit pattern mask) for an accepted prefix, as well as for an accepted elementary unit, can be established such that the first 3 bits of the first character, the first 2 bits of the second character, and the first 3 bits of the third character result in the check character.

After a positively finished i subcycle for the separation of a stringed-together unit, the calculating assembly 14 generates the numeric value of the autoscribtive quantity in steps by multiplying the content of the numeric value register 3 with the numeric value of the prefix, which was read via an actual ordinal number—that has been exchanged from the read-only memory 18 for prefixes—from the read-only memory 20 for numeric values, and with the numeric value of the elementary unit, which was also read via an actual ordinal number—that has been exchanged from the read-only memory 16 for elementary units—from the read-only memory 20 for numeric values 20, and by storing in the numeric value register 3.

In these multiplications, the switch positions of the exponent sign switch 15 and sign next factors switch 17 are considered further, before the multiplications of the numeric values read from the read-only memory 20 for numeric values are raised to a power with the content of the register 12 for a factor exponent, as determined by the position of the exponent sign switch 15 and sign next factors switch 17.

Further, after a positively finished i subcycle for the separation of a stringed-together unit, the calculating assembly 14 generates the unpacked unit of an autoscribtive quantity in the form of a sequence of exponents to base units in steps, while the unpacked-nominator unit and/or the unpacked-denominator unit of the actual stringed-together unit are/is added to the content of the register 8 for an autoscribtive unit, element for element, depends on the position in the sequence of exponents for base units. The unpacked-nominator unit and/or the unpacked-denominator unit have/has been read out from the read-only memory 23 for groups of exponents to base units via one or two actual ordinal numbers, have been exchanged from the read-only memory 16 for elementary units. In these additions the position of the exponent sign switch 15 and sign-next factors switch 17 are considered and, before the additions, the numeral digits read out from the read-only memory 23 for groups of exponents for base units are multiplied with the content of the register 12 to obtain a factor exponent, which takes into account the position of the exponent sign switch 15 and sign-next factors switch 17.

If the i subcycle is finished unsuccesfully, then sufficient shift cycles follow such that the register 11 for a stringed-together unit finishes a circulation. The stepping forward of the modified control and the beginning of the (i+1) subcycle of the second cycle sequence follow.

When, after a positive finishing of the cycle separation of a stringed-together unit, the factor-end switch 19 is "L", the control network-1 21 initiates a new cycle separation of an exponential product element.

When, after a positve finishing of the cycle separation of a stringed-together unit, the analysis-end switch 22 is "L", the cycle sequence of the array for the input transformation of quantities is duly finished.

When one of the conditions mentioned is not met, due to a syntactical error in the homoscribtive unit, the cycle sequence is truncated.

The read-only memories mounted in the array for the input transformation of quantities have the following design:

- The read-only memory 16 for elementary units contains systematically, according to the sums via the numeric value code of the letters of the abbreviation of an elementary unit, the check character generated in dependence on the sequence of letters and one ordinal number each for the numeric value, the unpacked-numerator unit and the unpacked-denominator unit for the respective elementary unit.
- The read-only memory 18 for prefixes contains systematically, according to the sums via the numeric value code of the letters of the abbreviation of a prefix for each prefix, the check character generated in dependence of the sequence of letters and an ordinal number for the numeric value of the prefix.
- The read-only memory 20 for numeric values contains numeric values for the elementary units and prefixes in an established order.
- The read-only memory 23 for groups of exponents for base units contains, in an established order, sequences of exponents for base units, which may be an unpacked-numerator unit or an unpacked-denominator unit.

Figure 10:
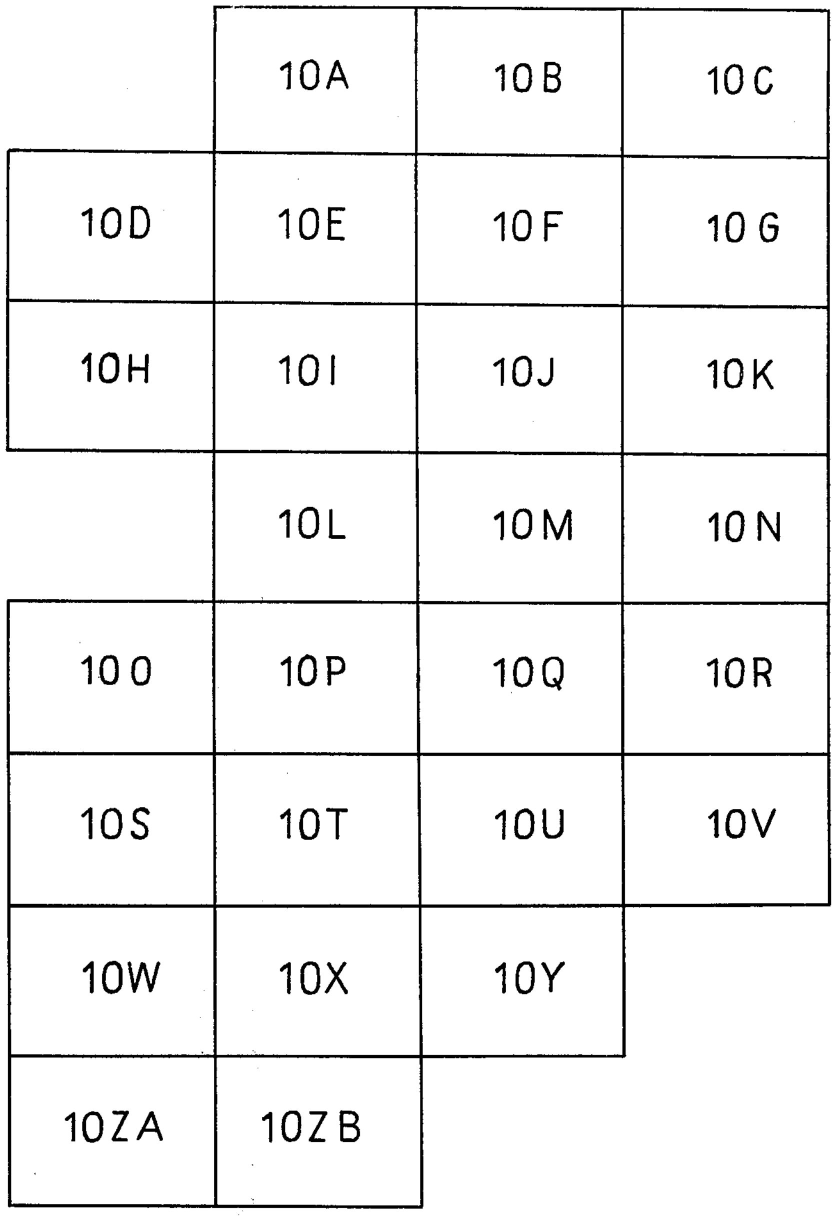
FIG. 10 the logic circuit scheme for the input transformation of quantities (partial drawings.
Figure 10A:
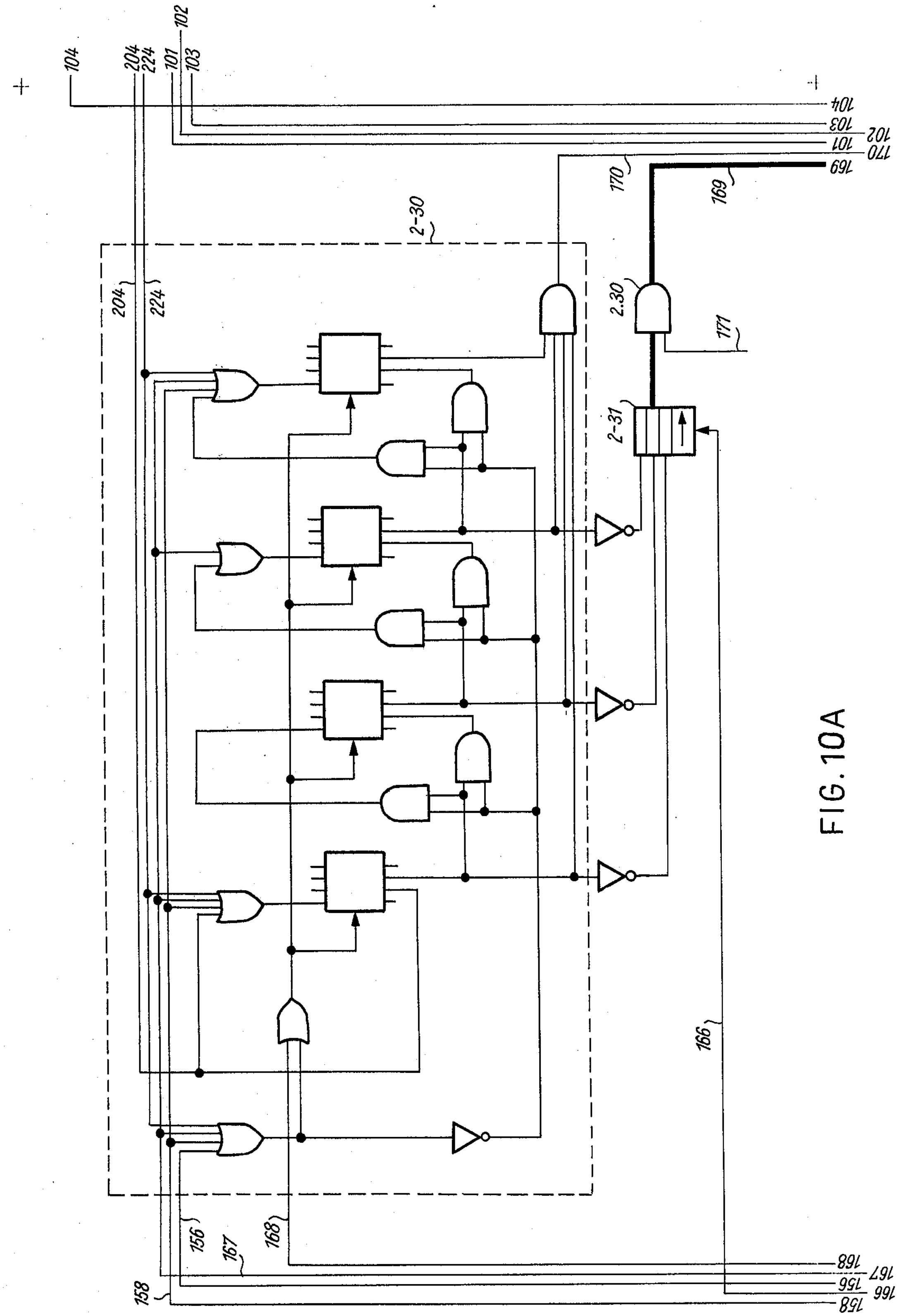
FIGS. 10*a* . . . 10*y*, 10*za*, 10*zb*)
Figure 10B:
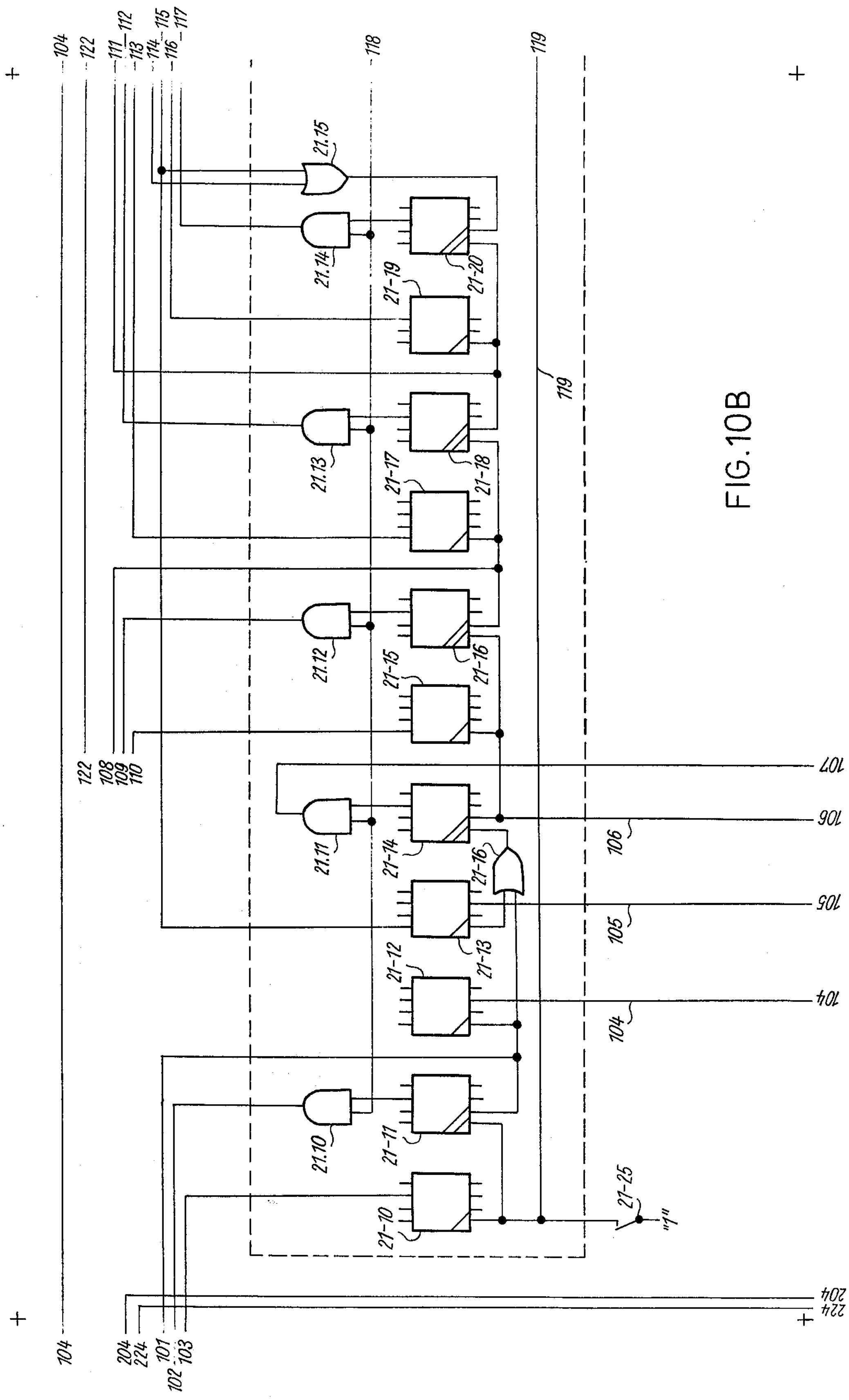
Figure 10C:
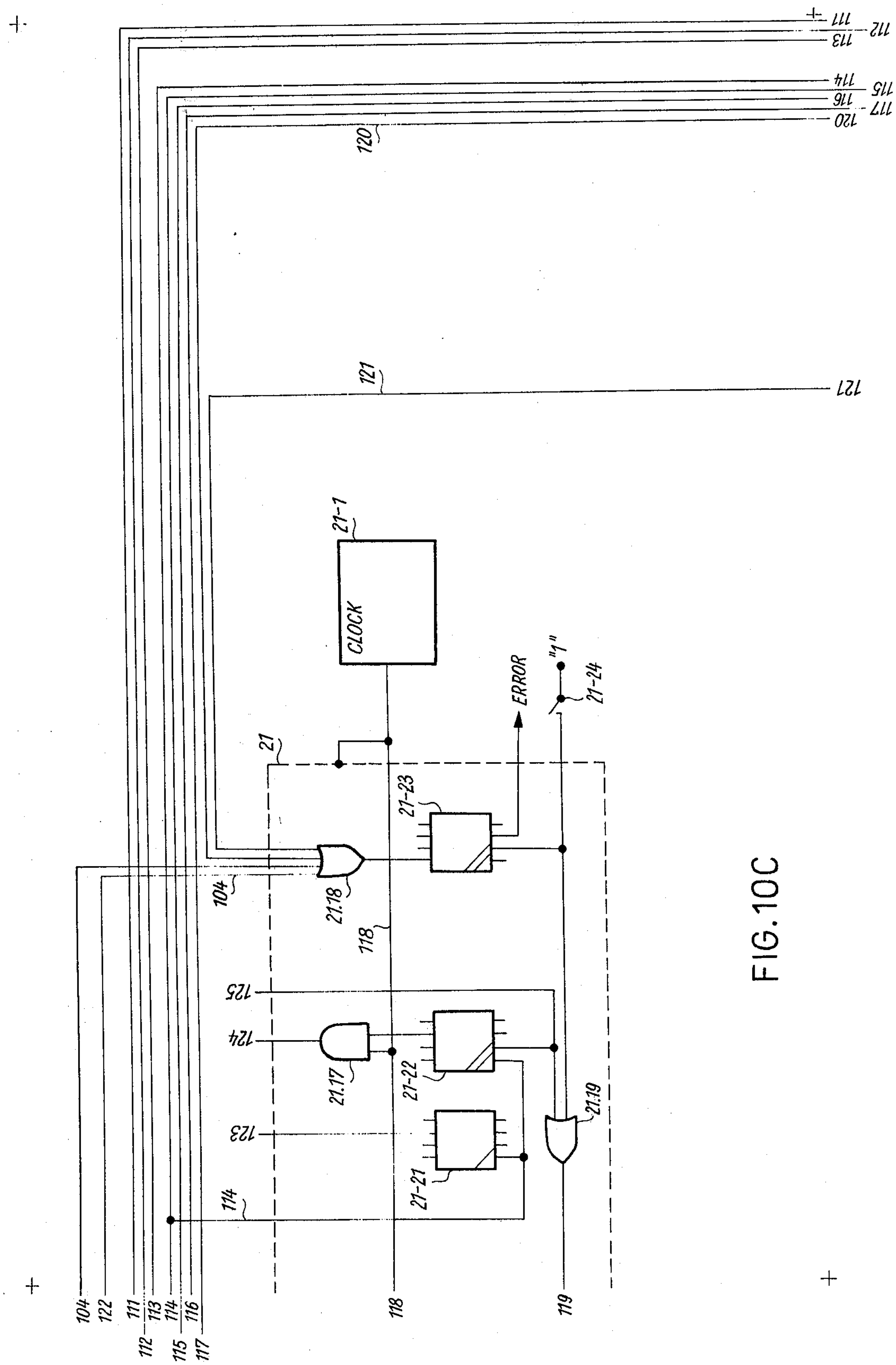
Figure 11:
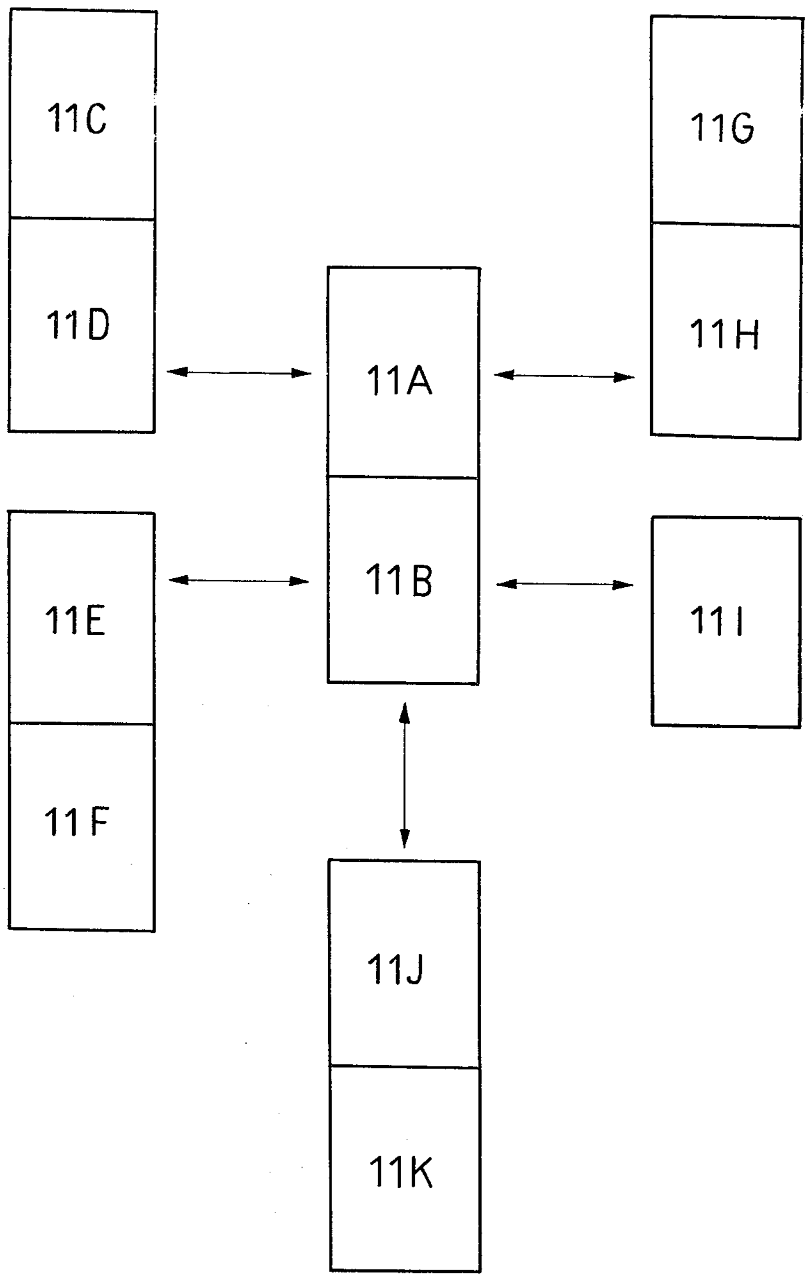
FIG. 11 the logic clock sequence scheme for the input transformation of quantities (partial drawings.

An example of the circuit arrangement for the input transformation of quantities is shown in FIG. 10, and the logic clock sequence for it is shown in FIG. 11, in the form of a flow chart. Additionally, in Tables 7, 8, 9, and 10 the detailed arrangement of the read-only memories for elementary units 16, for prefixes 18, for numeric values 20, and for groups of exponents to base units 23, is given.

The circuit of FIG. 10 is to be operated with a single-phase clock, this conditions the use of the master-slave flip-flop. The circuit causes the digital transformation of an optionally arranged homoscribtive quantity, containing abbreviations of the elementary units according to Table 3b and abbreviations of the physical-technical prefixes according to Table 2; to an autoscribtive quantity consisting of a floating-point number (8 bytes with 2 bytes of exponent) and an 8-byte autoscribtive unit, each byte of the autoscribtive unit representing the exponent to a base unit in the sequence, e.g., second, meter, ampere, kilogram, kelvin, candela, steradian and radian. For instance if the homoscribtive quantity 2 KNT (2 knots)

is put in, it is transformed to the autoscribtive quantity

102888.-05, −1, 1, 0, 0, 0, 0, 0, 0.

However, the same autoscribtive quantity is also determined by the circuit, if one of the following is put in as a homoscribtive quantity:

2 NTMI/HR (2 nautical miles per hour) or
3.704 KM/HR (3.704 kilometers per hour) or 6173.28 CM/MIN (6173.28 centimeters per minute)
or
1.02888 M/S (1.02888 meters per second).

At the end of the transformation process, the numeric value of the autoscribtive quantity (102888.-05) in the numeric value register 3-3 and the autoscribtive quantity (−1, 1, 0, 0, 0, 0, 0, 0) in the register for an autoscribtive unit 8, are stored for external interrogation.

Figure 10D:
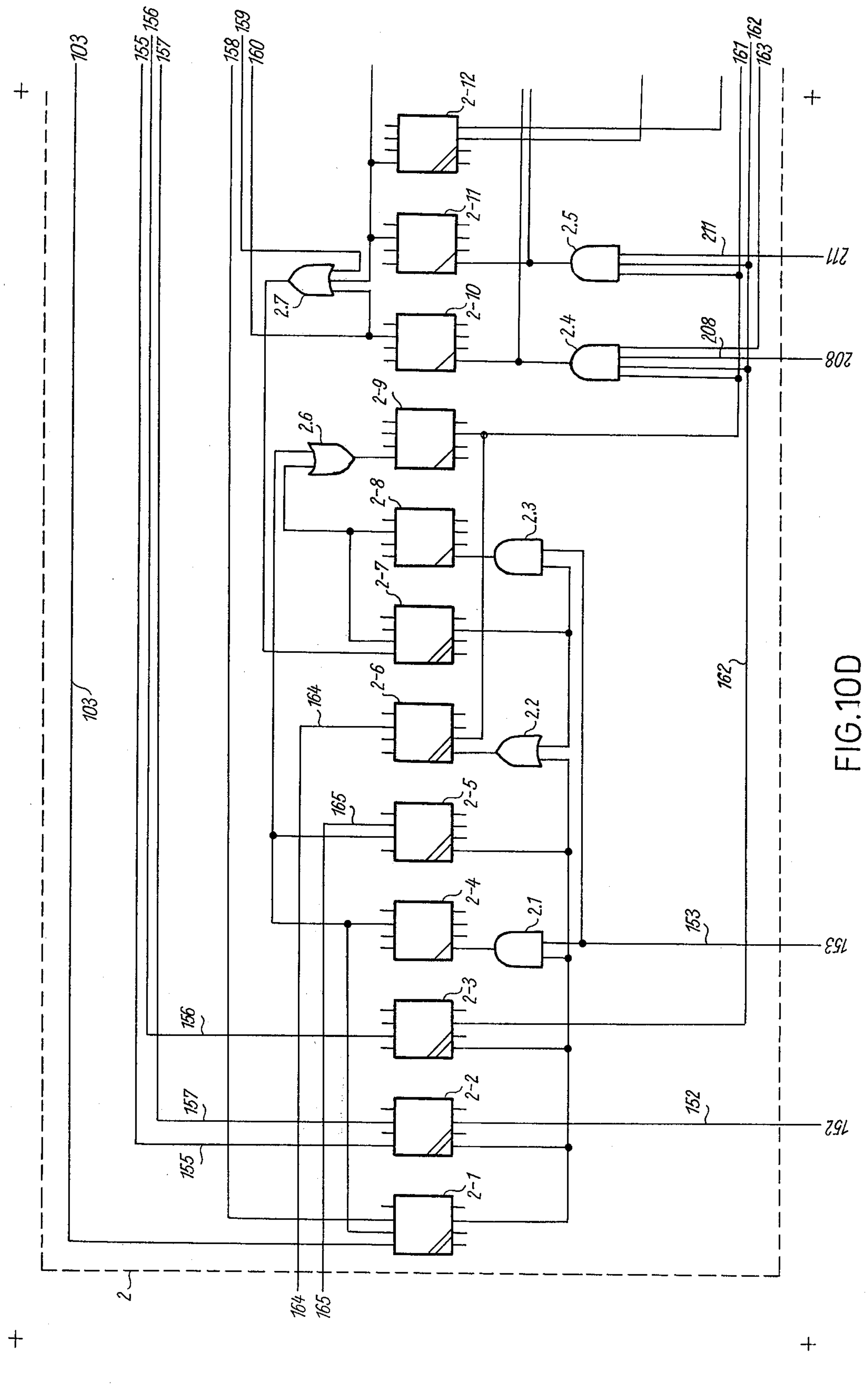
Figure 10:
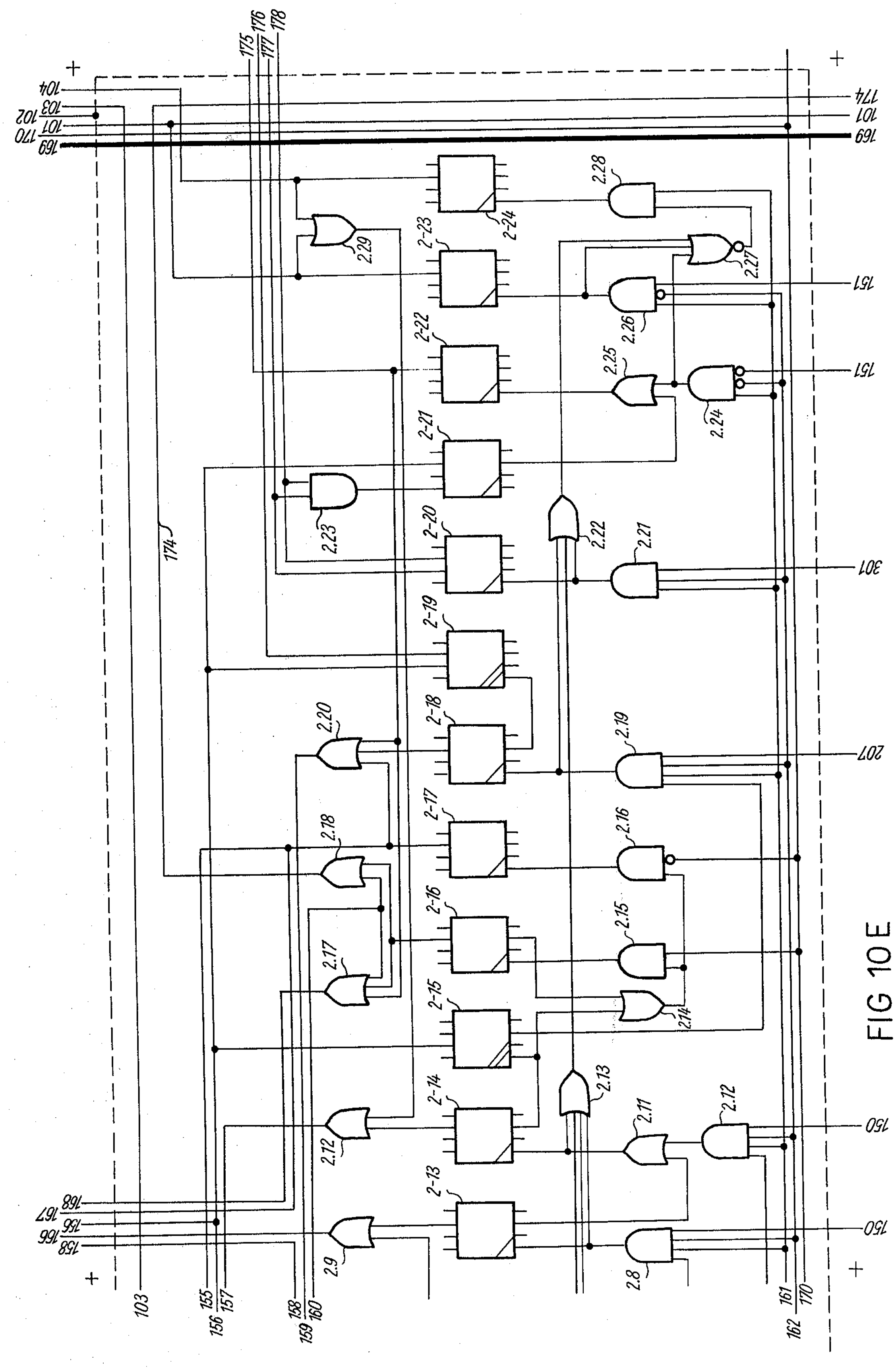
Figure 10F:
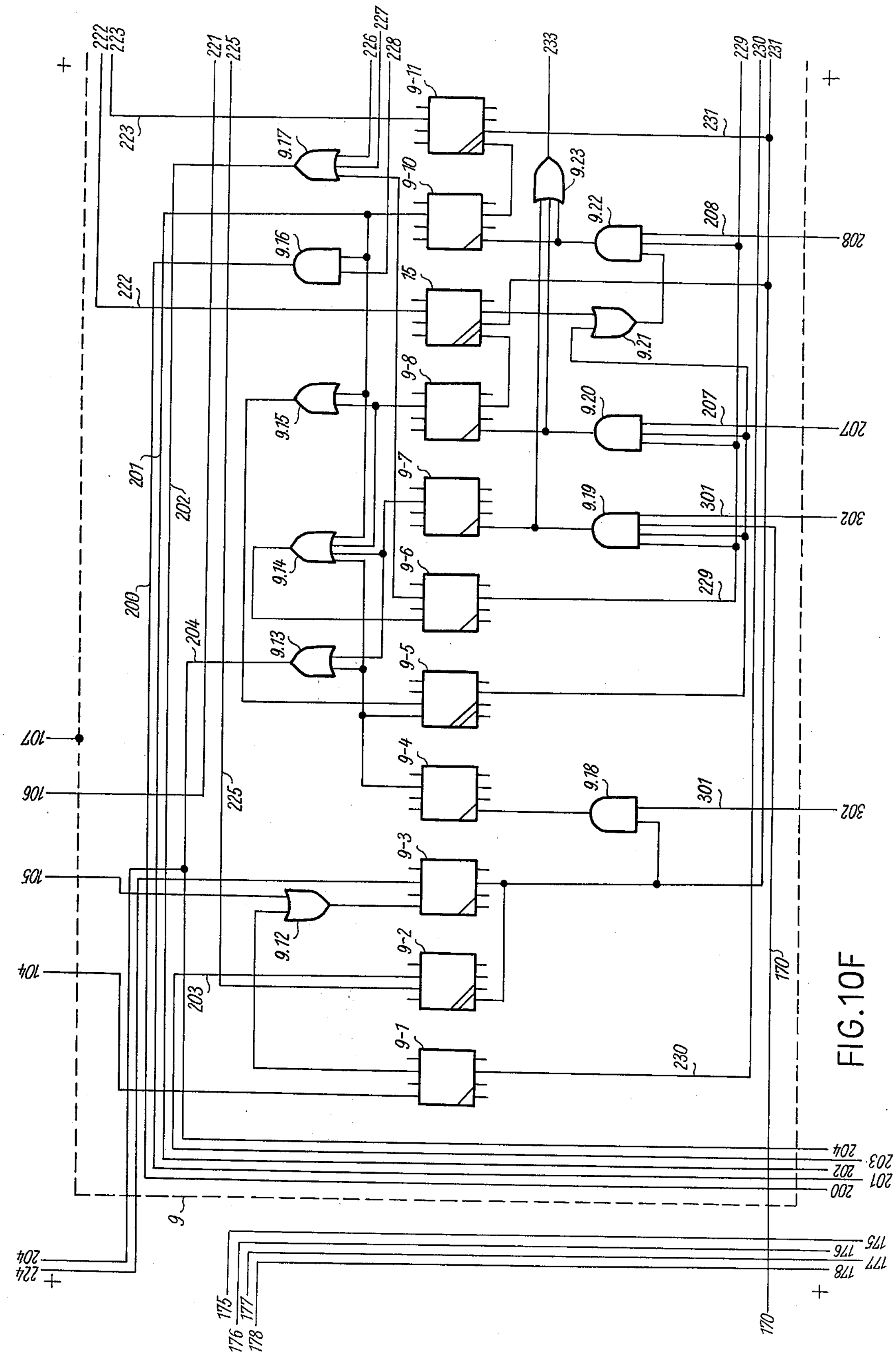
Figure 10G:
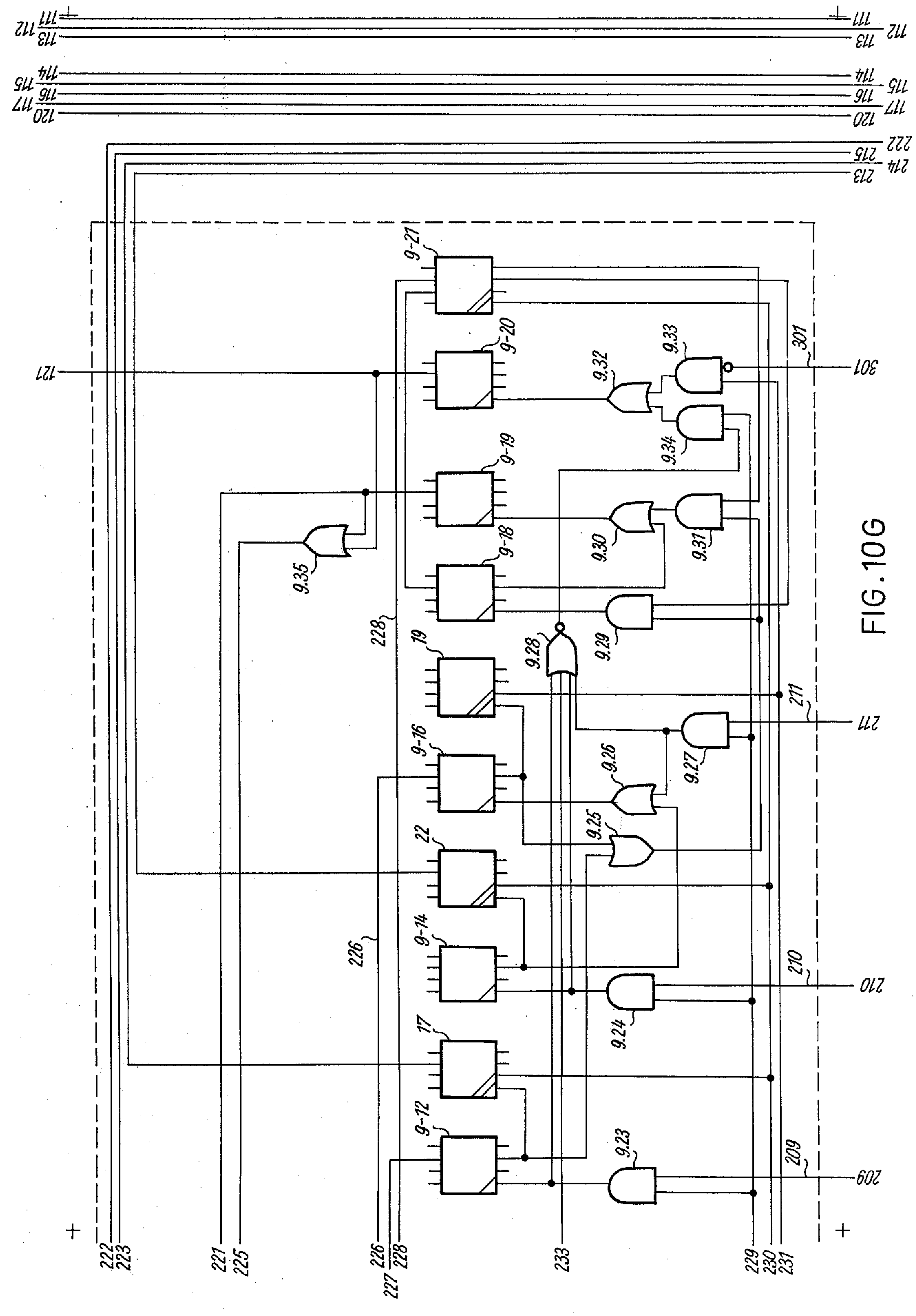
Figure 10H:
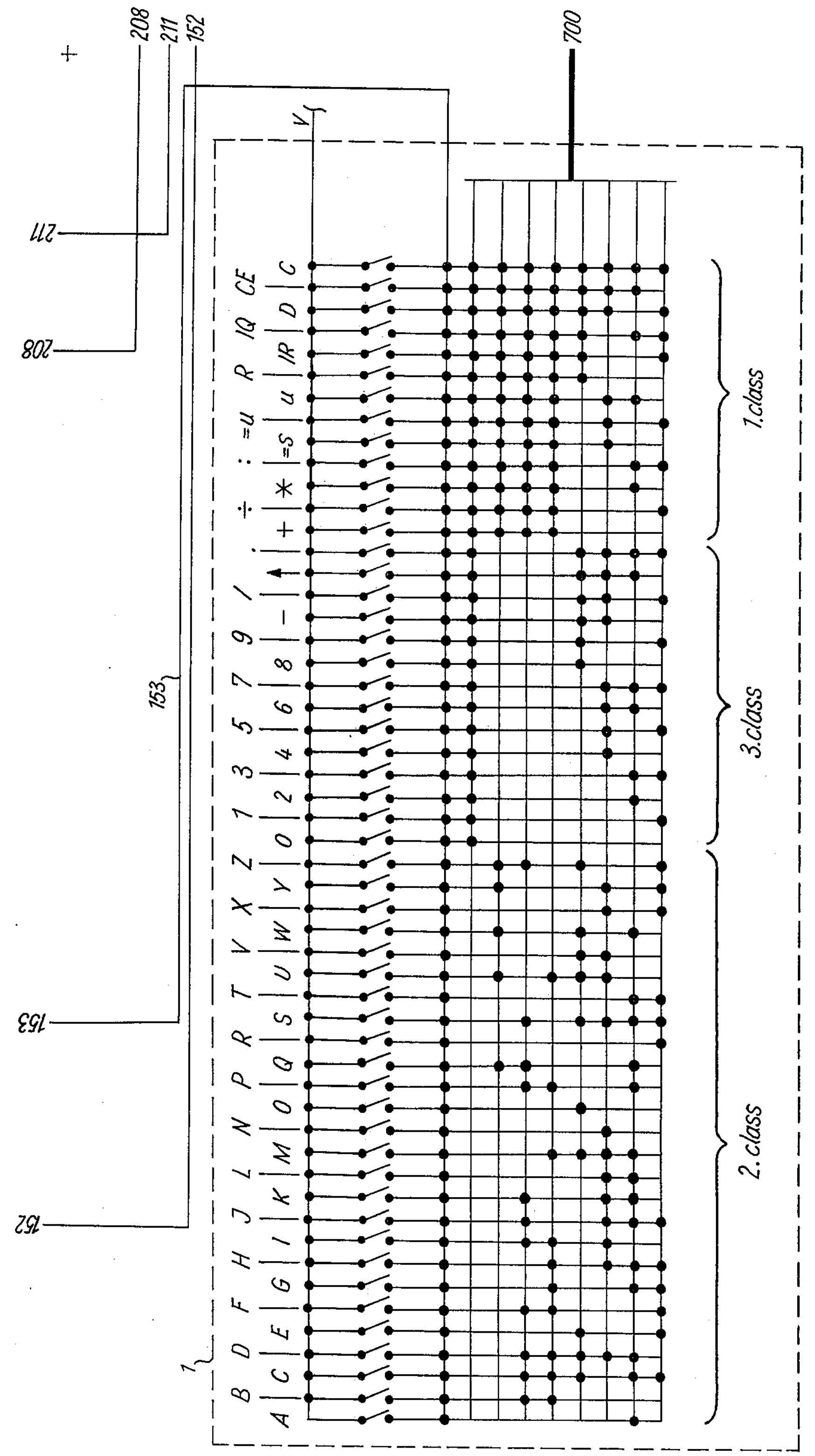
Figure 101:
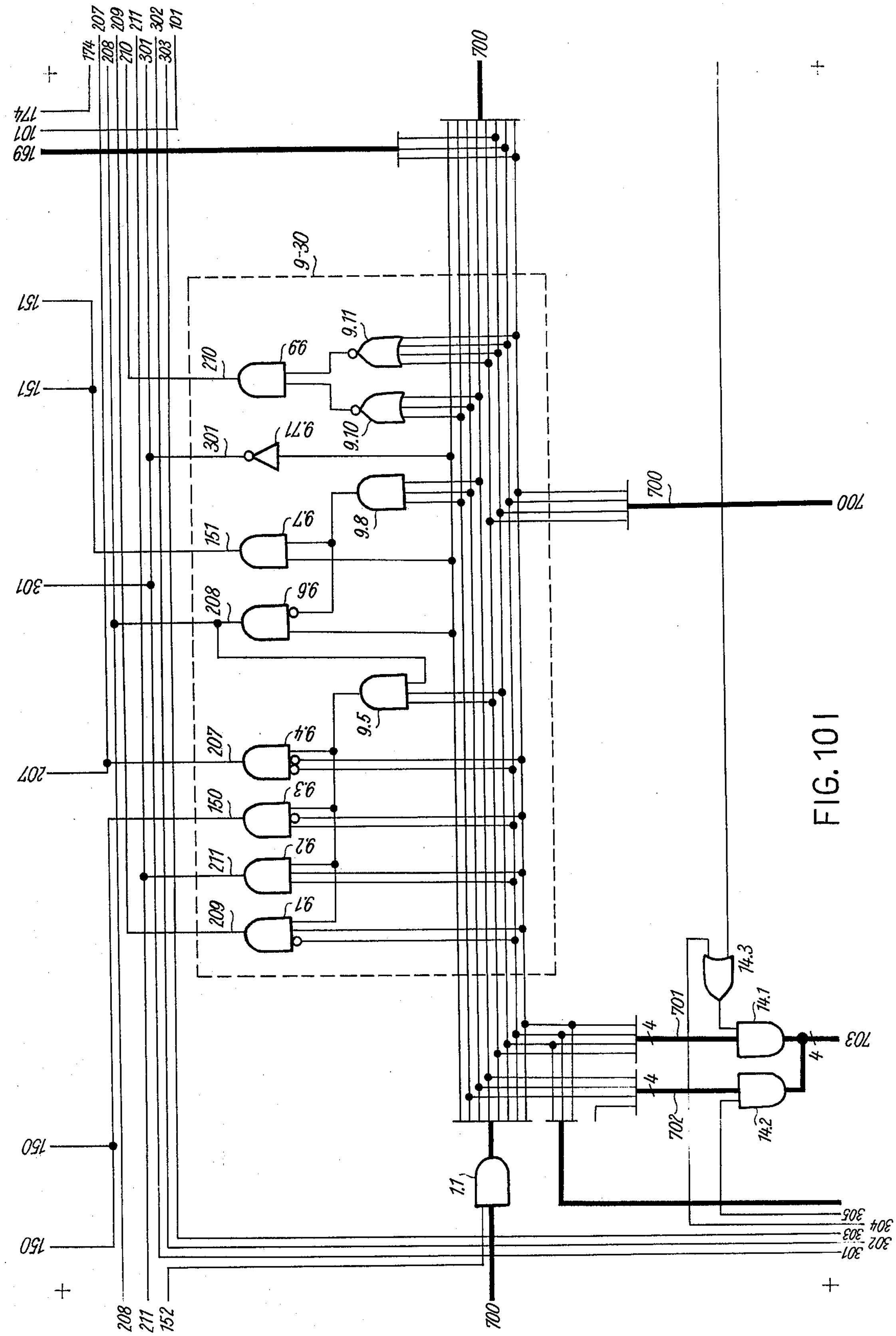
Figure 10J:
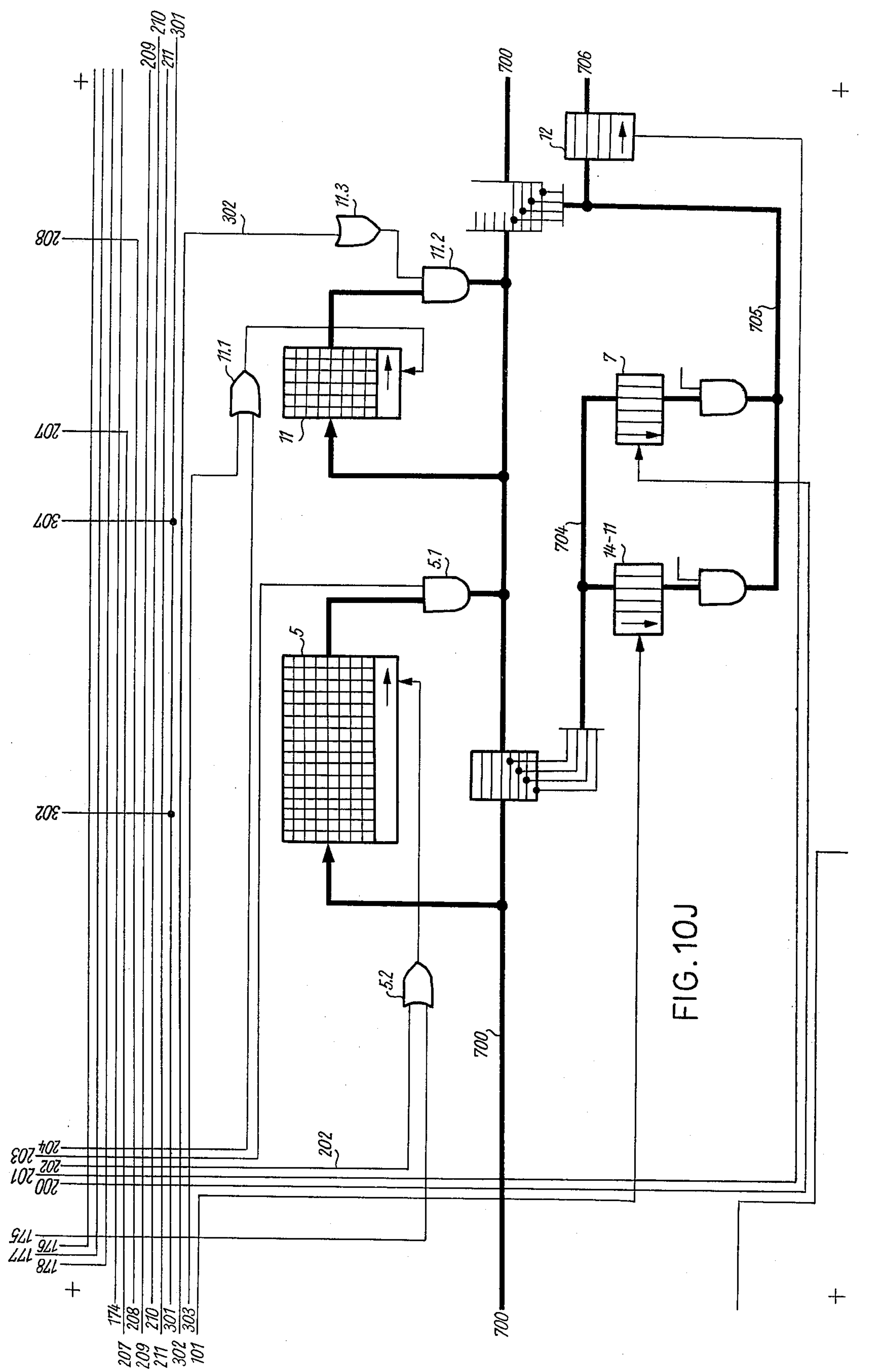
Figure 10K:
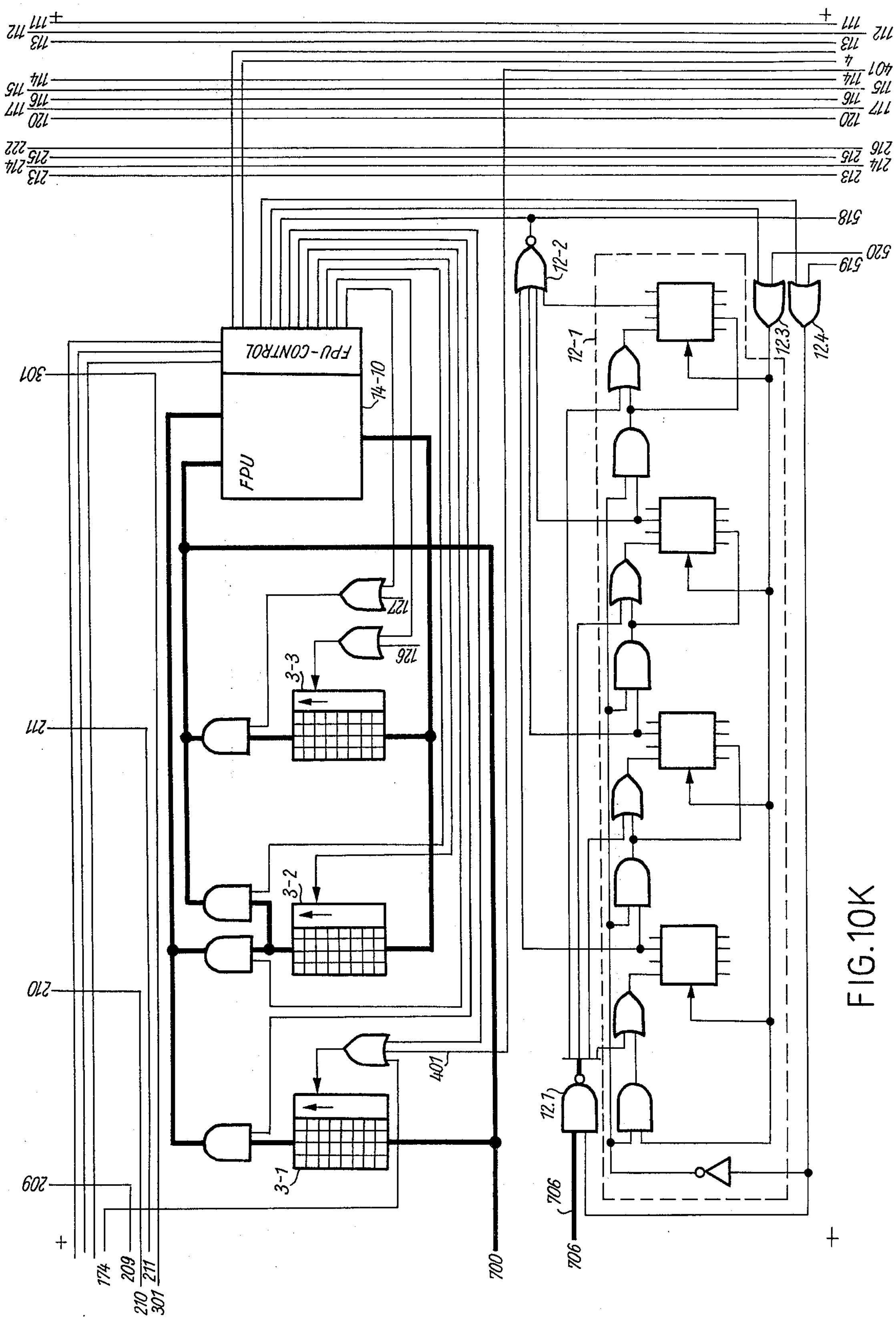
Figure 10L:
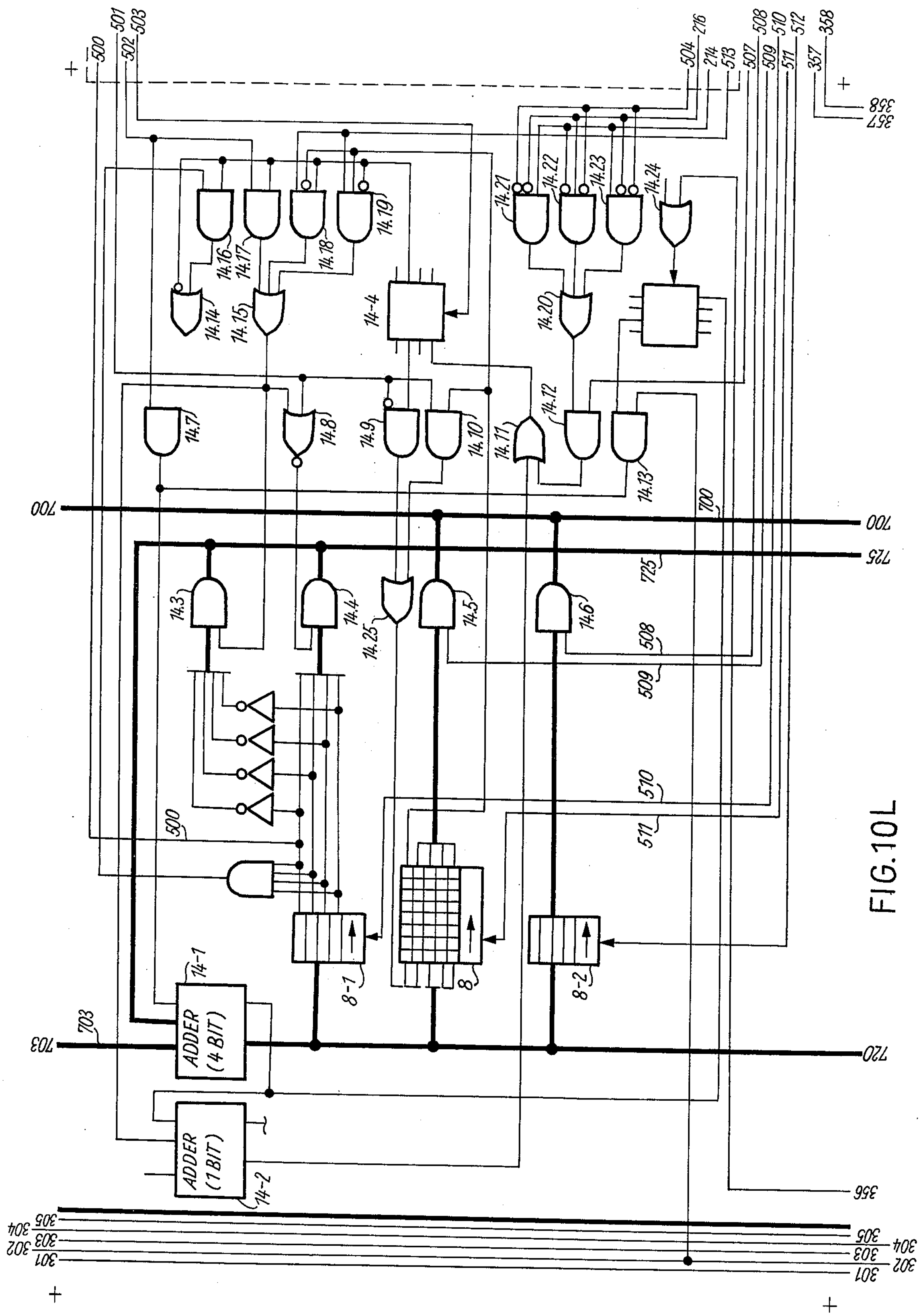

The operation of the invention circuit will be demonstrated by the example of the transformation of the homoscribtive quantity, 6173.28 CM/MIN:

During the input via the input keyboard 1 (FIG. 10*h*) the input discriminator 2 (FIGS. 10*d* and 10*e*) performs the storage of "617328.+02" in the numeric value register 3-3 and of "00000000000NIM/MC" in the register for a homoscribtive unit 5 according to logic clock sequence, "Input and separation of a homoscribtive quantity", of the FIGS. 11*c* and 11*d*, and with it a coding is performed, as shown in FIG. 10*h*.

The logic network 9 (FIGS. 10*f* and 10*g*) during a first flow of the clock sequence, "Separation of a homoscribtive unit", according to FIGS. 11*e* and 11*f*, causes the loading of the register for a stringed-together unit 11, during the status 9-7 with the character sequence "MC".

Figure 10M:
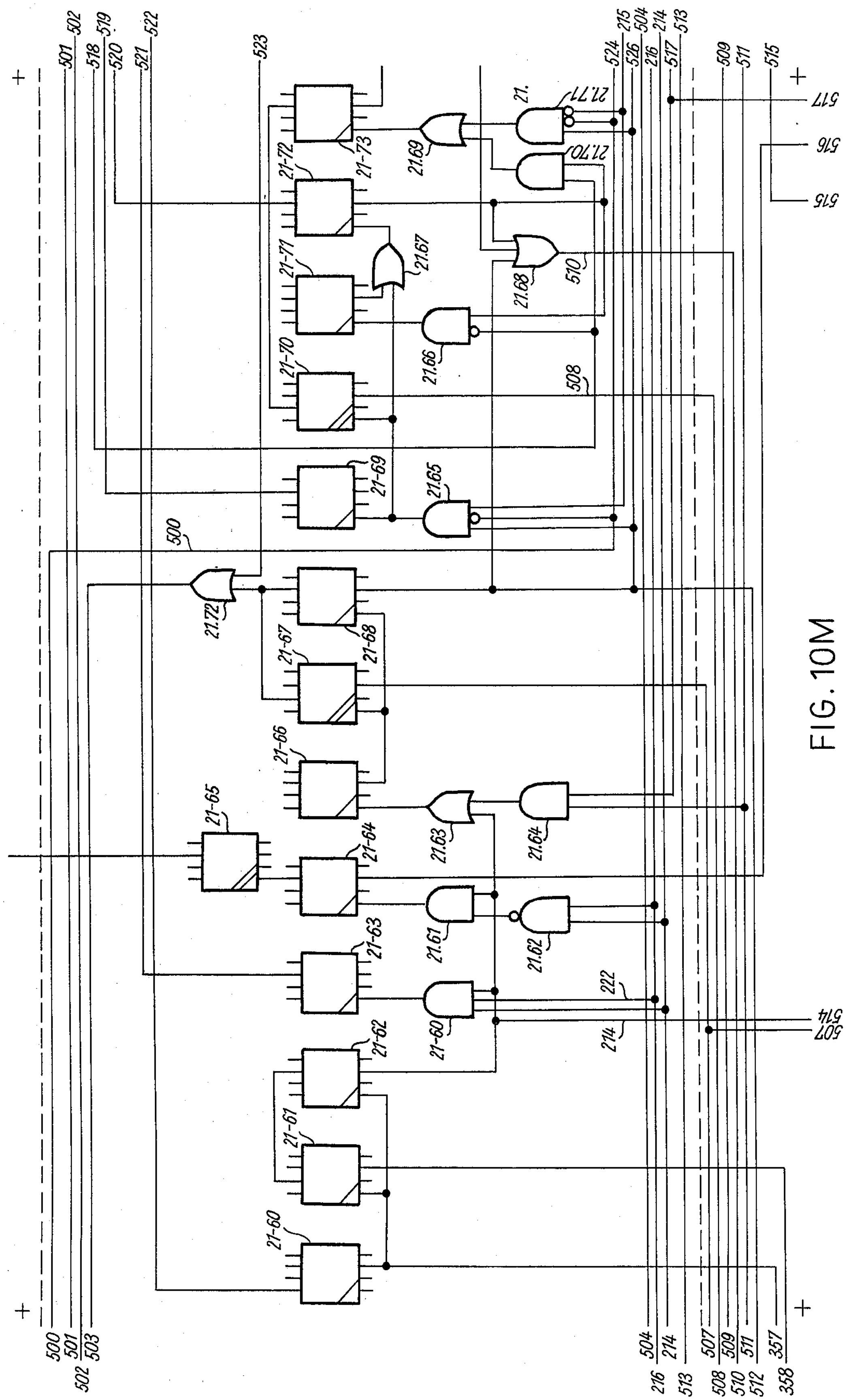
Figure 10N:
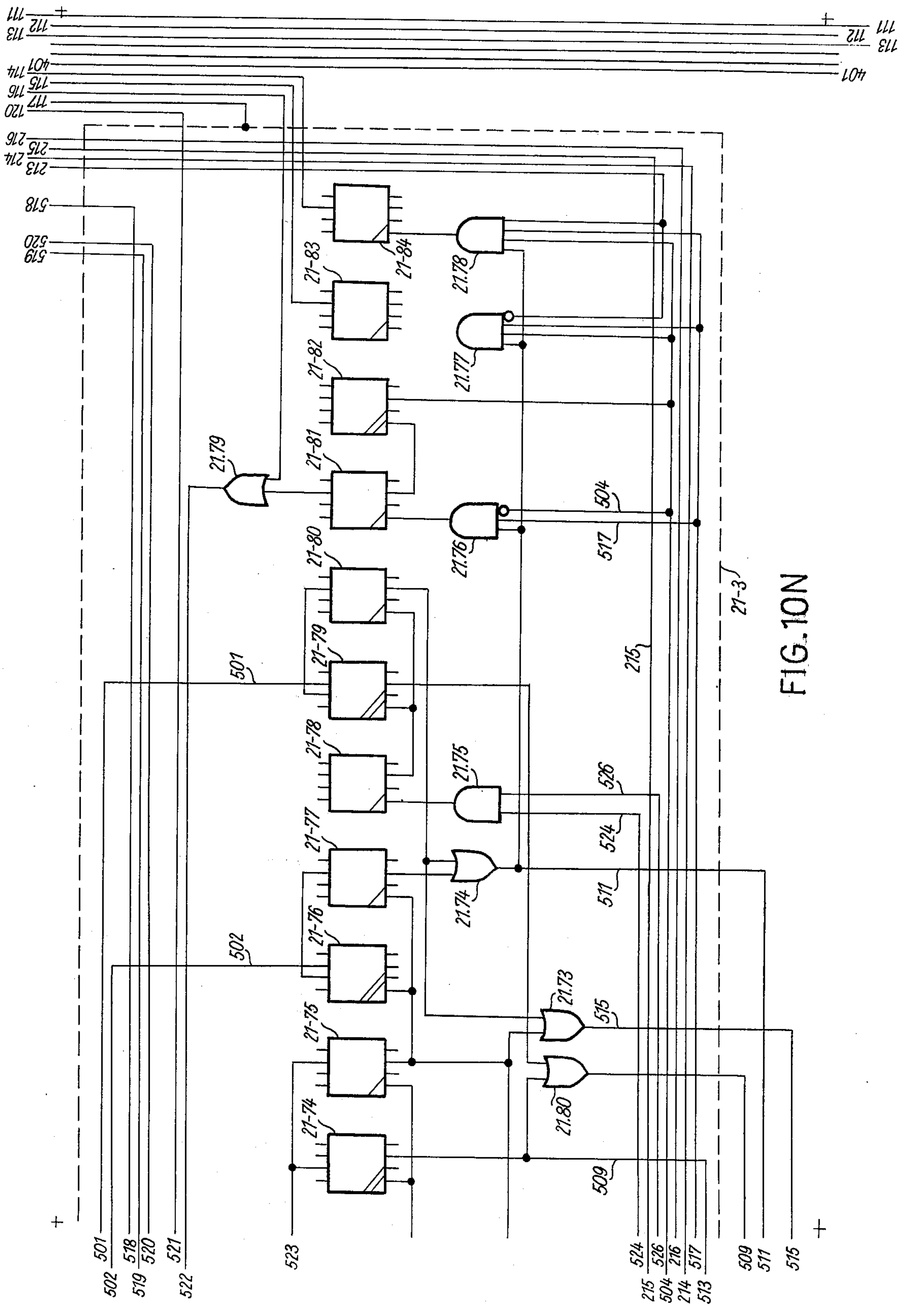
Figure 100:
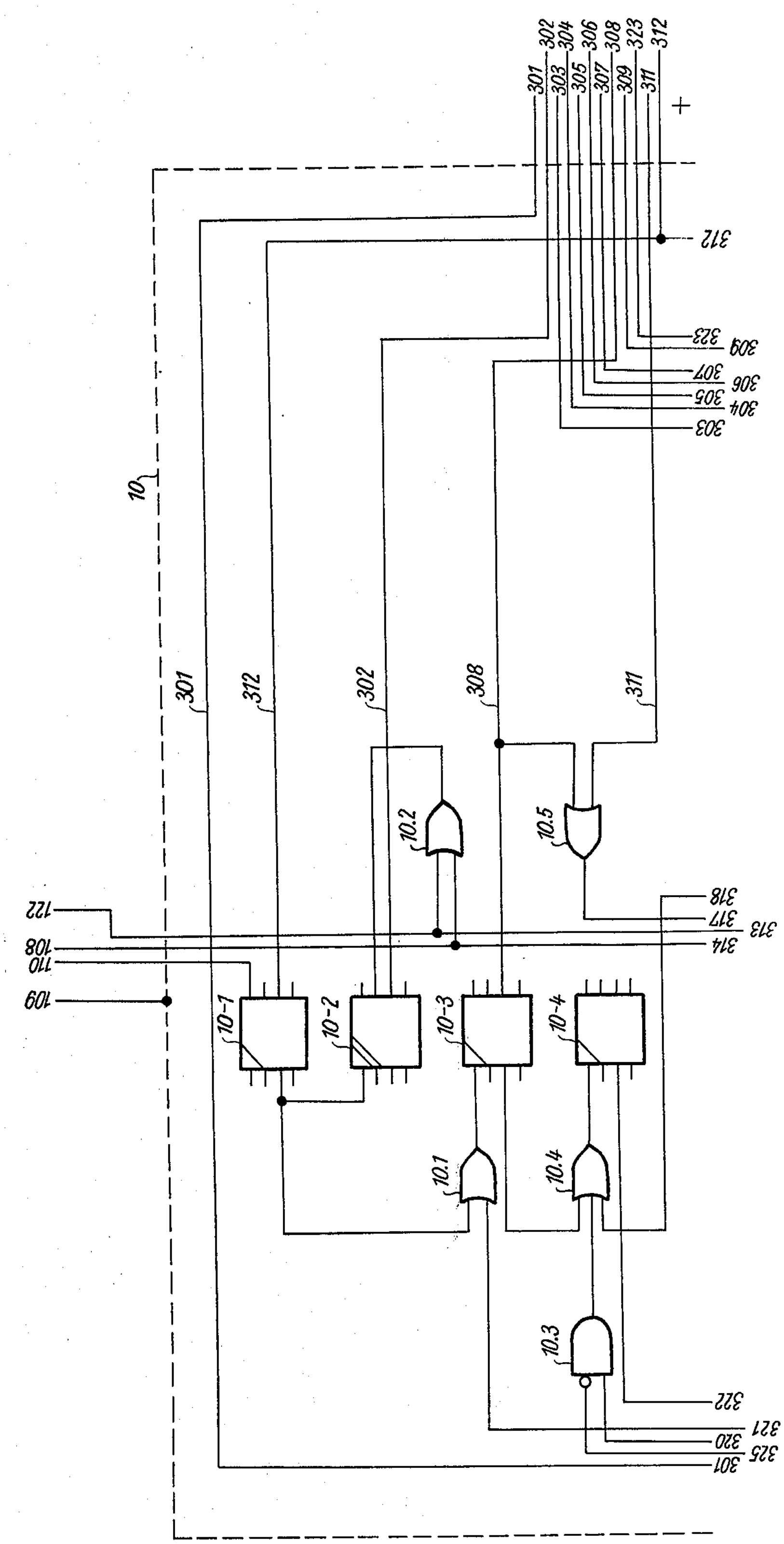
Figure 10P:
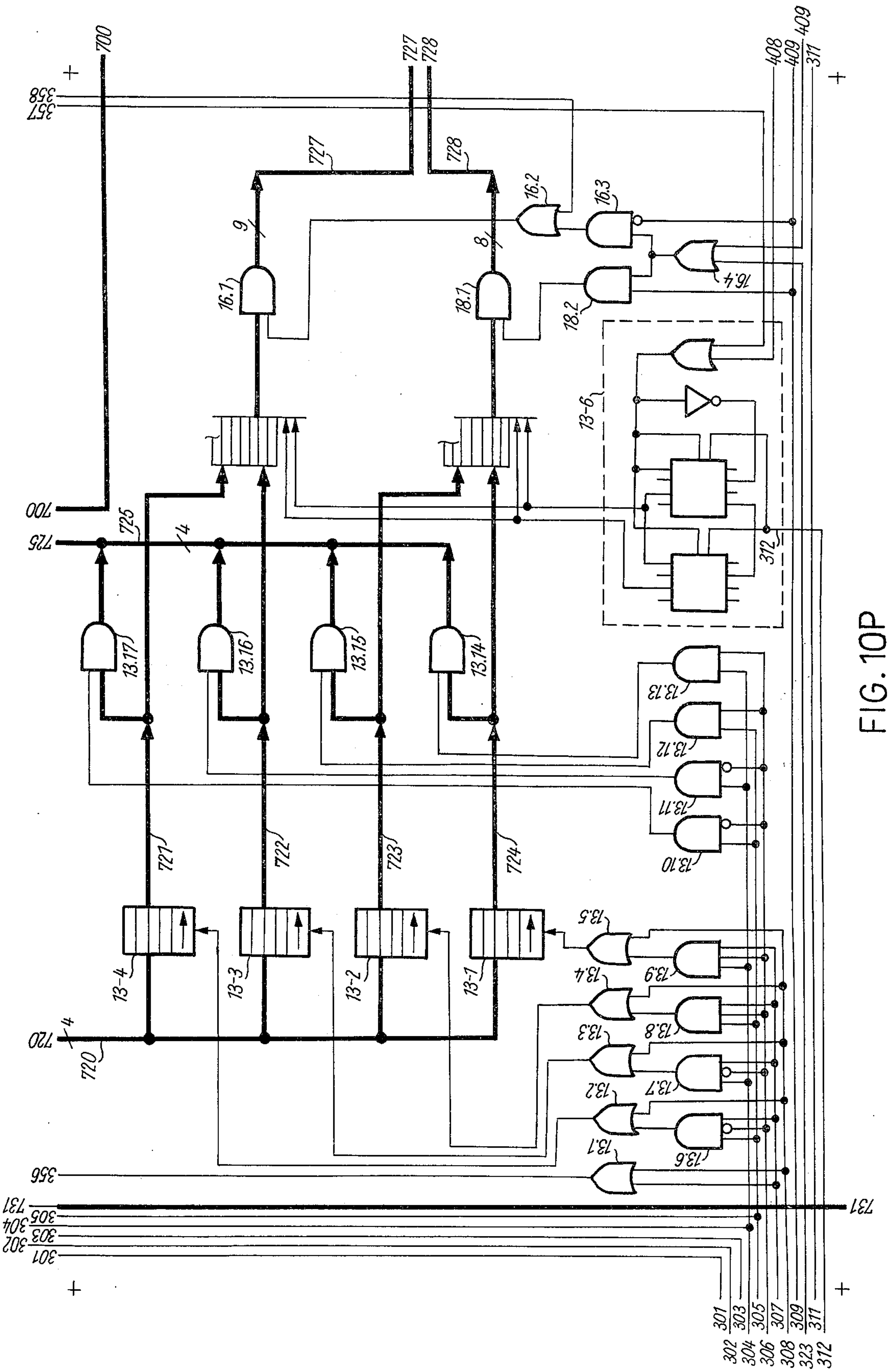

The check code generator 10 (FIGS. 10*o*, 10*s*, 10*t*, 10*u*, 10*w*, 10*x*, 10*y*, 10*za* and 10*zb*) finishes the cyclic flow of the clock sequence "Separation of a stringed-together unit", according to FIGS. 11*g* and 11*h*, if the check characters determined in status 10-8 are equal to the stored check characters, stored in the storage positions of the read-only memory for prefixes 18 and of the read-only memory for elementary units 16, computed for it in the status 10-8 and in the status 10-11. The arrangement of the addresses becomes evident from FIGS. 10*p* and 10*q*, the outputs of the address counter 13-6="00". The conditions are fulfilled with the separation of the contents of the register for a stringed-together unit 11 into the partial-character sequences "C" and "0000M".

For the partial-character sequence "C", it follows that according to the bit pattern mask already mentioned
the check character is: "00000011"
according to FIG. 10*p* the address for ROM 18 (shifted code for "C") is: "011 1011 0"

For the partial-character sequence "0000M" it follows that
the check character is: "00000110"
the address for ROM 16 is: "0001 1110 00"

The check characters determined are equal to the check characters given in Table 7 and Table 8, respectively.

Figure 10Q:
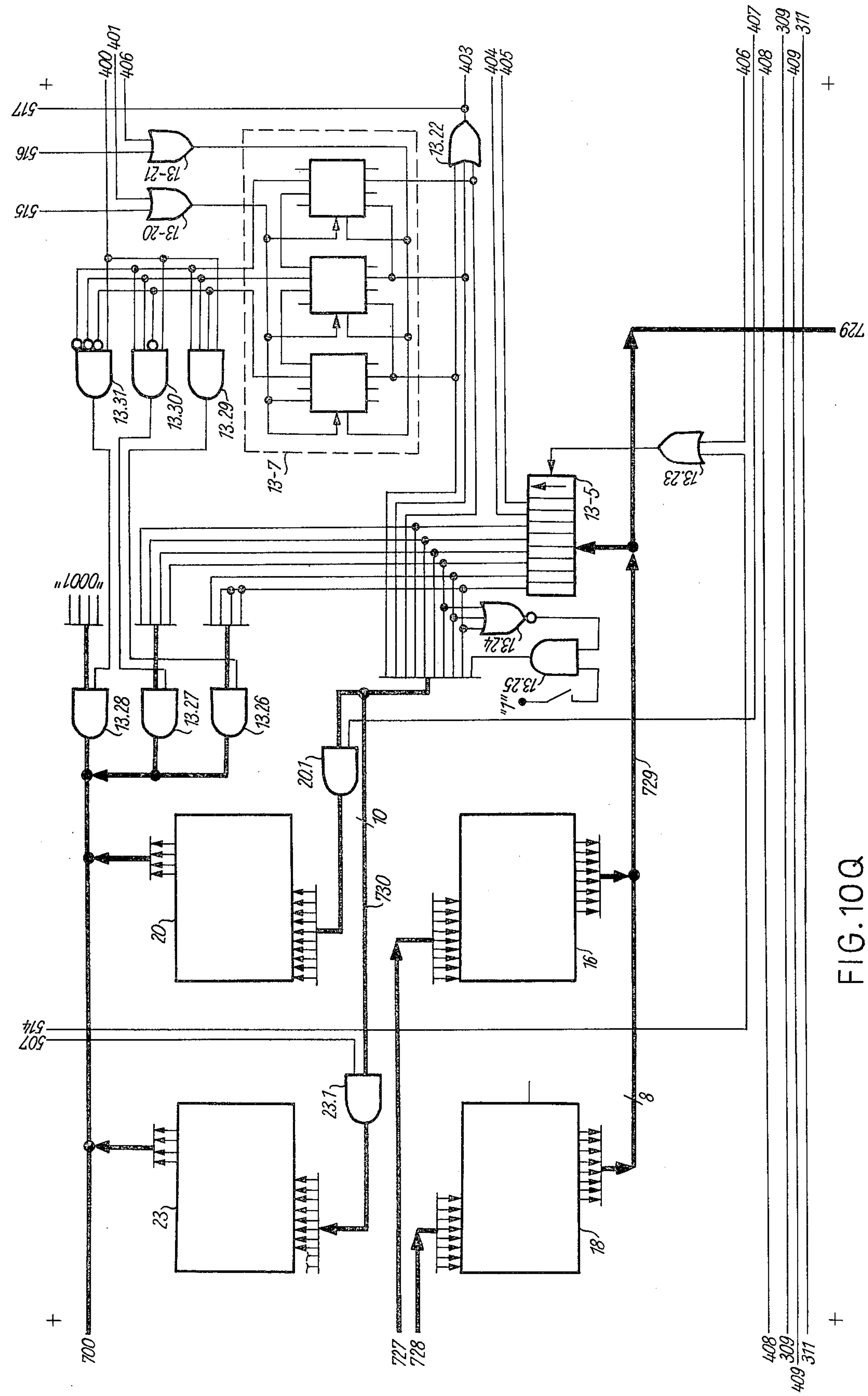
Figure 10R:
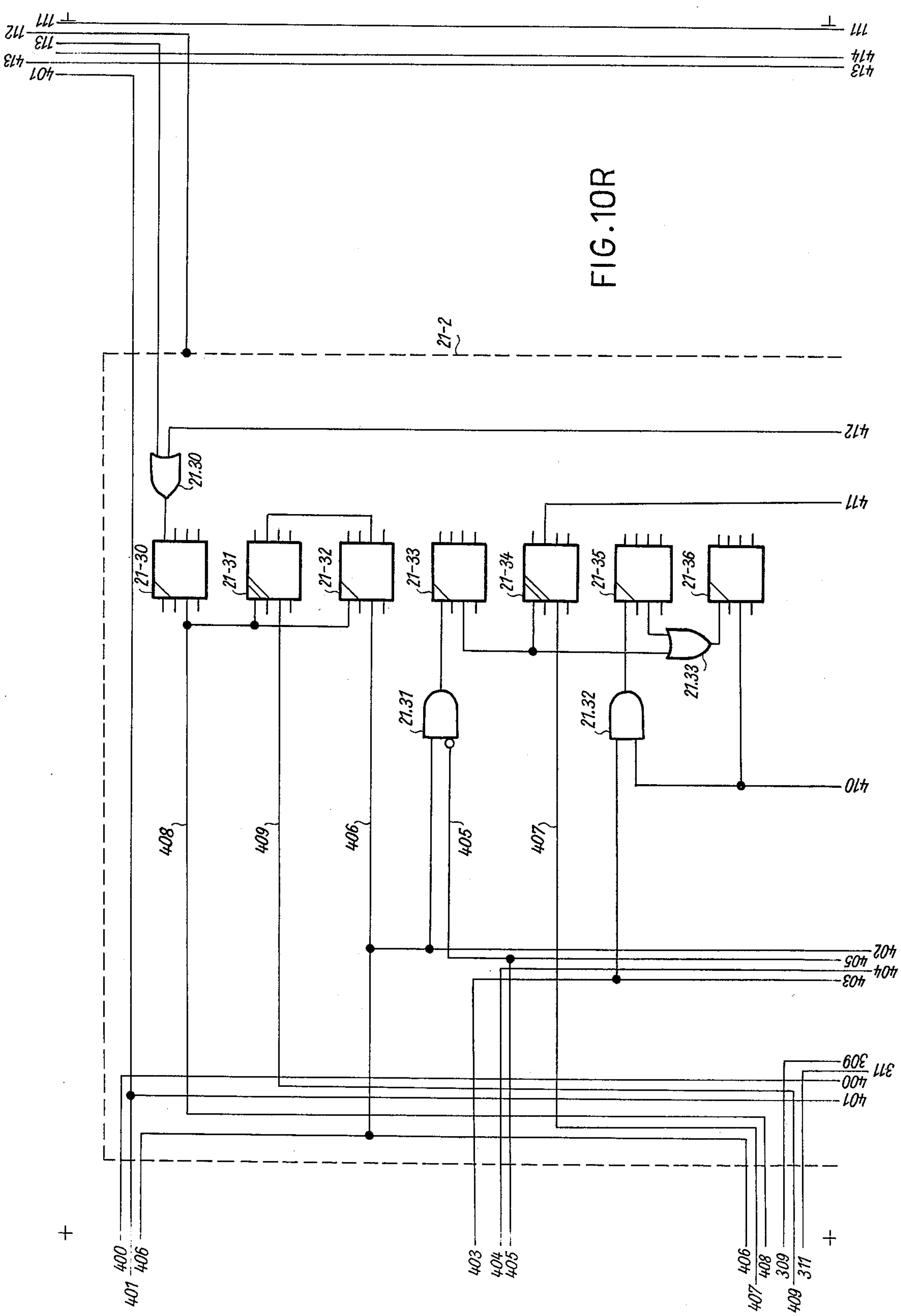
Figure 10S:
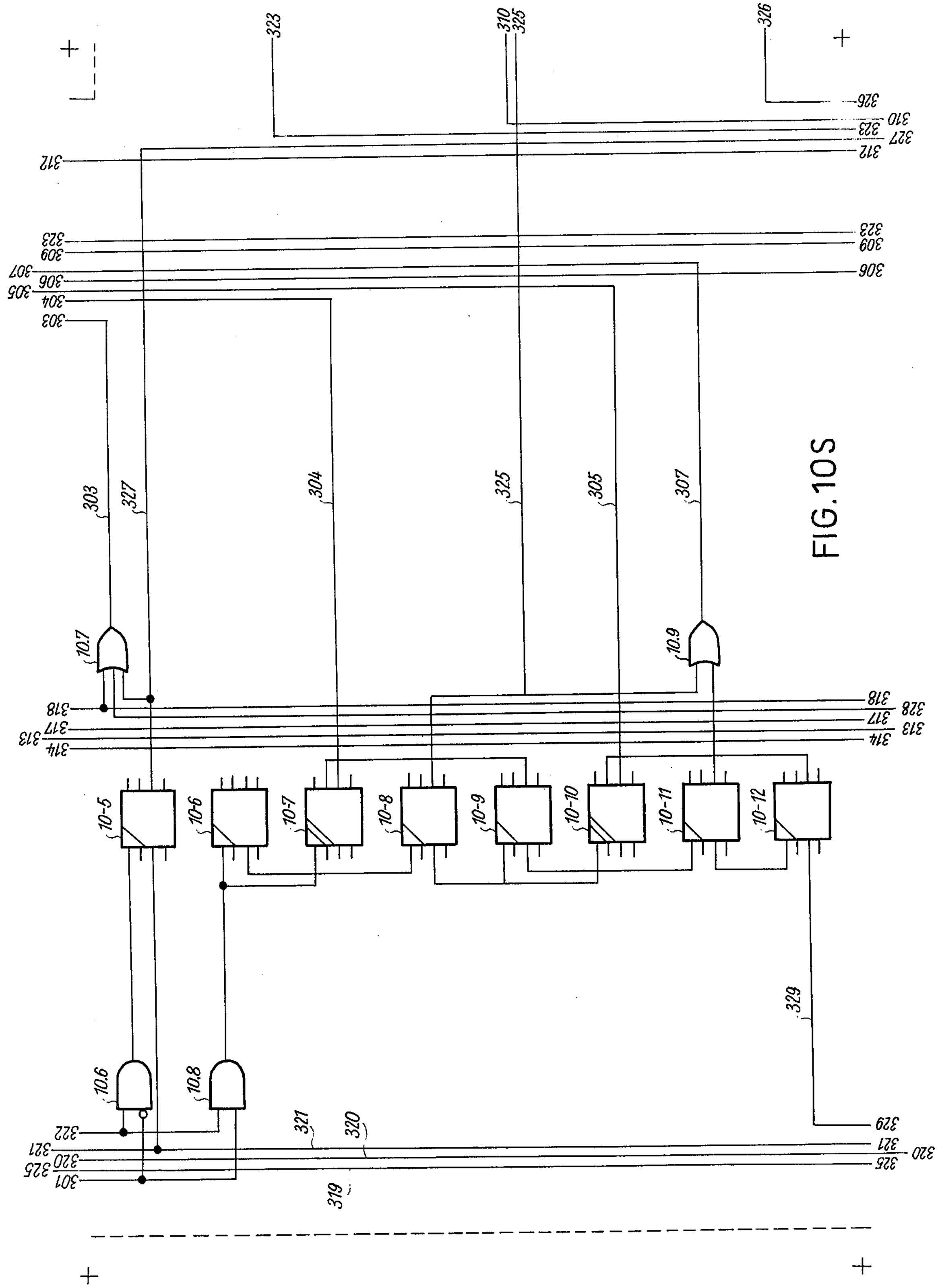
Figure 10T:
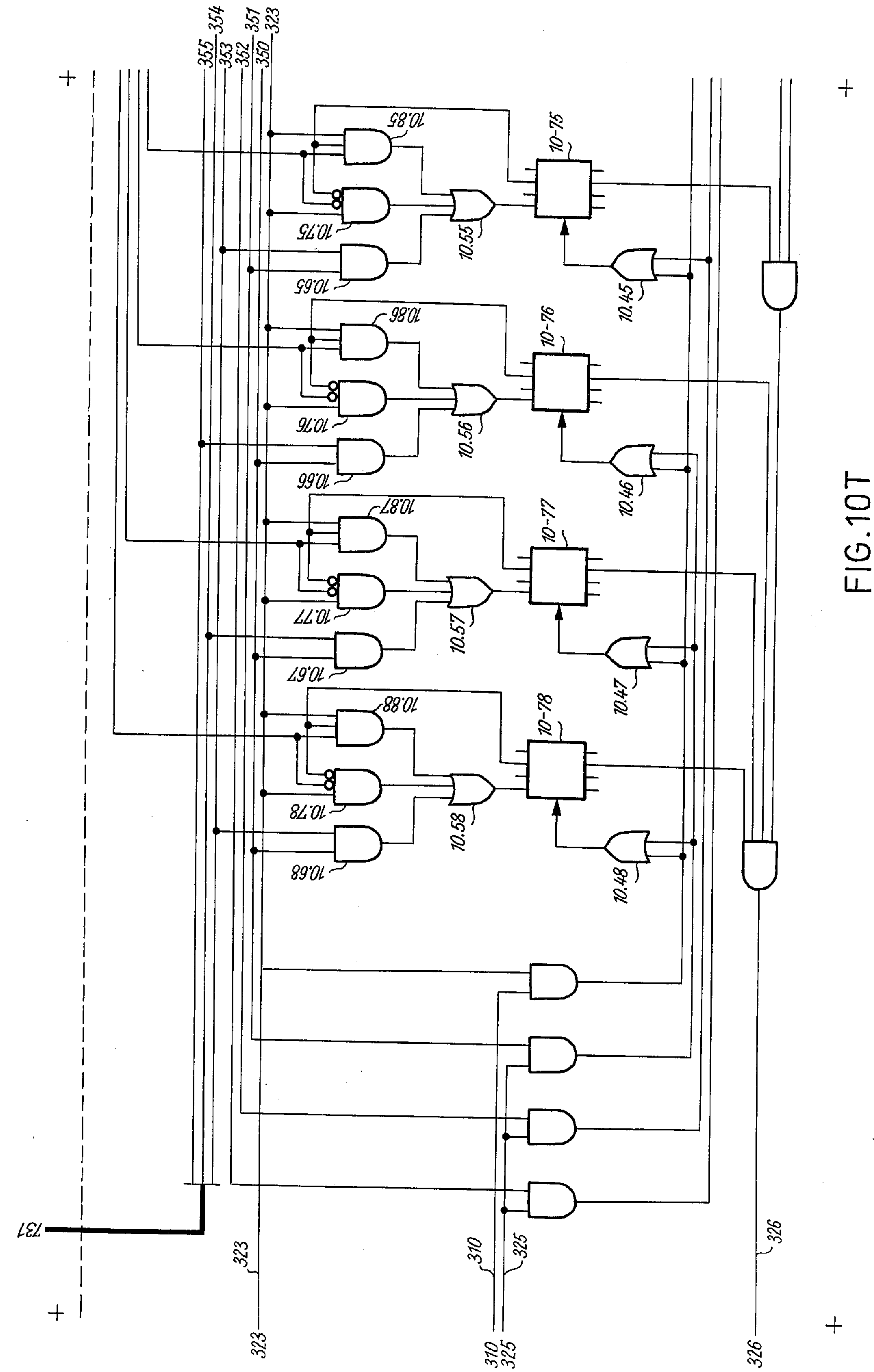
Figure 10U:
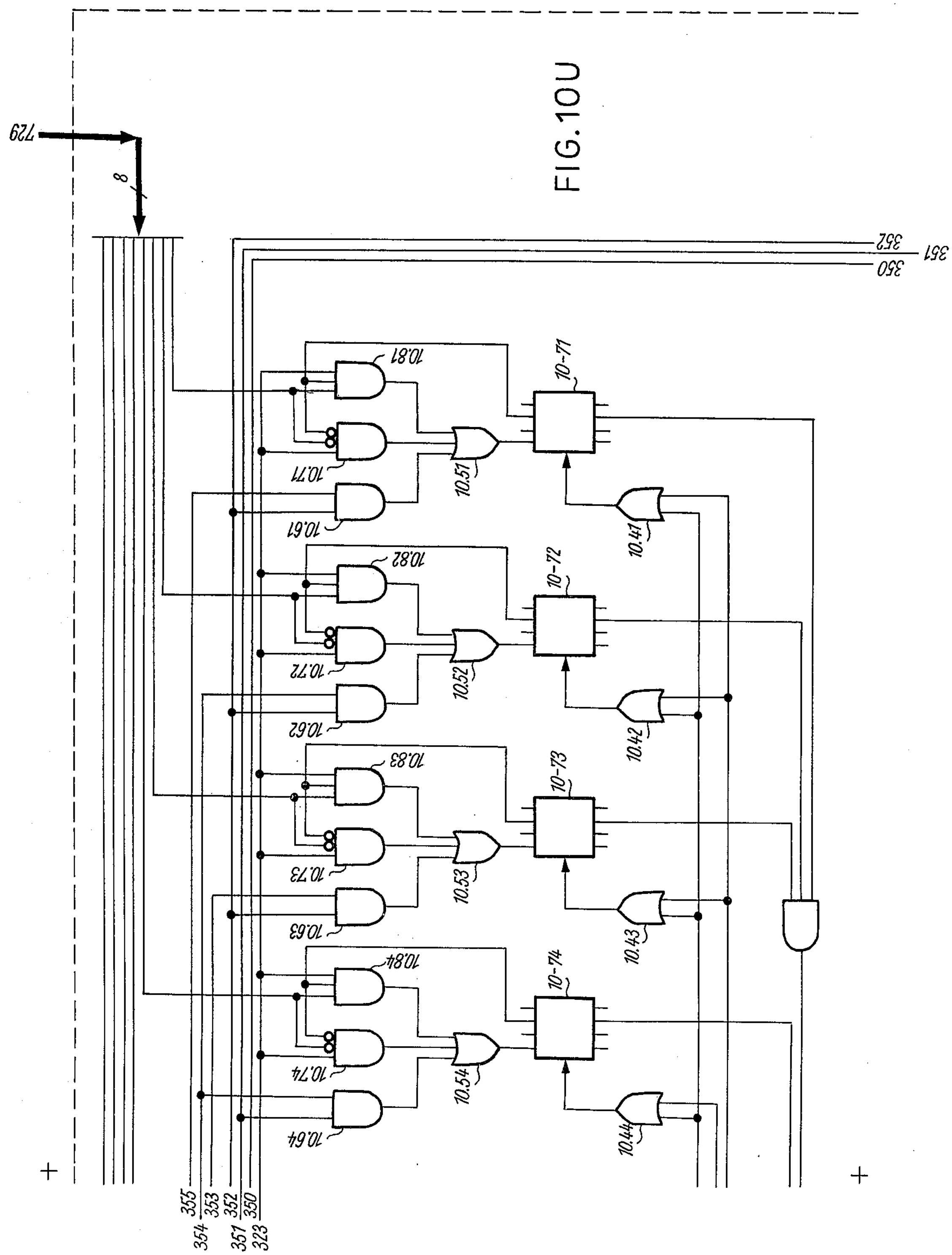
Figure 10V:
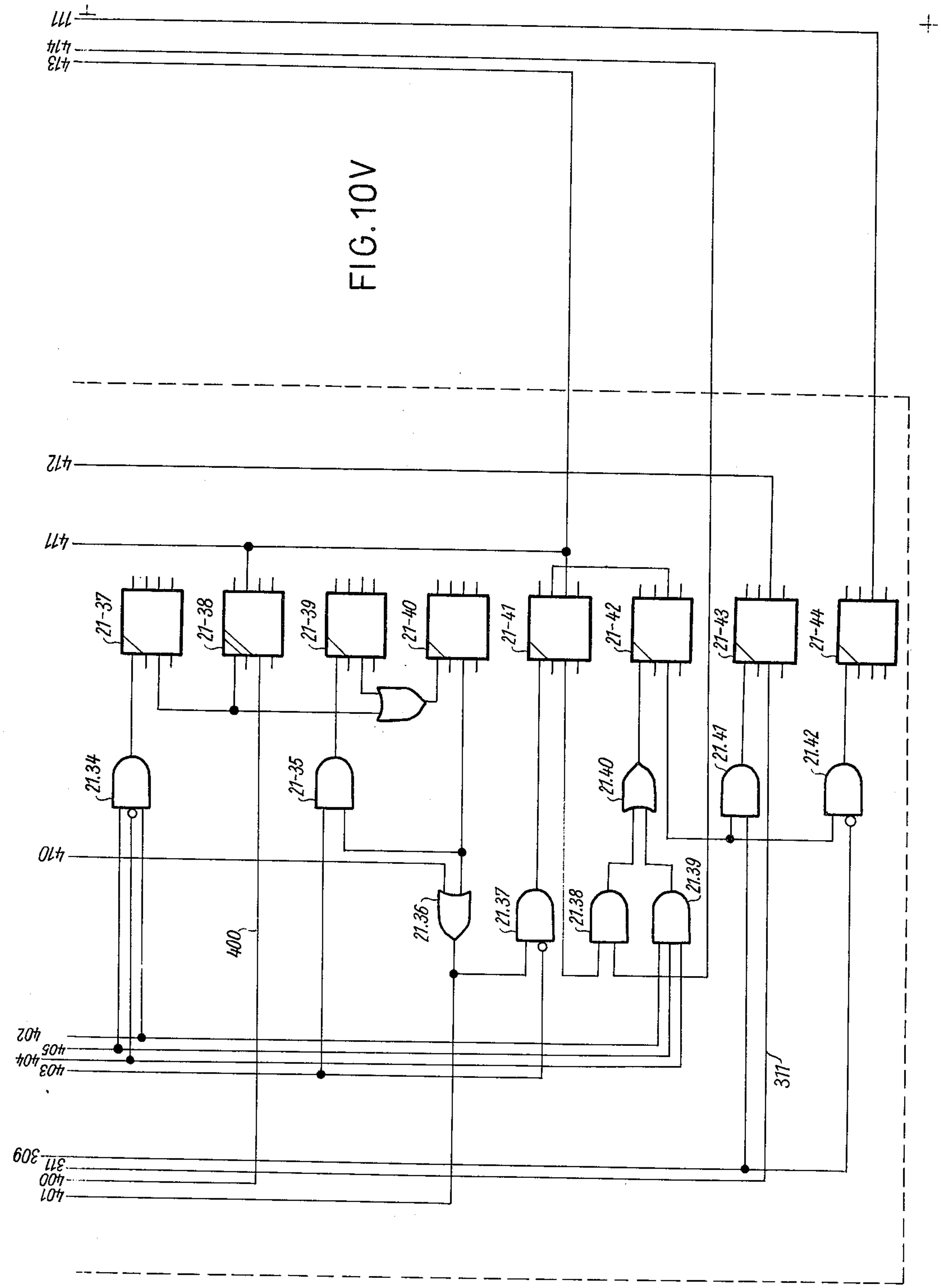
Figure 10W:
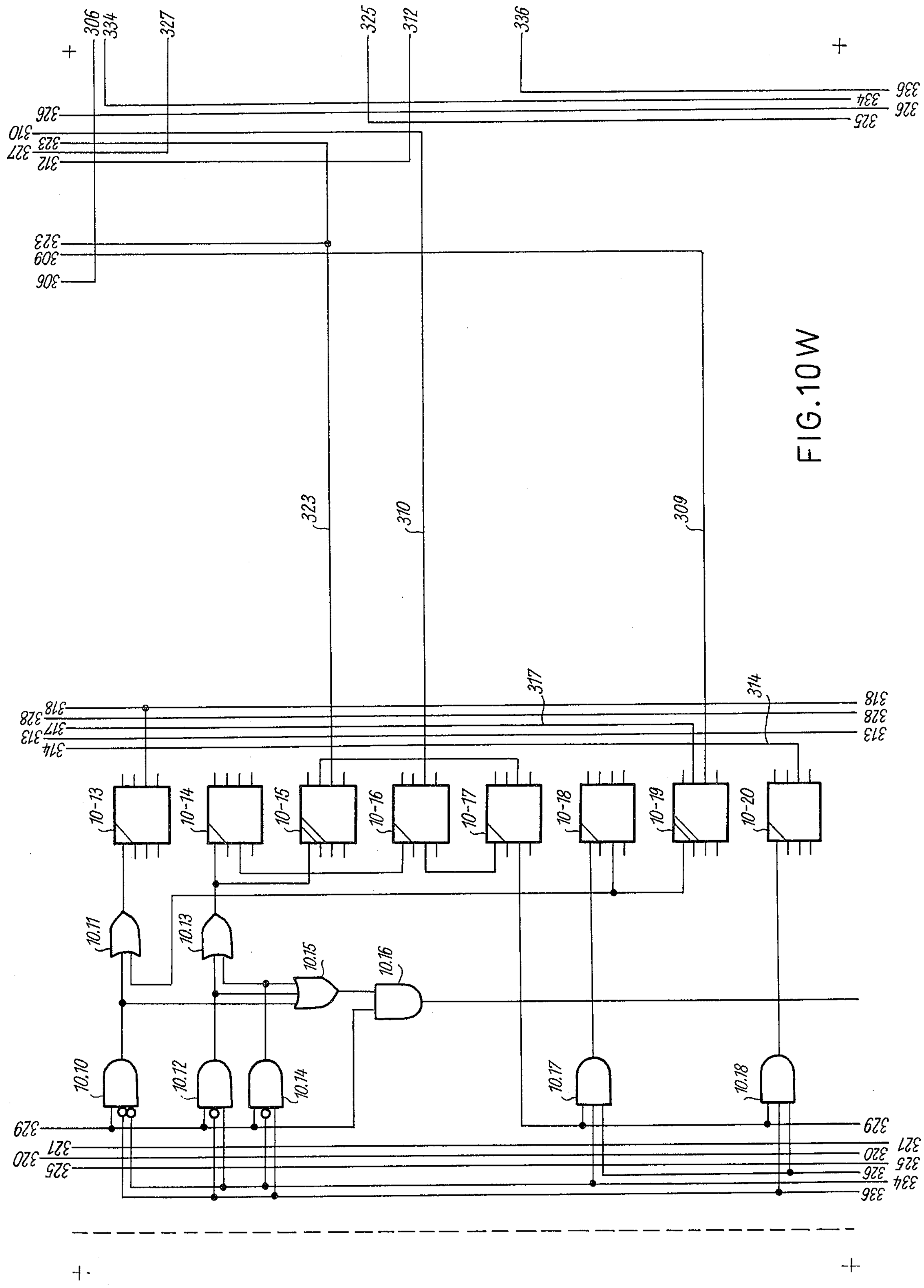
Figure 10X:
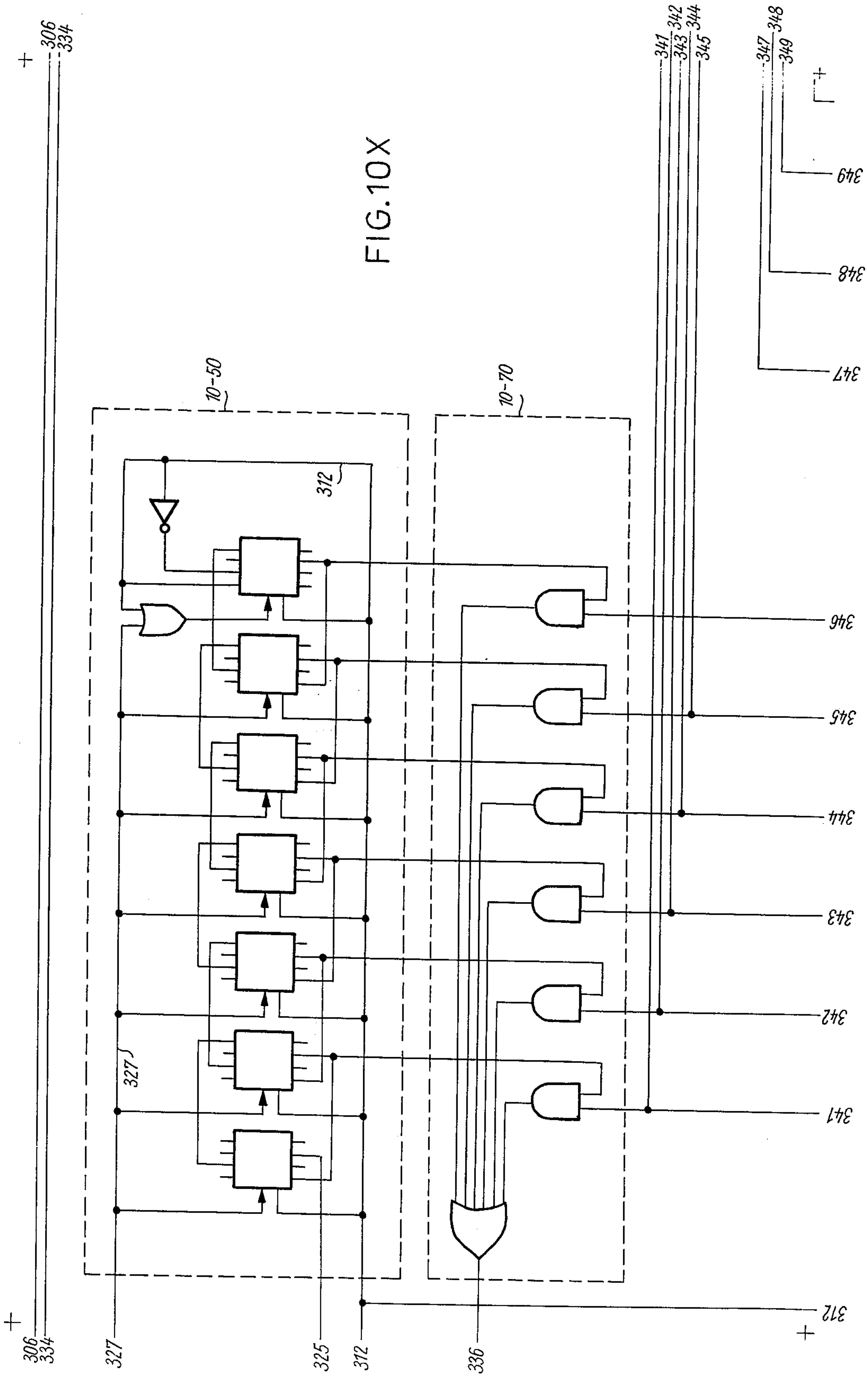
Figure 10Y:
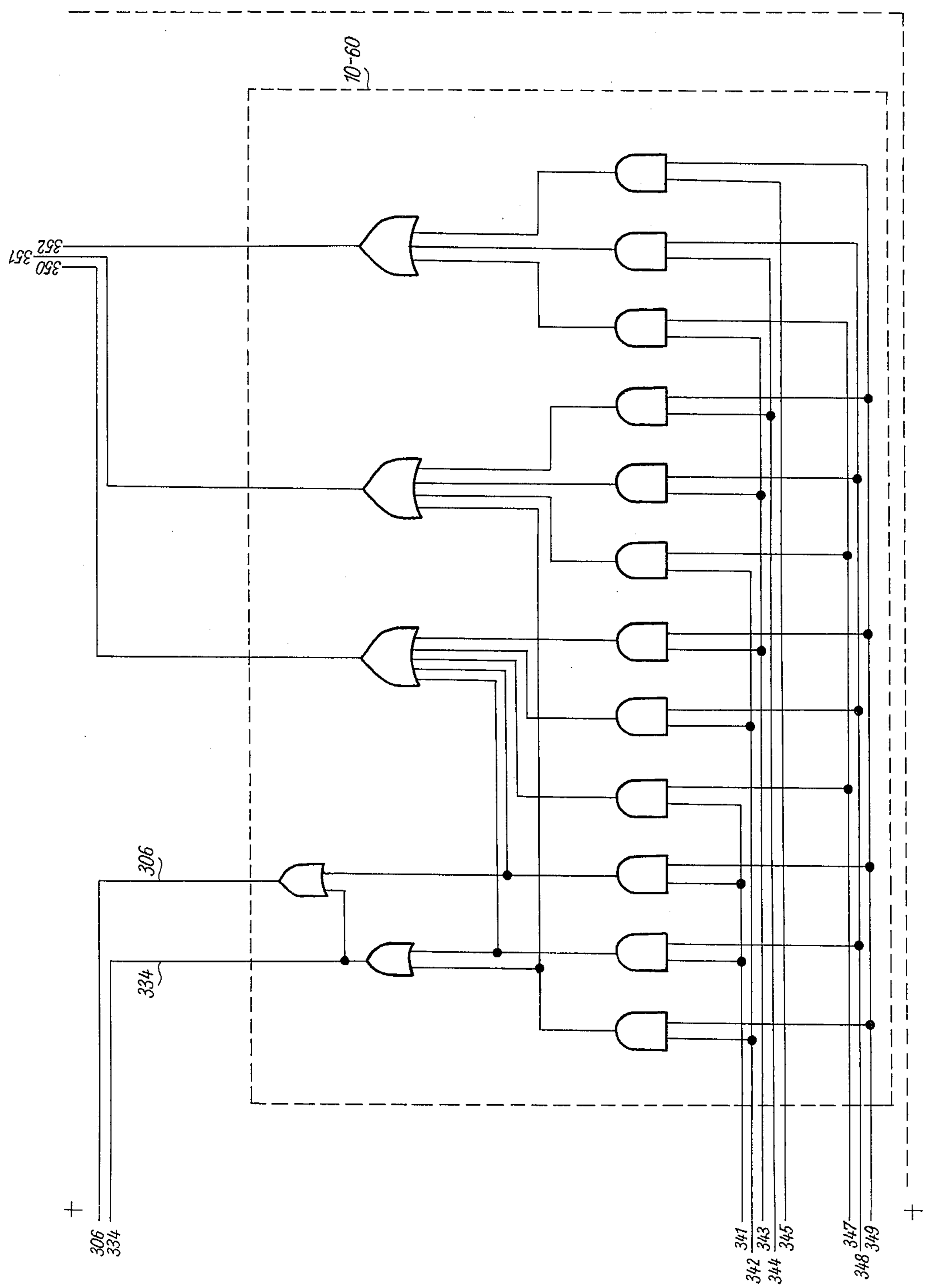
Figure 10Z:
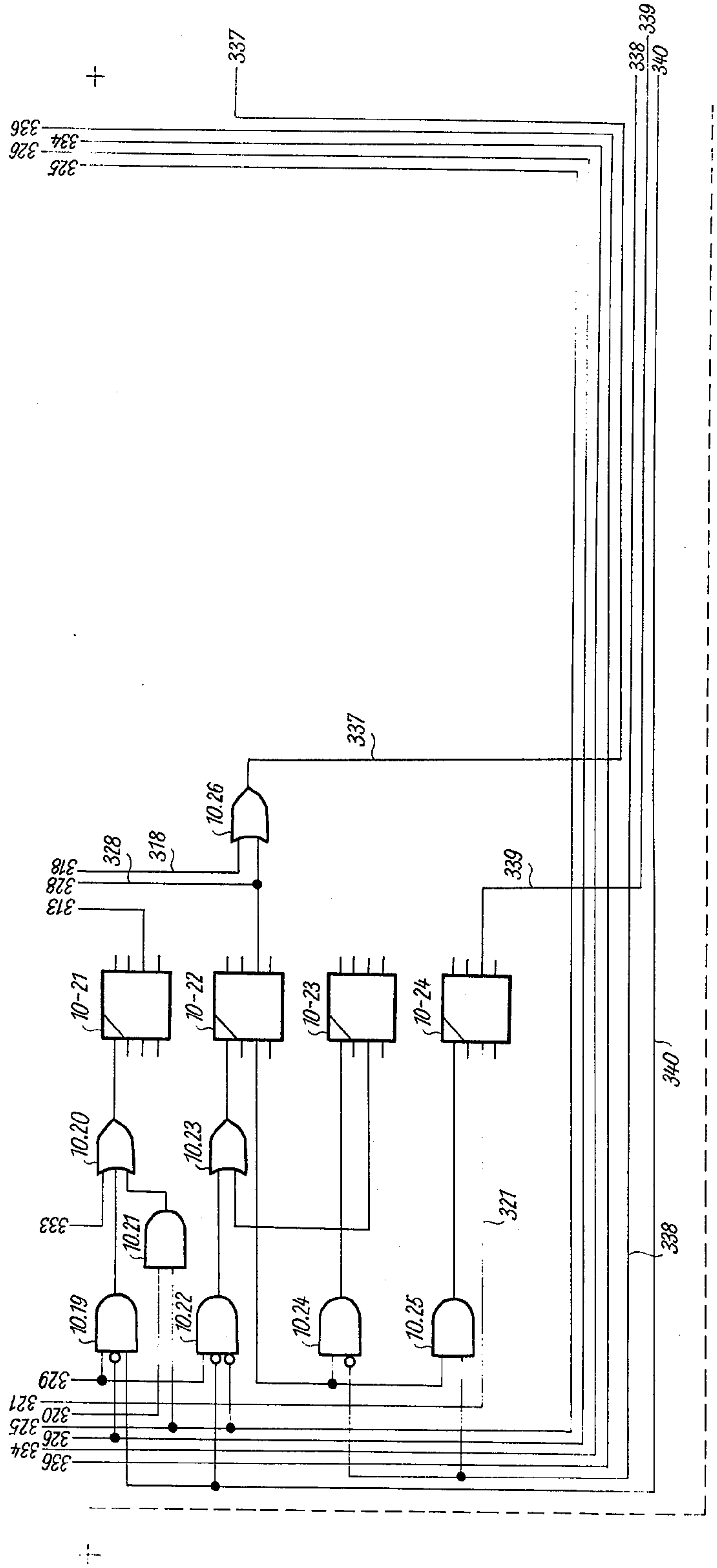
Figure 10Z:
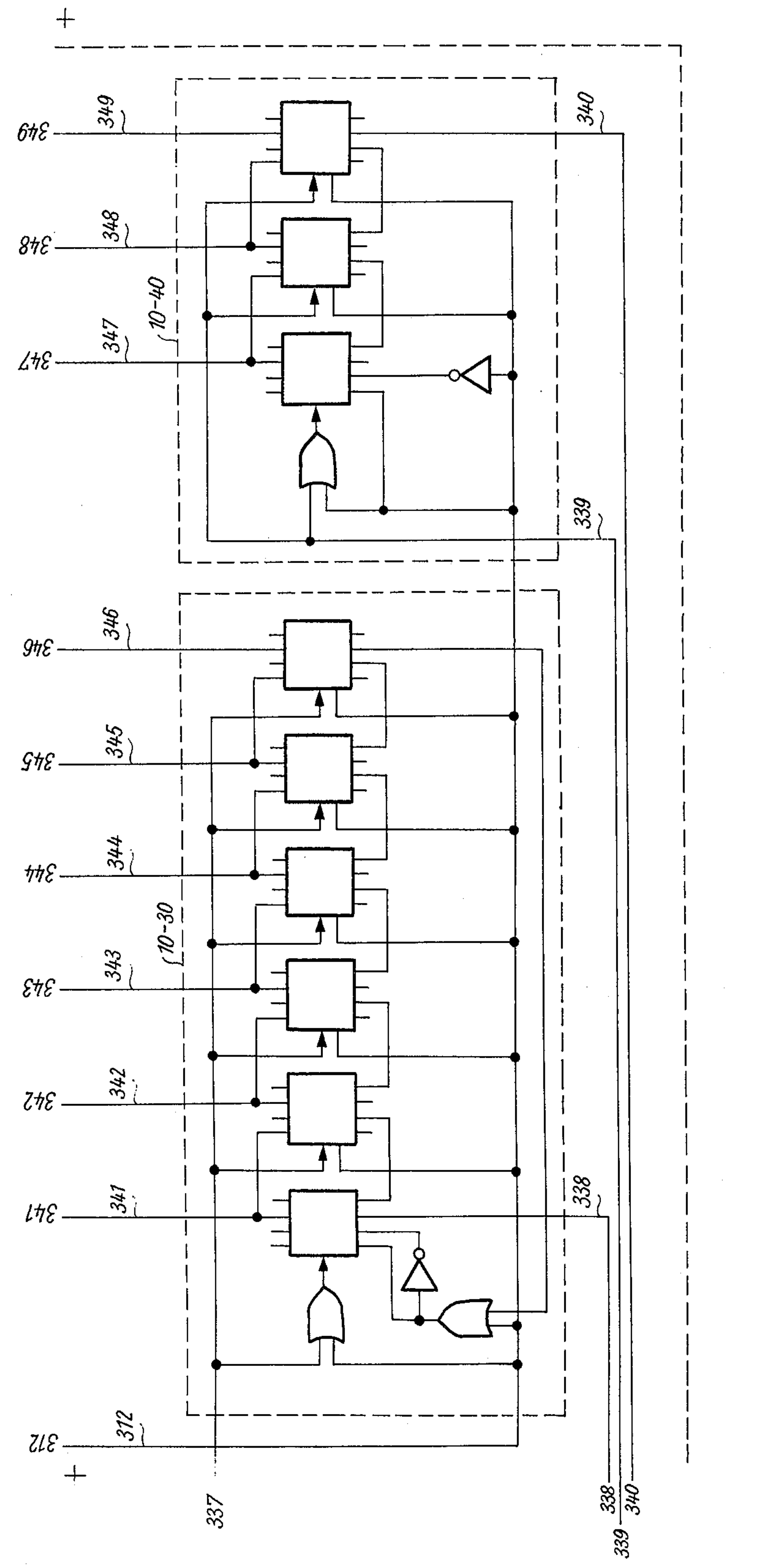

Due to the conditional latch "prefix" 10-19 set by the check code generator 10 in the status 10-18 by the control network 21-2 of the control network-1 21 (FIGS. 10*r* and 10*v*) in the clock sequence, "Building up the numeric value of the autoscribtive quantity", according to FIG. 11*i*, the factor corresponding to the prefix "C" is read out from the read-only memory for prefixes 18, split via the address register 13-5 according to FIG. 10*q*, and multiplied with the contents of the numeric value register 3-3; the exponent of the prefix is stored in ROM 18 in the last 6 binary positions-hence the range of numbers, −31≦ exponent≦+31, is allowed.

The control network 21-3 (FIGS. 10*m* and 10*n*) of the control network-1 21 in the steps during the clock sequence, "Building up the autoscribtive unit of the autoscribtive quantity", according to FIGS. 11*j* and 11*k*, determines the contents of the register for an autoscribtive unit 8 by reading out, by means of repeated increments of the address counter 13-6 with the occupied positions "10" or "11" from the read-only memory for elementary units 16, two expanded addresses for the read-only memory for groups of exponents to base units 23: "00000010" and "10000000", wherein the first 2 bits are used for control purposes and the last 6 bits serve as a higher address part for reading the ROM 23, to which a lower address part of 3 bits is added by the address counter 13-7 for the corresponding base unit. The bytes of the ROM 23, according to Table 10, contain "1" as the first bit, if the attached exponent=0. The actual contents of the register for an autoscribtive unit 8, when this clock sequence is finished is: "0, 1, 0, 0, 0, 0, 0, 0"

The logic network 9 (FIGS. 10*f* and 10*g*) during a second flow of the clock sequence, "Separation of a homoscribtive unit," according to FIG. 11*e* and FIG. 11*f*, causes the loading of the register for a stringed-together unit 11 during the status 9-7 with the character sequence "NIM".

The check code generator 10 (FIGS. 10*o*, 10*s*, 10*t*, 10*u*, 10*w*, 10*x*, 10*y*, 10*za* and 10*zb*) finishes the flow of the clock sequence, "Separation of a stringed unit", according to FIGS. 11*g* and 11*h*, after the first cycle, since prior to the summing of all lettes, the check character equivalence is determined under yes-condition 10.18 with:
Address (shifted code sum "M+I+N"): "0101 0110 00"
check character "00000110"

The control network 21-2 of the control network-1 21 (FIGS. 10*r* and 10*v*) during the clock sequence, "Building up the numeric value of the autoscribtive quantity", according to FIG. 11*i*, continues building up the numeric value by reading, with the higher address part "101010" read out from ROM 16, a coefficient (600000.-04) from the read-only memory for numeric values 20 and after considering the conditions (exponent=−1) multiplies it with the contents of the numeric value register 3-3 (result: "102888.-05").

The control network 21-3 of the control network-1 21 (FIGS. 10*m* and 10*n*) during the clock sequence, "Building up the autoscribtive unit of an autoscribtive quantity", according to FIGS. 11*j* and 11*k*, continues building up the autoscribtive unit by reading, with the higher address parts "000000" (not concerned) and "000001" read out from ROM 16, from the read-only memory for groups of exponents to base units 23 a sequence of exponents (1, 0, 0, 0, 0, 0, 0, 0) and after considering the conditions (reversal of signs) adds it, element for element to the contents of the register for an autoscribtive unit 8 (result: −1, 1, 0, 0, 0, 0, 0, 0).

Figure 3:
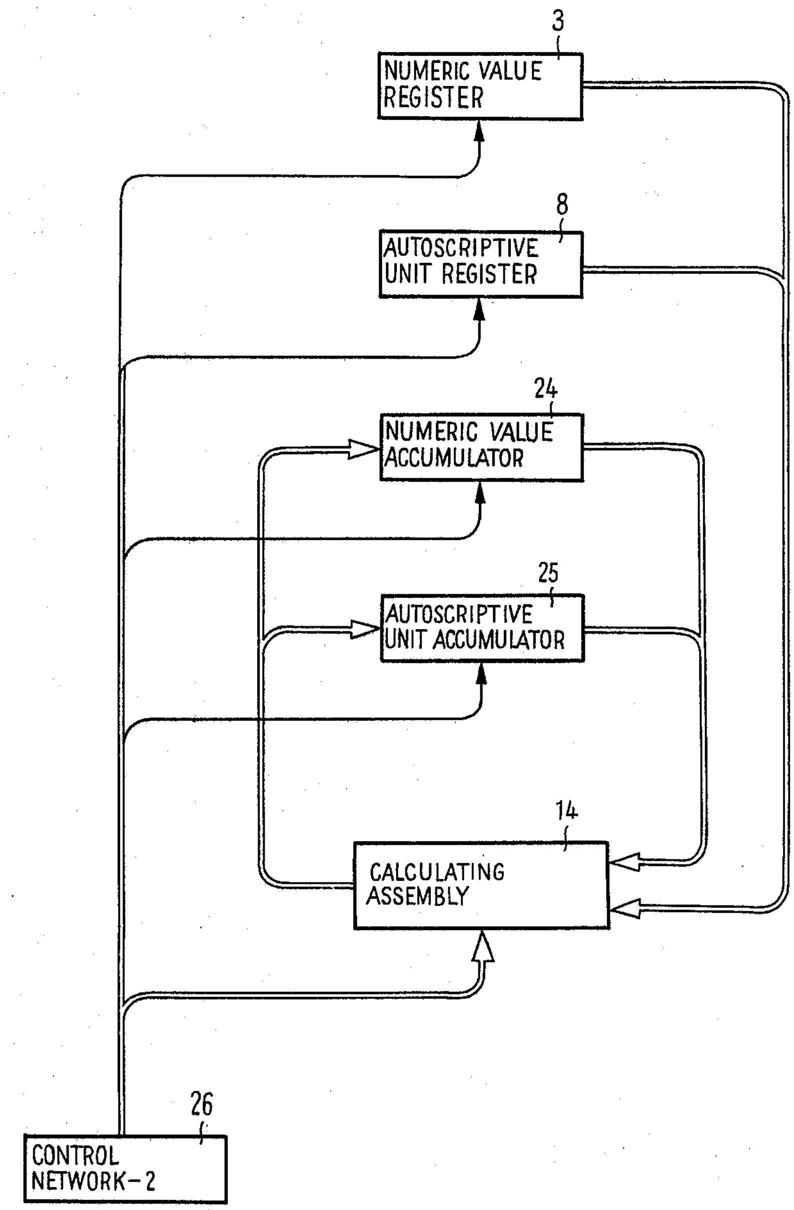
FIG. 3 the circuit arrangement for the automated processing of autoscribtive quantities.

The circuit arrangement for the automated processing of autoscribtive quantities (FIG. 3) is such a combination of assemblies that by the control network-2 26
the calculating assembly 14,
the numeric value register 3,
the register 8 for an autoscribtive unit,
the numeric value accumulator 24, and
the accumulator 25 for an autoscribtive unit are controlled in an ordered sequence, when the registers and accumulators are charged and the circuit is activated by the bit sequence for the execution of a special operation with quantities, e.g., via the input keyboard 1.

The circuit adds or subtracts two autoscribtive quantities of the same kind of quantity without limitation, it multiplies or divides two autoscribtive quantities of the same or different kind of quantity, or it raises an autoscribtive quantity to a power or extracts its root, and makes available the resulting quantity in an autoscribtive form of representation always in the numeric value accumulator 24 and in the accumulator for an autoscribtive unit 25.

In the addition/subtraction of two autoscribtive quantities the calculating assembly 14 compares the content of the register 8 for an autoscribtive unit with the content of the accumulator 25 for an autoscribtive unit, and in the case of an equality adds/subtracts the content of the numeric value register 3 to/from the content of the numeric value accumulator 24, and stores the sum in the numeric value accumulator 24.

In the multiplication/division of two autoscribtive quantities the calculating assembly 14 adds/subtracts, depending on the position, element for element, the content of the register 8 for an autoscribtive unit to/from the content of the accumulator 25 for an autoscribtive unit. The calculating assembly 14 further multiplies/divides the content of the numeric value accumulator 24 with/by the content of the numeric value register 3, and the results are stored, in each case, in the accumulator 25 for an autoscribtive unit and in the numeric value accumulator 24.

When an autoscribtive quantity is raised to a power, or when its root is extracted, the calculating assembly 14 checks whether the numeric register 3 contains an integer exponent with the mantissa "1", and whether the elements of the register 8 for an autoscribtive unit are always "0". In case of a fulfilled condition, the calculating assembly 14 divides the content of the accumulator for an autoscribtive unit 25, element for element, by the exponent/root-exponent of the numeric value register 3 and writes the result in the accumulator 25 for an autoscribtive unit. Further, the calculating assembly 14 raises to a power, or extracts the root from, the content of the numeric value accumulator 24 with the content of the numeric value register 3 and stores the result in the numeric value accumulator 24.

Figure 4:
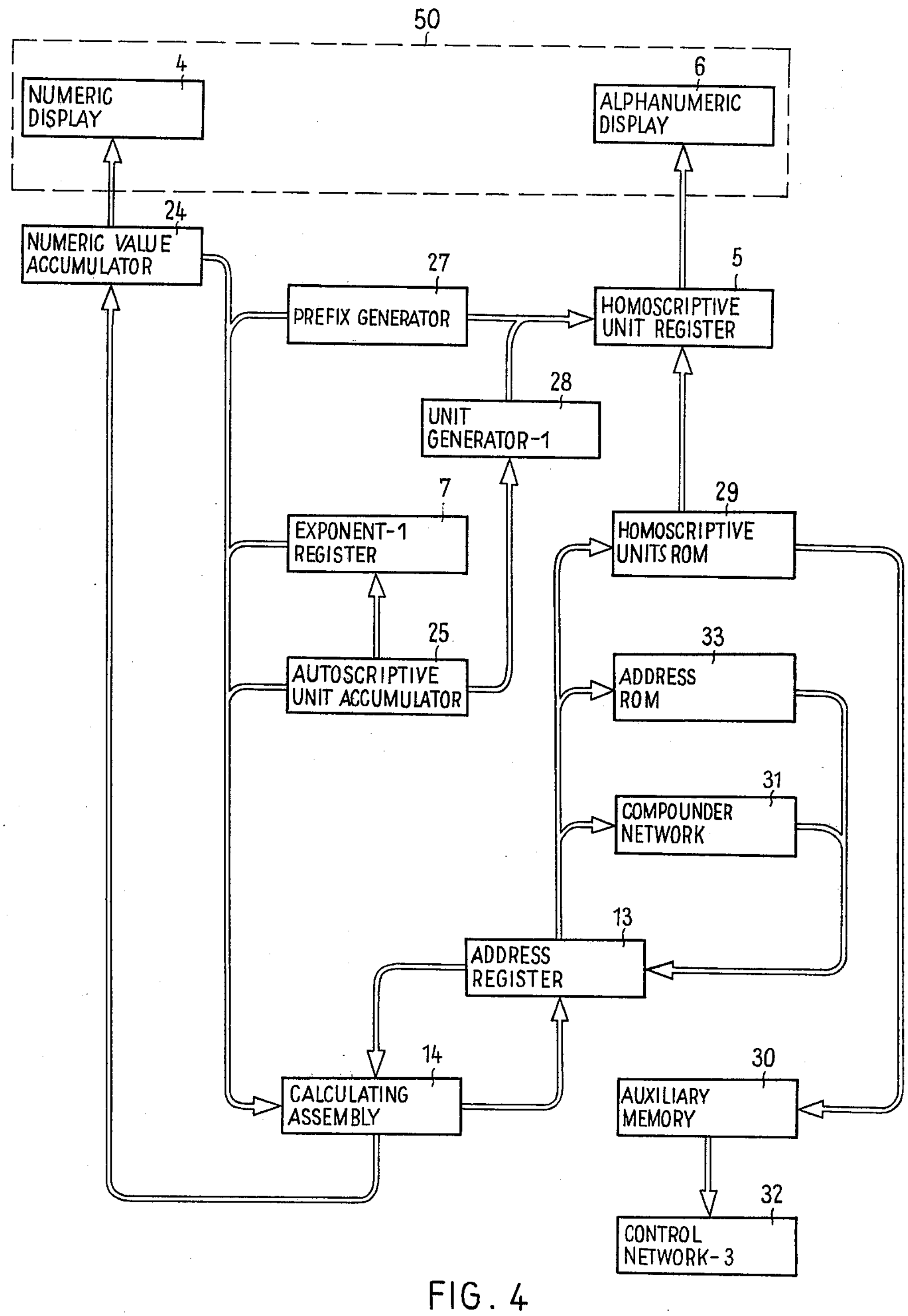
FIG. 4 the circuit arrangement for the controlled output transformation of quantities.

The circuit arrangement for the controlled output transformation of quantities (FIG. 4) is a combination of assemblies operating such that with the control network-3 32 the calculating assembly 14, the compounder network 31,
the unit generator-1 28,
the prefix generator 27,
the accumulator 25 for an autoscribtive unit,
the numeric valve accumulator 24,
the register for a homoscribtive unit 5,
the read-only memory 29 for homoscribtive units,
the address read-only memory 33, and
the address register 13 are controlled in an ordered sequence, when the circuit is activated by a starting impulse, e.g., via the input keyboard 1.

This circuit transforms an autoscribtive quantity stored in the numeric value accumulator 24 and in the accumulator 25 for an autoscribtive unit without limitation of the kind of quantity to a homoscribtive quantity, thereby determining a suitable homoscribtive unit. From this homoscribtive quantity, the numeric value in the numeric value accumulator 24 and the homoscribtive unit in the register 5 for a homoscribtive unit are stored.

Using the content of the accumulator for an autoscribtive unit 25, the calculating assembly 14 determines a packed-numerator unit and a packed-denominator unit. These packed units are multiplied exponential products, analogous to the homoscribtive form of representation, whereby for a certain base unit a certain number is chosen, but not an abbreviation. The packed-numerator unit and the packed-denominator unit are compounded by the compounder network 31 to a small numeral digit area. The compounder network 31 is a logic network, which reduces a bit sequence for a certain large number to a bit sequence for a certain small number. These compounded packed units are ordinal numbers for reading a homoscribtive unit from the read-only memory 29 for homoscribtive unit in the register 5 for a homoscribtive unit. When a homoscribtive unit cannot be determined for the autoscribtive quantity, then the unit generator-1 28 generates a homoscribtive unit in the form of an exponential product for base units.

The prefix generator 27 separates a factor from the content of the numeric value accumulator 24, depending on its value, and shifts the abbreviation for a prefix as the first character into the register 5 for a homoscribtive unit.

The control network-3 32 clocks the controlled output transformation in the following way:

(1) The calculating assembly 14 determines a packed numerator unit in cycles from the content of the accumulator 25 for an autoscribtive unit and stores it in the address register 13.

(2) In one cycle, the packed numerator unit is compounded in the compounder network 31 and written into the address register 13. By way of the compounded packed-numerator unit from an address read-only memory 33, an address for a section of the read-only memory 29 for homoscribtive units is read out. When an address cannot be read out from the address read-only memory 33, the control network-3 32 continues the cycle sequence according to (7).

(3) A repetition factor k is read into an auxiliary memory from the read-only memory 29 for homoscribtive units; k expresses how many denominator units of the given numerator unit homoscribtive units are established in the read-only memory 29 for homoscribtive units.

(4) Determination of the packed-denominator unit analogously to (1) with following compounding analogously to (2) and storing in the auxiliary memory 30.

(5) The calculating register 14 determines in k cycles, cyclic increase of the address according to (3), whether the compounded denominator unit is contained in the read-only memory 29 for homoscribtive units. When it is contained therein, the control network-3 32 causes a reading of a homoscribtive unit in the register 5 for a homoscribtive unit and an exponent to the first factor of the exponential product of the homoscribtive unit in the exponent-1-register 7 from the read-only memory 29 for homoscribtive units. When the search in all k cycles is finished negatively, the control network-3 32 continues the cycle sequence according to (7).

(6) In connection with the calculating assembly 14, the prefix generator 27 separates a factor from the content of the numeric value accumulator 24, depending on its value and the content of the exponent-1 register 7. The abbreviation of a prefix is inserted into the register for a homoscribtive unit 5. The representation of an autoscribtive quantity to a homoscribtive quantity is finished.

(7) The unit generator-1 28 generates a homoscribtive unit, and n cycles are run through, wherein n is equal to the number of base units of the quantity system employed. In each cycle, an exponential product factor is generated, when the corresponding element is not equal to zero. The first cycle is started with the last base unit of the established order. Within one cycle, which covers the generation of a factor, the exponent of the factor is first accepted from the accumulator 25 for an autoscribtive unit into the register 8 for an autoscribtive unit, and subsequently the abbreviation of the base unit is accepted from the unit generator-1 28. Further, the exponent of the factor is stored in the exponent-1 register 7. The control network-3 32 continues the cycle sequence according to (6).

Figure 5:
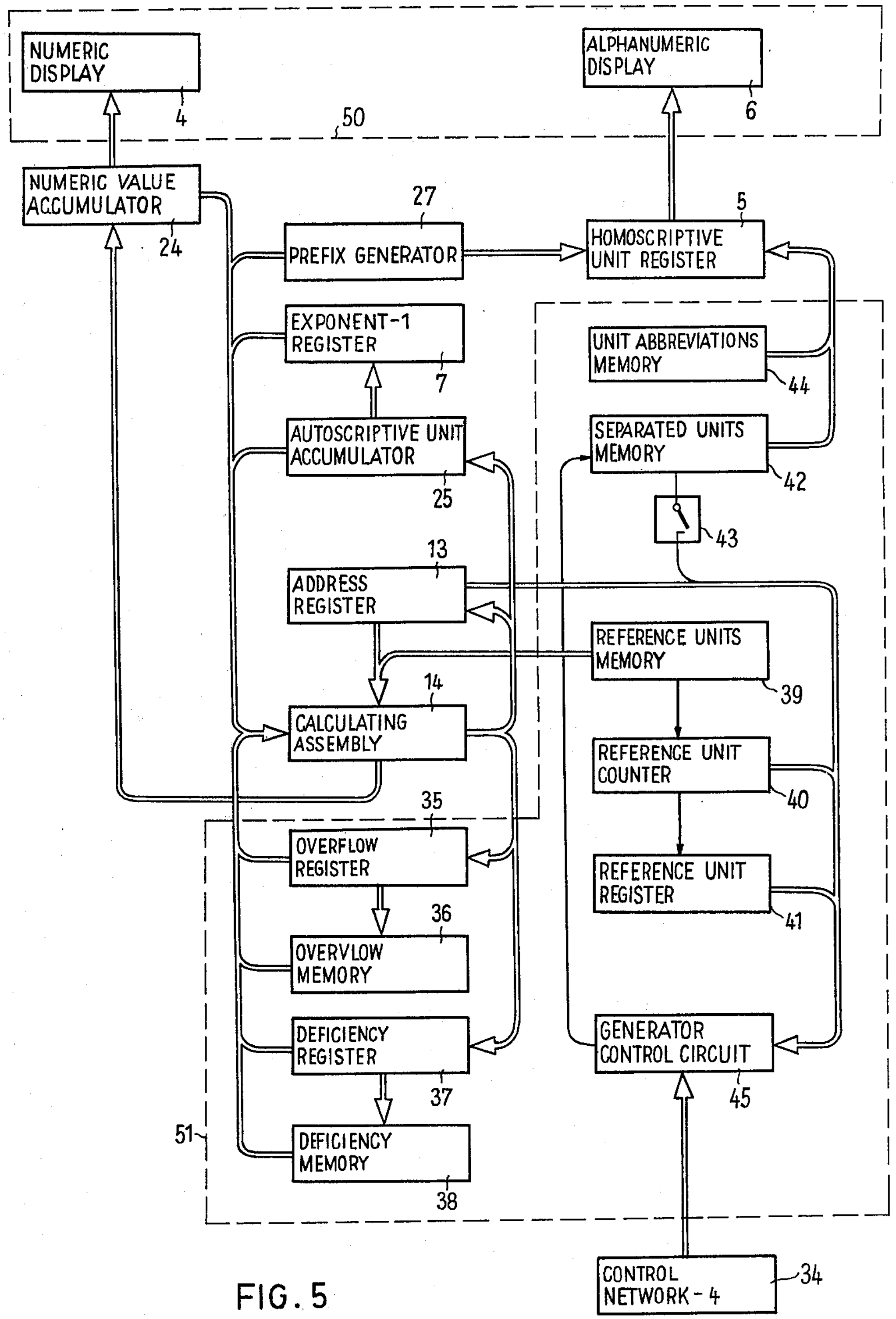
FIG. 5 the circuit arrangement for the optimal output transformation of quantities.

The circuit for the optimal output transformation of quantities (FIG. 5) is such a combination of assemblies that, by the control network-4 34 the calculating assembly 14, the unit generator-2 51,
the prefix generator 27,
the accumulator for an autoscribtive unit 25,
the numeric value accumulator 24,
the exponent-1-register 7, and
the register for a homoscribtive unit 5 are controlled in an ordered sequence when the circuit is activated by a starting impulse.

The circuit transforms an autoscribtive quantity stored in the numeric value accumulator 24 and in the accumulator 25 for an autoscribtive unit without limitation of the kind of quantity of the quantity to a homoscribtive quantity, whereby the homoscribtive unit is generated in an optimal form of representation.

An optimal kind of representation of a homoscribtive unit is understood herein to refer to an exponential product with a minimum number of factors whereby the factors contain only certain units. These units may be:

reference units (derived units of the SI with independent names), such as Newton, Volt, Pascal;
base units, such as second, ampere; or
supplementary units, such as radian.

For instance, for quantities of specific resistivity, the unit OHM.M and not V.M/A is always generated.

The unit generator-2 51 generates an optimal kind of representation of the homoscribtive unit in connection with the calculating assembly 14. This unit contains such a combination of subassemblies that by a generator control circuit 45, in dependance on the control network-4 34:

a deficiency register 37, an overflow register 35, a reference unit register 41, a deficiency memory 38, and an overflow memory 36 all store an integer number in each case,
a reference unit counter 40,
a memory of the separated units 42, in which the abbreviations of certain elementary units circulate in an established order, and
a memory of the reference units 39, in which the exponents to base units of reference exponents to base units of reference units circulate in an established order, are controlled such that, at first, if possible, from the content of the accumulator for an autoscribtive unit 25 reference units are separated and the remainder of the autoscribtive unit is represented with base units and supplementary units.

The unit generator-2 51 operates according to the following scheme:

(1) A separation attempt is started, when the given unit contains at least (k−1) base units of a group of reference units, whereby all reference units of a group contain the same k base units.

(2) In case of a fulfillment of (1), an evaluation of the deviation of the given autoscribtive unit from the individual reference units according to points is performed. A point means that a base unit with the exponent 1 deviates in relation to the base units considered. It is to be distinguished between efficiency points and overflow points.

(3) The reference unit with the smallest deviation is separated, but no more than the two deficiency points are allowed.

(4) A reference unit may be separated reciprocally and multiply.

(5) The remainder of the given autoscribtive unit after the separation of reference units is changed into an exponential product from base units and supplementary units.

The generation of a homoscribtive unit by the unit generator-2 51 is performed in several timing cycles, for example:

(1) The calculating assembly 14 determines the difference between the content of the accumulator 25 for an autoscribtive unit and the content of the memory of the reference units 39, element for element, and sums the deficiency and overflow points, which are stored in the deficiency register 37 and in the overflow register 35, respectively, for the actual reference unit 1 in each case.

(2) When the content of the deficiency register 37 is >2, the flow according to (1) is repeated, but with a sign reversion of the elements of the content of the accumulator for an autoscribtive unit 25.

(3) When the content of the deficiency register 37 is >2, the memory 39 of the reference units makes available the reference unit i+1 and then continues according to (1) above, when the actual reference unit of the memory 39 of the reference units is not the last reference unit, then continuation is according to (6) below.

(4) The content of the deficiency register 37, of the overflow register 35 and of the reference unit counter 40 is accepted in the deficiency memory 38, the overflow memory 36 and the reference unit register 41, respectively, and the cycle sequence is continued, when the content of the deficiency register 37 and the content of the overflow register 35 are zero.

(5) The content of the deficiency register 37, of the overflow register 35 and of the reference unit counter 40 is accepted in the deficiency memory 38, the overflow memory 36 and the reference unit register 41, respectively, when the content of the deficiency register 37 is smaller as to its amount than the content of the deficiency memory 38;

continuation of the cycle sequence is according to (1) with the reference unit (i+1), when the actual reference unit of the memory 39 for reference units is not the last reference unit.

(6) According to the content of the reference unit register 41 in the memory of the separated units 42, a bit is added to the content of the memory location assigned to a certain reference unit, according to its sign as in (2) above, when the content of the deficiency memory 38 is >3. From the content of the accumulator for an autoscribtive unit, the content of the memory 39 for reference units is subtracted from the reference unit indicated in the reference unit register 41 according to its sign as in (2) and the result is stored in the accumulator 25 for an autoscribtive unit. Beginning a new sequence of timing cycles (1) . . . (6) with (1), the deficiency memory 38 is put to 3.

(7) When the content of the deficiency memory 38 is >2, the remaining content of the accumulator 25 for an autoscribtive unit is transferred, element for element, in the memory 42 of separated units.

(8) During a full circulation of the memory 42 of separated units and of the memory 44 of unit abbreviations, one number each from the memory 42 of the separated units and after that an abbreviation of a unit from the memory 44 of unit abbreviations are exchanged, element for element, in the register 5 for a homoscribtive unit, when the respective number of the content of the memory 42 of separated units is >0. The first number is stored in the exponent-1 register 7 and at the first negative number a negative element switch 43 is turned on.

(9) In the register 5 for a homoscribtive unit the symbol "/" is shifted, when the negative elements switch 43 is "1".

(10) When the negative elements switch 43 is "1", a further full circulation of the memory 42 of separated units and of the memory 44 of unit abbreviations 44 follows. The amount of a number from the register 42 of separated units are first exchanged and after that the abbreviation of a unit from the memory 44 of the unit abbreviations are exchanged, when the respective number of the content of separated units 42 is <0.

Subsequently the prefix generator 27 connected to the calculating assembly 14 separates a factor from the content of the numeric value accumulator 24, depending on its value and on the content of the exponent-1 register 7. The abbreviation of a prefix is shifted from the prefix generator 27 in the register 5 for a homoscribtive unit. The optimal representation of an autoscribtive quantity to a homoscribtive quantity is finished.

Figure 12:
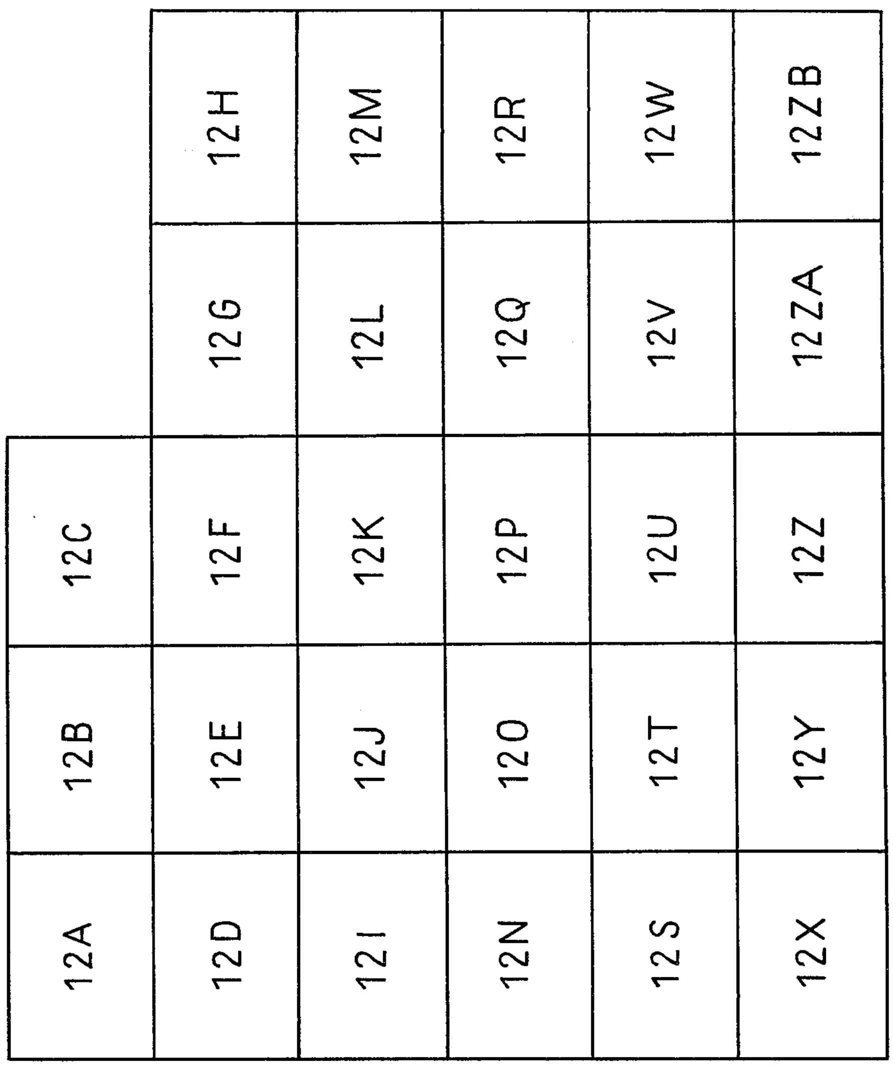
FIG. 12 the logic circuit scheme for the optimal output transformation of quantities (partial drawings.
Figure 13:
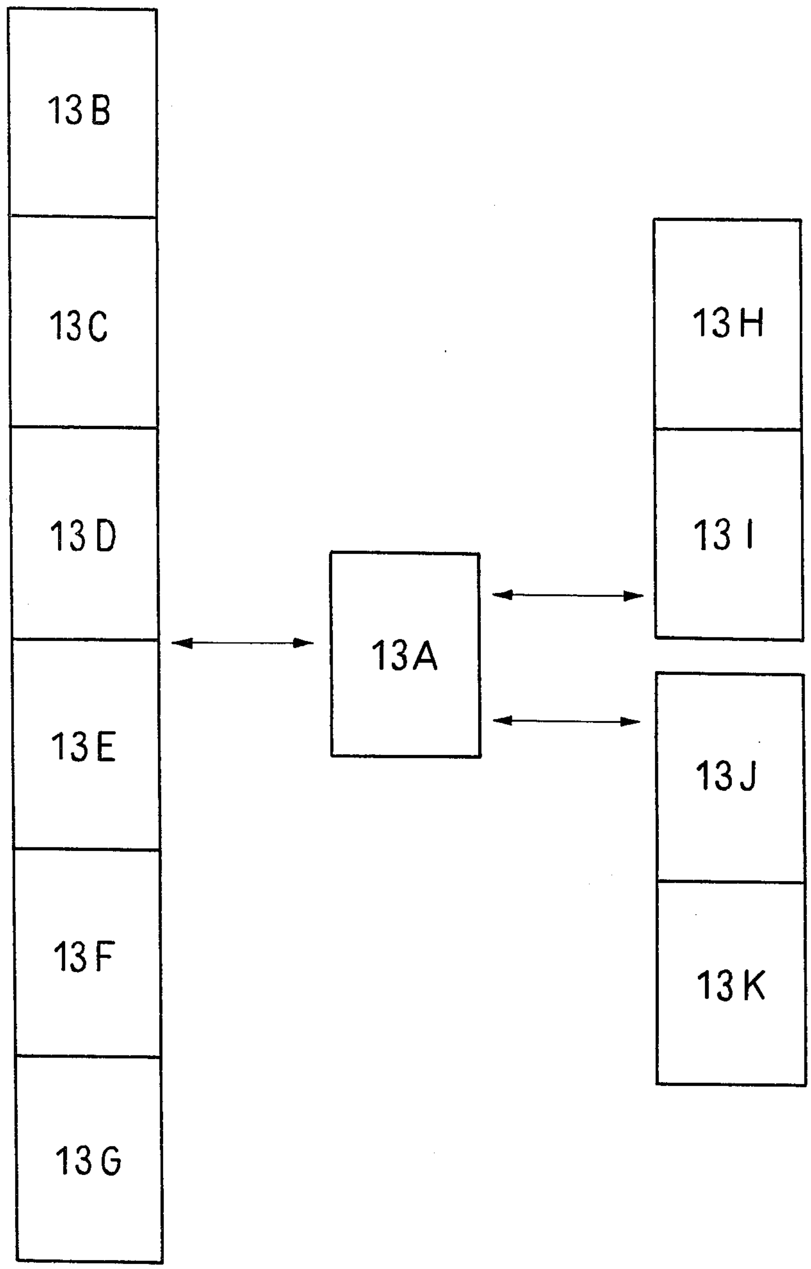
FIG. 13 the logic clock sequence scheme for the optimal output transformation of quantities (partial drawings.
Figure 13:
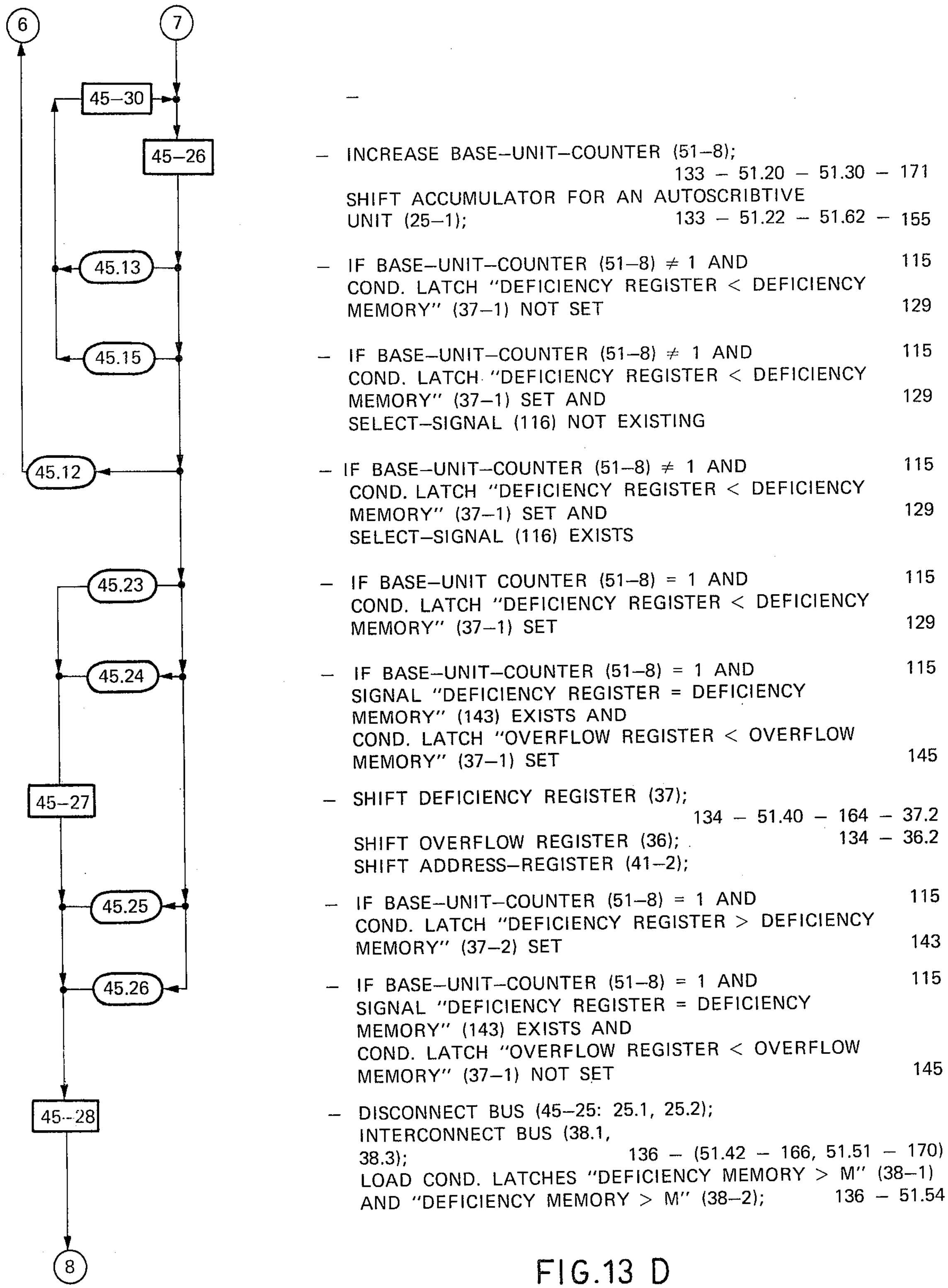
Figure 13:
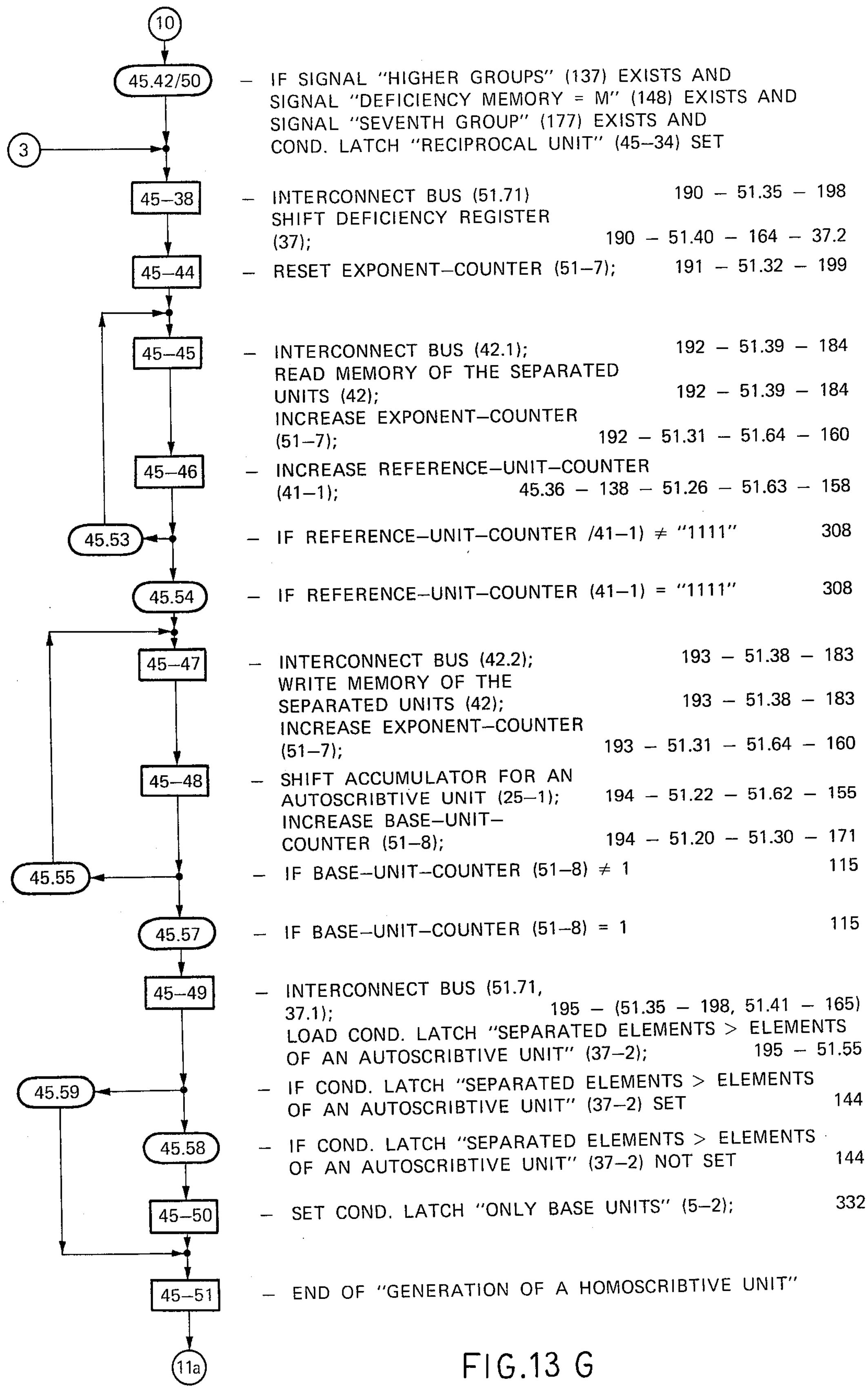

A circuit example of the circuit arrangement for the optimal output transformation of quantities is shown in FIG. 12, the logic clock sequence for this circuit being represented in the form of a flow chart in FIG. 13, while Table 11 gives the detailed contents of the memory of reference units 39, arranged as ROM.

Figure 12A:
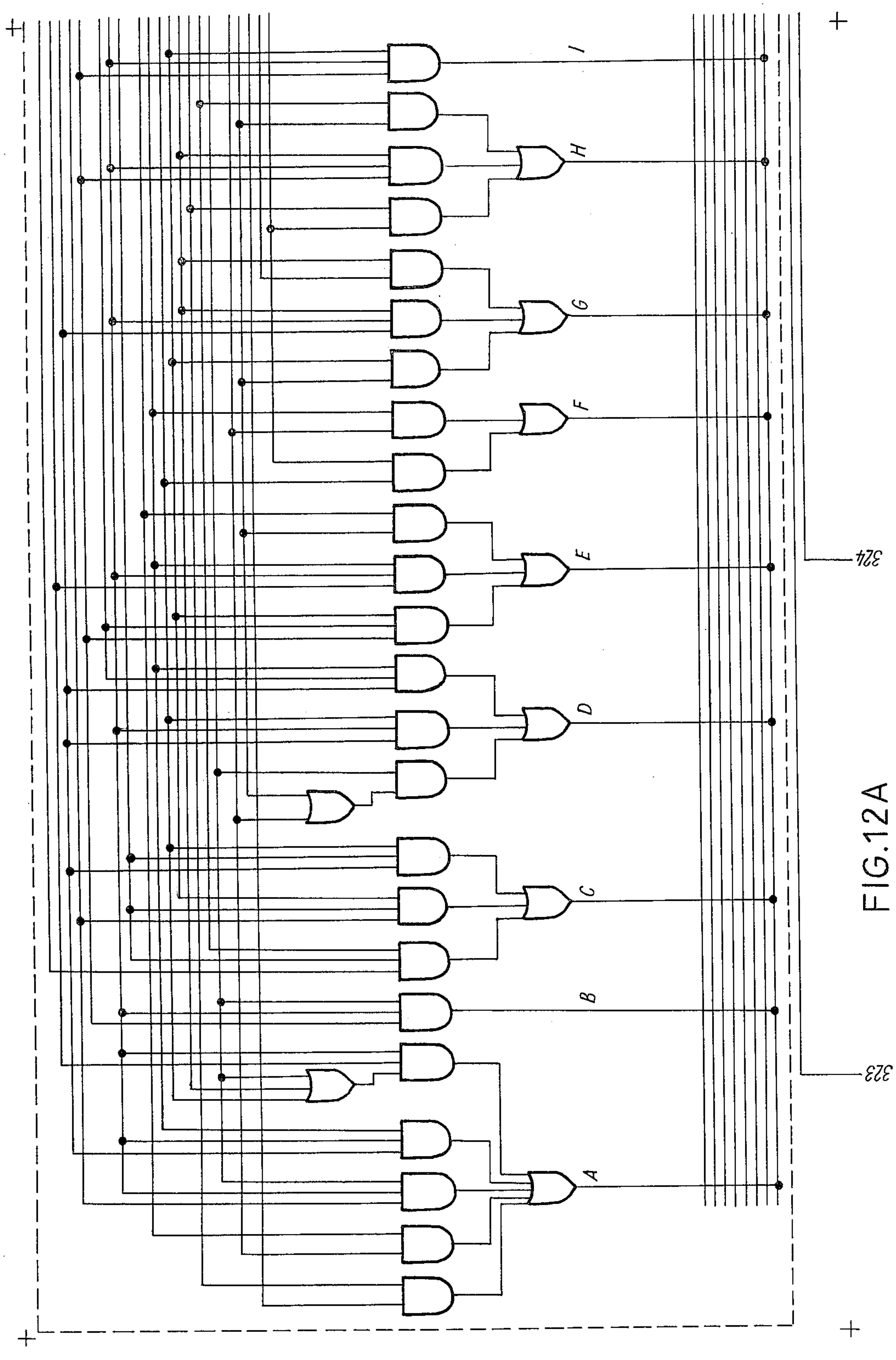
FIGS. 12*a* . . . 12*z*, 12*za*, 12*zb*)
Figure 12B:
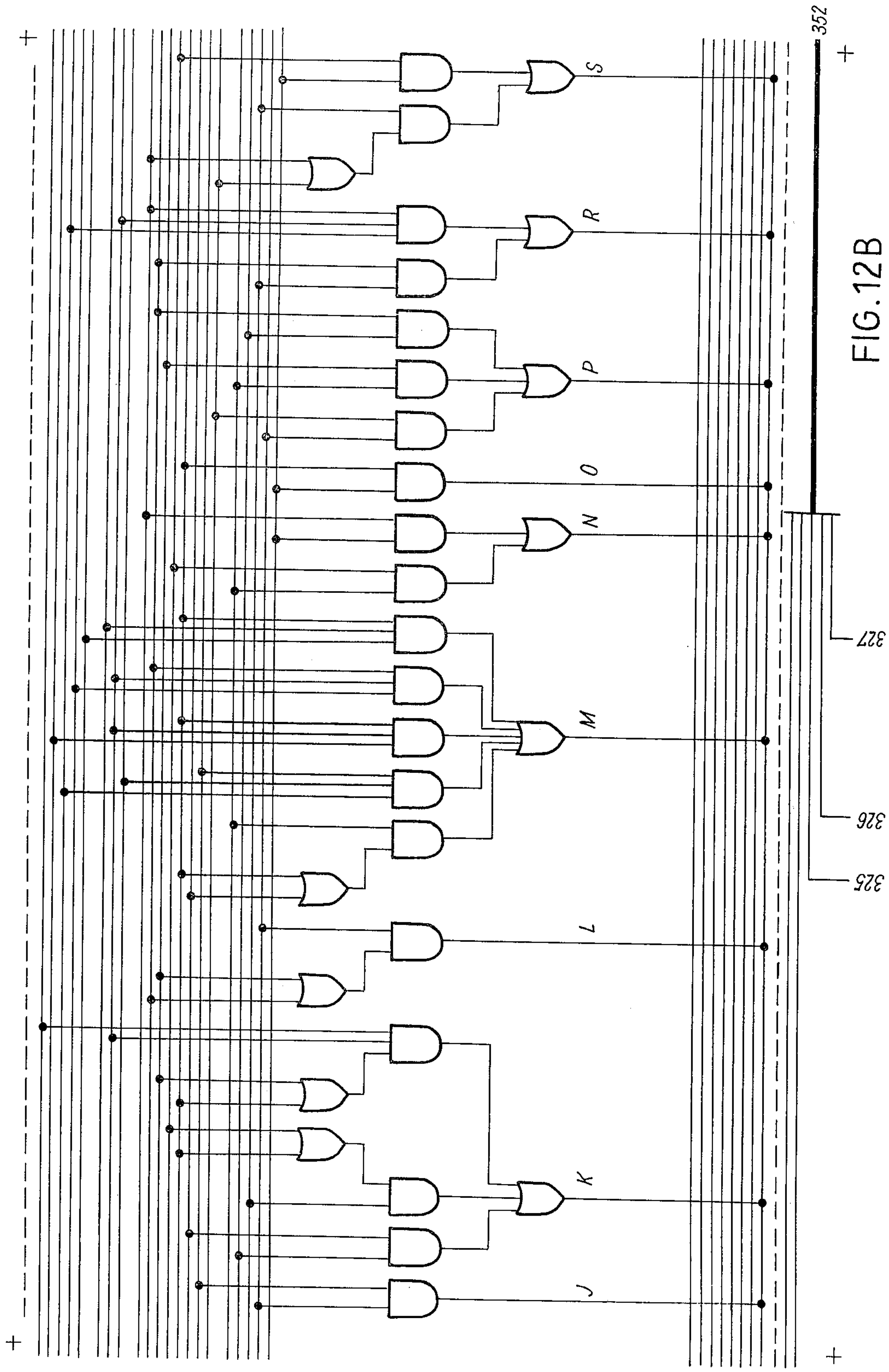
Figure 12C:
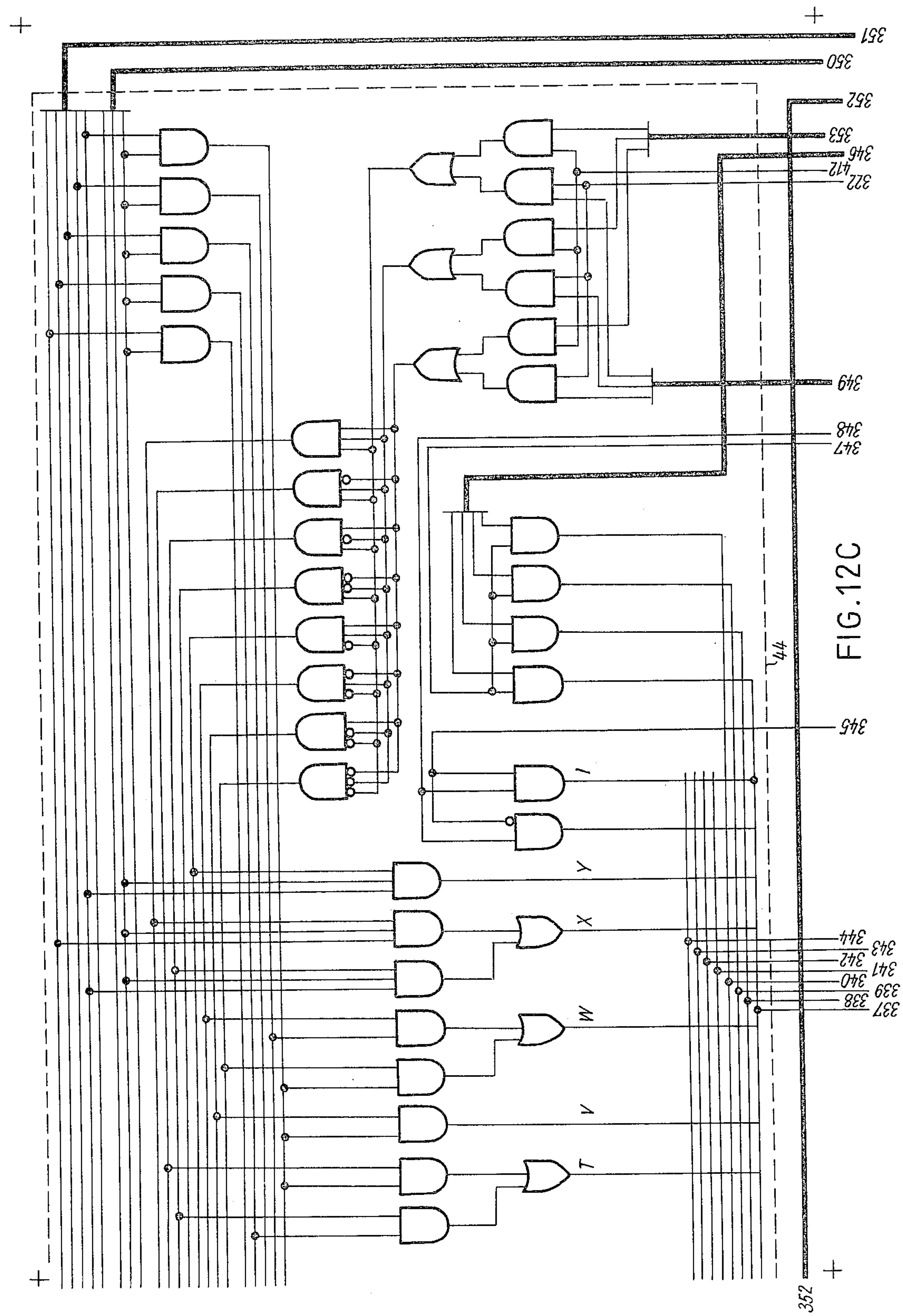
Figure 12D:
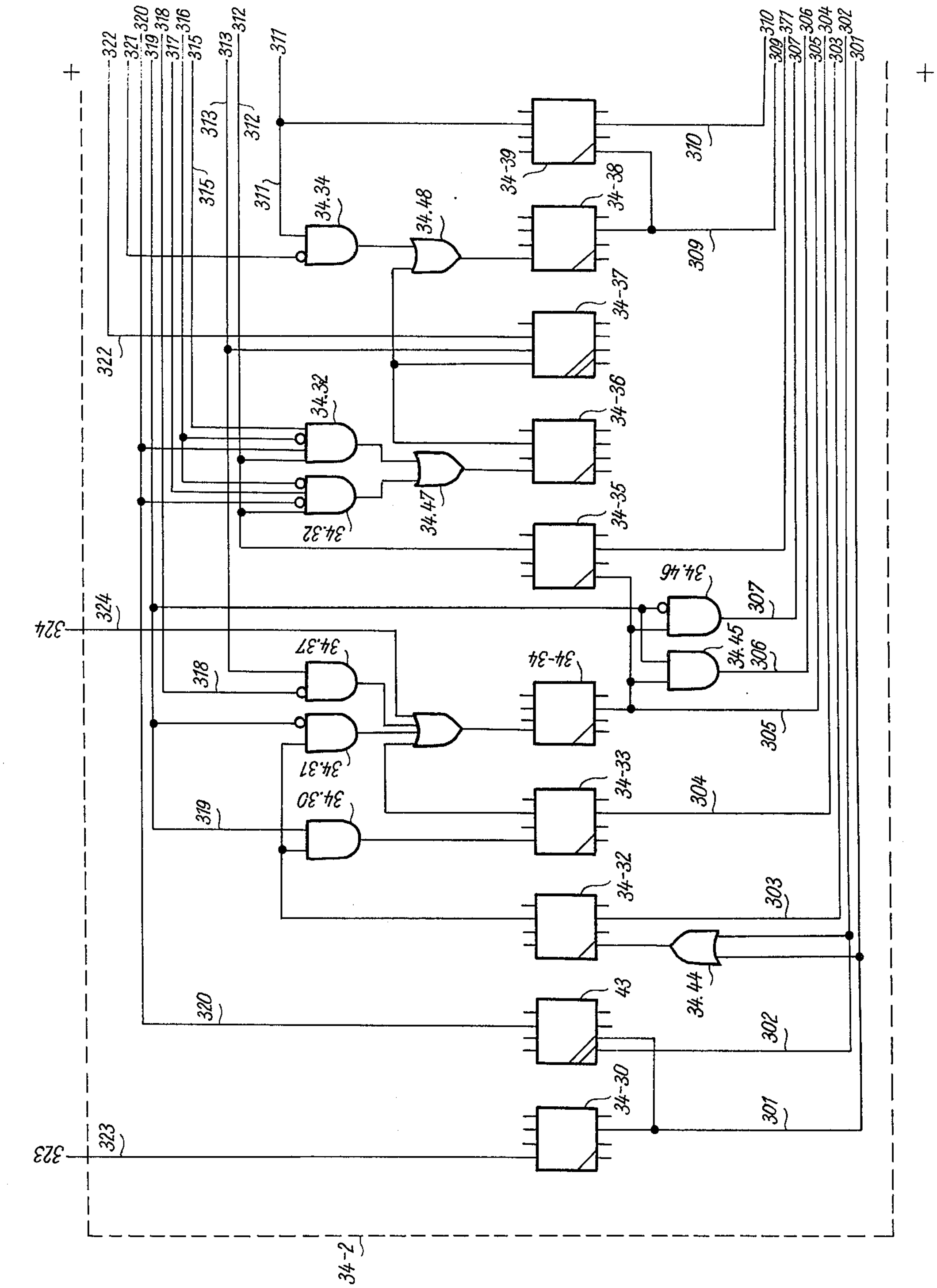
Figure 12E:
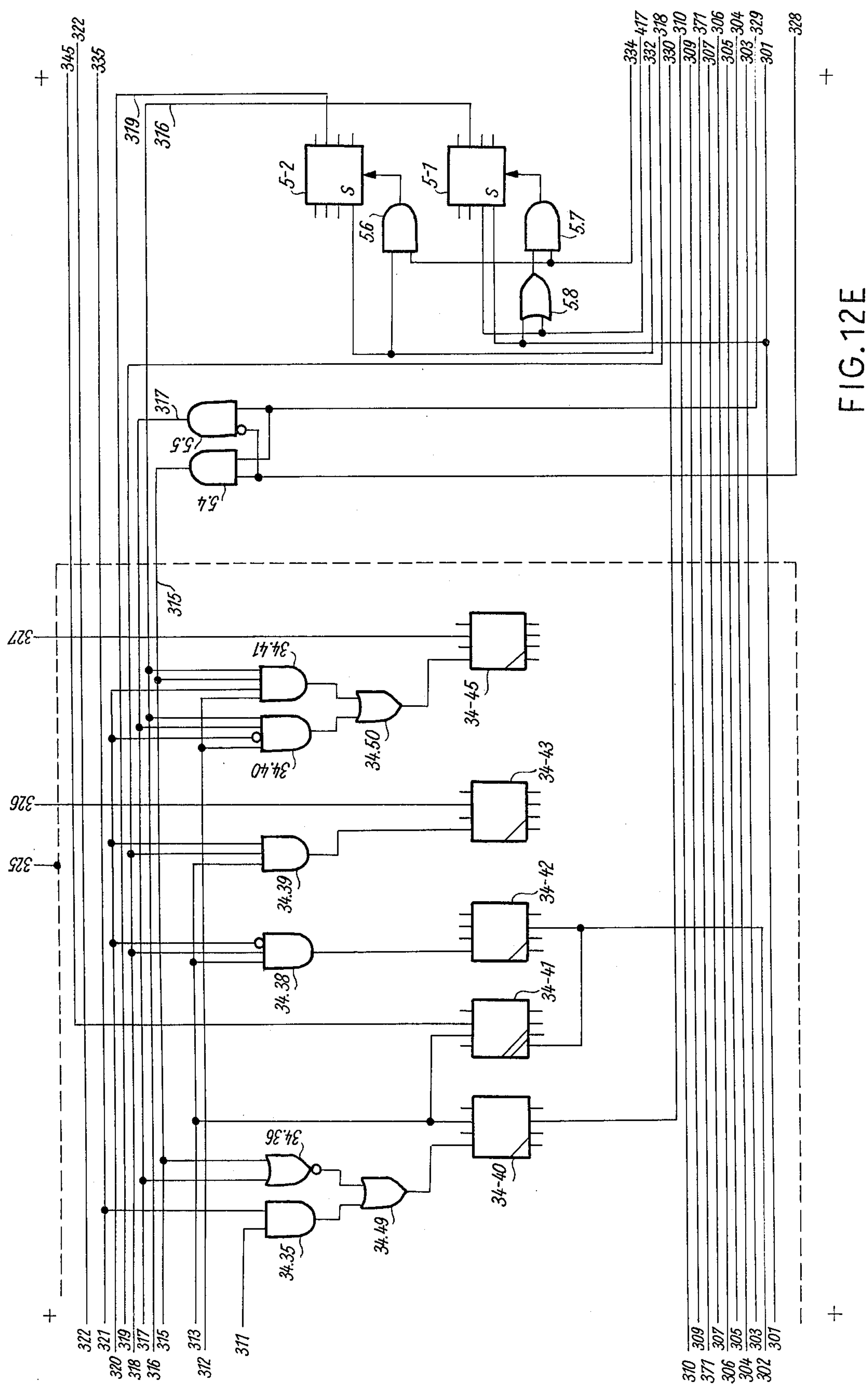
Figure 12F:
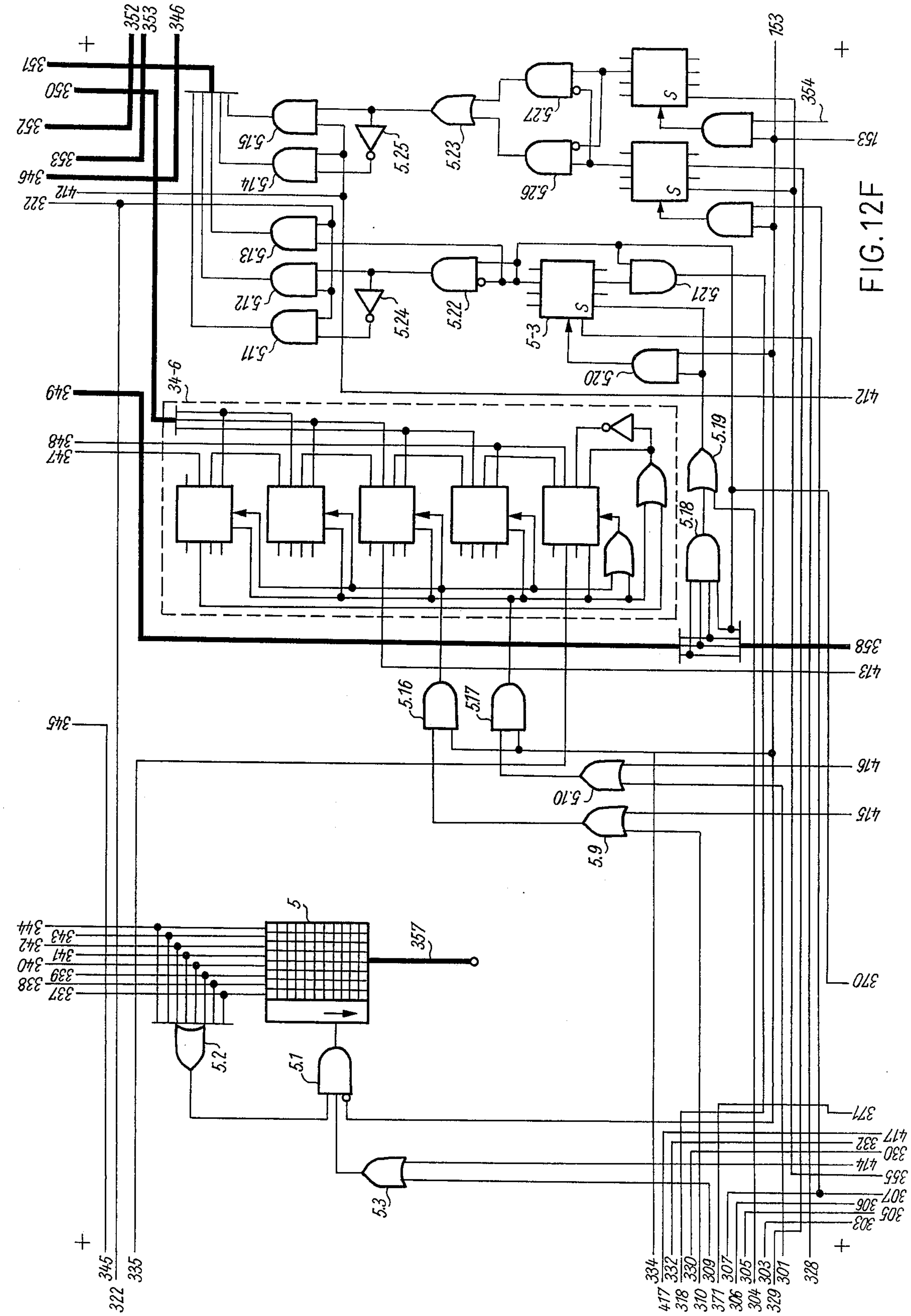
Figure 12G:
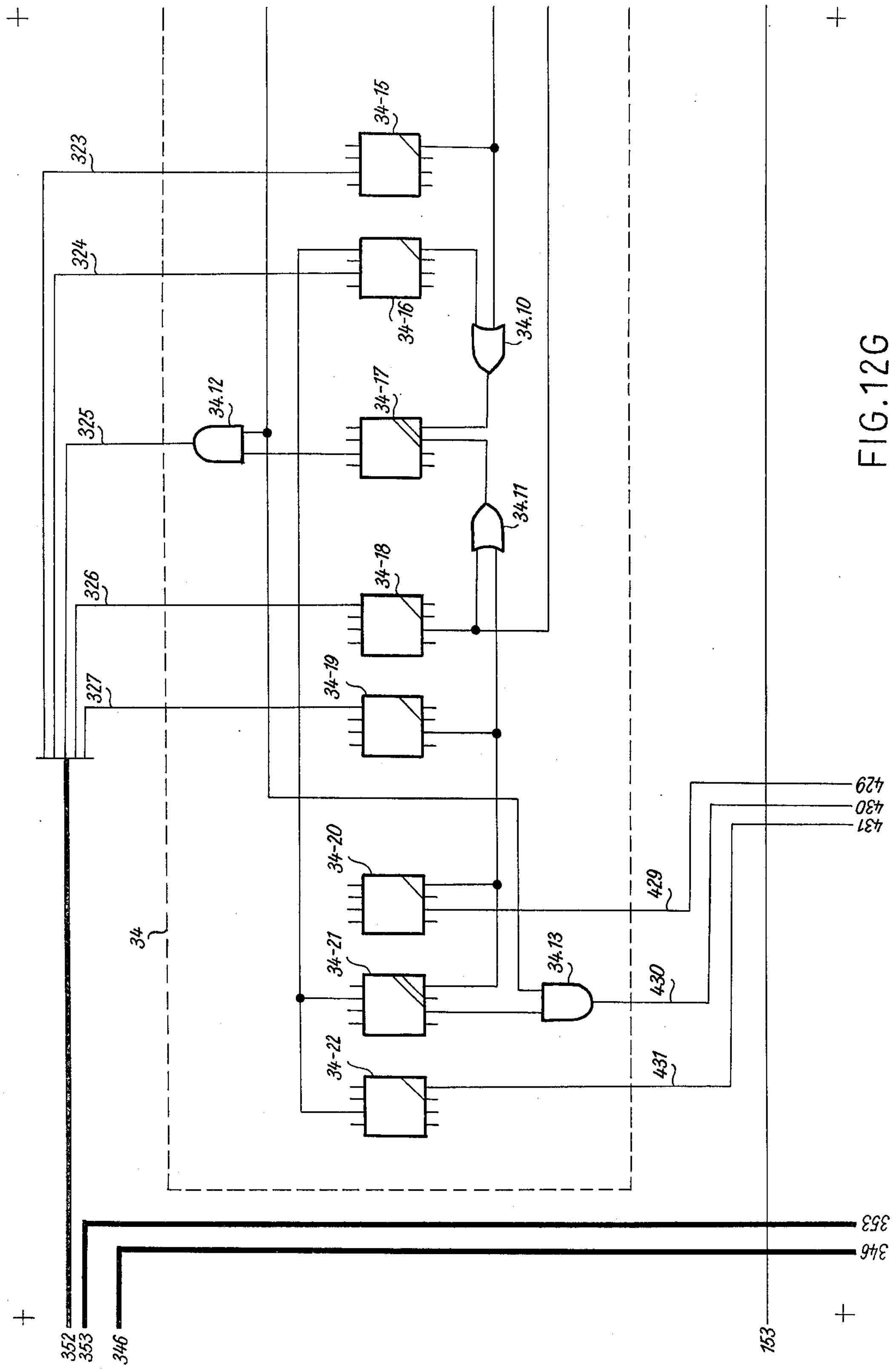
Figure 12H:
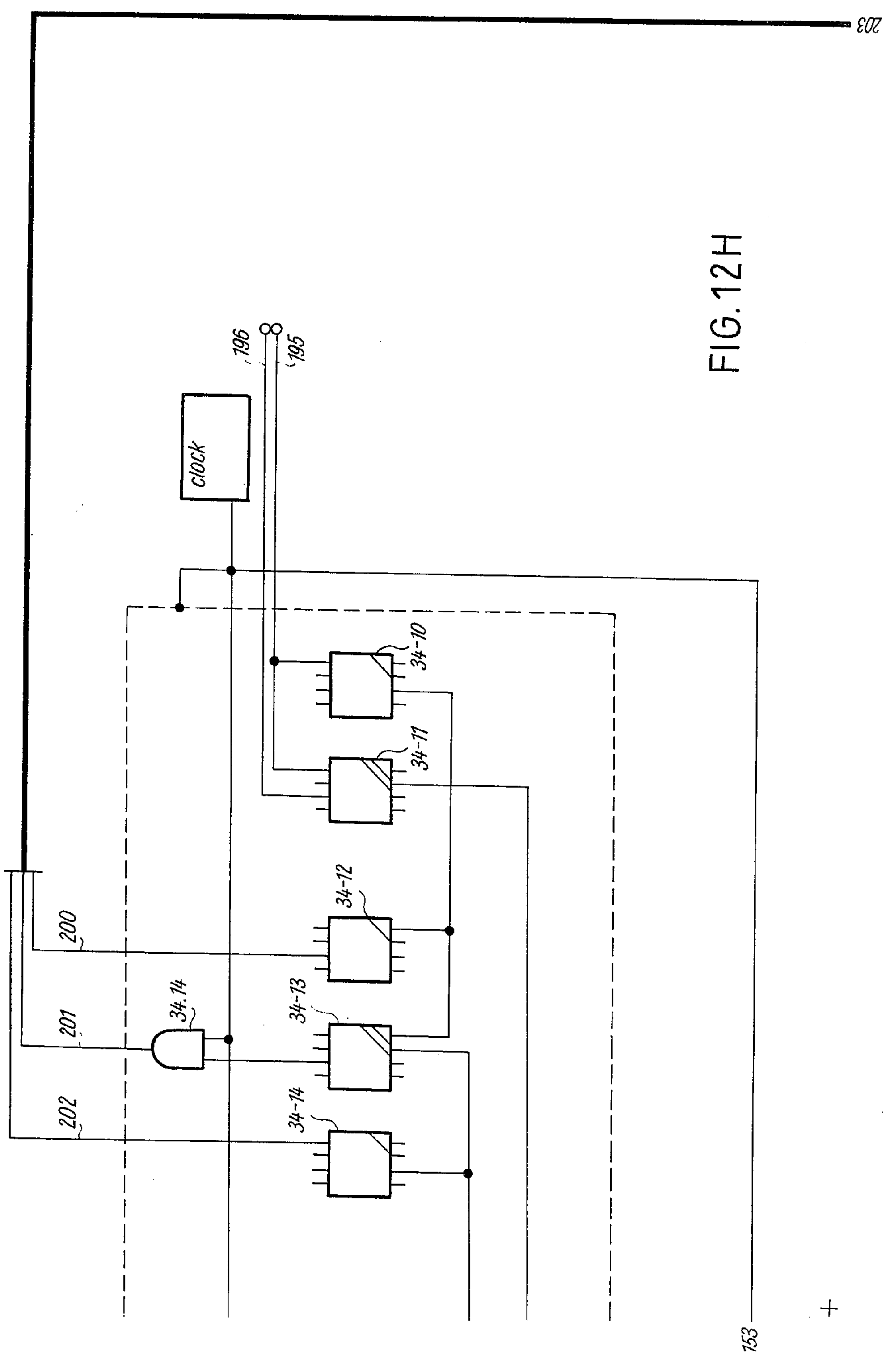
Figure 121:
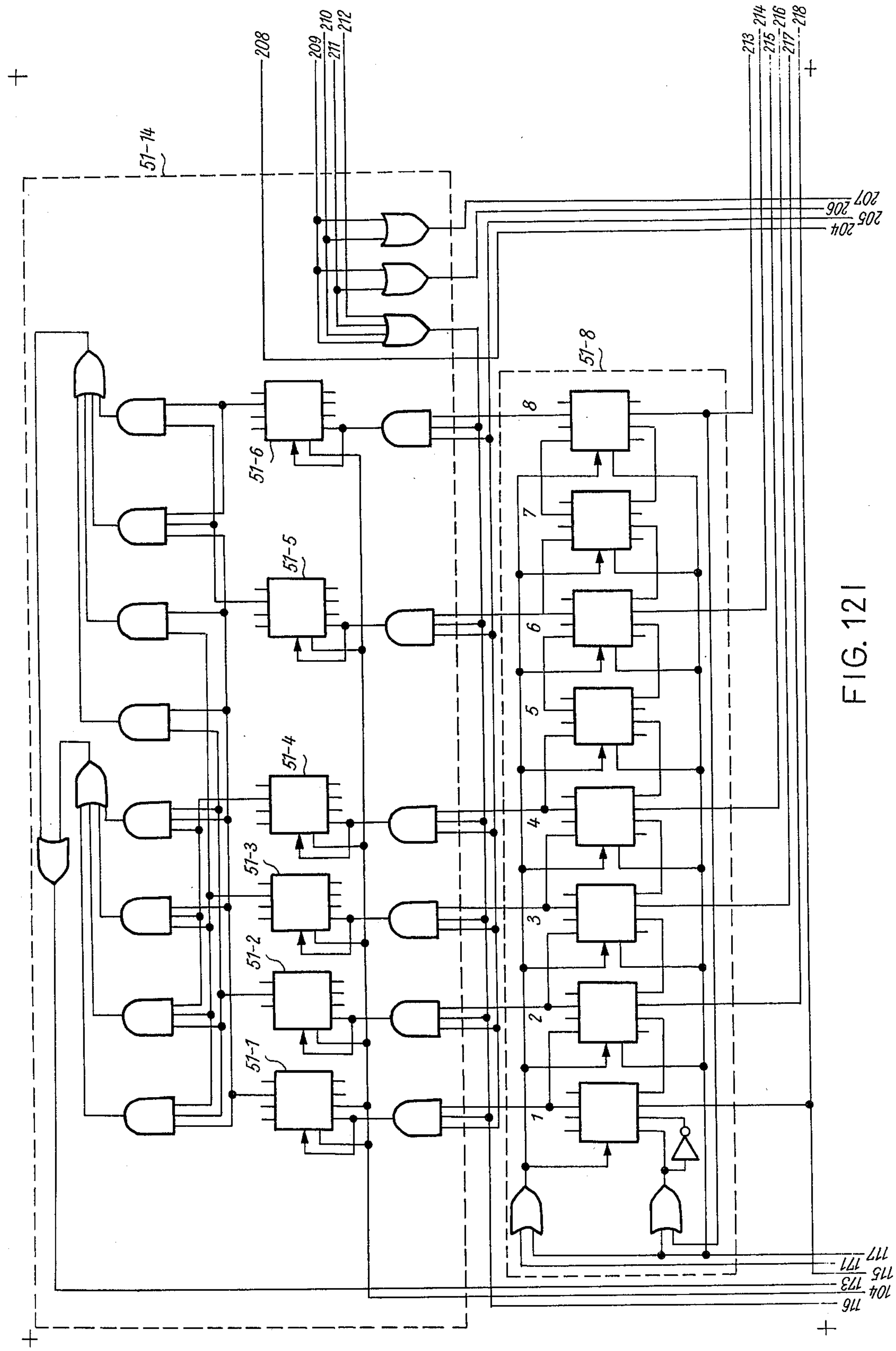
Figure 12J:
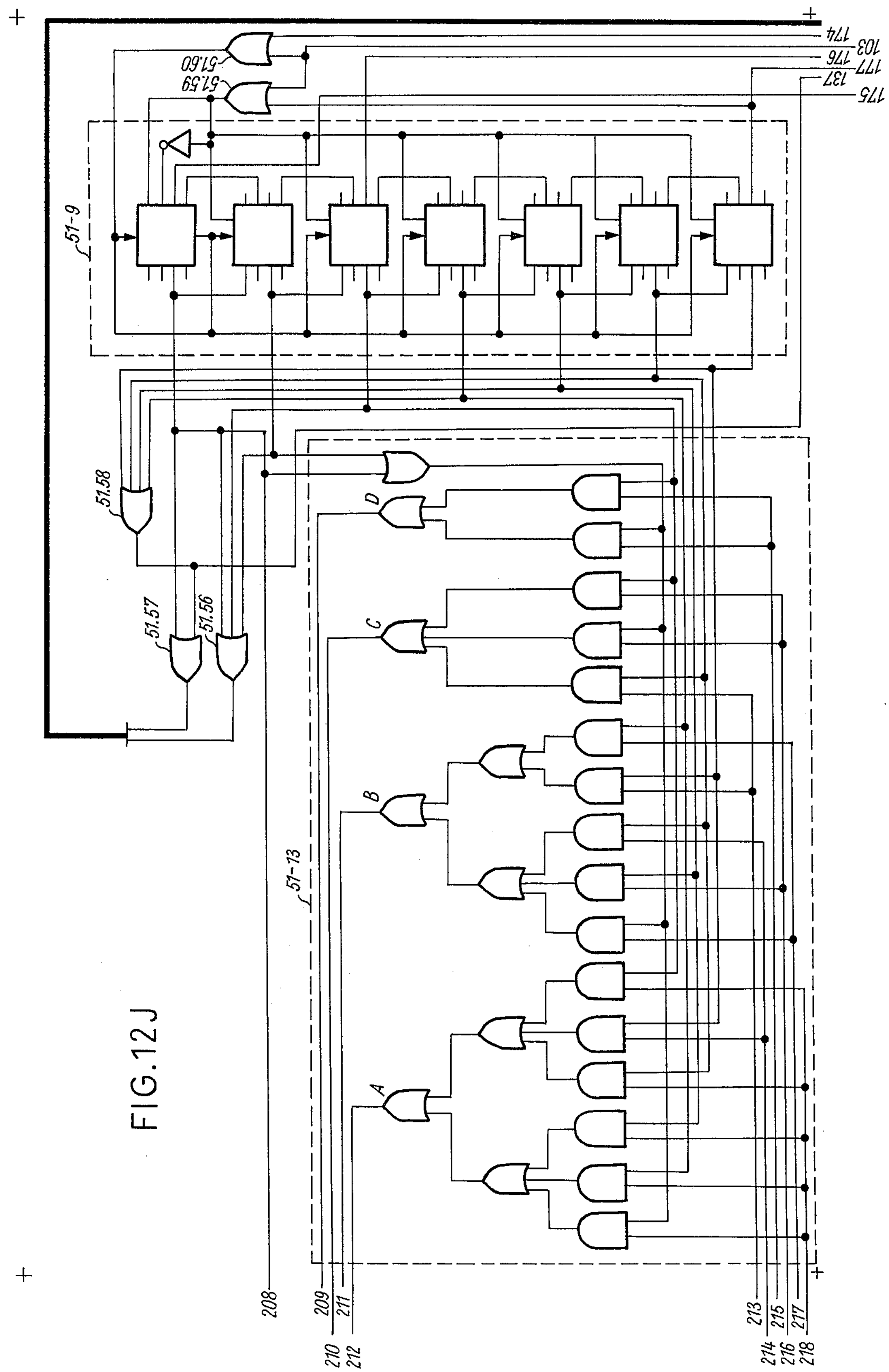
Figure 12K:
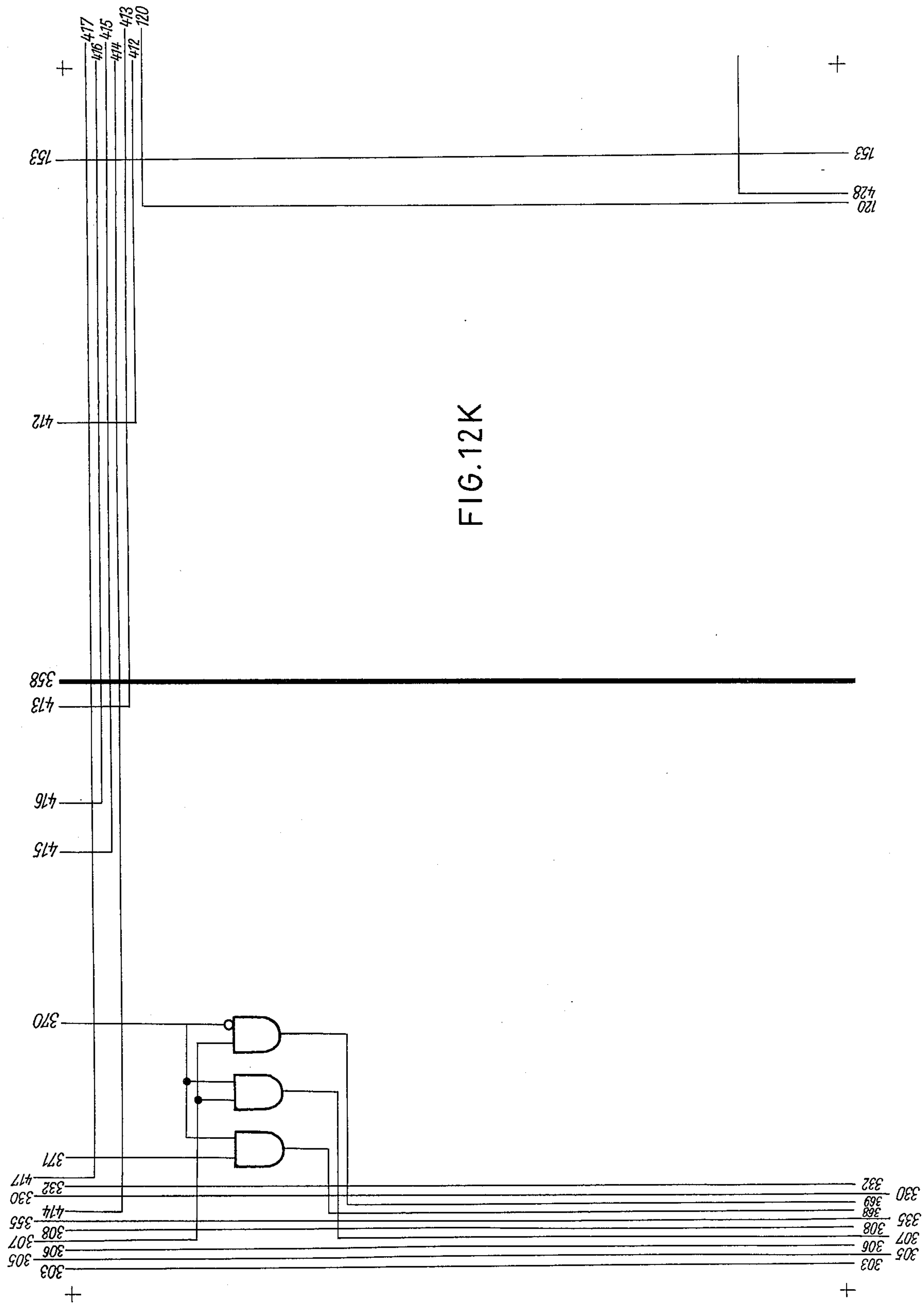
Figure 12L:
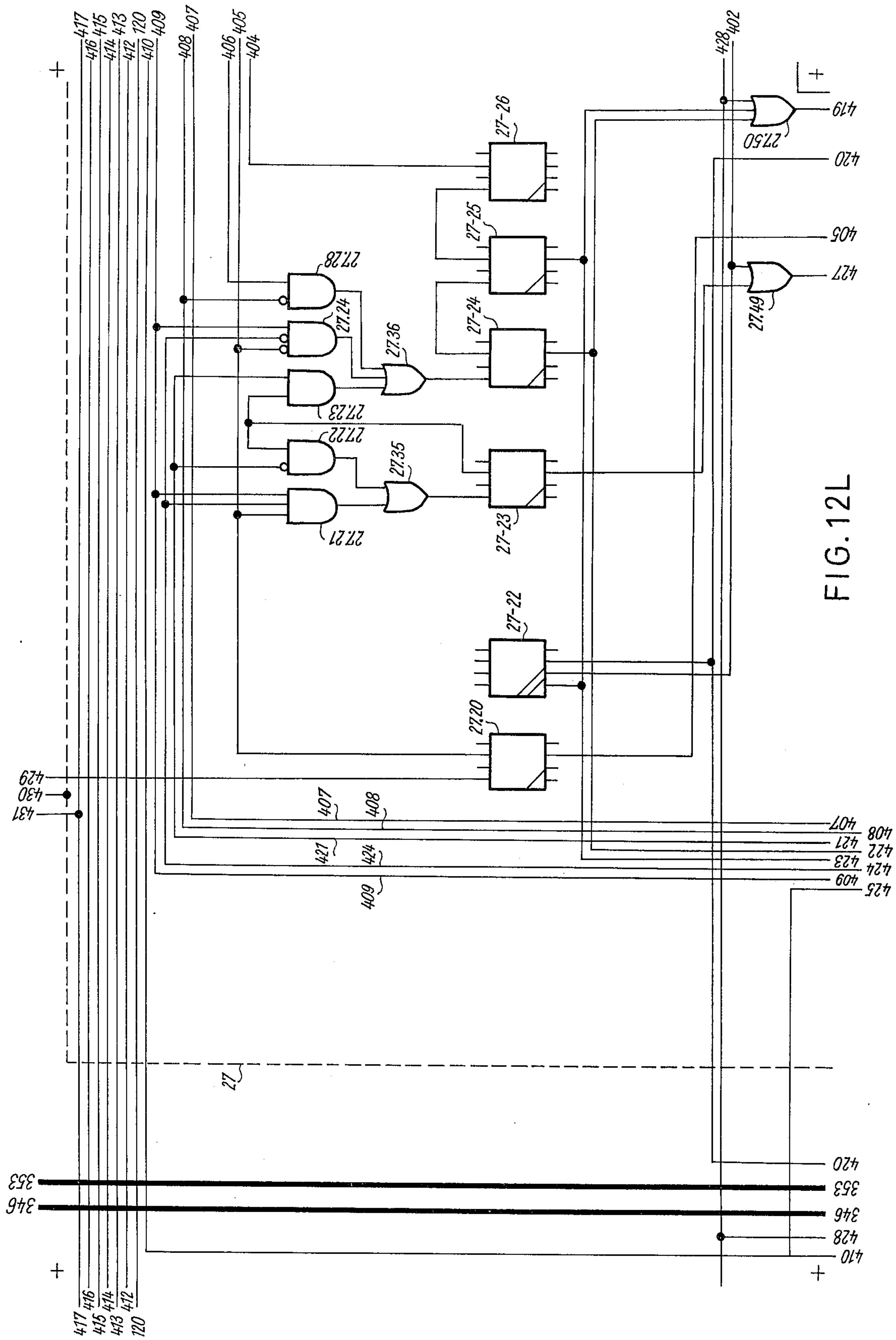
Figure 12M:
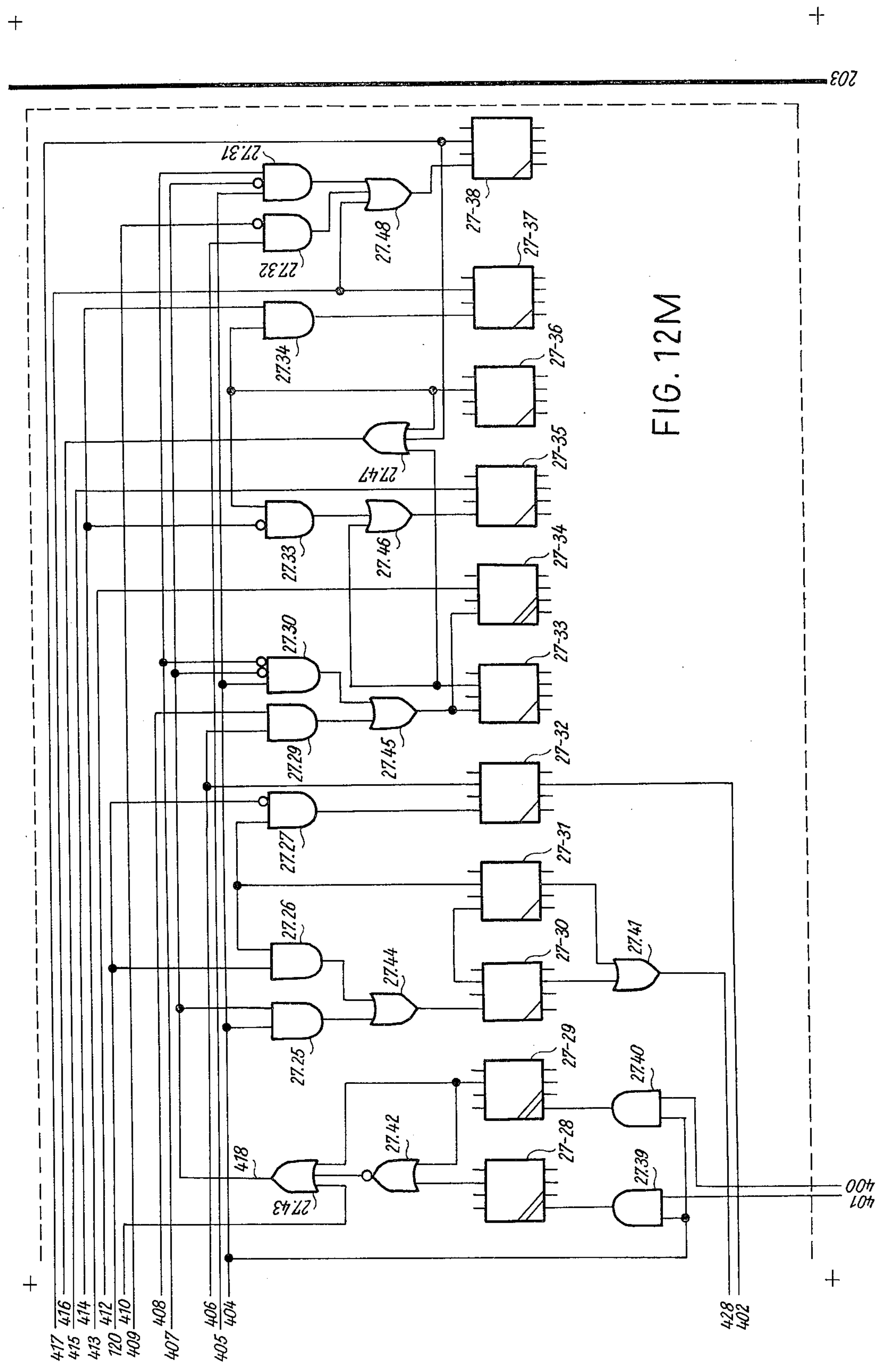
Figure 12N:
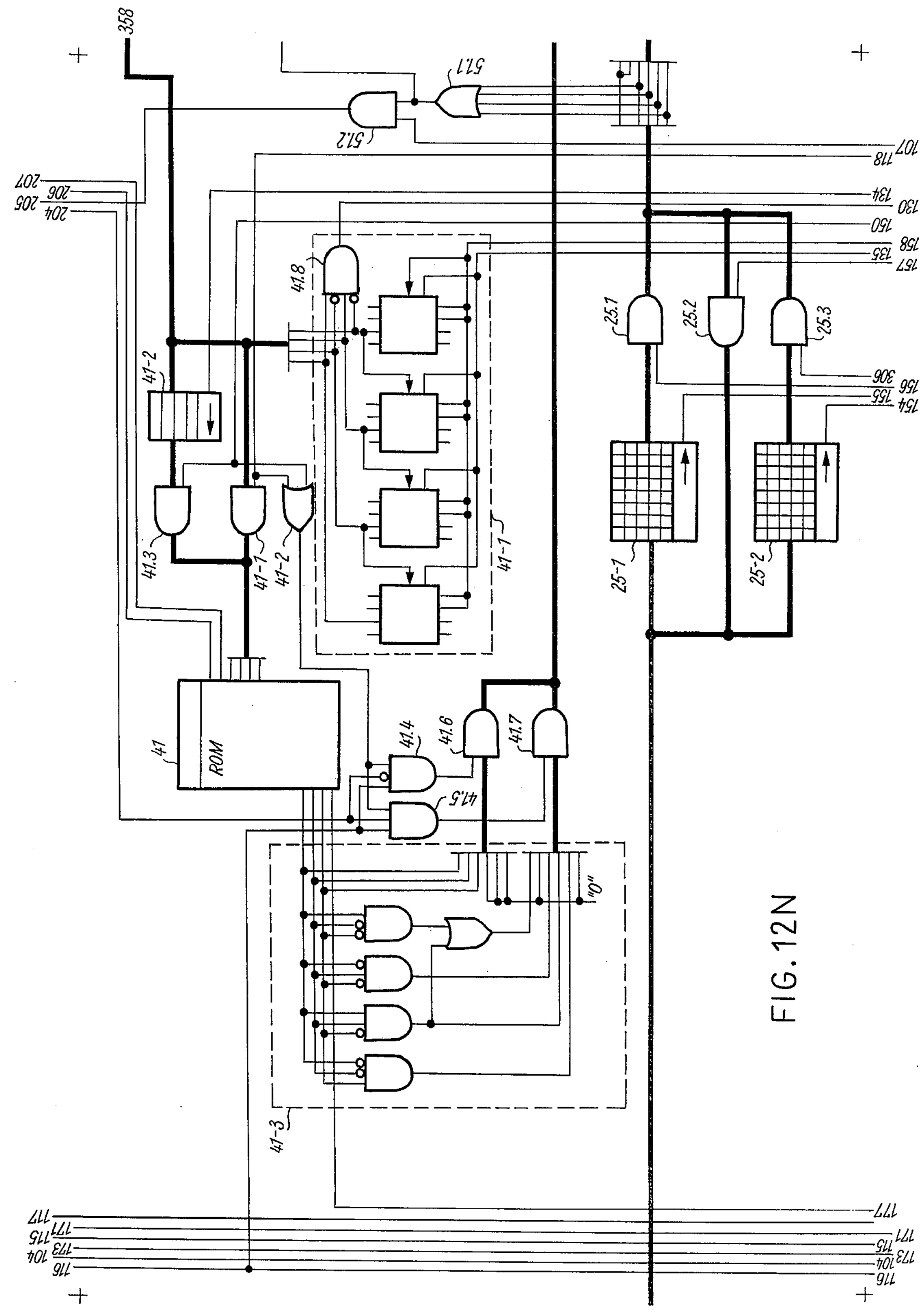
Figure 120:
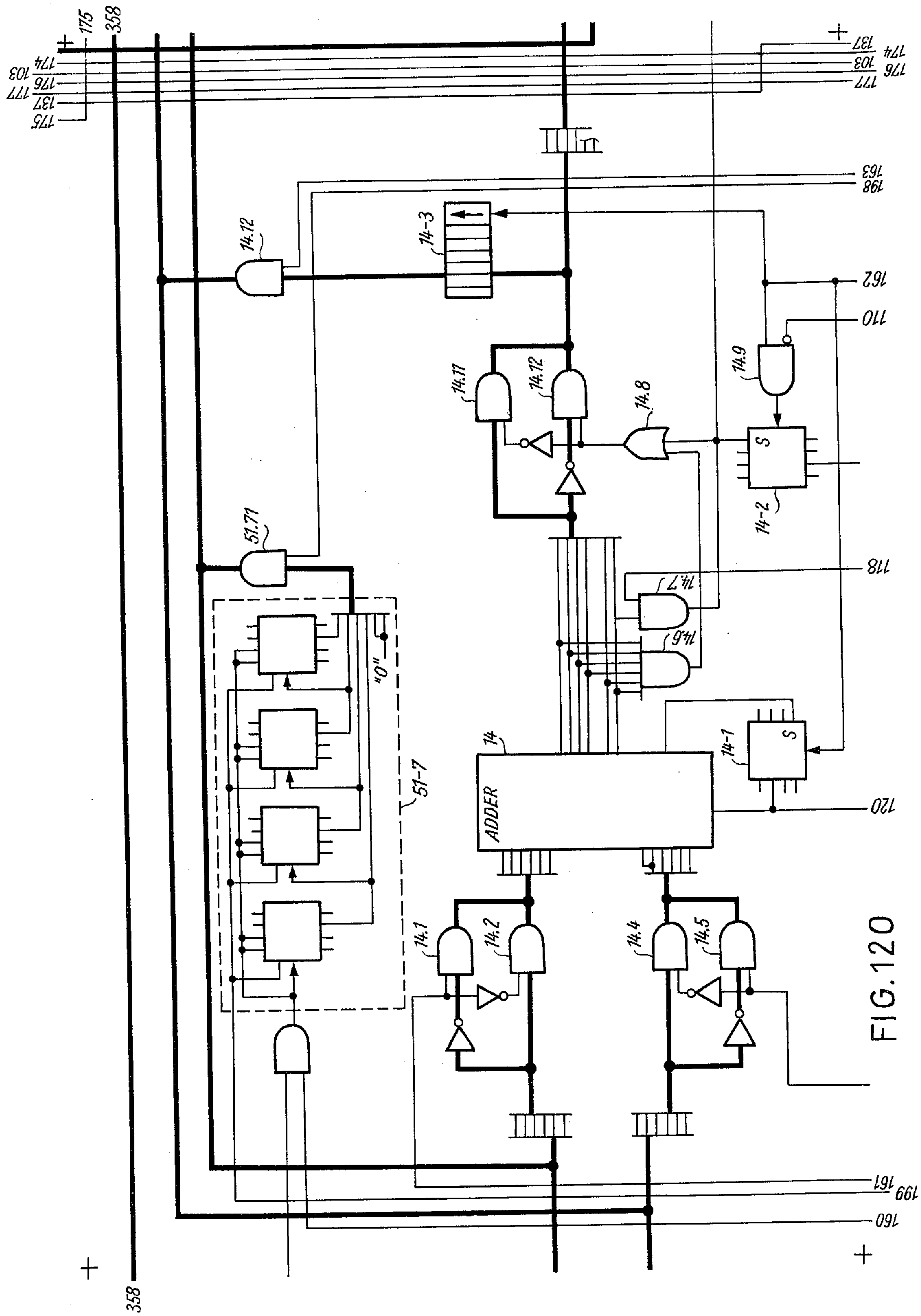

The circuit of FIG. 12 is operated with a single-phase clock. It effects the transformation of an optionally arranged autoscribtive quantity, consisting of a floating point number (exponent 2 bytes) and an autoscribtive unit (8 bytes) with each byte of the autoscribtive unit representing the exponent to a base unit in the sequence of second, meter, ampere, kilogram, kelvin, candela, steradian and radian—to a homoscribtive quantity, arranged from abbreviations of units to reference units (WB, V, H, OHM, SIE, F, T, N, PA, J, W, GY, C, LX, LM) and to base units (S, M, A, KG, K, CD, SR, RAD) as well as from abbreviations of physical-technical prefixes according to Table 2. The supplementary units radian and steradian are used as base units. For instance, the autoscribtive quantity 0.173456-05, −3, 3, −2, 1, 0, 0, 0, 0 made available by the inventive device is transformed to the homoscriptive quantity 17.3456 MOHM.M The circuit can be started from the status 34-10 (FIG. 12*h*, FIG. 13*a*), if the mantissa m of the numeric value of the autoscribtive quantity is arranged such that it fulfills the condition $1>m\geq 10^{-1}$, if the exponent of the numeric value of the autoscribtive quantity (−5) is loaded in the numeric value accumulators 24-1 and 24-2 (FIG. 12*q*) and the sign-memory 45-55 (FIG. 12*f*), and if the autoscribtive unit (0, 0, 0, 0, 1, −2, 3, −3) was stored in the accumulator for an autoscribtive unit 25-1 (FIG. 12*n*).

With the status 34-18 (FIG. 12*g*, FIG. 13*a*), the circuit finishes the transformation. For the external interrogation the value of the exponent of the numeric value of the homoscribtive quantity is stored in the numeric value accumulator 24-1 and 24-2 (FIG. 12*q*) and the homoscribtive unit (M.MHOM) is stored in the register for a homoscribtive unit 5 (FIG. 12*f*).

The operation of the circuit will be demonstrated with the example of the transformation of the autoscribtive quantity mentioned above: the unit generator-2 51 (FIGS. 12*i*, 12*j*, 12*n*, 12*s*, 12*x*, 12*y*, 12*z*, 12*za* and 12*zb*) discriminates 7 groups of reference units:

group 1: The squares of the reference units WB, V, H, OHM, SIE, F, T, N, PA, J, W;
group 2: The reference units WB, V, H, OHM, SIE, F, T, N, PA, J, W;
group 3: The same as in group 2, but with blanking out of the base unit meter;
group 4: GY;
group 5: C;
group 6: LX;
group 7: LM;

The elements of the groups can be separated, repeated or reciprocated, during the clock sequence "Generation of a homoscribtive unit" (FIGS. 13*b*, 13*c*, 13*d*, 13*e*, 13*f* and 13*g*). If the group-counter 51-9 (FIG. 12*j*), arranged as a shift register, has the position "2", then after the 4th base unit in the status 45-5 (FIG. 13*b*), the signal "Separation" is set and, in connection with the memory of reference units 39 (FIG. 12*n*) and the reference-unit counter 40 (FIG. 12*n*), separation attempts for elements of the second group begin.

Figure 12P:
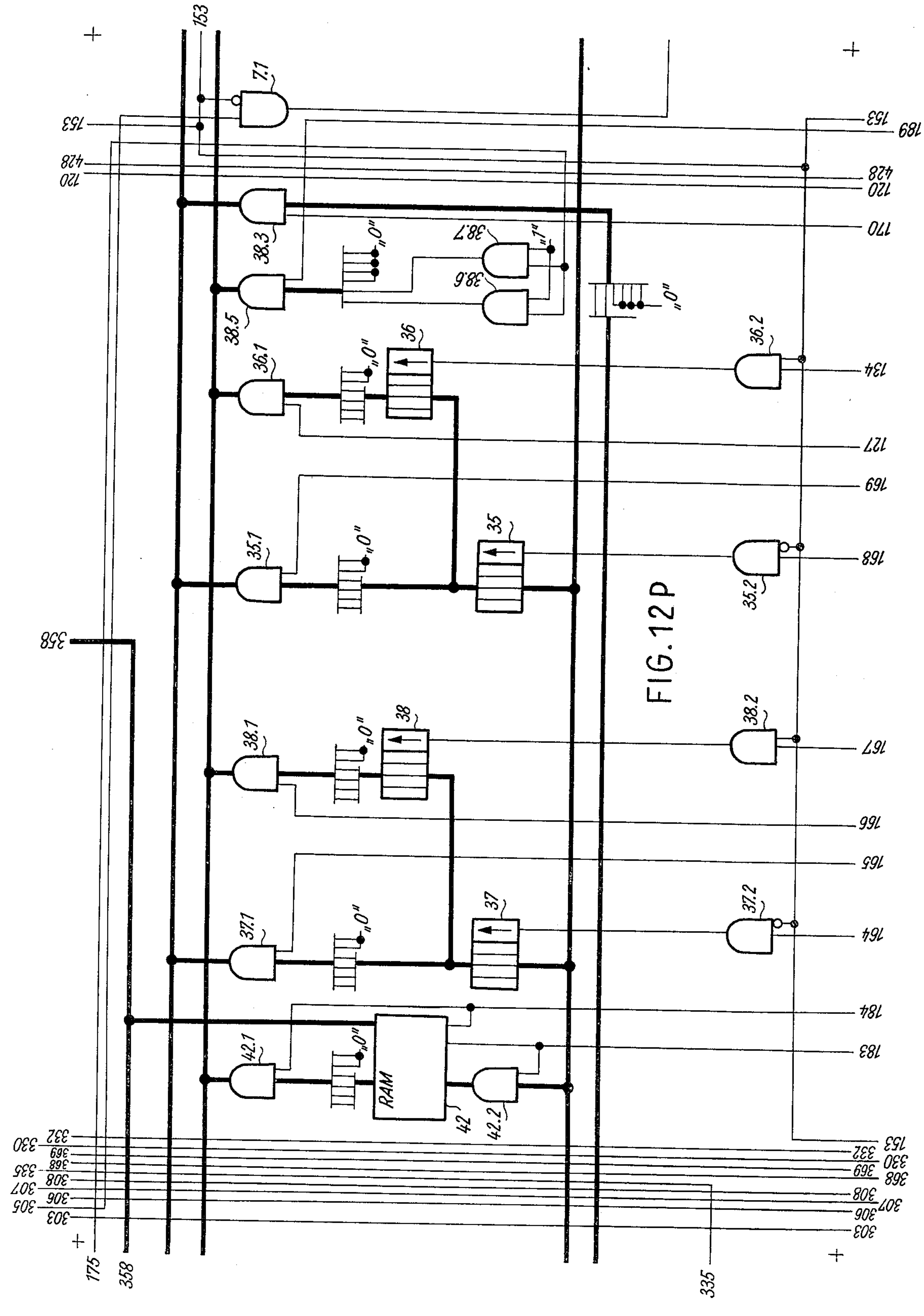

In the status 45-15 (FIG. 12*y*, FIG. 13*c*) the determination of the deficiency or overflow points by comparing the exponents from the accumulator for an autoscribtive unit 25-1 (FIG. 12*n*) and the exponents from the memory of reference units 39 (FIG. 12*n*) is carried out. In it, the address for the memory of reference units 39 is determined by the reference-unit counter 40 (FIG. 12*n*), the base-unit counter 51-8 (FIG. 12*i*) and the group-counter 51-9 (FIG. 12*j*) in connection with the selection network according to FIG. 12*j*. If the reference-unit counter 40 has the contents "0100", then in the status 45-27 (FIG. 12z, FIG. 13d) the overflow memory 36 is loaded with "0001" and an address register 41-2 (FIG. 12n) is loaded with "0100", respectively, with this the unit OHM is prepared for the separation. In the status 45-41 (FIG. 12za, FIG. 13f) within one cycle of base units the accumulator for an autoscribtive unit 25-1 (FIG. 12n) is loaded with the remaining "autoscribtive residual unit" (0, 0, 0, 0, 0, 0, 1, 0). During the status 55-43 (FIG. 12za, FIG. 13f) in the memory of the separated units 42 (FIG. 12p), arranged as RAM, the writing of a "+1" is carried out. All further separation attempts up to the 7th group are without success.

During the subsequent clock sequence, "Formation of a homoscribtive unit," (FIGS. 13h, 13i) the control-network-4 34-2 (FIGS. 12d, 12e) takes over the process control. The status 34-40 (FIG. 13i) is passed through as often as necessary, with an increment of the reference-unit counter 41-1 (FIG. 12n) taking place in each case, until in the status 34-34 (FIG. 13h), an exponent ≠ 0 is loaded into the exponent-1 register 7 (FIG. 12q); in the example it takes place with a counter condition of "0100". Since the conditional latch "1. element" 5-1 (FIG. 12e) is set, when passing through the status 34-45 (FIG. 13i) the abrupt transition to the clock sequence, "Generation of a prefix", takes place.

Figure 12Q:
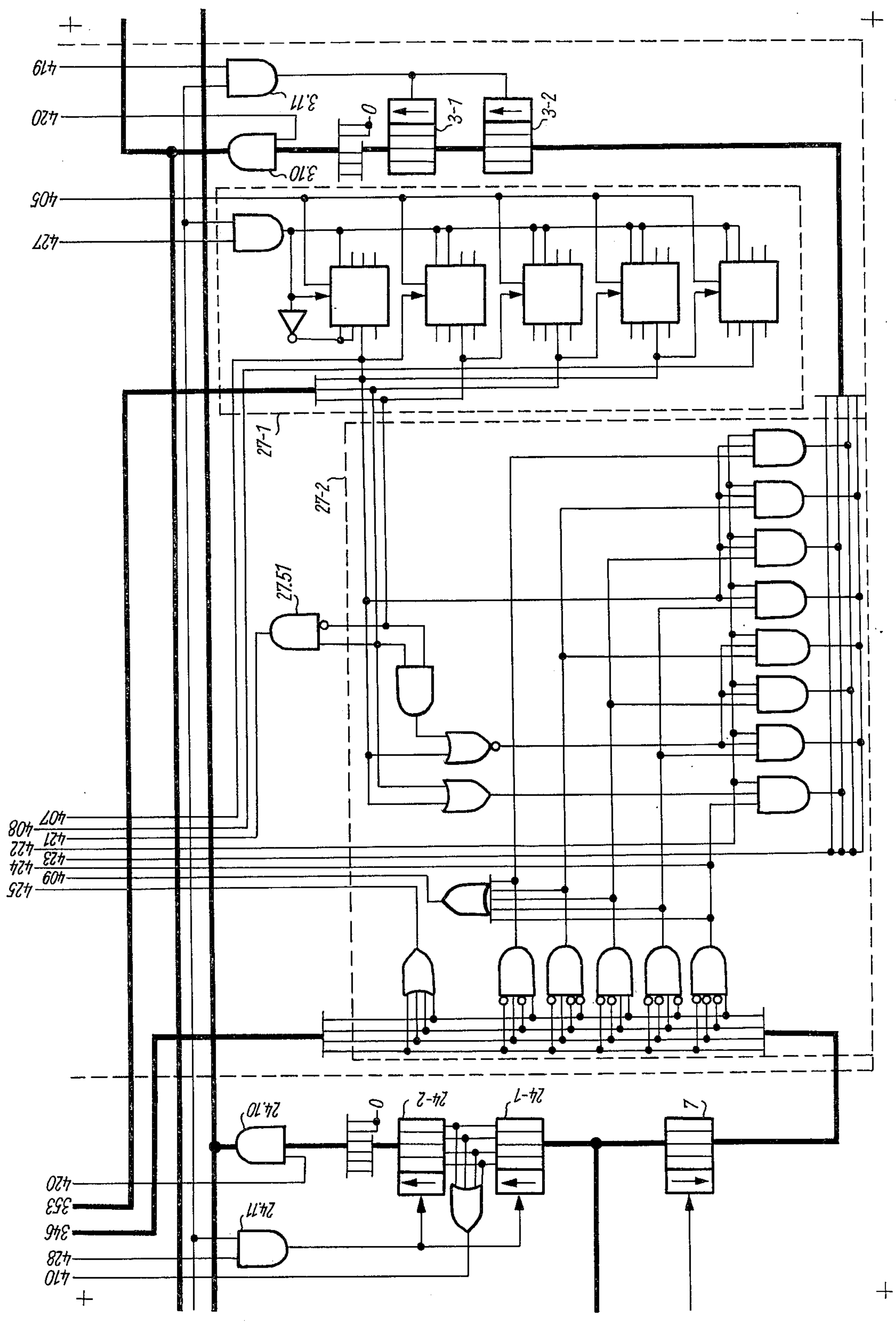
Figure 12R:
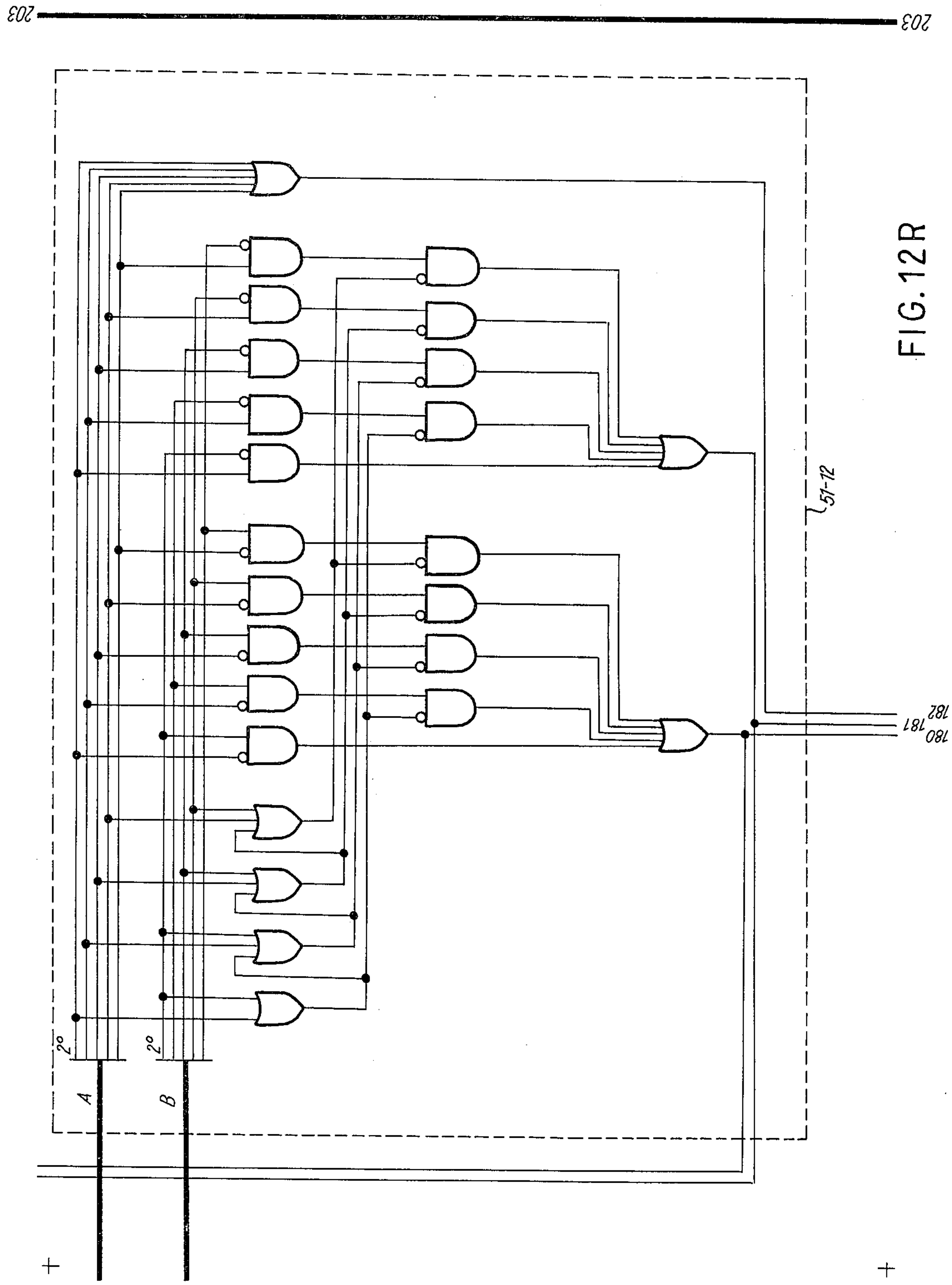
Figure 12S:
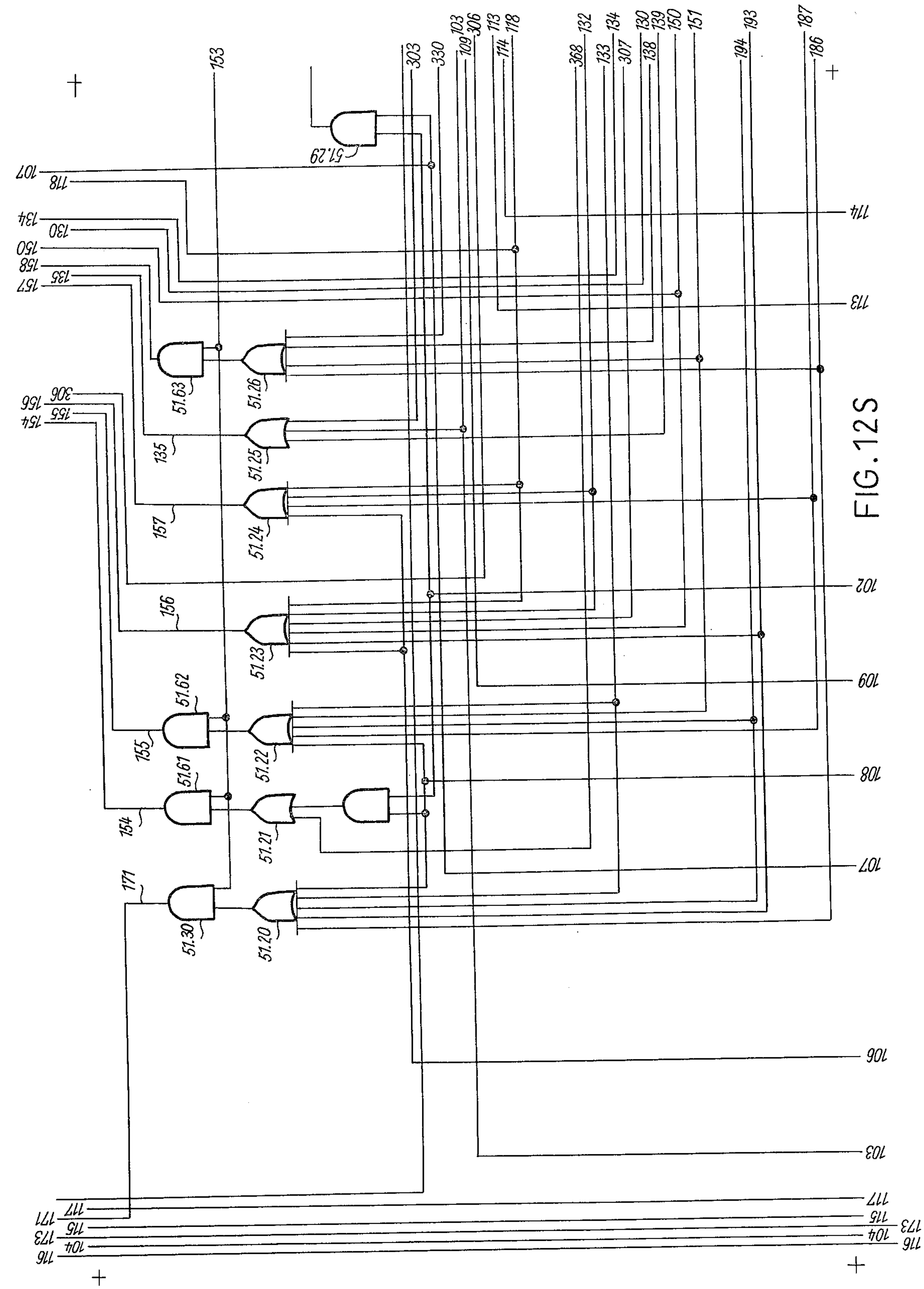
Figure 12T:
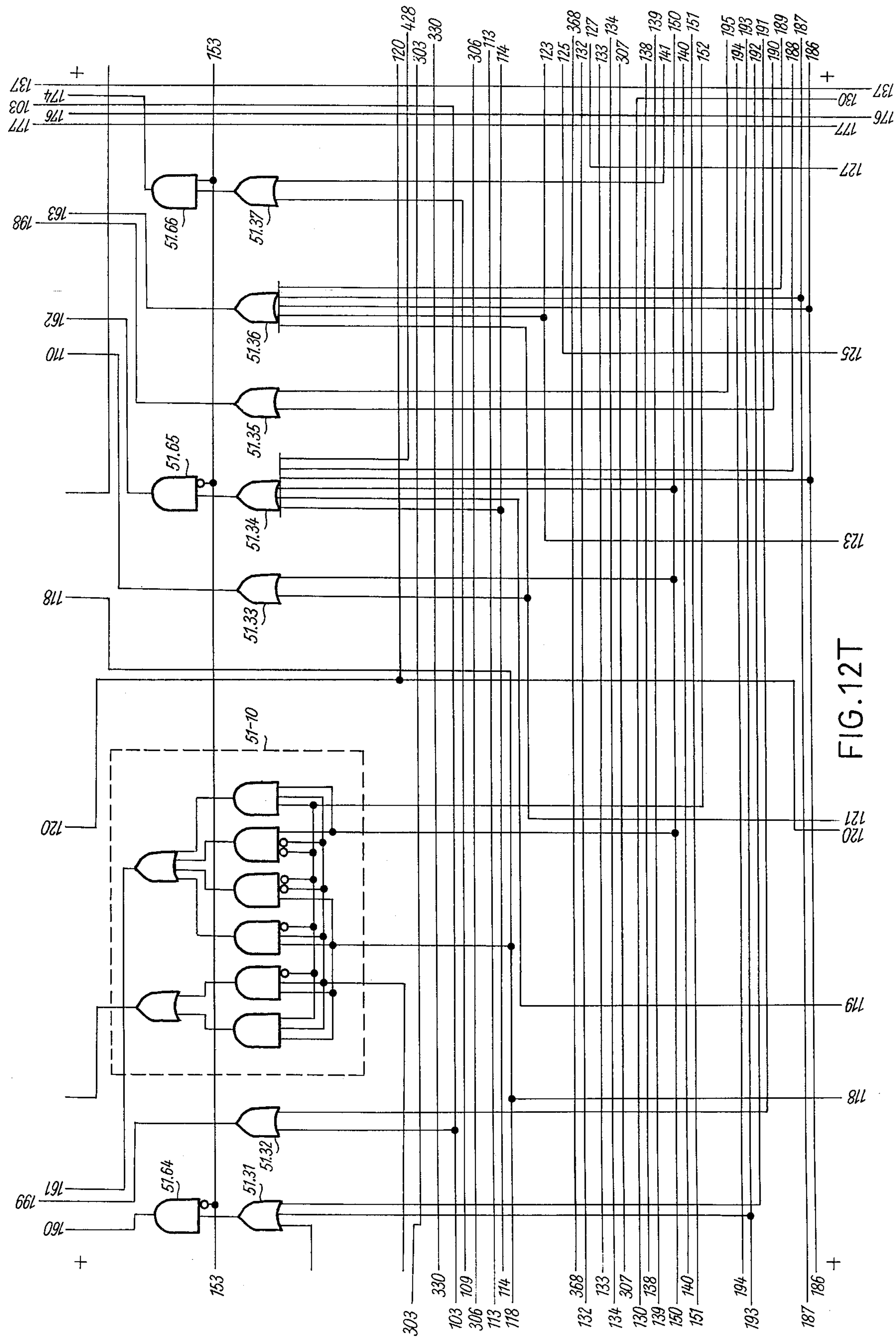
Figure 12U:
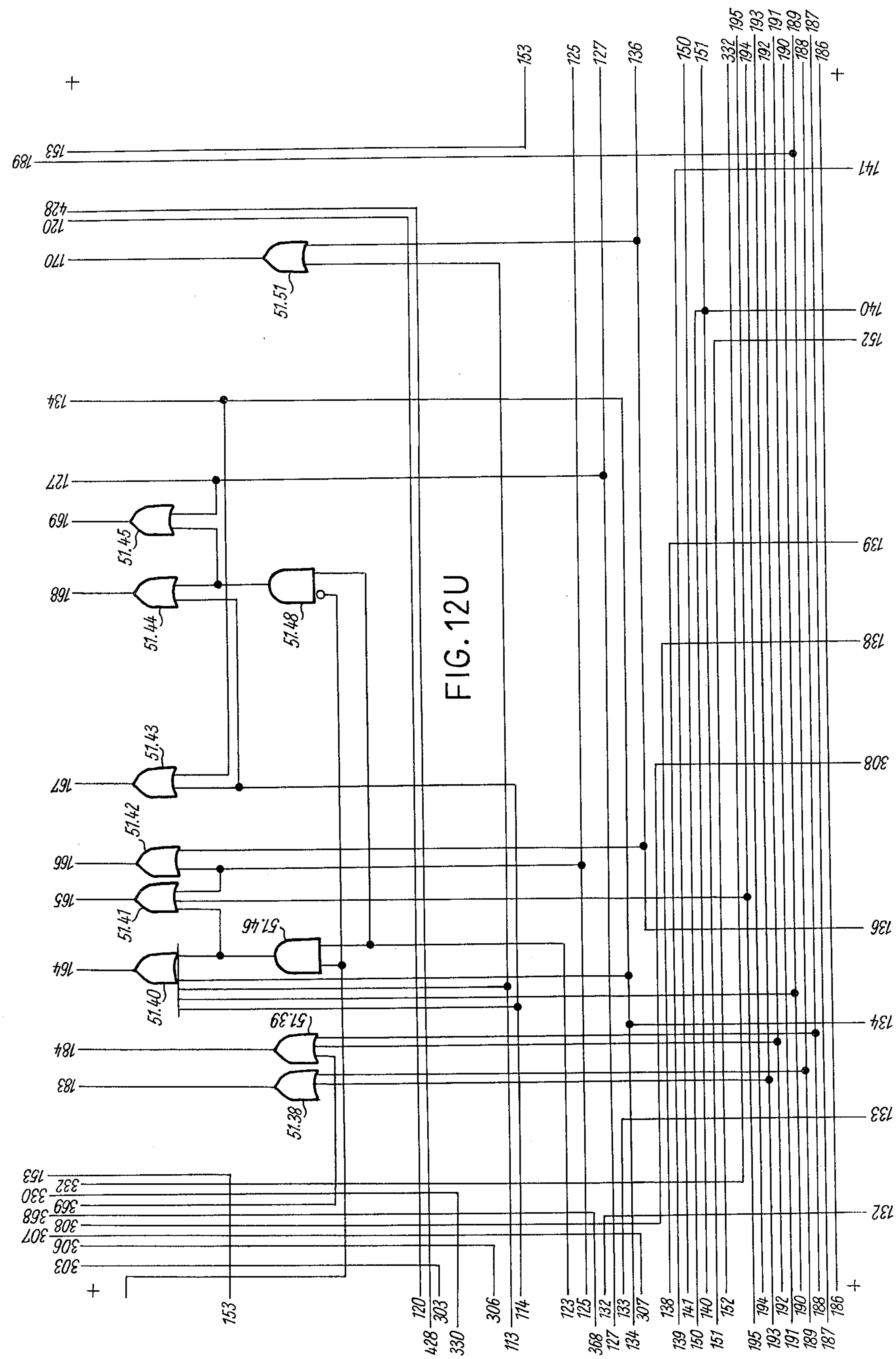
Figure 12V:
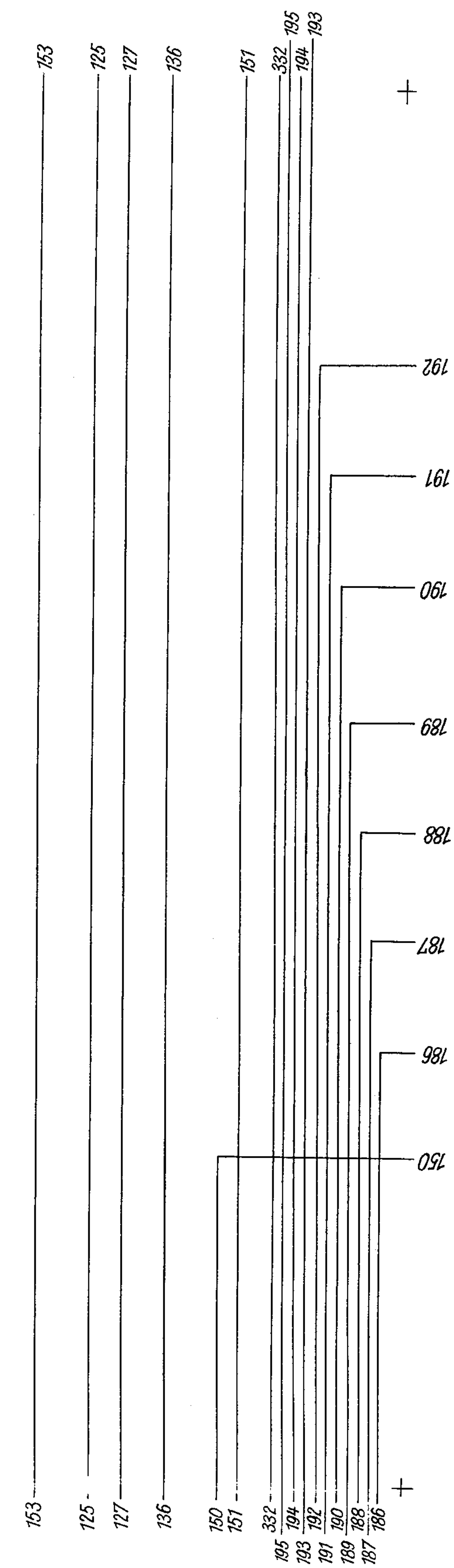
Figure 12W:
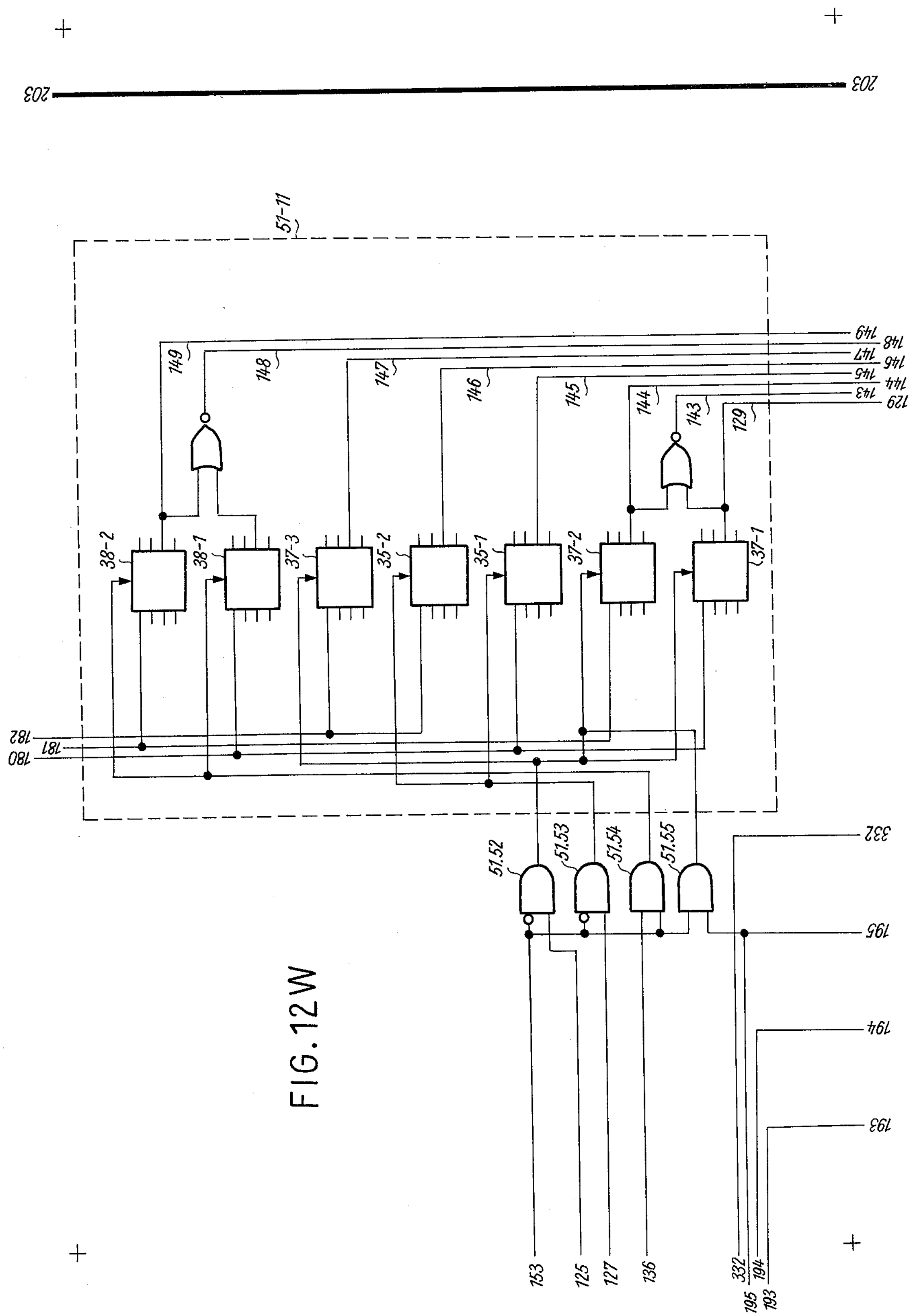
Figure 12X:
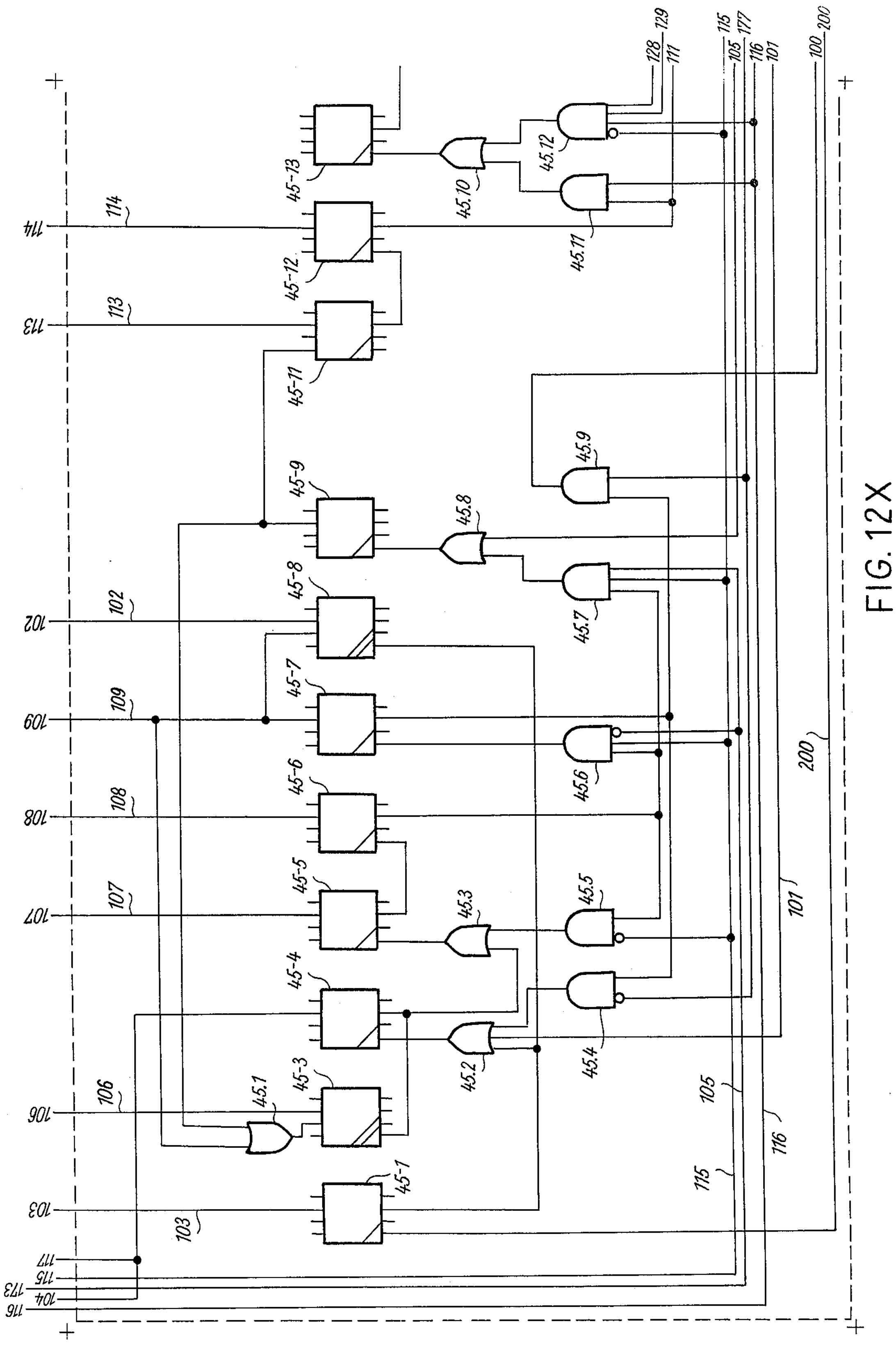
Figure 12Y:
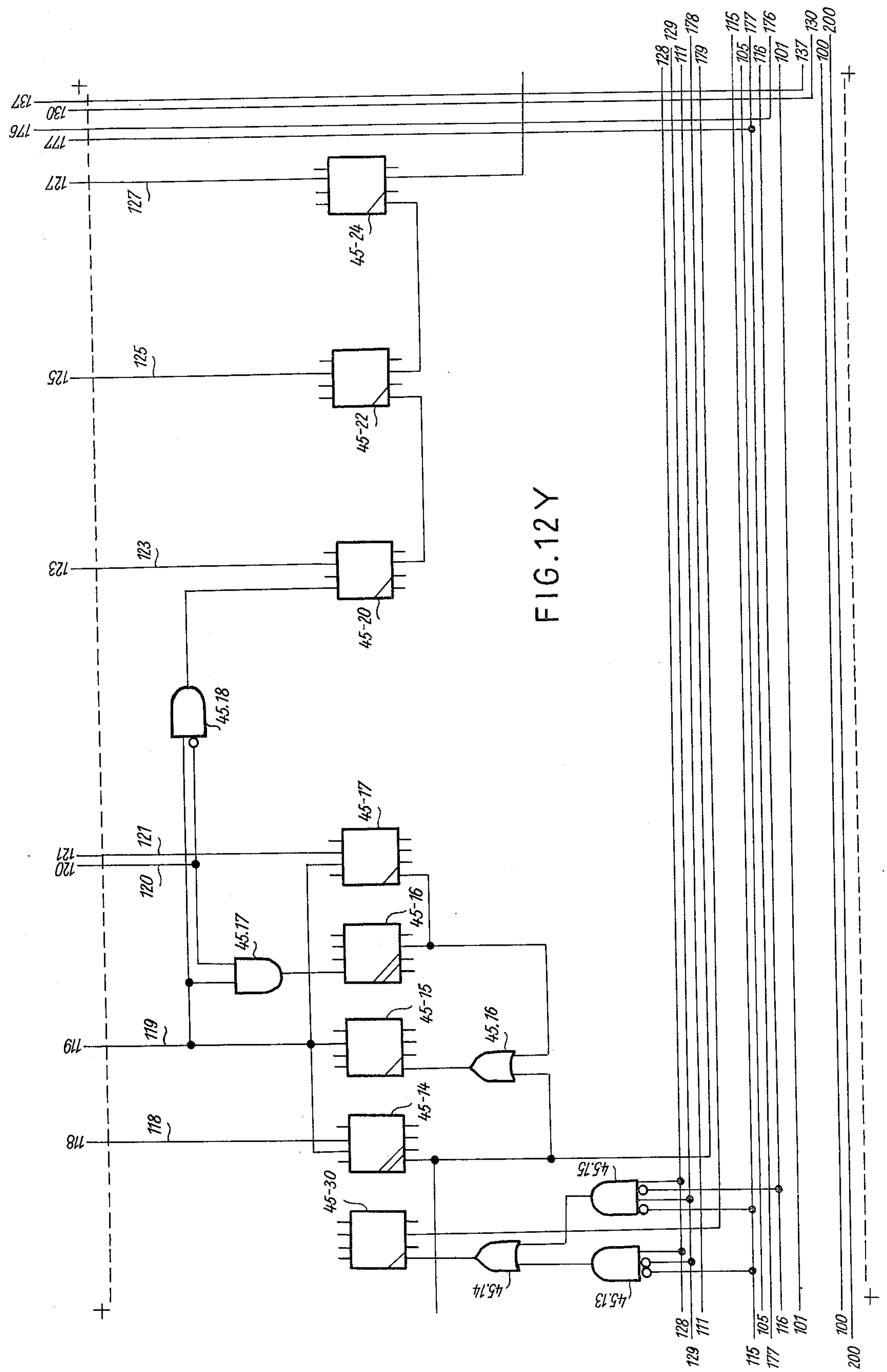
Figure 12Z:
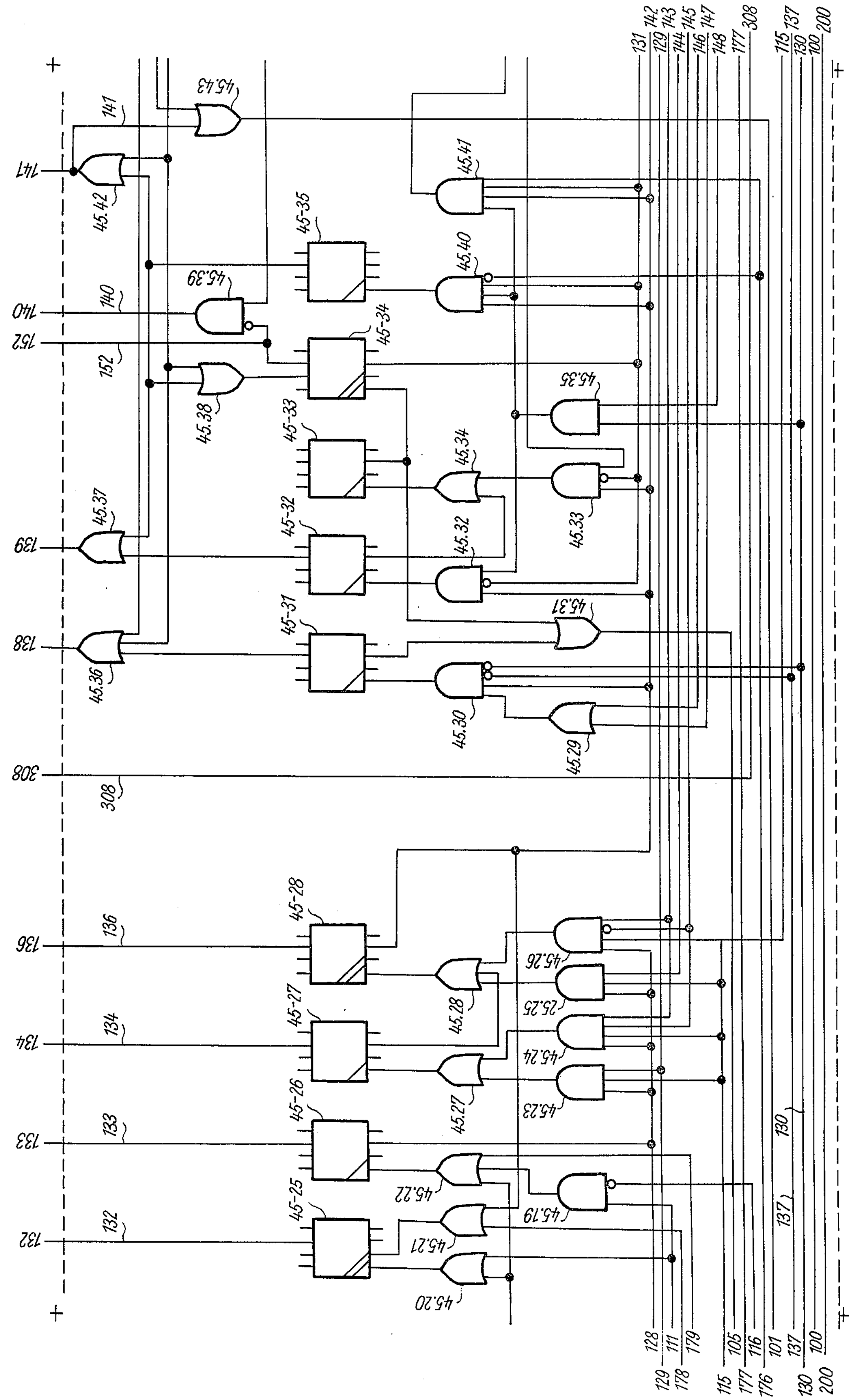
Figure 12Z:
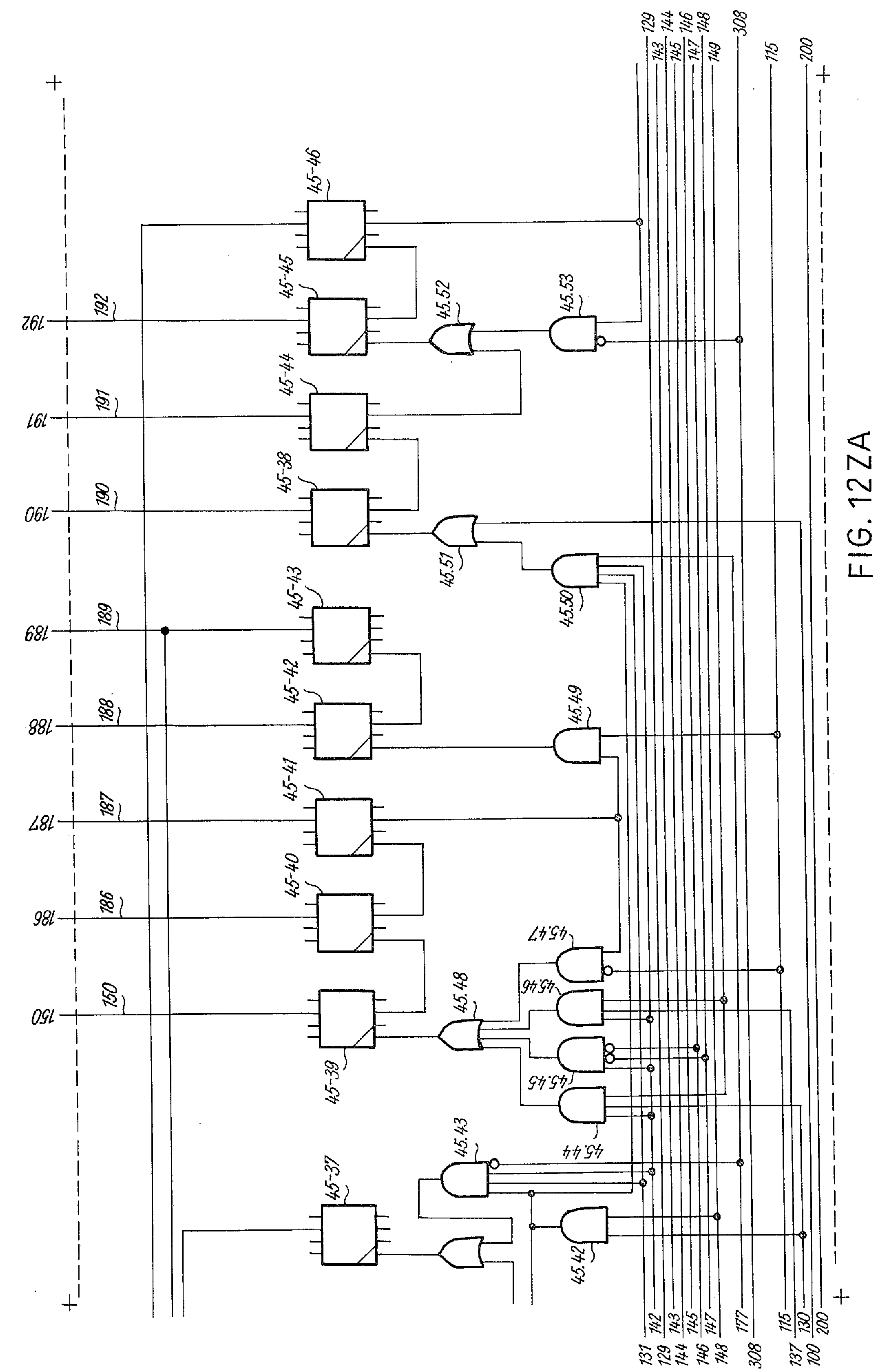
Figure 12Z:
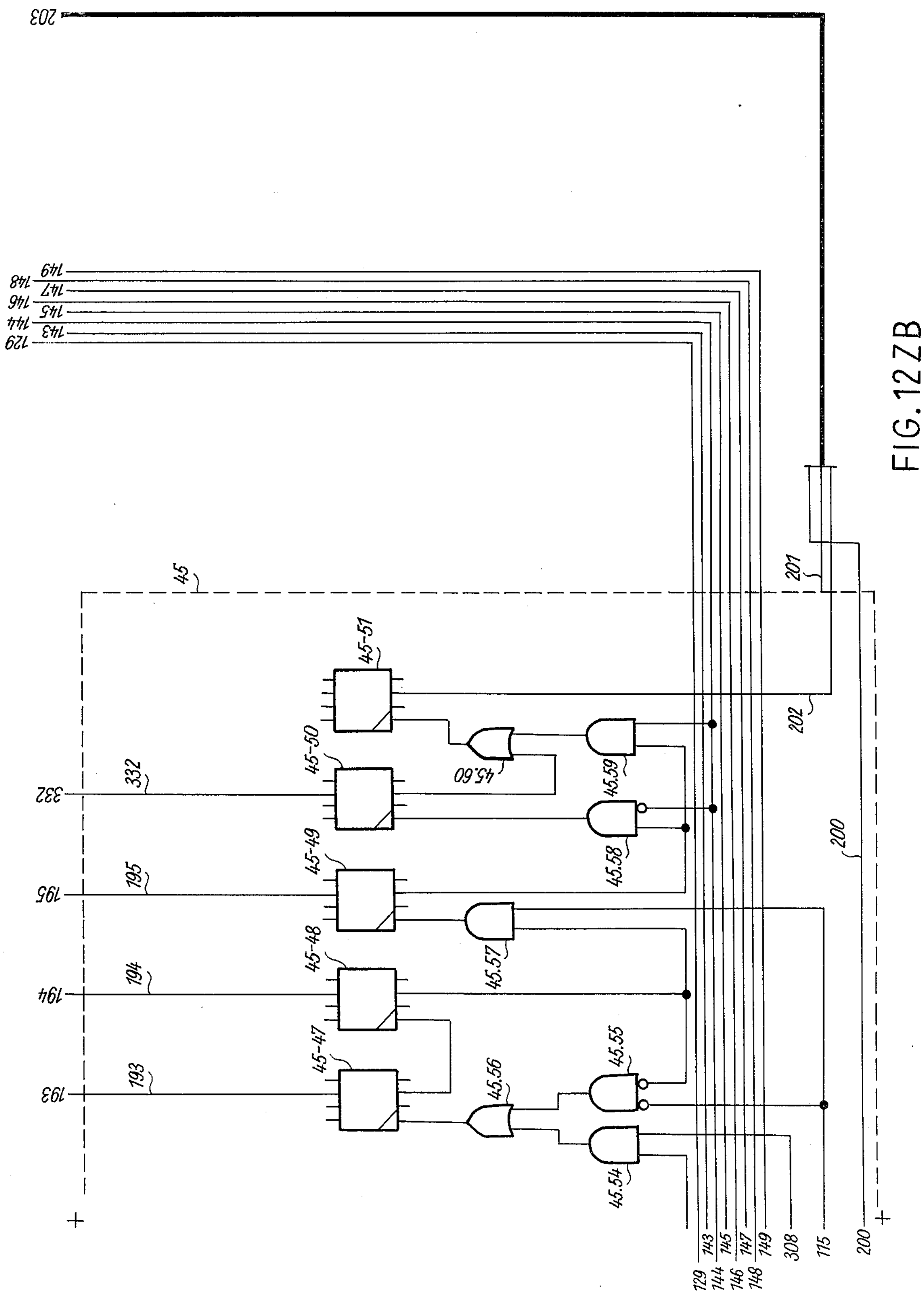

During one passage of the clock sequence, "Generation of a prefix", (FIGS. 13i, 13k) the prefix generator 27 (FIGS. 12l, 12m, 12q) in dependence on the value of the exponent of the first factor of the homoscribtive unit, which is stored in the exponent-1 register 7 (FIG. 12q), effects the separation of a coefficient from the exponent mentioned of the numeric value of the autoscribtive quantity. In the status 27-30 (FIG. 12g, FIG. 13i) a partial exponent (Δ-exponent) is repeatedly subtracted from the value of the exponent of the numeric value ("0101"), until the remaining difference is smaller than the partial exponent made available. The number of subtractions is counted by the prefix-counter 27-1 (FIG. 12q). In each case the partial exponent in the status 27-24 and the status 27-25 (FIG. 12l, FIG. 13i) is loaded into the numeric value register 3-1 and 3-2 (FIG. 12q) via a selection network 27-2 (FIG. 12q) in dependence on the exponent-1 register 7 and prefix-counter 27-1. In the example, the status 27-32 (FIG. 13k), as FIG. 12q shows, is passed through only once, thus, on bus 353 the byte "010" for the generation of a prefix that resulted from the increment of the prefix-counter 27-1, is maintained. In the status 27-35 (FIG. 12x, FIG. 13k) the register for a homoscribtive unit 5 (FIG. 12f) is loaded with "M".

The control network-4 34 (FIGS. 12g, 12h) activates the mentioned clock sequence, "Formation of a homoscribtive unit", (FIGS. 13h, 13i) from status 34-35 (FIG. 13h). The reference-unit counter 41-1 (FIG. 12n) or the prefix counter 27-1 (FIG. 12q), a character counter 34-6 (FIG. 12f) and the lines of a preselection bus 351 drive the memory of the unit abbreviations 44 (FIGS. 12a, 12b and 12c), which is realized as a matrix memory with a selection network.

With the above-described system, via the lines of the preselection bus 351, groups of unit abbreviations or prefix abbreviations are fixed as follows:

group 1: WB, V, H, OHM, SIE, F, T, N;
group 2: PA, J, W, GY, C, LX, LM;
group 3: S, M, A, KG, K, CD, RAD, SR;
group 4: DA, H, K, MA, G, TA, PE, EX;
group 5: D, C, M, MK, N, PK, F, A.

During one cycle of the character counter 34-6 (FIG. 12f) in the status 34-38 (FIG. 13i) the characters "0", "H" and "M" are loaded into the register for a homoscribtive unit 5. The further process is evident from FIG. 13 in connection with FIG. 12.

In the parameter-controlled representation of an autoscribtive quantity by a homoscribtive quantity, including the generation of a prefix for the unit given as a parameter, (depending on the numeric value of the autoscribtive quantity) an autoscribtive quantity of a certain kind determined with the circuit for the automated processing of autoscribtive quantities is represented by a homoscribtive unit of the same kind of quantity, given as a parameter. In this case, the first factor of the exponential product of the given unit is not allowed to contain a prefix. The circuit combination necessary for this requires the circuit for the input transformation of quantities, the exponent-1 register 7, the unit register 47, the coefficient register 48, the numeric value accumulator 24, the accumulator 25 for an autoscribtive unit, the register 5 for a homoscribtive unit, and the prefix generator 27.

The control network 46 controls the assemblies mentioned such that a homoscribtive unit made available as a parameter at the time $T_1$ is represented by the circuit for the input transformation of quantities to an autoscribtive quantity, whereby both the autoscribtive unit and the homoscribtive unit are stored in the unit register 47, and the numeric value of this autoscribtive quantity is stored in the coefficient register 48.

The autoscribtive quantity to be represented by the parameter is the content of the numeric value accumulator 24 and of the accumulator 25 for an autoscribtive unit and may be stored at the time $T_2$, while $T_2$ may be before or after $T_1$.

The execution of the parameter-controlled representation occurs at the time $T_3$.

(1) By means of the calculating assembly 14, the autoscribtive unit of the unit register 47 is checked with the content of the register 8 for an autoscribtive unit as to equality and, subsequently, the content of the numeric value accumulator 24 is divided by the content of the coefficient register 48, and the result is made available in the numeric value register 24.

(2) The homoscribtive unit of the unit register 47 is exchanged in the register for a homoscribtive unit 5.

(3) After separation of a factor from the content of the numeric value accumulator 24 by the calculating assembly 14 in connection with the prefix generator 27 and the content of the exponent-1 register 7, a prefix is inserted into the register 5 for a homoscribtive unit. The homoscribtive quantity determined is available in the numeric value accumulator 24 and in the register 5 for a homoscribtive unit.

Figure 6:
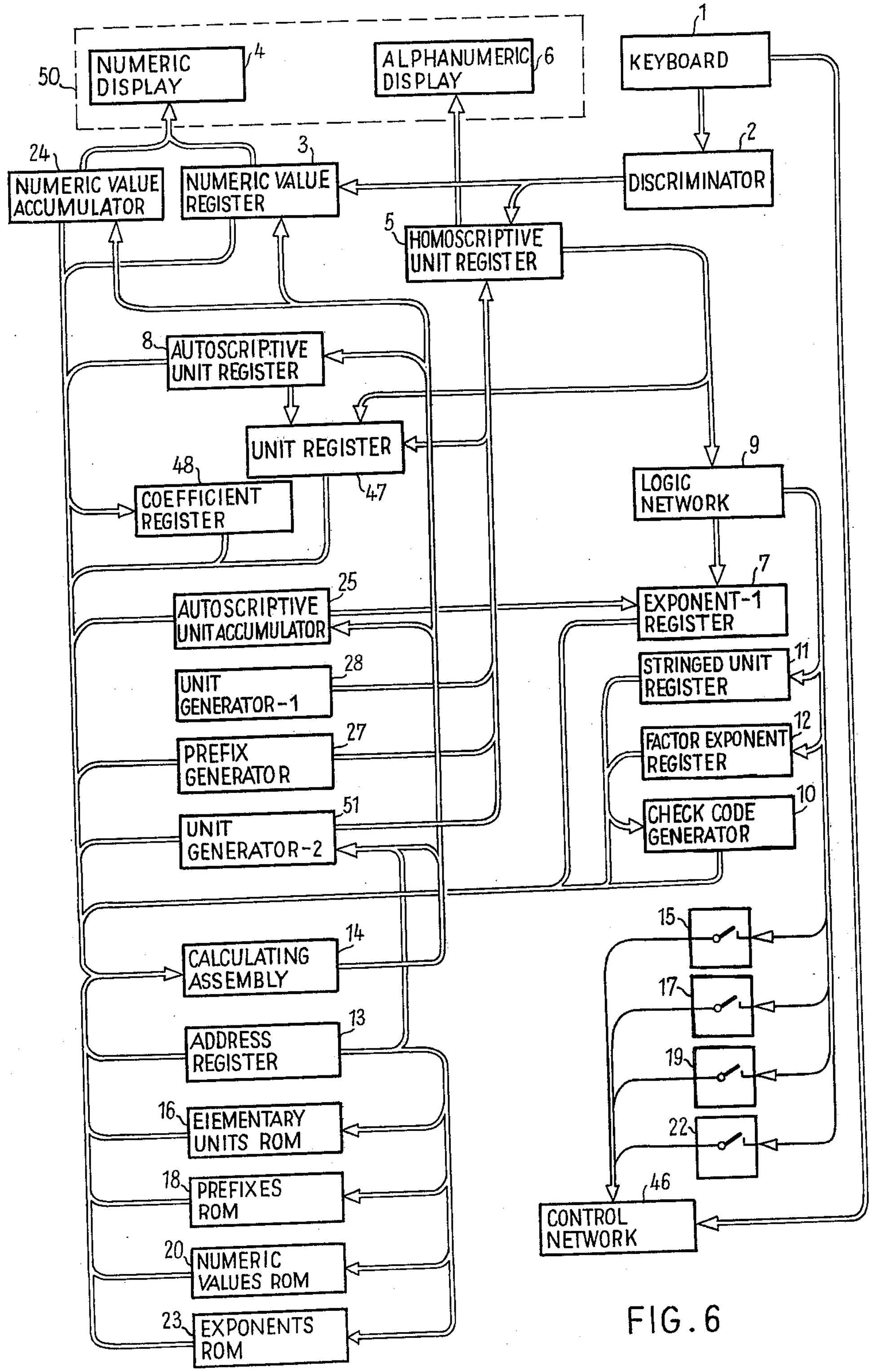
FIG. 6 a circuit arrangement for the automated digital transcription and processing of quantities and units.

In the parameter-controlled representation of an autoscribtive quantity by a homoscribtive quantity without generation of a prefix for a given unit (FIG. 6), an autoscribtive quantity of a specified kind of quantity determined, for example, with the circuit for the automated processing of quantities, is represented by a homoscribtive unit of the same kind of quantity given as a parameter. The circuit combination necessary for this corresponds to the circuit combination of the parameter-controlled representation with generation of a prefix, but it does not require the prefix generator 27 and the exponent-1 register 7.

The present invention will be further explained in relation to the practical application of a pocket or desk calculator for scientific-technical tasks.

Figure 7:
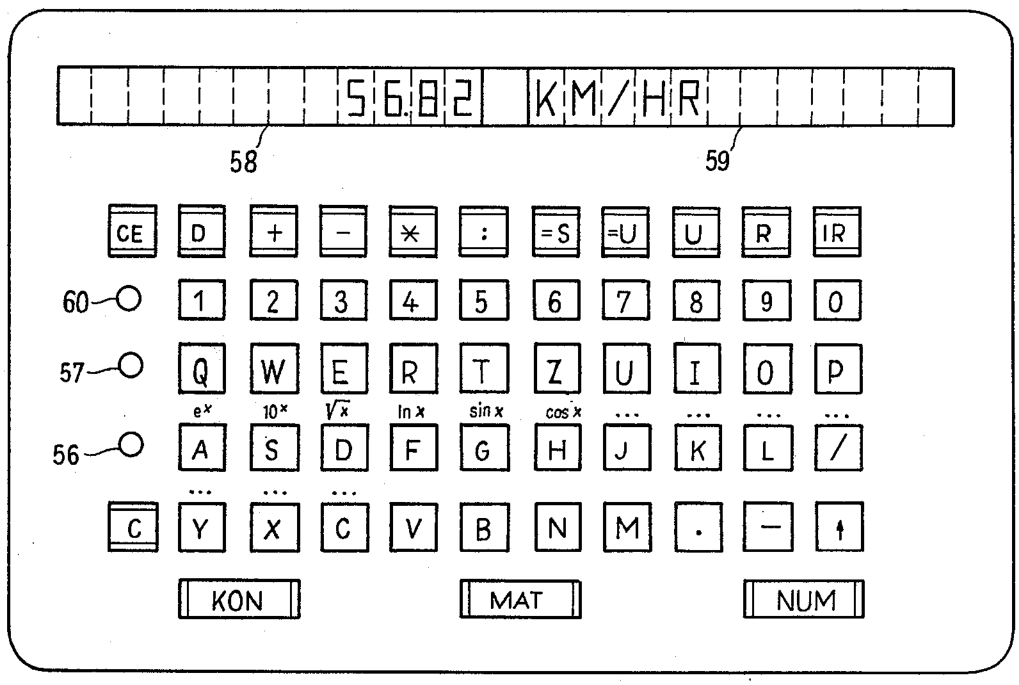
FIG. 7 an input/output field of a scientific-technical pocket or desk calculator with automated processing of quantities.

FIG. 7 shows the essential elements of the input/output field 55. It serves for setting and displaying the input quantities and for the display of the output quantities. The input keyboard consists of 6 key lines, the first key line having operational keys, the second key line having numeral-digit keys, and in the subsequent key lines the letter and special symbol keys are combined. The input-key field also contains pressure-shift keys for the switching of calculating processes. The numeral digit keys "0" . . . "9" and the special symbol keys "." and "↑" serve for the input of numbers, numeric values to quantities or exponents to units. The letter keys "A" . . . "Z" and the special symbol keys "." and "/" serve for the input of units or, after the switching of the pressure shift keys "MAT", for the call of mathematical functions. The pressure shift key "KON" switches from stringed-together operations to constant operations. By clicking the pressure shift key "NUM" into place, the pocket or desk calculator is shifted to purely numerical operation in the sense of a usual calculator. The following operational keys are distinguished:

+—addition key (with input transformation)
−—Subtraction key (with input transformation)
*—multiplication key (with input transformation)
:—division key (with input transformation)
U—unit key (with input transformation, for presetting a unit as a parameter)
=S—output key-1 (with controlled or optimal output transformation)
=U—output key-2 (parameter-controlled output without generation of a prefix)
R—register key
D—rounding key
C—clearing key
CE—input clearing key The output field consists of an undervoltage display 56, an overflow display 57, a 12-digit-numeric display 58 (also 10-digit mantissa, two-digit exponent) for the representation of numbers and numeric values of quantities, of a 12-digit alphanumeric unit display 59 for the representation of homoscribtive units of the input or output quantities and of an error display 60.

Figure 8:
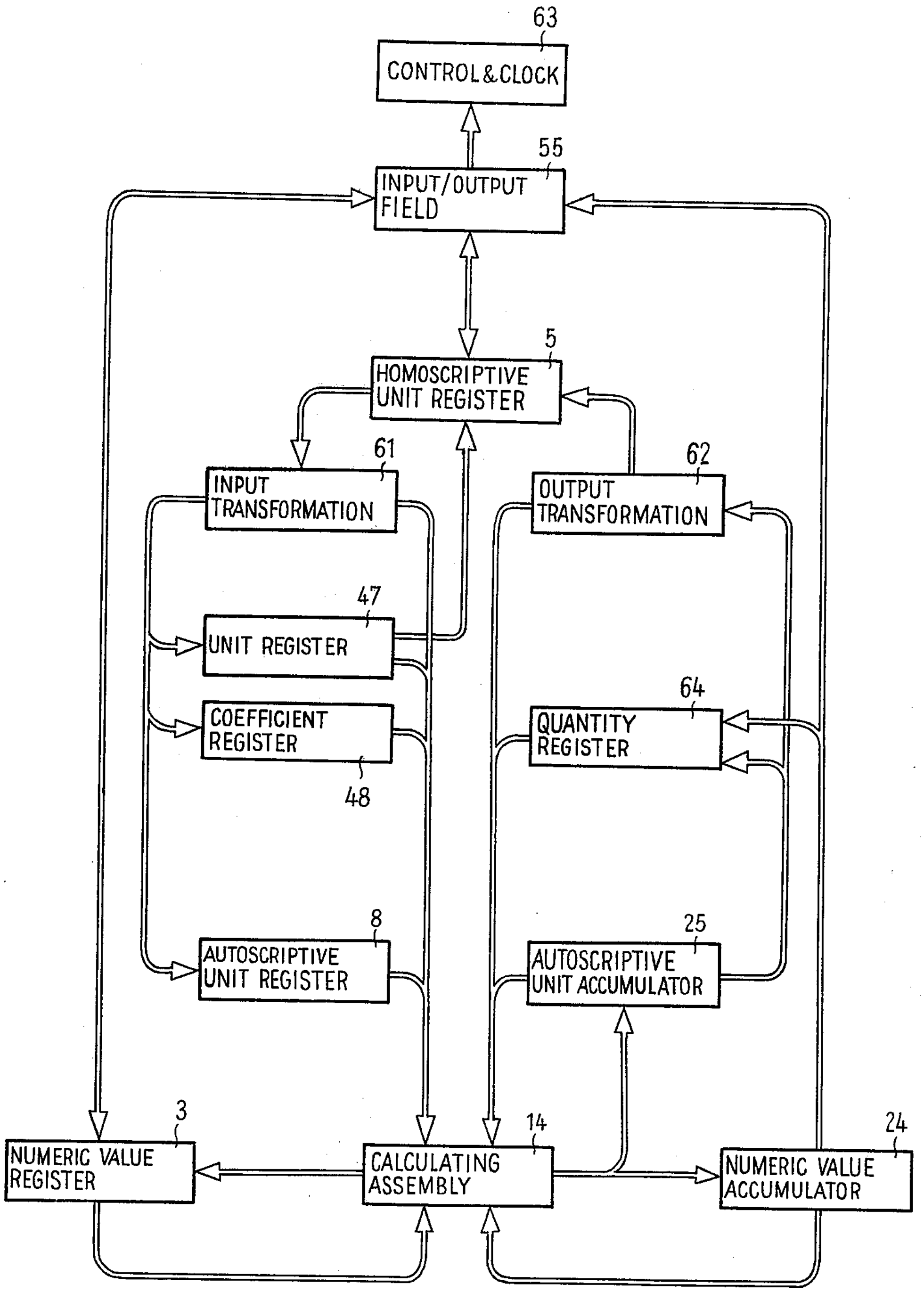
FIG. 8 a schematic representation of the functional principle of a pocket or desk calculator with automated processing of quantities.
Figure 9:
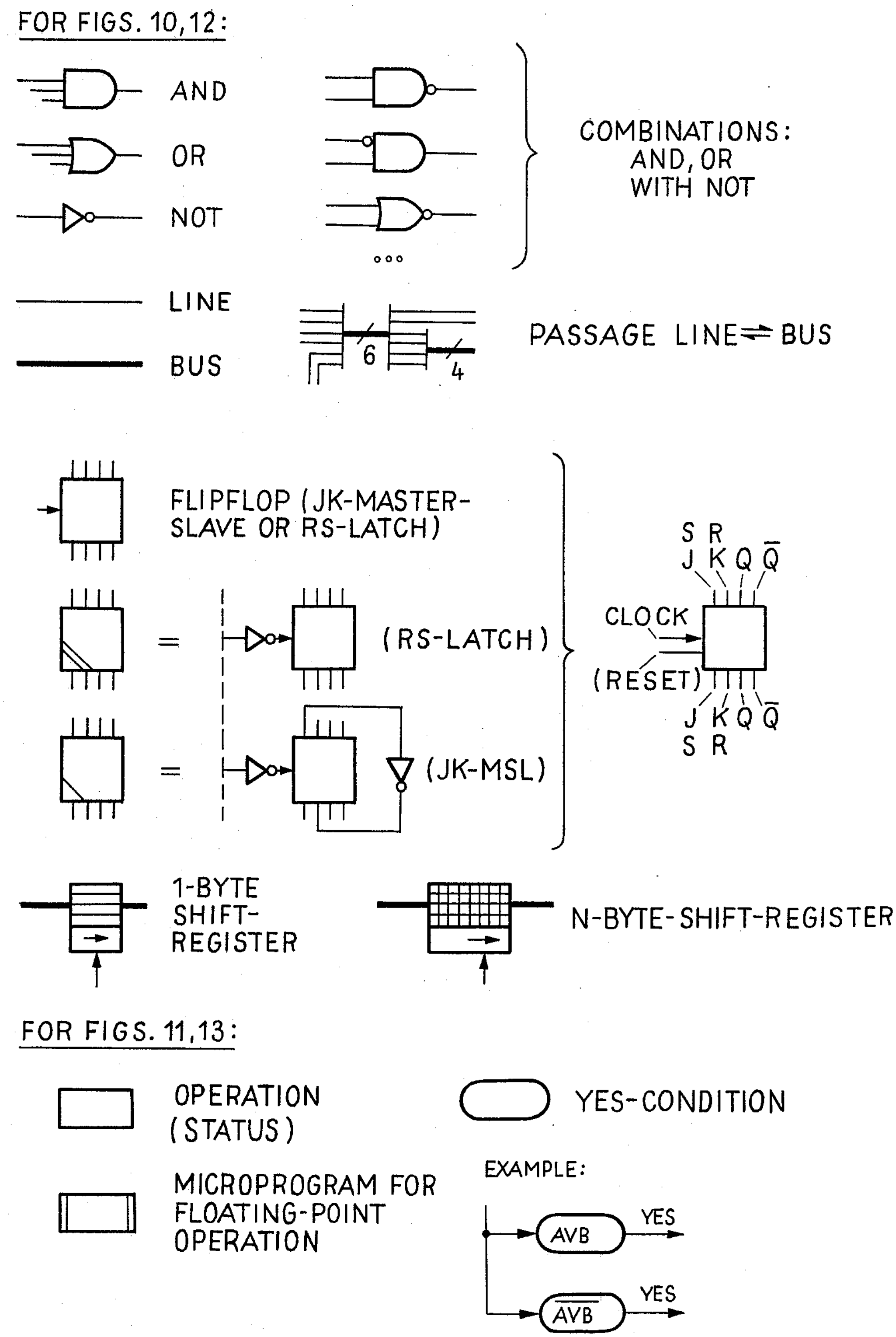
FIG. 9 is a representation of the symbols for the circuit elements and assemblies shown in FIGS. 10 through 13.

FIG. 8 shows the most important functional groups of the extended calculator with the essential information lines. With the setting via the input/output field 55 the numeric value of the homoscribtive quantity is stored in the numeric value register 3, and its homoscribtive unit is stored in the register 5 for a homoscribtive unit.

The assembly input-transformation 61 (part of the circuit array for the input transformation of quantities) represents a given homoscribtive quantity by an autoscribtive quantity, when one of the keys "+", "−", "*", ":" or "U" is pressed. When one of the operational keys "+, −, *, :" is activated, a correction of the numeric value in the numeric value register 3 is performed, and the autoscribtive unit is intermediately stored in the register for an autoscribtive unit 8. When the operational key "U" is activated, then the homoscribtive unit and the autoscribtive unit are intermediately stored in the unit register 47, and the numeric value of the autoscribtive quantity determined as a parameter is intermediately stored in the coefficient register 48.

The assembly output transformation 62 (part of the circuit array for the output transformation of quantities) is activated by the key "=S", and transcribes the autoscribtive unit of the accumulator 25 for an autoscribtive unit in a homoscribtive unit. This fills the register 5 for a homoscribtive unit, simultaneously the numeric value of the numeric value accumulator 24 is corrected, and the content of the numeric value accumulator 24, as well as the content of the register 5 for a homoscribtive unit, are displayed as homoscribtive unit in the input/output field 55.

When two autoscribtive quantities are stringed together ("+, −, *, :"), the calculating unit processes the contents of the numeric value register 3 and of the numeric value accumulator 24 to a new content of the numeric value accumulator 24, and the contents of the register 8 for an autoscribtive unit and of the accumulator 25 for an autoscribtive unit to a new content of the autoscribtive unit accumulator 25.

The control and clock unit 63 controls the connecting lines between the individual assemblies in dependence on the actuated input key. Additionally, this embodiment contains "i" quantity registers 64, for the intermediate storage of autoscribtive units, which can be accepted from the accumulators 24, 25 or stored back into them.

The following calculating examples are intended for the demonstration of the functional principles (abbreviations are made according to table 1 and table 2):

Handling
of a non-programmable pocket calculator
with automated processing of quantities
Examples Example 1:

3.2 YD + 11.6 M = a
YD : yard
M : meter

| step | input | display |
|---|---|---|
| 1. | [C] | 0 |
| 2. | 3.2 YD | 3.2 YD |
| 3. | [+] | 3.2 YD |
| 4. | 11.6 M | 11.6 M |
| 5. | [=S] | 14.35 M = a |

Example 2:

44.2 MIN + 1.53 HR = b
b is to be put out in 'HR'
MIN : minute
HR : hour

| step | input | display |
|---|---|---|
| 1. | [C] | 0 |
| 2. | 1 HR | 1 HR |
| 3. | [U] | 1 HR |
| 4. | 44.2 MIN | 44.2 MIN |

-continued

Handling of a non-programmable pocket calculator with automated processing of quantities Examples

| step | input | display |
|---|---|---|
| 5. | [+] | 44.2 MIN |
| 6. | 1.53 HR | 1.53 HR |
| 7. | [=U] | 2.67 HR = b |

Example 3:

20 KW + 23 HPW = c
c is to be put out in 'HPW'
KW : kilowatt
HPW : horse power

| step | input | display |
|---|---|---|
| 1. | [C] | 0 |
| 2. | 1 HPW | 1 HPW |
| 3. | [U] | 1 HPW |
| 4. | 20 KW | 20 KW |
| 5. | [+] | 20 KW |
| 6. | 23 HPW | 23 HPW |
| 7. | [=U] | 50.19 HPW = c |

Example 4:

15 V : 3 MA = d
V : volt
MA : milliampere

| step | input | display |
|---|---|---|
| 1. | [C] | 0 |
| 2. | 15 V | 15 V |
| 3. | [:] | 15 V |
| 4. | 3 MA | 3 MA |
| 5. | [=S] | 5 KOHM = d |

KOHM : kiloohm

Example 5:

11.6 M2 * 0.85 INCH = e
e is to be put out in 'L'
M2 : square inch
INCH : inch
L : liter

| step | input | display |
|---|---|---|
| 1. | [C] | 0 |
| 2. | 1 L | 1 L |
| 3. | [U] | 1 L |
| 4. | 11.6 M2 | 11.6 M2 |
| 5. | [*] | 11.6 M2 |
| 6. | 0.85 INCH | 0.85 INCH |
| 7. | [=U] | 250.44 L = e |

Example 6:

3 M : 120 MS = f
f is to be put out in 'MI/HR'
M : meter
MS : millisecond

-continued

Handling of a non-programmable pocket calculator with automated processing of quantities Examples MI : mile (statute)
HR : hour

| step | input | display |
|---|---|---|
| | | 0 |
| 1. | [C] 0 | |
| 2. | 3 M | 3 M |
| 3. | [:] | 3 M |
| 4. | 120 MS | 120 MS |
| 5. | [=S] | 25 M/S |
| 6. | 1 MI/HR | 1 MI/HR |
| 7. | [U] | 1 MI/HR |
| 8. | [=U] | 55.923 MI/HR = f |

TABLE 1

Set of elementary units for the representation of quantities in natural science, engineering, industry and economy (including Anglo-American units)

| consecutive no. | abbreviation of the elementary unit | name of the elementary unit |
|---|---|---|
| 1 | A | ampere |
| 2 | ACRE | acre |
| 3 | ANG | angstrom |
| 4 | ANN | year (calendar) |
| 5 | APSB | apostilb |
| 6 | ARE | are |
| 7 | ATM | atmosphere (normal) |
| 8 | ATT | technical atmosphere |
| 9 | AUT | astronomical unit |
| 10 | B | bel |
| 11 | BA | barye |
| 12 | BADR | barrel, dry |
| 13 | BAPE | barrel (petroleum) |
| 14 | BAR | bar |
| 15 | BARN | barn |
| 16 | BD | baud |
| 17 | BIT | bit |
| 18 | BQ | becquerel |
| 19 | BU | bushel |
| 20 | BYTE | byte |
| 21 | C | coulomb |
| 22 | CAL | caloric (International Table) |
| 23 | CD | candela |
| 24 | CEL | degree Celsius |
| 25 | CHAL | chaldron |
| 26 | CHN | chain |
| 27 | CI | curie |
| 28 | DEG | degree (angle) |
| 29 | DI | day (mean solar, lat.: dies) |
| 30 | DOL | $ (US-dollar) |
| 31 | DPT | dioptrie |
| 32 | DR | dram |
| 33 | DRAP | dram, apothecaries (drachm) |
| 34 | DRFL | drachm, fluid |
| 35 | DYN | dyne |
| 36 | ERG | erg |
| 37 | EV | electron volt |
| 38 | F | farad |
| 39 | FATH | fathom |
| 40 | FOOT | foot |
| 41 | FUR | furlong |
| 42 | G | gram |
| 43 | GAL | gal (galileo) |

TABLE 1-continued

| Set of elementary units for the representation of quantities in natural science, engineering, industry and economy (including Anglo-American units) | | |
|---|---|---|
| consecutive no. | abbreviation of the elementary unit | name of the elementary unit |
| 44 | GALL | gallon |
| 45 | GAUS | gauss |
| 46 | GIL | gilbert |
| 47 | GILL | gill |
| 48 | GON | grad |
| 49 | GR | grain |
| 50 | GRF | grain-force |
| 51 | GY | gray |
| 52 | H | henry |
| 53 | HHD | hogshead |
| 54 | HAND | hand |
| 55 | HAR | hectare |
| 56 | HPW | horse-power (metric) |
| 57 | HR | hour (mean solar) |
| 58 | HZ | hertz |
| 59 | INMI | international nautical mile |
| 60 | INCH | inch |
| 61 | j | joule |
| 62 | K | kelvin |
| 63 | KAR | carat |
| 64 | KG | kilogram |
| 65 | KNT | knot |
| 66 | L | liter |
| 67 | LB | pound |
| 68 | LBF | pound-force |
| 69 | LBTR | pound, troy |
| 70 | LGY | langley |
| 71 | LINE | line |
| 72 | LINK | link |
| 73 | LM | lumen |
| 74 | LX | lux |
| 75 | LY | light year |
| 76 | M | meter |
| 77 | MEN | month (mean calendar,lat.: mensis) |
| 78 | MHG | meter of mercury |
| 79 | MI | mile (statute) |
| 80 | MIL | mil |
| 81 | MIM | minim |
| 82 | MIN | minute (mean solar) |
| 83 | MNT | minute (angle) |
| 84 | MOL | mole |
| 85 | MR | mark |
| 86 | MWS | meter of water |
| 87 | MX | maxwell |
| 88 | MYM | micron |
| 89 | N | newton |
| 90 | NEP | neper |
| 91 | NIT | nit |
| 92 | NAMI | nautical mile |
| 93 | OER | oerstedt |
| 94 | OHM | ohm |
| 95 | OZ | ounce |
| 96 | OZFL | ounce, fluid |
| 97 | OZLI | ounce, liquid |
| 98 | OZTR | ounce, troy |
| 99 | OZTR | ounce, apothecary |
| 100 | P | pond |
| 101 | PAR | parsec |
| 102 | PAS | pascal |
| 103 | PDL | poundal |
| 104 | PECK | peck |
| 105 | PERS | person |
| 106 | PFS | horse-power (metric) |
| 107 | PHON | phon |
| 108 | PINT | pint |
| 109 | POI | poise |
| 110 | PPM | part per million |
| 111 | PRM | per mille |
| 112 | PTDR | pint, dry |
| 113 | PTLI | pint, liquid |
| 114 | PWT | pennyweight |
| 115 | PZ | per cent |
| 116 | QR | quarter (length) |
| 117 | QT | quart |
| 118 | QTDR | quart, dry |
| 119 | QTLI | quart, liquid |
| 120 | QTR | quarter (mass) |
| 121 | QTRL | quarter, liquid (volume) |
| 122 | RAD | radian |
| 123 | RD | rad |
| 124 | REV | revolutions |
| 125 | ROD | rod (perch, pole) |
| 126 | ROE | roentgen |
| 127 | ROOD | rood |
| 128 | RT | register ton |
| 129 | S | second (time) |
| 130 | SAP | scruple |
| 131 | SB | stilb |
| 132 | SEP | week (lat.: septimana) |
| 133 | SEC | second (angle) |
| 134 | SFL | scruple, fluid |
| 135 | SIE | siemens |
| 136 | SLUG | slug |
| 137 | SM | nautical mile ("Seemeile") |
| 138 | SR | steradian |
| 139 | ST | piece |
| 140 | STON | stone |
| 141 | STO | stokes |
| 142 | T | tesla |
| 143 | TEX | tex |
| 144 | TNE | ton (metric) |
| 145 | TNSH | ton, short |
| 146 | TON | ton |
| 147 | TONF | ton-force |
| 148 | TORR | torr |
| 149 | U | atomic mass unit |
| 150 | UNA | 1-unit |
| 151 | USSF | US Survey foot |
| 152 | V | volt |
| 153 | VAR | var |
| 154 | W | watt |
| 155 | WB | weber |
| 156 | XE | x-unit |
| 157 | YD | yard |

TABLE 2

| Set of prefixes for the representation of quantities in natural science, engineering, industry and economy | | | |
|---|---|---|---|
| consecutive no. | abbreviation | name | numeric value |
| 1. Physical-technical prefixes | | | |
| 1 | A | atto | $10^{-18}$ |
| 2 | F | femto | $10^{-15}$ |
| 3 | P | pico | $10^{-12}$ |
| 4 | N | nano | $10^{-9}$ |
| 5 | MY | micro | $10^{-6}$ |
| 6 | M | milli | $10^{-3}$ |
| 7 | C | centi | $10^{-2}$ |
| 8 | D | deci | $10^{-1}$ |
| 9 | DA | deca | $10^{1}$ |
| 10 | H | hecto | $10^{2}$ |
| 11 | K | kilo | $10^{3}$ |
| 12 | MA | mega | $10^{6}$ |
| 13 | G | giga | $10^{9}$ |
| 14 | TA | tera | $10^{12}$ |
| 15 | PE | peta | $10^{15}$ |
| 16 | EX | exa | $10^{18}$ |
| 2. Commercial prefixes | | | |
| 17 | H | hundred | $10^{2}$ |
| 18 | T | thousand | $10^{3}$ |
| 19 | MIO | million | $10^{6}$ |
| 20 | MRD | milliard | $10^{9}$ |
| 21 | BIO | billion | $10^{12}$ |
| 22 | BRD | billiard | $10^{15}$ |

TABLE 2-continued

Set of prefixes for the representation of quantities in natural science, engineering, industry and economy

| consecutive no. | abbreviation | name | numeric value |
|---|---|---|---|
| 23 | TRO | trillion | $10^{18}$ |
| 24 | TRD | trilliard | $10^{21}$ |

TABLE 3a

Set of elementary units
Selected amount for the representation of physical-technical quantities

| consecutive no. | abbreviation of the elementary unit | name of the elementary unit |
|---|---|---|
| 1 | A | ampere |
| 2 | ANG | angstrom |
| 3 | ANN | year |
| 4 | ATM | atmosphere (normal) |
| 5 | ATT | technical atmosphere |
| 6 | AUT | astronomical unit |
| 7 | BAR | bar |
| 8 | BARN | barn |
| 9 | BQ | becquerel |
| 10 | C | coulomb |
| 11 | CAL | calorie (International Table) |
| 12 | CD | candela |
| 13 | CI | curie |
| 14 | DEG | degree (angle) |
| 15 | DI | day (mean solar) |
| 16 | DYN | dyne |
| 17 | ERG | erg |
| 18 | EV | electron volt |
| 19 | F | farad |
| 20 | G | gram |
| 21 | GAL | gal (galileo) |
| 22 | GON | grad |
| 23 | H | henry |
| 24 | HR | hour (mean solar) |
| 25 | HZ | hertz |
| 26 | INCH | inch |
| 27 | J | joule |
| 28 | K | kelvin |
| 29 | KAR | carat |
| 30 | KG | kilogram |
| 31 | KNT | knot |
| 32 | L | liter |
| 33 | LGY | langley |
| 34 | LM | lumen |
| 35 | LX | lux |
| 36 | LY | light year |
| 37 | M | meter |
| 38 | MIN | minute (mean solar) |
| 39 | MNT | minute (angle) |
| 40 | MOL | mole |
| 41 | MWS | meter of water |
| 42 | N | newton |
| 43 | OHM | ohm |
| 44 | P | pond |
| 45 | PAR | parsec |
| 46 | PAS | pascal |
| 47 | PFS | horse-power (metric) |
| 48 | POI | poise |
| 49 | PRM | per mille |
| 50 | PZ | per cent |
| 51 | RAD | radian |
| 52 | RD | rad |
| 53 | ROE | roentgen |
| 54 | S | second (time) |
| 55 | SEC | second (angle) |
| 56 | SEP | week (lat.: septimana) |
| 57 | SIE | siemens |
| 58 | SM | nautical mile ("Seemeile") |
| 59 | SR | steradian |
| 60 | STO | stokes |
| 61 | T | tesla |
| 62 | TEX | tex |
| 63 | TNE | ton (metric) |

TABLE 3a-continued

Set of elementary units
Selected amount for the representation of physical-technical quantities

| consecutive no. | abbreviation of the elementary unit | name of the elementary unit |
|---|---|---|
| 64 | TORR | torr |
| 65 | U | atomic mass unit |
| 66 | UNA | 1-Einheit |
| 67 | V | volt |
| 68 | W | watt |
| 69 | WB | weber |
| 70 | XE | x-unit |

TABLE 3b

Set of elementary units
selected amount for the representation of physical-technical quantities and anglo-american units

| consecutive no. | abbreviation of the elementary unit | name of the elementary unit |
|---|---|---|
| 1 | A | ampere |
| 2 | ACRE | acre |
| 3 | ANG | angstrom |
| 4 | ANN | year |
| 5 | ARE | are |
| 6 | ATM | atmosphere (normal) |
| 7 | ATT | technical atmosphere |
| 8 | AUT | astronomical unit |
| 9 | BAR | bar |
| 10 | BARN | barn |
| 11 | BBL | barrel |
| 12 | BQ | becquerel |
| 13 | BTU | british thermal unit |
| 14 | BU | bushel |
| 15 | C | coulomb |
| 16 | CAL | calorie (International Table) |
| 17 | CD | candela |
| 18 | CI | curie |
| 19 | CRAN | cran |
| 20 | CWT | hundredweight |
| 21 | DEG | degree (angle) |
| 22 | DI | day (mean solar) |
| 23 | DRAM | dram |
| 24 | DYN | dyne |
| 25 | ERG | erg |
| 26 | EV | electron volt |
| 27 | F | farad |
| 28 | FATH | fathom |
| 29 | FOOT | foot |
| 30 | G | gram |
| 31 | GAL | gal (galileo) |
| 32 | GALL | gallon |
| 33 | GILL | gill |
| 34 | GON | grad |
| 35 | GR | grain |
| 36 | GY | gray |
| 37 | H | henry |
| 38 | HAND | hand |
| 39 | HAR | hectare |
| 40 | HPW | horse-power (metric) |
| 41 | HR | hour (mean solar) |
| 42 | HZ | hertz |
| 43 | INCH | inch |
| 44 | J | joule |
| 45 | K | kelvin |
| 46 | KAR | carat |
| 47 | KG | kilogram |
| 48 | KNT | knot |
| 49 | L | liter |
| 50 | LB | pound |
| 51 | LBF | pound-force |
| 52 | LGY | langley |
| 53 | LM | lumen |
| 54 | LX | lux |
| 55 | LY | light year |
| 56 | M | meter |
| 57 | MEN | month (mean calender) |

TABLE 3b-continued

| consecutive no. | Set of elementary units selected amount for the representation of physical-technical quantities and anglo-american units: abbreviation of the elementary unit | name of the elementary unit |
|---|---|---|
| 58 | MHG | meter of mercury |
| 59 | MI | mile |
| 60 | MIN | minute (mean solar) |
| 61 | MNT | minute (angle) |
| 62 | MWS | meter of water |
| 63 | N | newton |
| 64 | NTMI | nautical mile |
| 65 | OHM | ohm |
| 66 | OZ | ounce |
| 67 | OZFL | ounce, fluid |
| 68 | OZTR | ounce, troy |
| 69 | P | pond |
| 70 | PA | pascal |
| 71 | PAR | parsec |
| 72 | PDL | poundal |
| 73 | PECK | peck |
| 74 | PINT | pint |
| 75 | POI | poise |
| 76 | PPM | part per million |
| 77 | PRM | per mille |
| 78 | PWT | pennyweight |
| 79 | PZ | percent |
| 80 | QR | quarter (length) |
| 81 | QT | quart |
| 82 | RAD | radian |
| 83 | RD | rad |
| 84 | REM | rem |
| 85 | ROE | roentgen |
| 86 | ROOD | rood |
| 87 | S | second (time) |
| 88 | SEC | second (angle) |
| 89 | SEP | week |
| 90 | SIE | siemens |
| 91 | SLUG | slug |
| 92 | SR | steradian |
| 93 | STO | stokes |
| 94 | STON | stone |
| 95 | T | tesla |
| 96 | TEX | tex |
| 97 | TNE | ton (metric) |
| 98 | TON | ton |
| 99 | TONF | ton-force |
| 100 | TORR | torr |
| 101 | U | atomic mass unit |
| 102 | UN | una (1-unit) |
| 103 | V | volt |
| 104 | W | watt |
| 105 | WB | weber |
| 106 | XE | x-unit |
| 107 | YD | yard |

TABLE 4

| consecutive no. | Base units for the set of elementary units according to table 1: abbreviation of the base unit | name of the base unit |
|---|---|---|
| 1 | M | meter |
| 2 | S | second |
| 3 | A | ampere |
| 4 | KG | kilogram |
| 5 | K | kelvin |
| 6 | CD | candela |
| 7 | RAD | radian |
| 8 | SR | steradian |
| 9 | BIT | bit |
| 10 | ST | piece |
| 11 | MR | mark |
| 12 | MOL | mole |
| 13 | PERS | person |

TABLE 5

| consecutive no. | Base units for the set of elementary units according to table 3: abbreviation of the base unit | name of the base unit |
|---|---|---|
| 1 | M | meter |
| 2 | S | second |
| 3 | A | ampere |
| 4 | KG | kilogram |
| 5 | K | kelvin |
| 6 | CD | candela |
| 7 | MOL | mole |
| 8 | SR | steradian |
| 9 | RAD | radian |

TABLE 6

| consecutive no. | Representation of the elementary units according to table 3 as exponential product from base units: abbreviation of the elem. unit | representation of the elementary unit as quantity with base units |
|---|---|---|
| 1 | A | (base unit) |
| 2 | ANG | 1 ANG = 1 . $10^{-10}$ M |
| 3 | ANN | 1 ANN = 3.1536 . $10^{7}$ S |
| 4 | ATM | 1 ATM = 1.01325 . $10^{5}$ KG/M . S2 |
| 5 | ATT | 1 ATT = 0.980665 . $10^{5}$ KG/M . S2 |
| 6 | AUT | 1 AUT = 1.49598 . $10^{11}$ M |
| 7 | BAR | 1 BAR = 1 . $10^{5}$ KG/M . S2 |
| 8 | BARN | 1 BARN = 1 . $10^{-28}$ M2 |
| 9 | BQ | 1 BQ = 1 S − 1 |
| 10 | C | 1 C = 1 A . S |
| 11 | CAL | 1 CAL = 4.1868 M2 . KG/S2 |
| 12 | CD | (base unit) |
| 13 | CI | 1 CI = 3.7 . $10^{10}$ S − 1 |
| 14 | DEG | 1 DEG = 1.745392 . $10^{-2}$ RAD |
| 15 | DI | 1 DI = 8.64 . $10^{4}$ S |
| 16 | DYN | 1 DYN = 1 . $10^{-5}$ M . KG/S2 |
| 17 | ERG | 1 ERG = 1 . $10^{-7}$ M2 . KG/S2 |
| 18 | EV | 1 EV = 1.60210 . $10^{-19}$ M2 . KG/S2 |
| 19 | F | 1 F = 1 S4 . A2/M2 . KG |
| 20 | G | 1 G = 1 . $10^{-3}$ KG |
| 21 | GAL | 1 GAL = 1 . $10^{-2}$ M/S2 |
| 22 | GON | 1 GON = 1.5708 . $10^{-2}$ RAD |
| 23 | H | 1 H = 1 M2 . KG/S2 . A2 |
| 24 | HR | 1 HR = 3.6 . $10^{3}$ S |
| 25 | HZ | 1 HZ = 1 S − 1 |
| 26 | INCH | 1 INCH = 2.54 . $10^{-2}$ M |
| 27 | J | 1 J = 1 M2 . KG/S2 |
| 28 | K | (base unit) |
| 29 | KAR | 1 KAR = 2 . $10^{-4}$ KG |
| 30 | KG | (base unit) |
| 31 | KNT | 1 KNT = 5.14444 . $10^{-1}$ M/S |
| 32 | L | 1 L = 1 . $10^{-3}$ M3 |
| 33 | LGY | 1 LGY = 4.1868 . $10^{4}$ KG/S2 |
| 34 | LM | 1 LM = 1 CD . SR |
| 35 | LX | 1 LX = 1 CD . SR/M2 |
| 36 | LY | 1 LY = 9.46055 . $10^{15}$ M |
| 37 | M | (base unit) |
| 38 | MIN | 1 MIN = 60 S |
| 39 | MNT | 1 MNT = 2.908882 . $10^{-4}$ RAD |
| 40 | MOL | (base unit) |
| 41 | MWS | 1 MWS = 9.80665 . $10^{3}$ KG/M . S2 |
| 42 | N | 1 N = 1 M2 . KG/S2 |
| 43 | OHM | 1 OHM = 1 M2 . KG/S3 . A2 |
| 44 | P | P = 9.80665 . $10^{-3}$ KG . M/S2 |
| 45 | PAR | 1 PAR = 3.0857 . $10^{16}$ M |
| 46 | PAS | 1 PAS = 1 PAS = KG/M . S2 |
| 47 | PFS | 1 PFS = 735 . 499 W |
| 48 | POI | 1 POI = 1 . $10^{-1}$ KG/M . S |
| 49 | PRM | 1 PRM = 1 . $10^{-3}$ |
| 50 | PZ | 1 PZ = 1 . $10^{-2}$ |
| 51 | RAD | (base unit) |
| 52 | RD | 1 RD = 1 . $10^{-2}$ M2/S2 |
| 53 | ROE | 1 ROE = 2.57976 . $10^{-4}$ S . A/KG |
| 54 | S | (base unit) |
| 55 | SEC | 1 SEC = 4.848137 . $10^{-6}$ RAD |
| 56 | SEP | 1 SEP = 6.048 . $10^{5}$ S |
| 57 | SIE | 1 SIE = 1 S3 . A2/M2 . KG |

TABLE 6-continued

| Representation of the elementary units according to table 3 as exponential product from base units | | |
|---|---|---|
| consecutive no. | abbreviation of the elem. unit | representation of the elementary unit as quantity with base units |
| 58 | SM | 1 SM = 1852 M |
| 59 | SR | (base unit) |
| 60 | STO | 1 STO = 1 . $10^{-4}$ M2/S |
| 61 | T | 1 T = 1 KG/S2 . A |
| 62 | TEX | 1 TEX = 1 . $10^{-6}$ KG/M |
| 63 | TNE | 1 TNE = 1 . $10^{3}$ KG |
| 64 | TORR | 1 TORR = 1.33322 . $10^{2}$ KG/M . S2 |
| 65 | U | 1 U = 1.66053 . $10^{-27}$ KG |
| 66 | UNA | 1 UNA = 1 |
| 67 | V | 1 V = 1 M2 . KG/S3 . A |
| 68 | W | 1 W = 1 M2 . KG/S3 |
| 69 | WB | 1 WB = 1 M2 . KG/S2 . A |
| 70 | XE | 1 XE = 1 . $10^{-13}$ M |

TABLE 7

| Read-only memory for elementary units | | | |
|---|---|---|---|
| ordinal number | address | contents | remark |
| 0 | 00000000 00 | 11111111 | — |
| | 00000000 01 | 00000000 | |
| | 00000000 10 | 00000000 | |
| | 00000000 11 | 00000000 | |
| 1 | 00000001 00 | 11111111 | — |
| | 00000001 01 | 00000000 | |
| | 00000001 10 | 00000000 | |
| | 00000001 11 | 00000000 | |
| 2 | 00000010 00 | 00000010 | A |
| | 00000010 01 | 11000000 | |
| | 00000010 10 | 00000011 | |
| | 00000010 11 | 10000000 | |
| 3 | 00000011 00 | 00000011 | T |
| | 00000011 01 | 11000000 | |
| | 00000011 10 | 00000100 | |
| | 00000011 11 | 00001101 | |
| 4 | 00000100 00 | 00000100 | N |
| | 00000100 01 | 11000000 | |
| | 00000100 10 | 00010011 | |
| | 00000100 11 | 00001011 | |
| 5 | 00000101 00 | 11111111 | — |
| | 00000101 01 | 00000000 | |
| | 00000101 10 | 00000000 | |
| | 00000101 11 | 00000000 | |
| 6 | 00000110 00 | 00000110 | L |
| | 00000110 01 | 10111100 | |
| | 00000110 10 | 00010110 | |
| | 00000110 11 | 10000000 | |
| 7 | 00000111 00 | 11111111 | — |
| | 00000111 01 | 00000000 | |
| | 00000111 10 | 00000000 | |
| | 00000111 11 | 00000000 | |
| 8 | 00001000 00 | 01111010 | ATT |
| | 00001000 01 | 00110110 | |
| | 00001000 10 | 00000100 | |
| | 00001000 11 | 00001100 | |
| 9 | 00001001 00 | 11111111 | — |
| | 00001001 01 | 00000000 | |
| | 00001001 10 | 00000000 | |
| | 00001001 11 | 00000000 | |
| 10 | 00001010 00 | 10000010 | ANN |
| | 00001010 01 | 00111011 | |
| | 00001010 10 | 00000001 | |
| | 00001010 11 | 10000000 | |
| 11 | 00001011 00 | 00001110 | LX |
| | 00001011 01 | 11000000 | |
| | 00001011 10 | 00010111 | |
| | 00001011 11 | 00010100 | |
| 12 | 00001100 00 | 00101010 | ARE |
| | 00001100 01 | 10000010 | |
| | 00001100 10 | 00010100 | |
| | 00001100 11 | 10000000 | |
| 13 | 00001101 00 | 00110011 | TORR |
| | 00001101 01 | 00101011 | |
| | 00001101 10 | 00000100 | |

TABLE 7-continued

| Read-only memory for elementary units | | | |
|---|---|---|---|
| ordinal number | address | contents | remark |
| | 00001101 11 | 00001100 | |
| 14 | 00001110 00 | 00001101 | XE |
| | 00001110 01 | 00001011 | |
| | 00001110 10 | 00000010 | |
| | 00001110 11 | 10000000 | |
| 15 | 00001111 00 | 10010011 | TON |
| | 00001111 01 | 00101101 | |
| | 00001111 10 | 00000100 | |
| | 00001111 11 | 10000000 | |
| 16 | 00010000 00 | 00100011 | TNE |
| | 00010000 01 | 10000011 | |
| | 00010000 10 | 00000100 | |
| | 00010000 11 | 10000000 | |
| 17 | 00010001 00 | 10101011 | TEX |
| | 00010001 01 | 10111001 | |
| | 00010001 10 | 00000100 | |
| | 00010001 11 | 00000010 | |
| 18 | 00010010 00 | 00100001 | ROE |
| | 00010010 01 | 00001111 | |
| | 00010010 10 | 00001010 | |
| | 00010010 11 | 00000100 | |
| 19 | 00010011 00 | 00000011 | G |
| | 00010011 01 | 10111100 | |
| | 00010011 10 | 00000100 | |
| | 00010011 11 | 10000000 | |
| 20 | 00010100 00 | 00001011 | GR |
| | 00010100 01 | 00001101 | |
| | 00010100 10 | 00000100 | |
| | 00010100 11 | 10000000 | |
| 21 | 00010101 00 | 11111111 | — |
| | 00010101 01 | 00000000 | |
| | 00010101 10 | 00000000 | |
| | 00010101 11 | 00000000 | |
| 22 | 00010110 00 | 11111111 | — |
| | 00010110 01 | 00000000 | |
| | 00010110 10 | 00000000 | |
| | 00010110 11 | 00000000 | |
| 23 | 00010111 00 | 00000111 | H |
| | 00010111 01 | 11000000 | |
| | 00010111 10 | 00010101 | |
| | 00010111 11 | 00001110 | |
| 24 | 00011000 00 | 00001111 | HR |
| | 00011000 01 | 00110000 | |
| | 00011000 10 | 00000001 | |
| | 00011000 11 | 10000000 | |
| 25 | 0011001 00 | 01100010 | ANG |
| | 00011001 01 | 10110101 | |
| | 00011001 10 | 00000010 | |
| | 00011001 11 | 10000000 | |
| 26 | 00011010 00 | 00110111 | HAR |
| | 00011010 01 | 10000100 | |
| | 00011010 10 | 00010100 | |
| | 00011010 11 | 10000000 | |
| 27 | 00011011 00 | 11010011 | GAL |
| | 00011011 01 | 10111101 | |
| | 00011011 10 | 00000010 | |
| | 00011011 11 | 00001011 | |
| 28 | 00011100 00 | 11111111 | — |
| | 00011100 01 | 00000000 | |
| | 00011100 10 | 00000000 | |
| | 00011100 11 | 00000000 | |
| 29 | 00011101 00 | 01101001 | ERG |
| | 00011101 01 | 10111000 | |
| | 00011101 10 | 00010101 | |
| | 00011101 11 | 00001011 | |
| 30 | 00011110 00 | 00000110 | M |
| | 00011110 01 | 11000000 | |
| | 00011110 10 | 00000010 | |
| | 00011110 11 | 10000000 | |
| 31 | 00011111 00 | 10000011 | GON |
| | 00011111 01 | 00011010 | |
| | 00011111 10 | 00001000 | |
| | 00011111 11 | 10000000 | |
| 32 | 00100000 00 | 11111111 | — |
| | 00100000 01 | 00000000 | |
| | 00100000 10 | 00000000 | |
| | 00100000 11 | 00000000 | |
| 33 | 00100001 00 | 11010011 | GALL |

TABLE 7-continued

Read-only memory for elementary units

| ordinal number | address | contents | remark |
|---|---|---|---|
| | 00100001 01 | 00000100 | |
| | 00100001 10 | 00010110 | |
| | 00100001 11 | 10000000 | |
| 34 | 00100010 00 | 11111111 | — |
| | 00100010 01 | 00000000 | |
| | 00100010 10 | 00000000 | |
| | 00100010 11 | 00000000 | |
| 35 | 00100011 00 | 11011010 | ATM |
| | 00100011 01 | 00110111 | |
| | 00100011 10 | 00000100 | |
| | 00100011 11 | 00001100 | |
| 36 | 00100100 00 | 00010110 | LM |
| | 00100100 01 | 11000000 | |
| | 00100100 10 | 00010111 | |
| | 00100100 11 | 10000000 | |
| 37 | 00100101 00 | 01100110 | MNT |
| | 00100101 01 | 00001110 | |
| | 00100101 10 | 00001000 | |
| | 00100101 11 | 10000000 | |
| 38 | 00100110 00 | 00000110 | K |
| | 00100110 01 | 11000000 | |
| | 00100110 10 | 00000101 | |
| | 00100110 11 | 10000000 | |
| 39 | 00100111 00 | 00000111 | J |
| | 00100111 01 | 11000000 | |
| | 00100111 10 | 00010101 | |
| | 00100111 11 | 00001011 | |
| 40 | 00101000 00 | 01101001 | REM |
| | 00101000 01 | 10111101 | |
| | 00101000 10 | 00010100 | |
| | 00101000 11 | 00001011 | |
| 41 | 00101001 00 | 00110110 | KAR |
| | 00101001 01 | 00010000 | |
| | 00101001 10 | 00000100 | |
| | 00101001 11 | 10000000 | |
| 42 | 00101010 00 | 11111111 | — |
| | 00101010 01 | 00000000 | |
| | 00101010 10 | 00000000 | |
| | 00101010 11 | 00000000 | |
| 43 | 00101011 00 | 10001110 | MEN |
| | 00101011 01 | 00111010 | |
| | 00101011 10 | 00000001 | |
| | 00101011 11 | 10000000 | |
| 44 | 00101100 00 | 11111111 | — |
| | 00101100 01 | 00000000 | |
| | 00101100 10 | 00000000 | |
| | 00101100 11 | 00000000 | |
| 45 | 00101101 00 | 01100110 | KNT |
| | 00101101 01 | 00011100 | |
| | 00101101 10 | 00000010 | |
| | 00101101 11 | 00000001 | |
| 46 | 00101110 00 | 11111111 | — |
| | 00101110 01 | 00000000 | |
| | 00101110 10 | 00000000 | |
| | 00101110 11 | 00000000 | |
| 47 | 00101111 00 | 00000011 | S |
| | 00101111 01 | 11000000 | |
| | 00101111 10 | 00000001 | |
| | 00101111 11 | 10000000 | |
| 48 | 00110000 00 | 00001011 | SR |
| | 00110000 01 | 11000000 | |
| | 00110000 10 | 00000111 | |
| | 00110000 11 | 10000000 | |
| 49 | 00110001 00 | 00000001 | F |
| | 00110001 01 | 11000000 | |
| | 00110001 10 | 00010010 | |
| | 00110001 11 | 00010101 | |
| 50 | 00110010 00 | 00000010 | P |
| | 00110010 01 | 00010001 | |
| | 00110010 10 | 00010011 | |
| | 00110010 11 | 00001011 | |
| 51 | 00110011 00 | 00110000 | BAR |
| | 00110011 01 | 10000101 | |
| | 00110011 10 | 00000100 | |
| | 00110011 11 | 00001100 | |
| 52 | 00110100 00 | 00010010 | PA |
| | 00110100 01 | 11000000 | |
| | 00110100 10 | 00000100 | |
| | 00110100 11 | 00001100 | |
| 53 | 00110101 00 | 00110010 | PAR |
| | 00110101 01 | 00111111 | |
| | 00110101 10 | 00000010 | |
| | 00110101 11 | 10000000 | |
| 54 | 00110110 00 | 00000110 | LB |
| | 00110110 01 | 00011101 | |
| | 00110110 10 | 00000100 | |
| | 00110110 11 | 10000000 | |
| 55 | 00110111 00 | 00110000 | BARN |
| | 00110111 01 | 10100011 | |
| | 00110111 10 | 00010100 | |
| | 00110111 11 | 10000000 | |
| 56 | 00111000 00 | 11111111 | — |
| | 00111000 01 | 00000000 | |
| | 00111000 10 | 00000000 | |
| | 00111000 11 | 00000000 | |
| 57 | 00111001 00 | 00011110 | KG |
| | 00111001 01 | 11000000 | |
| | 00111001 10 | 00000100 | |
| | 00111001 11 | 10000000 | |
| 58 | 00111010 00 | 00011111 | STO |
| | 00111010 01 | 10111011 | |
| | 00111010 10 | 00010100 | |
| | 00111010 11 | 00000001 | |
| 59 | 00111011 00 | 00000011 | C |
| | 00111011 01 | 11000000 | |
| | 00111011 10 | 00001010 | |
| | 00111011 11 | 10000000 | |
| 60 | 00111100 00 | 11111111 | — |
| | 00111100 01 | 00000000 | |
| | 00111100 10 | 00000000 | |
| | 00111100 11 | 00000000 | |
| 61 | 00111101 00 | 11011000 | OHM |
| | 00111101 01 | 11000000 | |
| | 00111101 10 | 00010101 | |
| | 00111101 11 | 00010001 | |
| 62 | 00111110 00 | 00011111 | STON |
| | 00111110 01 | 00100110 | |
| | 00111110 10 | 00000100 | |
| | 00111110 11 | 10000000 | |
| 63 | 00111111 00 | 00010001 | RD |
| | 00111111 01 | 11000000 | |
| | 00111111 10 | 00010100 | |
| | 00111111 11 | 00001011 | |
| 64 | 01000000 00 | 10000011 | TONF |
| | 01000000 01 | 00110011 | |
| | 01000000 10 | 00010011 | |
| | 01000000 11 | 00001011 | |
| 65 | 01000001 00 | 11010001 | RAD |
| | 01000001 01 | 11000000 | |
| | 01000001 10 | 00001000 | |
| | 01000001 11 | 10000000 | |
| 66 | 01000010 00 | 01001011 | CRAN |
| | 01000010 01 | 00011111 | |
| | 01000010 10 | 00010110 | |
| | 01000010 11 | 10000000 | |
| 67 | 01000011 00 | 11010011 | CAL |
| | 01000011 01 | 00100100 | |
| | 01000011 10 | 00010101 | |
| | 01000011 11 | 00001011 | |
| 68 | 01000100 00 | 00000001 | FOOT |
| | 01000100 01 | 00011110 | |
| | 01000100 10 | 00000010 | |
| | 01000100 11 | 10000000 | |
| 69 | 01000101 00 | 11111111 | — |
| | 01000101 01 | 00000000 | |
| | 01000101 10 | 00000000 | |
| | 01000101 11 | 00000000 | |
| 70 | 01000110 00 | 11111111 | — |
| | 01000110 01 | 00000000 | |
| | 01000110 10 | 00000000 | |
| | 01000110 11 | 00000000 | |
| 71 | 01000111 00 | 00111010 | ACRE |
| | 01000111 01 | 00110001 | |
| | 01000111 10 | 00010100 | |
| | 01000111 11 | 10000000 | |
| 72 | 01001000 00 | 01111110 | MHG |

TABLE 7-continued

Read-only memory for elementary units

| ordinal number | address | contents | remark |
|---|---|---|---|
| | 01001000 01 | 00111000 | |
| | 01001000 10 | 00000100 | |
| | 01001000 11 | 00001100 | |
| 73 | 01001001 00 | 11111111 | — |
| | 01001001 01 | 00000000 | |
| | 01001001 10 | 00000000 | |
| | 01001001 11 | 00000000 | |
| 74 | 01001010 00 | 00000010 | W |
| | 01001010 01 | 11000000 | |
| | 01001010 10 | 00010101 | |
| | 01001010 11 | 00001111 | |
| 75 | 01001011 00 | 00001110 | LY |
| | 01001011 01 | 00111110 | |
| | 01001011 10 | 00000001 | |
| | 01001011 11 | 10000000 | |
| 76 | 01001100 00 | 00000000 | V |
| | 01001100 01 | 11000000 | |
| | 01001100 10 | 00010101 | |
| | 01001100 11 | 00010000 | |
| 77 | 01001101 00 | 01110001 | FATH |
| | 01001101 01 | 00100011 | |
| | 01001101 10 | 00000010 | |
| | 01001101 11 | 10000000 | |
| 78 | 01001110 00 | 11111111 | — |
| | 01001110 01 | 00000000 | |
| | 01001110 10 | 00000000 | |
| | 01001110 11 | 00000000 | |
| 79 | 01001111 00 | 00000001 | ROOD |
| | 01001111 01 | 00101100 | |
| | 01001111 01 | 00010100 | |
| | 01001111 11 | 10000000 | |
| 80 | 01010000 00 | 11111111 | — |
| | 01010000 01 | 00000000 | |
| | 01010000 10 | 00000000 | |
| | 01010000 11 | 00000000 | |
| 81 | 01010001 00 | 11001010 | PRM |
| | 01010001 01 | 10111000 | |
| | 01010001 10 | 10000000 | |
| | 01010001 11 | 10000000 | |
| 82 | 01010010 00 | 00000110 | MI |
| | 01010010 01 | 00101111 | |
| | 01010010 10 | 00000010 | |
| | 01010010 11 | 10000000 | |
| 83 | 01010011 01 | 01100011 | GILL |
| | 01010011 01 | 00010101 | |
| | 01010011 10 | 00010110 | |
| | 01010011 11 | 10000000 | |
| 84 | 01010100 00 | 11111111 | — |
| | 01010100 01 | 00000000 | |
| | 01010100 10 | 00000000 | |
| | 01010100 11 | 00000000 | |
| 85 | 01010101 00 | 00000001 | EV |
| | 01010101 01 | 00001010 | |
| | 01010101 10 | 00010101 | |
| | 01010101 11 | 00001011 | |
| 86 | 01010110 00 | 10000110 | MIN |
| | 01010110 01 | 00101010 | |
| | 01010110 10 | 00000001 | |
| | 01010110 11 | 10000000 | |
| 87 | 01010111 00 | 11111111 | — |
| | 01010111 01 | 00000000 | |
| | 01010111 10 | 00000000 | |
| | 01010111 11 | 00000000 | |
| 88 | 01011000 00 | 00001011 | GY |
| | 01011000 01 | 11000000 | |
| | 01011000 10 | 00010100 | |
| | 01011000 11 | 00001011 | |
| 89 | 01011001 00 | 11011100 | NTMI |
| | 01011001 01 | 00000111 | |
| | 01011001 10 | 00000010 | |
| | 01011001 11 | 10000000 | |
| 90 | 01011010 00 | 01101110 | DEG |
| | 01011010 01 | 00011001 | |
| | 01011010 10 | 00001000 | |
| | 01011010 11 | 10000000 | |
| 91 | 01011011 00 | 10010111 | HAND |
| | 01011011 01 | 00100010 | |
| | 01011011 10 | 00000010 | |

TABLE 7-continued

Read-only memory for elementary units

| ordinal number | address | contents | remark |
|---|---|---|---|
| | 01011011 11 | 10000000 | |
| 92 | 01011100 00 | 00000100 | U |
| | 01011100 01 | 00001001 | |
| | 01011100 10 | 00000100 | |
| | 01011100 11 | 10000000 | |
| 93 | 01011101 00 | 11111111 | — |
| | 01011101 01 | 00000000 | |
| | 01011101 10 | 00000000 | |
| | 01011101 11 | 00000000 | |
| 94 | 01011110 00 | 10111110 | LGY |
| | 01011110 01 | 00110100 | |
| | 01011110 10 | 00000100 | |
| | 01011110 11 | 00001011 | |
| 95 | 01011111 00 | 00101110 | DRAM |
| | 01011111 01 | 00010100 | |
| | 01011111 10 | 00000100 | |
| | 01011111 11 | 10000000 | |
| 96 | 01100000 00 | 00000100 | UN |
| | 01100000 01 | 11000000 | |
| | 01100000 10 | 10000000 | |
| | 01100000 11 | 10000000 | |
| 97 | 01100001 00 | 01100010 | AUT |
| | 01100001 01 | 00111101 | |
| | 01100001 10 | 00000010 | |
| | 01100001 11 | 10000000 | |
| 98 | 01100010 00 | 11111111 | — |
| | 01100010 01 | 00000000 | |
| | 01100010 10 | 00000000 | |
| | 01100010 11 | 00000000 | |
| 99 | 01100011 00 | 00001010 | QR |
| | 01100011 01 | 00100111 | |
| | 01100011 10 | 00000100 | |
| | 01100011 11 | 10000000 | |
| 100 | 01100100 00 | 11111111 | — |
| | 01100100 01 | 00000000 | |
| | 01100100 10 | 00000000 | |
| | 01100100 11 | 00000000 | |
| 101 | 01100101 00 | 00011010 | QT |
| | 01100101 01 | 00000011 | |
| | 01100101 10 | 00010110 | |
| | 01100101 11 | 10000000 | |
| 102 | 01100110 00 | 11000000 | BBL |
| | 01100110 01 | 00100000 | |
| | 01100110 10 | 00010110 | |
| | 01100110 11 | 10000000 | |
| 103 | 01100111 00 | 00100110 | LBF |
| | 01100111 01 | 00100101 | |
| | 01100111 10 | 00010011 | |
| | 01100111 11 | 00001011 | |
| 104 | 01101000 00 | 11111111 | — |
| | 01101000 01 | 00000000 | |
| | 01101000 10 | 00000000 | |
| | 01101000 11 | 00000000 | |
| 105 | 01101001 00 | 11111111 | — |
| | 01101001 01 | 00000000 | |
| | 01101001 10 | 00000000 | |
| | 01101001 11 | 00000000 | |
| 106 | 01101010 00 | 01001111 | SEP |
| | 01101010 01 | 00111001 | |
| | 01101010 10 | 00000001 | |
| | 01101010 11 | 10000000 | |
| 107 | 01101011 00 | 11111111 | — |
| | 01101011 01 | 00000000 | |
| | 01101011 10 | 00000000 | |
| | 01101011 11 | 00000000 | |
| 108 | 01101100 00 | 00100111 | SIE |
| | 01101100 01 | 11000000 | |
| | 01101100 10 | 00010001 | |
| | 01101100 11 | 00010101 | |
| 109 | 01101101 00 | 10000010 | PINT |
| | 01101101 01 | 00000010 | |
| | 01101101 10 | 10010110 | |
| | 01101101 11 | 10000000 | |
| 110 | 01101110 00 | 10000010 | POI |
| | 01101110 01 | 10111110 | |
| | 01101110 10 | 00000100 | |
| | 01101110 11 | 00001001 | |
| 111 | 01101111 00 | 00000011 | CI |

TABLE 7-continued

| Read-only memory for elementary units | | | |
|---|---|---|---|
| ordinal number | address | contents | remark |
| | 01101111 01 | 00111100 | |
| | 01101111 10 | 80000000 | |
| | 01101111 11 | 00000001 | |
| 112 | 01110000 00 | 11111111 | — |
| | 01110000 01 | 00000000 | |
| | 01110000 10 | 00000000 | |
| | 01110000 11 | 00000000 | |
| 113 | 01110001 00 | 00001000 | OZ |
| | 01110001 01 | 00010111 | |
| | 01110001 10 | 00000100 | |
| | 01110001 11 | 10000000 | |
| 114 | 01110010 00 | 00000110 | DI |
| | 01110010 01 | 00110101 | |
| | 01110010 10 | 00000001 | |
| | 01110010 11 | 10000000 | |
| 115 | 01110011 00 | 01101111 | SEC |
| | 01110011 01 | 00001100 | |
| | 01110011 10 | 00000001 | |
| | 01110011 11 | 10000000 | |
| 116 | 01110100 00 | 11111111 | — |
| | 01110100 01 | 00000000 | |
| | 01110100 10 | 00000000 | |
| | 01110100 11 | 00000000 | |
| 117 | 01110101 00 | 01101000 | OZTR |
| | 01110101 01 | 00010110 | |
| | 01110101 10 | 00000100 | |
| | 01110101 11 | 10000000 | |
| 118 | 01110110 00 | 11010010 | PDL |
| | 01110110 01 | 00100001 | |
| | 01110110 10 | 00010011 | |
| | 01110110 11 | 00001011 | |
| 119 | 01110111 00 | 11111111 | — |
| | 01110111 01 | 00000000 | |
| | 01110111 10 | 00000000 | |
| | 01110111 11 | 00000000 | |
| 120 | 01111000 00 | 11111111 | — |
| | 01111000 01 | 00000000 | |
| | 01111000 10 | 00000000 | |
| | 01111000 11 | 00000000 | |
| 121 | 01111001 00 | 00010011 | CD |
| | 01111001 01 | 11000000 | |
| | 01111001 10 | 00000110 | |
| | 01111001 11 | 10000000 | |
| 122 | 01111010 00 | 00000010 | WB |
| | 01111010 01 | 11000000 | |
| | 01111010 10 | 00010101 | |
| | 01111010 11 | 00001101 | |
| 123 | 01111011 00 | 11111111 | — |
| | 01111011 01 | 00000000 | |
| | 01111011 10 | 00000000 | |
| | 01111011 11 | 00000000 | |
| 124 | 01111100 00 | 11111111 | — |
| | 01111100 01 | 00000000 | |
| | 01111100 10 | 00000000 | |
| | 01111100 11 | 00000000 | |
| 125 | 01111101 00 | 11111111 | — |
| | 01111101 01 | 00000000 | |
| | 01111101 10 | 00000000 | |
| | 01111101 11 | 00000000 | |
| 126 | 01111110 00 | 11111111 | — |
| | 01111110 01 | 00000000 | |
| | 01111110 10 | 00000000 | |
| | 01111110 11 | 00000000 | |
| 127 | 01111111 00 | 01110010 | PWT |
| | 01111111 01 | 00010011 | |
| | 01111111 10 | 00000010 | |
| | 01111111 11 | 10000000 | |
| 128 | 10000000 00 | 00001111 | HZ |
| | 10000000 01 | 11000000 | |
| | 10000000 10 | 10000000 | |
| | 10000000 11 | 00000001 | |
| 129 | 10000001 00 | 11111111 | — |
| | 10000001 01 | 00000000 | |
| | 10000001 10 | 00000000 | |
| | 10000001 11 | 00000000 | |
| 130 | 10000010 00 | 11010010 | PPM |
| | 10000010 01 | 10111001 | |
| | 10000010 10 | 10000000 | |

TABLE 7-continued

| Read-only memory for elementary units | | | |
|---|---|---|---|
| ordinal number | address | contents | remark |
| | 10000010 11 | 10000000 | |
| 131 | 10000011 00 | 00010101 | YD |
| | 10000011 01 | 00011011 | |
| | 10000011 10 | 00000010 | |
| | 10000011 11 | 10000000 | |
| 132 | 10000100 00 | 11111111 | — |
| | 10000100 01 | 00000000 | |
| | 10000100 10 | 00000000 | |
| | 10000100 11 | 00000000 | |
| 133 | 10000101 00 | 11111111 | — |
| | 10000101 01 | 00000000 | |
| | 10000101 10 | 00000000 | |
| | 10000101 11 | 00000000 | |
| 134 | 10000110 00 | 11111111 | — |
| | 10000110 01 | 00000000 | |
| | 10000110 10 | 00000000 | |
| | 10000110 11 | 00000000 | |
| 135 | 10000111 00 | 10001110 | DYN |
| | 10000111 01 | 10111010 | |
| | 10000111 10 | 00010011 | |
| | 10000111 11 | 00001011 | |
| 136 | 10001000 00 | 01110011 | CWT |
| | 10001000 01 | 00101001 | |
| | 10001000 10 | 00000100 | |
| | 10001000 11 | 10000000 | |
| 137 | 10001001 00 | 11111111 | — |
| | 10001001 01 | 00000000 | |
| | 10001001 10 | 00000000 | |
| | 10001001 11 | 00000000 | |
| 138 | 10001010 00 | 01100100 | INCH |
| | 10001010 01 | 00011000 | |
| | 10001010 11 | 10000000 | |
| 139 | 10001011 00 | 11111111 | — |
| | 10001011 01 | 00000000 | |
| | 10001011 11 | 00000000 | |
| 140 | 10001100 00 | 00000000 | BU |
| | 10001100 01 | 00000101 | |
| | 10001100 10 | 00010110 | |
| | 10001100 11 | 10000000 | |
| 141 | 10001101 00 | 11111111 | — |
| | 10001101 01 | 00000000 | |
| | 10001101 10 | 00000000 | |
| | 10001101 11 | 00000000 | |
| 142 | 10001110 00 | 11111111 | — |
| | 10001110 01 | 00000000 | |
| | 10001110 10 | 00000000 | |
| | 10001110 11 | 00000000 | |
| 143 | 10001111 00 | 10011000 | BTU |
| | 10001111 01 | 00101110 | |
| | 10001111 10 | 00010101 | |
| | 10001111 11 | 00001011 | |
| 144 | 10010000 00 | 11111111 | — |
| | 10010000 01 | 00000000 | |
| | 10010000 10 | 00000000 | |
| | 10010000 11 | 00000000 | |
| 145 | 10010001 00 | 11111111 | — |
| | 10010001 01 | 00000000 | |
| | 10010001 10 | 00000000 | |
| | 10010001 11 | 00000000 | |
| 146 | 10010010 00 | 00010000 | BQ |
| | 10010010 01 | 11000000 | |
| | 10010010 10 | 10000000 | |
| | 10010010 11 | 00000001 | |
| 147 | 10010011 00 | 01010111 | HPW |
| | 10010011 01 | 00000110 | |
| | 10010011 10 | 00010100 | |
| | 10010011 11 | 00001101 | |
| 148 | 10010100 00 | 11111111 | — |
| | 10010100 01 | 00000000 | |
| | 10010100 10 | 00000000 | |
| | 10010100 11 | 00000000 | |
| 149 | 10010101 00 | 11111111 | — |
| | 10010101 01 | 00000000 | |
| | 10010101 10 | 00000000 | |
| | 10010101 11 | 00000000 | |
| 150 | 10010110 00 | 11111111 | — |
| | 10010110 01 | 00000000 | |
| | 10010110 10 | 00000000 | |

TABLE 7-continued

Read-only memory for elementary units

| ordinal number | address | contents | remark |
|---|---|---|---|
| | 10010110 11 | 00000000 | |
| 151 | 10010111 00 | 11110110 | MWS |
| | 10010111 01 | 00110010 | |
| | 10010111 10 | 00000100 | |
| | 10010111 11 | 00001100 | |
| 152 | 10011000 00 | 111111111 | — |
| | 10011000 01 | 00000000 | |
| | 10011000 10 | 00000000 | |
| | 10011000 11 | 00000000 | |
| 153 | 10011001 00 | 11111111 | — |
| | 10011001 01 | 00000000 | |
| | 10011001 10 | 00000000 | |
| | 10011001 11 | 00000000 | |
| 154 | 10011010 00 | 11111111 | — |
| | 10011010 01 | 00000000 | |
| | 10011010 10 | 00000000 | |
| | 10011010 11 | 00000000 | |
| 155 | 10011011 00 | 00001010 | PZ |
| | 10011011 01 | 10111101 | |
| | 10011011 10 | 10000000 | |
| | 10011011 11 | 10000000 | |
| 156 | 10011100 00 | 01101010 | PECK |
| | 10011100 01 | 00010010 | |
| | 10011100 10 | 00010110 | |
| | 10011100 11 | 10000000 | |
| 157 | 10011101 00 | 11111111 | — |
| | 10011101 01 | 00000000 | |
| | 10011101 10 | 00000000 | |
| | 10011101 11 | 00000000 | |
| 158 | 10011110 00 | 11111111 | — |
| | 10011110 01 | 00000000 | |
| | 10011110 11 | 00000000 | |
| 159 | 10011111 00 | 11111111 | — |
| | 10011111 01 | 00000000 | |
| | 10011111 10 | 00000000 | |
| | 10011111 11 | 00000000 | |
| 160 | 10100000 00 | 11111111 | — |
| | 10100000 01 | 00000000 | |
| | 10100000 10 | 00000000 | |
| | 10100000 11 | 00000000 | |
| 161 | 10100001 00 | 11111111 | — |
| | 10100001 01 | 00000000 | |
| | 10100001 10 | 00000000 | |
| | 10100001 11 | 00000000 | |
| 162 | 10100010 00 | 11111111 | — |
| | 10100010 01 | 00000000 | |
| | 10100010 10 | 00000000 | |
| | 10100010 11 | 00000000 | |
| 163 | 10100011 00 | 11111111 | — |
| | 10100011 01 | 00000000 | |
| | 10100011 11 | 00000000 | |
| 164 | 10100100 00 | 10010111 | SLUG |
| | 10100100 01 | 00101000 | |
| | 10100100 10 | 00000100 | |
| | 10100100 11 | 10000000 | |
| 165 | 10100101 00 | 11111111 | — |
| | 10100101 01 | 00000000 | |
| | 10100101 10 | 00000000 | |
| | 10100101 11 | 00000000 | |
| 166 | 10100110 00 | 11111111 | — |
| | 10100110 01 | 00000000 | |
| | 10100110 10 | 00000000 | |
| | 10100110 11 | 00000000 | |
| 167 | 10100111 00 | 11111111 | — |
| | 10100111 01 | 00000000 | |
| | 10100111 10 | 00000000 | |
| | 10100111 11 | 00000000 | |
| 168 | 10101000 00 | 00101000 | OZFL |
| | 10101000 01 | 00000001 | |
| | 10101000 10 | 00010110 | |
| | 10101000 11 | 10000000 | |

TABLE 8

Read-only memory for prefixes

| ordinal number | address | contents | remark |
|---|---|---|---|
| 0 | 0000000 0 | 11111111 | — |
| | 0000000 1 | 00000000 | |
| 1 | 0000001 0 | 11111111 | — |
| | 0000001 1 | 00000000 | |
| 2 | 0000010 0 | 00000010 | A |
| | 0000010 1 | 10101101 | |
| 3 | 0000011 0 | 11111111 | — |
| | 0000011 1 | 00000000 | |
| 4 | 0000100 0 | 00000100 | N |
| | 0000100 1 | 10110110 | |
| 5 | 0000101 0 | 00010011 | TA |
| | 0000101 1 | 10001100 | |
| 6 | 0000110 0 | 11111111 | — |
| | 0000110 1 | 00000000 | |
| 7 | 0000111 0 | 11111111 | — |
| | 0000111 1 | 00000000 | |
| 8 | 0001000 0 | 11111111 | — |
| | 0001000 1 | 00000000 | |
| 9 | 0001001 0 | 11111111 | — |
| | 0001001 1 | 00000000 | |
| 10 | 0001010 0 | 11111111 | — |
| | 0001010 1 | 00000000 | |
| 11 | 0001011 1 | 11111111 | — |
| | 0001011 1 | 00000000 | |
| 12 | 0001100 0 | 11111111 | — |
| | 0001100 1 | 00000000 | |
| 13 | 0001101 0 | 11111111 | — |
| | 0001101 1 | 00000000 | |
| 14 | 0001110 0 | 00001001 | EX |
| | 0001110 1 | 10010010 | |
| 15 | 0001111 0 | 11111111 | — |
| | 0001111 1 | 00000000 | |
| 16 | 0010000 0 | 11111111 | — |
| | 0010000 1 | 00000000 | |
| 17 | 0010001 0 | 11111111 | — |
| | 0010001 1 | 00000000 | |
| 18 | 0010010 0 | 11111111 | — |
| | 0010010 1 | 00000000 | |
| 19 | 0010011 0 | 00000011 | G |
| | 0010011 1 | 10001001 | |
| 20 | 0010100 0 | 11111111 | — |
| | 0010100 1 | 00000000 | |
| 21 | 0010101 0 | 11111111 | — |
| | 0010101 1 | 00000000 | |
| 22 | 0010110 0 | 11111111 | — |
| | 0010110 1 | 00000000 | |
| 23 | 0010111 0 | 00000111 | H |
| | 0010111 1 | 10000010 | |
| 24 | 0011000 0 | 11111111 | — |
| | 0011000 1 | 00000000 | |
| 25 | 0011001 0 | 11111111 | — |
| | 0011001 1 | 00000000 | |
| 26 | 0011010 0 | 11111111 | — |
| | 0011010 1 | 00000000 | |
| 27 | 0011011 0 | 11111111 | — |
| | 0011011 1 | 00000000 | |
| 28 | 0011100 0 | 11111111 | — |
| | 0011100 1 | 00000000 | |
| 29 | 0011101 0 | 11111111 | — |
| | 0011101 1 | 00000000 | |
| 30 | 0011110 0 | 00000110 | M |
| | 0011110 1 | 10111100 | |
| 31 | 0011111 1 | 11111111 | — |
| | 0011111 1 | 00000000 | |
| 32 | 0100000 0 | 00010110 | MA |
| | 0100000 1 | 10000110 | |
| 33 | 0100001 0 | 11111111 | — |
| | 0100001 1 | 00000000 | |
| 34 | 0100010 0 | 11111111 | — |
| | 0100010 1 | 00000000 | |
| 35 | 0100011 0 | 11111111 | — |
| | 0100011 1 | 00000000 | |
| 36 | 0100100 0 | 11111111 | — |
| | 0100101 1 | 00000000 | |
| 37 | 0100101 0 | 11111111 | — |
| | 0100101 1 | 00000000 | |
| 38 | 0100110 0 | 00000110 | K |
| | 0100110 1 | 01000011 | |

TABLE 8-continued

| | Read-only memory for prefixes | | |
|---|---|---|---|
| ordinal number | address | contents | remark |
| 39 | 0100111 0 | 11111111 | — |
| | 0100111 1 | 00000000 | |
| 40 | 0101000 0 | 11111111 | — |
| | 0101000 1 | 00000000 | |
| 41 | 0101001 0 | 11111111 | — |
| | 0101001 1 | 00000000 | |
| 42 | 0101010 0 | 11111111 | — |
| | 0101010 1 | 00000000 | |
| 43 | 0101011 0 | 11111111 | — |
| | 0101011 1 | 00000000 | |
| 44 | 0101100 0 | 11111111 | — |
| | 0101100 1 | 00000000 | |
| 45 | 0101101 0 | 11111111 | — |
| | 0101101 1 | 00000000 | |
| 46 | 0101110 0 | 11111111 | — |
| | 0101110 1 | 00000000 | |
| 47 | 0101111 0 | 11111111 | — |
| | 0101111 1 | 00000000 | |
| 48 | 0110000 0 | 11111111 | — |
| | 0110000 1 | 00000000 | |
| 49 | 0110001 0 | 00000001 | F |
| | 0110001 1 | 10110000 | |
| 50 | 0110010 0 | 11111111 | — |
| | 0110010 1 | 00000000 | |
| 51 | 0110011 0 | 11111111 | — |
| | 0110011 1 | 00000000 | |
| 52 | 0110100 0 | 11111111 | — |
| | 0110100 1 | 00000000 | |
| 53 | 0110101 0 | 00011010 | PT |
| | 0110101 1 | 10001111 | |
| 54 | 0110110 0 | 11111111 | — |
| | 0110110 1 | 00000000 | |
| 55 | 0110111 0 | 11111111 | — |
| | 0110111 1 | 00000000 | |
| 56 | 0111000 0 | 11111111 | — |
| | 0111000 1 | 00000000 | |
| 57 | 0111001 0 | 11111111 | — |
| | 0111001 1 | 00000000 | |
| 58 | 0111010 0 | 11111111 | — |
| | 0111010 1 | 00000000 | |
| 59 | 0111011 0 | 00000011 | C |
| | 0111011 1 | 10111101 | |
| 60 | 0111100 0 | 11111111 | — |
| | 0111100 1 | 00000000 | |
| 61 | 0111101 0 | 11111111 | — |
| | 0111101 1 | 00000000 | |
| 62 | 0111110 0 | 00000110 | D |
| | 0111110 1 | 10111110 | |
| 63 | 0111111 0 | 11111111 | — |
| | 0111111 1 | 00000000 | |
| 64 | 1000000 0 | 00010110 | DA |
| | 1000000 1 | 10000001 | |
| 65 | 1000001 0 | 11111111 | — |
| | 1000001 1 | 00000000 | |
| 66 | 1000010 0 | 11111111 | — |
| | 1000010 1 | 00000000 | |
| 67 | 1000011 0 | 11111111 | — |
| | 1000011 1 | 00000000 | |
| 68 | 1000100 0 | 11111111 | — |
| | 1000100 1 | 00000000 | |
| 69 | 1000101 0 | 11111111 | — |
| | 1000101 1 | 00000000 | |
| 70 | 1000110 0 | 11111111 | — |
| | 1000110 1 | 00000000 | |
| 71 | 1000111 0 | 11111111 | — |
| | 1000111 1 | 00000000 | |
| 72 | 1001000 0 | 11111111 | — |
| | 1001000 1 | 00000000 | |
| 73 | 1001001 0 | 11111111 | — |
| | 1001001 1 | 00000000 | |
| 74 | 1001010 0 | 11111111 | — |
| | 1001010 1 | 00000000 | |
| 75 | 1001011 0 | 11111111 | — |
| | 1001011 1 | 00000000 | |
| 76 | 1001100 0 | 11111111 | — |
| | 1001100 1 | 00000000 | |
| 77 | 1001101 0 | 11111111 | — |
| | 1001101 1 | 00000000 | |

TABLE 8-continued

| | Read-only memory for prefixes | | |
|---|---|---|---|
| ordinal number | address | contents | remark |
| 78 | 1001110 0 | 11111111 | — |
| | 1001110 0 | 00000000 | |
| 79 | 1001111 0 | 11111111 | — |
| | 1001111 1 | 00000000 | |
| 80 | 1010000 0 | 11111111 | — |
| | 1010000 1 | 00000000 | |
| 81 | 1010001 0 | 11111111 | — |
| | 1010001 1 | 00000000 | |
| 82 | 1010010 0 | 11111111 | — |
| | 1010010 1 | 00000000 | |
| 83 | 1010011 0 | 11111111 | — |
| | 1010011 1 | 00000000 | |
| 84 | 1010100 0 | 11111111 | — |
| | 1010100 1 | 00000000 | |
| 85 | 1010101 0 | 11111111 | — |
| | 1010101 1 | 00000000 | |
| 86 | 1010110 0 | 11111111 | — |
| | 1010110 1 | 00000000 | |
| 87 | 1010111 0 | 11111111 | — |
| | 1010111 1 | 00000000 | |
| 88 | 1011000 0 | 00010010 | PK |
| | 1011000 1 | 10110011 | |
| 89 | 1011001 0 | 11111111 | — |
| | 1011001 1 | 00000000 | |
| 90 | 1011010 0 | 11111111 | — |
| | 1011010 1 | 00000000 | |
| 91 | 1011011 0 | 11111111 | — |
| | 1011011 1 | 00000000 | |
| 92 | 1011100 0 | 11111111 | — |
| | 1011100 1 | 00000000 | |
| 93 | 1011101 0 | 11111111 | — |
| | 1011101 1 | 00000000 | |
| 94 | 1011110 0 | 11111111 | — |
| | 1011110 1 | 00000000 | |
| 95 | 1011111 0 | 11111111 | — |
| | 1011111 1 | 00000000 | |
| 96 | 1100000 0 | 11111111 | — |
| | 1100000 1 | 00000000 | |
| 97 | 1100001 0 | 11111111 | — |
| | 1100001 1 | 00000000 | |
| 98 | 1100010 0 | 11111111 | — |
| | 1100010 1 | 00000000 | |
| 99 | 1100011 0 | 00001101 | MY |
| | 1100011 1 | 10111001 | |

TABLE 9

| | Read-only memory for numeric values | | |
|---|---|---|---|
| ordinal number | address | contents | remark |
| 0 | 0 000000 000 | 0001 | |
| | 0 000000 001 | 0000 | |
| | 0 000000 010 | 0000 | |
| | 0 000000 011 | 0000 | |
| | 0 000000 100 | 0000 | |
| | 0 000000 101 | 0000 | |
| | 0 000000 110 | 0000 | |
| | 0 000000 111 | 0000 | |
| 1 | 0 000001 000 | 0101 | OZFL (US) |
| | 0 000001 001 | 0011 | |
| | 0 000001 010 | 0111 | |
| | 0 000001 011 | 0101 | |
| | 0 000001 100 | 1001 | |
| | 0 000001 101 | 0010 | |
| | 0 000001 110 | 0101 | |
| | 0 000001 111 | 1111 | |
| 2 | 0 000010 000 | 0001 | PINT (US) |
| | 0 000010 001 | 0001 | |
| | 0 000010 010 | 0110 | |
| | 0 000010 011 | 0001 | |
| | 0 000010 100 | 0101 | |
| | 0 000010 101 | 0101 | |
| | 0 000010 110 | 0110 | |
| | 0 000010 111 | 1111 | |
| 3 | 0 000011 000 | 0010 | QT (US) |
| | 0 000011 001 | 0010 | |
| | 0 000011 010 | 0001 | |

TABLE 9-continued

Read-only memory for numeric values

| ordinal number | address | contents | remark |
|---|---|---|---|
| | 0 000011 011 | 0000 | |
| | 0 000011 100 | 0001 | |
| | 0 000011 101 | 0001 | |
| | 0 000011 110 | 0111 | |
| | 0 000011 111 | 1111 | |
| 4 | 0 000100 000 | 0001 | GALL (US) |
| | 0 000100 001 | 0100 | |
| | 0 000100 010 | 0101 | |
| | 0 000100 011 | 1000 | |
| | 0 000100 100 | 0111 | |
| | 0 000100 101 | 0011 | |
| | 0 000100 110 | 0111 | |
| | 0 000100 111 | 1111 | |
| 5 | 0 000101 000 | 0001 | BU (US) |
| | 0 000101 001 | 1001 | |
| | 0 000101 010 | 0011 | |
| | 0 000101 011 | 0010 | |
| | 0 000101 100 | 0101 | |
| | 0 000101 101 | 0011 | |
| | 0 000101 110 | 1000 | |
| | 0 000101 111 | 1111 | |
| 6 | 0 000110 000 | 1001 | HPW (metric) |
| | 0 000110 001 | 1001 | |
| | 0 000110 010 | 0100 | |
| | 0 000110 011 | 0101 | |
| | 0 000110 100 | 0011 | |
| | 0 000110 101 | 0111 | |
| | 0 000110 110 | 1100 | |
| | 0 000110 111 | 1111 | |
| 7 | 0 000111 000 | 0000 | NTMI (metric) |
| | 0 000111 001 | 0000 | |
| | 0 000111 010 | 0010 | |
| | 0 000111 011 | 0101 | |
| | 0 000111 100 | 1000 | |
| | 0 000111 101 | 0001 | |
| | 0 000111 110 | 1101 | |
| | 0 000111 111 | 1111 | |
| 8 | 0 001000 000 | 0001 | |
| | 0 001000 001 | 0000 | |
| | 0 001000 010 | 0000 | |
| | 0 001000 011 | 0000 | |
| | 0 001000 100 | 0000 | |
| | 0 001000 101 | 0000 | |
| | 0 001000 110 | 0000 | |
| | 0 001000 111 | 0000 | |
| 9 | 0 001001 000 | 0111 | U |
| | 0 001001 001 | 0101 | |
| | 0 001001 010 | 0000 | |
| | 0 001001 011 | 0110 | |
| | 0 001001 100 | 0110 | |
| | 0 001001 101 | 0001 | |
| | 0 001001 110 | 1111 | |
| | 0 001001 111 | 1101 | |
| 10 | 0 001010 000 | 1001 | EV |
| | 0 001010 001 | 0001 | |
| | 0 001010 010 | 0010 | |
| | 0 001010 011 | 0000 | |
| | 0 001010 100 | 0110 | |
| | 0 001010 101 | 0001 | |
| | 0 001010 110 | 0111 | |
| | 0 001010 111 | 1110 | |
| 11 | 0 001011 000 | 0110 | XE |
| | 0 001011 001 | 0000 | |
| | 0 001011 010 | 0010 | |
| | 0 001011 011 | 0000 | |
| | 0 001011 100 | 0000 | |
| | 0 001011 101 | 0001 | |
| | 0 001011 110 | 1101 | |
| | 0 001011 111 | 1110 | |
| 12 | 0 001100 000 | 0100 | SEC |
| | 0 001100 001 | 0001 | |
| | 0 001100 010 | 1000 | |
| | 0 001100 011 | 0100 | |
| | 0 001100 100 | 1000 | |
| | 0 001100 101 | 0100 | |
| | 0 001100 110 | 0100 | |
| | 0 001100 111 | 1111 | |
| 13 | 0 001101 000 | 1001 | GR |
| | 0 001101 001 | 1000 | |

TABLE 9-continued

Read-only memory for numeric values

| ordinal number | address | contents | remark |
|---|---|---|---|
| | 0 001101 010 | 1001 | |
| | 0 001101 011 | 0111 | |
| | 0 001101 100 | 0100 | |
| | 0 001101 101 | 0110 | |
| | 0 001101 110 | 0101 | |
| | 0 001101 111 | 1111 | |
| 14 | 0 001110 000 | 1000 | MNT |
| | 0 001110 001 | 1000 | |
| | 0 001110 010 | 1000 | |
| | 0 001110 011 | 0000 | |
| | 0 001110 100 | 1001 | |
| | 0 001110 101 | 0010 | |
| | 0 001110 110 | 0110 | |
| | 0 001110 111 | 1111 | |
| 15 | 0 001111 000 | 0000 | ROE |
| | 0 001111 001 | 0000 | |
| | 0 001111 010 | 0000 | |
| | 0 001111 011 | 1000 | |
| | 0 001111 100 | 0101 | |
| | 0 001111 101 | 0010 | |
| | 0 001111 110 | 0110 | |
| | 0 001111 111 | 1111 | |
| 16 | 0 010000 000 | 0000 | KAR |
| | 0 010000 001 | 0000 | |
| | 0 010000 010 | 0000 | |
| | 0 010000 011 | 0000 | |
| | 0 010000 100 | 0000 | |
| | 0 010000 101 | 0010 | |
| | 0 010000 110 | 0110 | |
| | 0 010000 111 | 1111 | |
| 17 | 0 010001 000 | 0101 | P |
| | 0 010001 001 | 0110 | |
| | 0 010001 010 | 0110 | |
| | 0 010001 011 | 0001 | |
| | 0 010001 100 | 1000 | |
| | 0 010001 101 | 1001 | |
| | 0 010001 110 | 0111 | |
| | 0 010001 111 | 1111 | |
| 18 | 0 010010 000 | 0111 | PECK |
| | 0 010010 001 | 0111 | |
| | 0 010010 010 | 1001 | |
| | 0 010010 011 | 0000 | |
| | 0 010010 100 | 1000 | |
| | 0 010010 101 | 1000 | |
| | 0 010010 110 | 0111 | |
| | 0 010010 111 | 1111 | |
| 19 | 0 010011 000 | 0111 | PWT |
| | 0 010011 001 | 0001 | |
| | 0 010011 010 | 0101 | |
| | 0 010011 011 | 0101 | |
| | 0 010011 100 | 0101 | |
| | 0 010011 101 | 0001 | |
| | 0 010011 110 | 0111 | |
| | 0 010011 111 | 1111 | |
| 20 | 0 010100 000 | 0000 | DRAM |
| | 0 010100 001 | 0000 | |
| | 0 010100 010 | 0010 | |
| | 0 010100 011 | 0111 | |
| | 0 010100 100 | 0111 | |
| | 0 010100 101 | 0001 | |
| | 0 010100 110 | 0111 | |
| | 0 010100 111 | 1111 | |
| 21 | 0 010101 000 | 0100 | GILL |
| | 0 010101 001 | 1001 | |
| | 0 010101 010 | 0010 | |
| | 0 010101 011 | 1000 | |
| | 0 010101 100 | 0001 | |
| | 0 010101 101 | 0001 | |
| | 0 010101 110 | 0111 | |
| | 0 010101 111 | 1111 | |
| 22 | 0 010110 000 | 0101 | OZTR |
| | 0 010110 001 | 0011 | |
| | 0 010110 010 | 0000 | |
| | 0 010110 011 | 0001 | |
| | 0 010110 100 | 0001 | |
| | 0 010110 101 | 0011 | |
| | 0 010110 110 | 1000 | |
| | 0 010110 111 | 1111 | |
| 23 | 0 010111 000 | 0101 | OZ |

TABLE 9-continued

Read-only memory for numeric values

| ordinal number | address | contents | remark |
|---|---|---|---|
| | 0 010111 001 | 1001 | |
| | 0 010111 010 | 0100 | |
| | 0 010111 011 | 0011 | |
| | 0 010111 100 | 1000 | |
| | 0 010111 101 | 0010 | |
| | 0 010111 110 | 1000 | |
| | 0 010111 111 | 1111 | |
| 24 | 0 011000 000 | 0000 | INCH |
| | 0 011000 001 | 0000 | |
| | 0 011000 010 | 0000 | |
| | 0 011000 011 | 0100 | |
| | 0 011000 100 | 0101 | |
| | 0 011000 101 | 0010 | |
| | 0 011000 110 | 1000 | |
| | 0 011000 111 | 1111 | |
| 25 | 0 011001 000 | 0011 | DEG |
| | 0 011001 001 | 0011 | |
| | 0 011001 010 | 0101 | |
| | 0 011001 011 | 0100 | |
| | 0 011001 100 | 0111 | |
| | 0 011001 101 | 0001 | |
| | 0 011001 110 | 1000 | |
| | 0 011001 111 | 1111 | |
| 26 | 0 011010 000 | 0000 | GON |
| | 0 011010 001 | 1000 | |
| | 0 011010 010 | 0000 | |
| | 0 011010 011 | 0111 | |
| | 0 011010 100 | 0101 | |
| | 0 011010 101 | 0001 | |
| | 0 011010 110 | 1000 | |
| | 0 011010 111 | 1111 | |
| 27 | 0 011011 000 | 0000 | YD |
| | 0 011011 001 | 0000 | |
| | 0 011011 010 | 0100 | |
| | 0 011011 011 | 0100 | |
| | 0 011011 100 | 0001 | |
| | 0 011011 101 | 1001 | |
| | 0 011011 110 | 1001 | |
| | 0 011011 111 | 1111 | |
| 28 | 0 011100 000 | 0100 | KNT |
| | 0 011100 001 | 0100 | |
| | 0 011100 010 | 0100 | |
| | 0 011100 011 | 0100 | |
| | 0 011100 100 | 0001 | |
| | 0 011100 101 | 0101 | |
| | 0 011100 110 | 1001 | |
| | 0 011100 111 | 1111 | |
| 29 | 0 011101 000 | 0010 | LB |
| | 0 011101 001 | 1001 | |
| | 0 011101 010 | 0101 | |
| | 0 011101 011 | 0011 | |
| | 0 011101 100 | 0101 | |
| | 0 011101 101 | 0100 | |
| | 0 011101 110 | 1001 | |
| | 0 011101 111 | 1111 | |
| 30 | 0 011110 000 | 0000 | FOOT |
| | 0 011110 001 | 0000 | |
| | 0 011110 010 | 1000 | |
| | 0 011110 011 | 0100 | |
| | 0 011110 100 | 0000 | |
| | 0 011110 101 | 0011 | |
| | 0 011110 110 | 1001 | |
| | 0 011110 111 | 1111 | |
| 31 | 0 011111 000 | 0000 | CRAN |
| | 0 011111 001 | 0000 | |
| | 0 011111 010 | 0101 | |
| | 0 011111 011 | 0000 | |
| | 0 011111 100 | 0111 | |
| | 0 011111 101 | 0001 | |
| | 0 011111 110 | 1001 | |
| | 0 011111 111 | 1111 | |
| 32 | 0 100000 000 | 0111 | BBL |
| | 0 100000 001 | 1000 | |
| | 0 100000 010 | 1001 | |
| | 0 100000 011 | 1000 | |
| | 0 100000 100 | 0101 | |
| | 0 100000 101 | 0001 | |
| | 0 100000 110 | 1001 | |
| | 0 100000 111 | 1111 | |

TABLE 9-continued

Read-only memory for numeric values

| ordinal number | address | contents | remark |
|---|---|---|---|
| 33 | 0 100001 000 | 0101 | PDL |
| | 0 100001 001 | 0101 | |
| | 0 100001 010 | 0010 | |
| | 0 100001 011 | 1000 | |
| | 0 100001 100 | 0011 | |
| | 0 100001 101 | 0001 | |
| | 0 100001 110 | 1001 | |
| | 0 100001 111 | 1111 | |
| 34 | 0 100010 000 | 0000 | HAND |
| | 0 100010 001 | 0000 | |
| | 0 100010 010 | 0110 | |
| | 0 100010 011 | 0001 | |
| | 0 100010 100 | 0000 | |
| | 0 100010 101 | 0001 | |
| | 0 100010 110 | 1001 | |
| | 0 100010 111 | 1111 | |
| 35 | 0 100011 000 | 0000 | FATH |
| | 0 100011 001 | 1000 | |
| | 0 100011 010 | 1000 | |
| | 0 100011 011 | 0010 | |
| | 0 100011 100 | 1000 | |
| | 0 100011 101 | 0001 | |
| | 0 100011 110 | 1010 | |
| | 0 100011 111 | 1111 | |
| 36 | 0 100100 000 | 0000 | CAL |
| | 0 100100 001 | 1000 | |
| | 0 100100 010 | 0110 | |
| | 0 100100 011 | 1000 | |
| | 0 100100 100 | 0001 | |
| | 0 100100 101 | 0100 | |
| | 0 100100 110 | 1010 | |
| | 0 100100 111 | 1111 | |
| 37 | 0 100101 000 | 0010 | LBF |
| | 0 100101 001 | 0010 | |
| | 0 100101 010 | 1000 | |
| | 0 100101 011 | 0100 | |
| | 0 100101 100 | 0100 | |
| | 0 100101 101 | 0100 | |
| | 0 100101 110 | 1010 | |
| | 0 100101 111 | 1111 | |
| 38 | 0 100110 000 | 0000 | STON |
| | 0 100110 001 | 0000 | |
| | 0 100110 010 | 0000 | |
| | 0 100110 011 | 0101 | |
| | 0 100110 100 | 0011 | |
| | 0 100110 101 | 0110 | |
| | 0 100110 110 | 1010 | |
| | 0 100110 111 | 1111 | |
| 39 | 0 100111 000 | 0000 | QR |
| | 0 100111 001 | 0000 | |
| | 0 100111 010 | 0000 | |
| | 0 100111 011 | 0111 | |
| | 0 100111 100 | 0010 | |
| | 0 100111 101 | 0001 | |
| | 0 100111 110 | 1011 | |
| | 0 100111 111 | 1111 | |
| 40 | 0 101000 000 | 1001 | SLUG |
| | 0 101000 001 | 0011 | |
| | 0 101000 010 | 1001 | |
| | 0 101000 011 | 0101 | |
| | 0 101000 100 | 0100 | |
| | 0 101000 101 | 0001 | |
| | 0 101000 110 | 1011 | |
| | 0 101000 111 | 1111 | |
| 41 | 0 101001 000 | 0100 | CWT |
| | 0 101001 001 | 0010 | |
| | 0 101001 010 | 0000 | |
| | 0 101001 011 | 1000 | |
| | 0 101001 100 | 0000 | |
| | 0 101001 101 | 0101 | |
| | 0 101001 110 | 1011 | |
| | 0 101001 111 | 1111 | |
| 42 | 0 101010 000 | 0000 | MIN |
| | 0 101010 001 | 0000 | |
| | 0 101010 010 | 0000 | |
| | 0 101010 011 | 0000 | |
| | 0 101010 100 | 0000 | |
| | 0 101010 101 | 0110 | |
| | 0 101010 110 | 1011 | |

TABLE 9-continued

Read-only memory for numeric values

| ordinal number | address | contents | remark |
|---|---|---|---|
| | 0 101010 111 | 1111 | |
| 43 | 0 101011 000 | 0010 | TORR |
| | 0 101011 001 | 0010 | |
| | 0 101011 010 | 0011 | |
| | 0 101011 011 | 0011 | |
| | 0 101011 100 | 0011 | |
| | 0 101011 101 | 0001 | |
| | 0 101011 110 | 1100 | |
| | 0 101011 111 | 1111 | |
| 44 | 0 101100 000 | 0001 | ROOD |
| | 0 101100 001 | 0111 | |
| | 0 101100 010 | 0001 | |
| | 0 101100 011 | 0001 | |
| | 0 101100 100 | 0000 | |
| | 0 101100 101 | 0001 | |
| | 0 101100 110 | 1101 | |
| | 0 101100 111 | 1111 | |
| 45 | 0 101101 000 | 0101 | TON |
| | 0 101101 001 | 0000 | |
| | 0 101101 010 | 0110 | |
| | 0 101101 011 | 0001 | |
| | 0 101101 100 | 0000 | |
| | 0 101101 101 | 0001 | |
| | 0 101101 110 | 1101 | |
| | 0 101101 111 | 1111 | |
| 46 | 0 101110 000 | 0110 | BTU |
| | 0 101110 001 | 0000 | |
| | 0 101110 010 | 0101 | |
| | 0 101110 011 | 0101 | |
| | 0 101110 100 | 0000 | |
| | 0 101110 101 | 0001 | |
| | 0 101110 110 | 1101 | |
| | 0 101110 111 | 1111 | |
| 47 | 0 101111 000 | 0100 | MI |
| | 0 101111 001 | 0011 | |
| | 0 101111 010 | 1001 | |
| | 0 101111 011 | 0000 | |
| | 0 101111 100 | 0110 | |
| | 0 101111 101 | 0001 | |
| | 0 101111 110 | 1101 | |
| | 0 101111 111 | 1111 | |
| 48 | 0 110000 000 | 0000 | HR |
| | 0 110000 001 | 0000 | |
| | 0110000 010 | 0000 | |
| | 0 110000 011 | 0000 | |
| | 0 110000 100 | 0110 | |
| | 0 110000 101 | 0011 | |
| | 0 110000 110 | 1101 | |
| | 0 110000 111 | 1111 | |
| 49 | 0 110001 000 | 0110 | ACRE |
| | 0 110001 001 | 1000 | |
| | 0 110001 010 | 0110 | |
| | 0 110001 011 | 0100 | |
| | 0 110001 100 | 0000 | |
| | 0 110001 101 | 0100 | |
| | 0 110001 110 | 1101 | |
| | 0 110001 111 | 1111 | |
| 50 | 0 110010 000 | 0101 | MWS |
| | 0 110010 001 | 0110 | |
| | 0 110010 010 | 0110 | |
| | 0 110010 011 | 0000 | |
| | 0 110010 100 | 1000 | |
| | 0 110010 101 | 1001 | |
| | 0 110010 110 | 1101 | |
| | 0 110010 111 | 1111 | |
| 51 | 0 110011 000 | 0000 | TONF |
| | 0 110011 001 | 0000 | |
| | 0 110011 010 | 0100 | |
| | 0 110011 011 | 0110 | |
| | 0 110011 100 | 1001 | |
| | 0 110011 101 | 1001 | |
| | 0 110011 110 | 1101 | |
| | 0 110011 111 | 1111 | |
| 52 | 0 110100 000 | 0000 | LGY |
| | 0 110100 001 | 0000 | |
| | 0 110100 010 | 0000 | |
| | 0 110100 011 | 1001 | |
| | 0 110100 100 | 0001 | |
| | 0 110100 101 | 0100 | |

TABLE 9-continued

Read-only memory for numeric values

| ordinal number | address | contents | remark |
|---|---|---|---|
| | 0 110100 110 | 1110 | |
| | 0 110100 111 | 1111 | |
| 53 | 0 110101 000 | 0000 | DI |
| | 0 110101 001 | 0000 | |
| | 0 110101 010 | 0000 | |
| | 0 110101 011 | 0100 | |
| | 0 110101 100 | 0110 | |
| | 0 110101 101 | 1000 | |
| | 0 110101 110 | 1110 | |
| | 0 110101 111 | 1111 | |
| 54 | 0 110110 000 | 0101 | ATT |
| | 0 110110 001 | 0110 | |
| | 0 110110 010 | 0110 | |
| | 0 110110 011 | 0000 | |
| | 0 110110 100 | 1000 | |
| | 0 110110 101 | 1001 | |
| | 0 110110 110 | 1110 | |
| | 0 110110 111 | 1111 | |
| 55 | 0 110111 000 | 0101 | ATM |
| | 0 110111 001 | 0010 | |
| | 0 110111 010 | 0011 | |
| | 0 110111 011 | 0001 | |
| | 0 110111 100 | 0000 | |
| | 0 110111 101 | 0001 | |
| | 0 110111 110 | 0000 | |
| | 0 110111 111 | 0000 | |
| 56 | 0 111000 000 | 0010 | NHG |
| | 0 111000 001 | 0010 | |
| | 0 111000 010 | 0011 | |
| | 0 111000 011 | 0011 | |
| | 0 111000 100 | 0011 | |
| | 0 111000 101 | 0001 | |
| | 0 111000 110 | 0000 | |
| | 0 111000 111 | 0000 | |
| 57 | 0 111001 000 | 0000 | SEP |
| | 0 111001 010 | 1000 | |
| | 0 111001 011 | 0100 | |
| | 0 111001 100 | 0000 | |
| | 0 111001 101 | 0110 | |
| | 0 111001 110 | 0000 | |
| | 0 111001 111 | 0000 | |
| 58 | 0 111010 000 | 0000 | MEN |
| | 0 111010 001 | 0000 | |
| | 0 111010 010 | 1000 | |
| | 0 111010 011 | 0010 | |
| | 0 111010 100 | 0110 | |
| | 0 111010 101 | 0010 | |
| | 0 111010 110 | 0001 | |
| | 0 111010 111 | 0000 | |
| 59 | 0 111011 000 | 0000 | ANN |
| | 0 111011 001 | 0110 | |
| | 0 111011 010 | 0011 | |
| | 0 111011 011 | 0101 | |
| | 0 111011 100 | 0001 | |
| | 0 111011 101 | 0011 | |
| | 0 111011 110 | 0010 | |
| | 0 111011 111 | 0000 | |
| 60 | 0 111100 000 | 0000 | CI |
| | 0 111100 001 | 0000 | |
| | 0 111100 010 | 0000 | |
| | 0 111100 011 | 0000 | |
| | 0 111100 100 | 0111 | |
| | 0 111100 101 | 0011 | |
| | 0 111100 110 | 0101 | |
| | 0 111100 111 | 0000 | |
| 61 | 0 111101 000 | 1000 | AUT |
| | 0 111101 001 | 1001 | |
| | 0 111101 010 | 0101 | |
| | 0 111101 011 | 1001 | |
| | 0 111101 100 | 0100 | |
| | 0 111101 101 | 0001 | |
| | 0 111101 110 | 0110 | |
| | 0 111101 111 | 0000 | |
| 62 | 0 111110 000 | 0101 | LY |
| | 0 111110 001 | 0101 | |
| | 0 111110 010 | 0000 | |
| | 0 111110 011 | 0010 | |
| | 0 111110 100 | 0100 | |
| | 0 111110 101 | 1001 | |

TABLE 9-continued

| ordinal number | Read-only memory for numeric values address | contents | remark |
|---|---|---|---|
| | 0 111110 110 | 1010 | |
| | 0 111110 111 | 0000 | |
| 63 | 0 111111 000 | 0100 | PAR |
| | 0 111111 001 | 0111 | |
| | 0 111111 010 | 0011 | |
| | 0 111111 011 | 1000 | |
| | 0 111111 100 | 0000 | |
| | 0 111111 101 | 0011 | |
| | 0 111111 110 | 1011 | |
| | 0 111111 111 | 0000 | |
| 64 | 1 000000 000 | 0001 | |
| | 1 000000 001 | 0000 | |
| | 1 000000 010 | 0000 | |
| | 1 000000 011 | 0000 | |
| | 1 000000 100 | 0000 | |
| | 1 000000 101 | 0000 | |
| | 1 000000 110 | 0000 | |
| | 1 000000 111 | 0000 | |
| 65 | 1 000001 000 | 0001 | OZFL (UK) |
| | 1 000001 001 | 0011 | |
| | 1 000001 010 | 0001 | |
| | 1 000001 011 | 0100 | |
| | 1 000001 100 | 1000 | |
| | 1 000001 101 | 0010 | |
| | 1 000001 110 | 0101 | |
| | 1 000001 111 | 1111 | |
| 66 | 1 000010 000 | 0000 | PINT (UK) |
| | 1 000010 001 | 0000 | |
| | 1 000010 010 | 0011 | |
| | 1 000010 011 | 1000 | |
| | 1 000010 100 | 0110 | |
| | 1 000010 101 | 0101 | |
| | 1 000010 110 | 0110 | |
| | 1 000010 111 | 1111 | |
| 67 | 1 000011 000 | 0000 | QT (UK) |
| | 1 000011 001 | 0000 | |
| | 1 000011 010 | 0111 | |
| | 1 000011 011 | 0011 | |
| | 1 000011 100 | 0001 | |
| | 1 000011 101 | 0001 | |
| | 1 000011 110 | 0110 | |
| | 1 000011 111 | 1111 | |
| 68 | 1 000100 000 | 1001 | GALL (UK) |
| | 1 000100 001 | 0000 | |
| | 1 000100 010 | 0110 | |
| | 1 000100 011 | 0100 | |
| | 1 000100 100 | 0101 | |
| | 1 000100 101 | 0100 | |
| | 1 000100 110 | 0111 | |
| | 1 000100 111 | 1111 | |
| 69 | 1 000101 000 | 0000 | BU (UK) |
| | 1 000101 001 | 0000 | |
| | 1 000101 010 | 0111 | |
| | 1 000101 011 | 0011 | |
| | 1 000101 100 | 0110 | |
| | 1 000101 101 | 0011 | |
| | 1 000101 110 | 1000 | |
| | 1 000101 111 | 1111 | |
| 70 | 1 000110 000 | 0000 | HPW (UK) |
| | 1 000110 001 | 0000 | |
| | 1 000110 010 | 0111 | |
| | 1 000110 011 | 0101 | |
| | 1 000110 100 | 0100 | |
| | 1 000110 101 | 0111 | |
| | 1 000110 110 | 1100 | |
| | 1 000110 111 | 1111 | |
| 71 | 1 000111 000 | 1000 | NTMI (UK) |
| | 1 000111 001 | 0001 | |
| | 1 000111 010 | 0011 | |
| | 1 000111 011 | 0101 | |
| | 1 000111 100 | 1000 | |
| | 1 000111 101 | 0001 | |
| | 1 000111 110 | 1101 | |
| | 1 000111 111 | 1111 | |

TABLE 10

| ordinal number | Read-only memory for groups of exponents to base units address | contents | remark |
|---|---|---|---|
| 0 | 00000 000 | 1000 | CD.SR |
| | 00000 001 | 1000 | |
| | 00000 010 | 1000 | |
| | 00000 011 | 1000 | |
| | 00000 100 | 1000 | |
| | 00000 101 | 0001 | |
| | 00000 110 | 0001 | |
| | 00000 111 | 1000 | |
| 1 | 00001 000 | 0001 | S |
| | 00001 001 | 1000 | |
| | 00001 010 | 1000 | |
| | 00001 011 | 1000 | |
| | 00001 100 | 1000 | |
| | 00001 101 | 1000 | |
| | 00001 110 | 1000 | |
| | 00001 111 | 1000 | |
| 2 | 00010 000 | 1000 | M |
| | 00010 001 | 0001 | |
| | 00010 010 | 1000 | |
| | 00010 011 | 1000 | |
| | 00010 100 | 1000 | |
| | 00010 101 | 1000 | |
| | 00010 110 | 1000 | |
| | 00010 111 | 1000 | |
| 3 | 00011 000 | 1000 | |
| | 00011 001 | 1000 | |
| | 00011 010 | 0001 | |
| | 00011 011 | 1000 | |
| | 00011 100 | 1000 | |
| | 00011 101 | 1000 | |
| | 00011 110 | 1000 | |
| | 00011 111 | 1000 | |
| 4 | 00100 000 | 1000 | KG |
| | 00100 001 | 1000 | |
| | 00100 010 | 1000 | |
| | 00100 011 | 0001 | |
| | 00100 100 | 1000 | |
| | 00100 101 | 1000 | |
| | 00100 110 | 1000 | |
| | 00100 111 | 1000 | |
| 5 | 00101 000 | 1000 | K |
| | 00101 001 | 1000 | |
| | 00101 010 | 1000 | |
| | 00101 011 | 1000 | |
| | 00101 100 | 0001 | |
| | 00101 101 | 1000 | |
| | 00101 110 | 1000 | |
| | 00101 111 | 1000 | |
| 6 | 00110 000 | 1000 | CD |
| | 00110 001 | 1000 | |
| | 00110 010 | 1000 | |
| | 00110 011 | 1000 | |
| | 00110 100 | 1000 | |
| | 00110 101 | 0001 | |
| | 00110 110 | 1000 | |
| | 00110 111 | 1000 | |
| 7 | 00111 000 | 1000 | SR |
| | 00111 001 | 1000 | |
| | 00111 010 | 1000 | |
| | 00111 011 | 1000 | |
| | 00111 100 | 1000 | |
| | 00111 101 | 1000 | |
| | 00111 110 | 0001 | |
| | 00111 111 | 1000 | |
| 8 | 01000 000 | 1000 | RAD |
| | 01000 001 | 1000 | |
| | 01000 010 | 1000 | |
| | 01000 011 | 1000 | |
| | 01000 100 | 1000 | |
| | 01000 101 | 1000 | |
| | 01000 110 | 1000 | |
| | 01000 111 | 0001 | |
| 9 | 01001 000 | 0001 | S.M |
| | 01001 001 | 0001 | |
| | 01001 010 | 1000 | |
| | 01001 011 | 1000 | |
| | 01001 100 | 1000 | |

TABLE 10-continued

| ordinal number | Read-only memory for groups of exponents to base units address | contents | remark |
|---|---|---|---|
| | 01001 101 | 1000 | |
| | 01001 110 | 1000 | |
| | 01001 111 | 1000 | |
| 10 | 01010 000 | 0001 | S.A |
| | 01010 001 | 1000 | |
| | 01010 010 | 0001 | |
| | 01010 011 | 1000 | |
| | 01010 100 | 1000 | |
| | 01010 101 | 1000 | |
| | 01010 110 | 1000 | |
| | 01010 111 | 1000 | |
| 11 | 01011 000 | 0010 | S2 |
| | 01011 001 | 1000 | |
| | 01011 010 | 1000 | |
| | 01011 011 | 1000 | |
| | 01011 100 | 1000 | |
| | 01011 101 | 1000 | |
| | 01011 110 | 1000 | |
| | 01011 111 | 1000 | |
| 12 | 01100 000 | 0010 | S2.M |
| | 01100 001 | 0001 | |
| | 01100 010 | 1000 | |
| | 01100 011 | 1000 | |
| | 01100 100 | 1000 | |
| | 01100 101 | 1000 | |
| | 01100 110 | 1000 | |
| | 01100 111 | 1000 | |
| 13 | 01101 000 | 0010 | S2.A |
| | 01101 001 | 1000 | |
| | 01101 010 | 0001 | |
| | 01101 011 | 1000 | |
| | 01101 100 | 1000 | |
| | 01101 101 | 1000 | |
| | 01101 110 | 1000 | |
| | 01101 111 | 1000 | |
| 14 | 01110 000 | 0010 | S2.A2 |
| | 01110 001 | 1000 | |
| | 01110 010 | 0010 | |
| | 01110 011 | 1000 | |
| | 01110 100 | 1000 | |
| | 01110 101 | 1000 | |
| | 01110 110 | 1000 | |
| | 01110 111 | 1000 | |
| 15 | 01111 000 | 0011 | S3 |
| | 01111 001 | 1000 | |
| | 01111 010 | 1000 | |
| | 01111 011 | 1000 | |
| | 01111 100 | 1000 | |
| | 01111 101 | 1000 | |
| | 01111 110 | 1000 | |
| | 01111 111 | 1000 | |
| 16 | 10000 000 | 0011 | S3.A |
| | 10000 001 | 1000 | |
| | 10000 010 | 0001 | |
| | 10000 011 | 1000 | |
| | 10000 100 | 1000 | |
| | 10000 101 | 1000 | |
| | 10000 110 | 1000 | |
| | 10000 111 | 1000 | |
| 17 | 10001 000 | 0011 | S3.A2 |
| | 10001 001 | 1000 | |
| | 10001 010 | 0010 | |
| | 10001 011 | 1000 | |
| | 10001 100 | 1000 | |
| | 10001 101 | 1000 | |
| | 10001 110 | 1000 | |
| | 10001 111 | 1000 | |
| 18 | 10010 000 | 0100 | S4.A2 |
| | 10010 001 | 1000 | |
| | 10010 010 | 0010 | |
| | 10010 011 | 1000 | |
| | 10010 100 | 1000 | |
| | 10010 101 | 1000 | |
| | 10010 110 | 1000 | |
| | 10010 111 | 1000 | |
| 19 | 10011 000 | 1000 | M.KG |
| | 10011 001 | 0001 | |

TABLE 10-continued

| ordinal number | Read-only memory for groups of exponents to base units address | contents | remark |
|---|---|---|---|
| | 10011 010 | 1000 | |
| | 10011 011 | 0001 | |
| | 10011 100 | 1000 | |
| | 10011 101 | 1000 | |
| | 10011 110 | 1000 | |
| | 10011 111 | 1000 | |
| 20 | 10100 000 | 1000 | M2 |
| | 10100 001 | 0010 | |
| | 10100 010 | 1000 | |
| | 10100 011 | 1000 | |
| | 10100 100 | 1000 | |
| | 10100 101 | 1000 | |
| | 10100 110 | 1000 | |
| | 10100 111 | 1000 | |
| 21 | 10101 000 | 1000 | M2.KG |
| | 10101 001 | 0010 | |
| | 10101 010 | 1000 | |
| | 10101 011 | 0001 | |
| | 10101 100 | 1000 | |
| | 10101 101 | 1000 | |
| | 10101 110 | 1000 | |
| | 10101 111 | 1000 | |
| 22 | 10110 000 | 1000 | M3 |
| | 10110 001 | 0011 | |
| | 10110 010 | 1000 | |
| | 10110 011 | 1000 | |
| | 10110 100 | 1000 | |
| | 10110 101 | 1000 | |
| | 10110 110 | 1000 | |
| | 10110 111 | 1000 | |

TABLE 11

| ordinal number | Read-only memory for reference units address | contents | remark |
|---|---|---|---|
| 0 | 0000 00 | 10010 | WB |
| | 0000 01 | 00010 | |
| | 0000 10 | 10001 | |
| | 0000 11 | 00001 | |
| 1 | 0001 00 | 10011 | V |
| | 0001 01 | 00010 | |
| | 0001 10 | 10001 | |
| | 0001 11 | 00001 | |
| 2 | 0010 00 | 10010 | H |
| | 0010 01 | 00010 | |
| | 0010 10 | 10010 | |
| | 0010 11 | 00001 | |
| 3 | 0011 00 | 11100 | OHM |
| | 0011 01 | 00010 | |
| | 0011 10 | 11101 | |
| | 0011 11 | 00001 | |
| 4 | 0100 00 | 00011 | SIE |
| | 0100 01 | 11101 | |
| | 0100 10 | 00010 | |
| | 0100 11 | 11110 | |
| 5 | 0101 00 | 00100 | F |
| | 0101 01 | 10010 | |
| | 0101 10 | 00010 | |
| | 0101 11 | 10001 | |
| 6 | 0110 00 | 10010 | T |
| | 0110 01 | 00000 | |
| | 0110 10 | 10001 | |
| | 0110 11 | 00001 | |
| 7 | 0111 00 | 10010 | N |
| | 0111 01 | 00001 | |
| | 0111 10 | 00000 | |
| | 0111 11 | 00001 | |
| 8 | 1000 00 | 10010 | PA |
| | 1000 01 | 10001 | |
| | 1000 10 | 00000 | |
| | 1000 11 | 00001 | |
| 9 | 1001 00 | 10010 | J |
| | 1001 01 | 00010 | |
| | 1001 10 | 00000 | |
| | 1001 11 | 00001 | |

TABLE 11-continued

| | Read-only memory for reference units | | |
|---|---|---|---|
| ordinal number | address | contents | remark |
| 10 | 1010 00 | 10011 | W |
| | 1010 01 | 00010 | |
| | 1010 10 | 00000 | |
| | 1010 11 | 00001 | |
| 11 | 1011 00 | 10010 | GY |
| | 1011 01 | 10001 | |
| | 1011 10 | 00000 | |
| | 1011 11 | 00000 | |
| 12 | 1100 00 | 00001 | C |
| | 1100 01 | 00001 | |
| | 1100 10 | 00000 | |
| | 1100 11 | 00000 | |
| 13 | 1101 00 | 10010 | LX |
| | 1101 01 | 00001 | |
| | 1101 10 | 00001 | |
| | 1101 11 | 00000 | |
| 14 | 1110 00 | 00001 | LM |
| | 1110 01 | 00001 | |
| | 1110 10 | 00000 | |
| | 1110 11 | 00000 | |

What is claimed is:

1. Device for the automated digital transcription and processing of various quantities and units of a defined quantity system of the kind including units of the International System of Units, national units, and other NonInternational System units, wherein each input or output quantity is termed a homoscriptive quantity and has a first portion representing the numerical part of the quantity and a second portion termed a homoscriptive unit representing the unit of measurement in the form of an exponential product of units of the quantity, said device comprising:

- entry and display means including an alphanumeric display and an alphanumeric keyboard connected to the input of a numeric value register for storing the numerical part and to the input of a homoscriptive unit register for storing the homoscriptive unit;
- input transformation means connected to the output of said homoscriptive unit register and cooperating with said keyboard, a calculating assembly, and said numeric value register for transforming said homoscriptive quantity into an internally operable format, termed an autoscriptive quantity, having a first portion for storage in said numeric value register and representing the numerical part of the autoscriptive quantity and a second portion representing the autoscriptive units of the quantity in the form of exponents to base units of the quantity system;
- an autoscriptive unit register connected with the output of said input transformation means for storing the autoscriptive units;
- an exponent-1 register connected with the output of said input transformation means for storing the exponent of the first factor of the exponential product of the homoscriptive unit;
- calculating means selectively operably connected with said numeric value register and a numeric value accumulator for storing the numerical parts of a first and a second autoscriptive quantity and selectively operably connected with said autoscriptive unit register and an autoscriptive unit accumulator for storing the autoscriptive units of the first and the second autoscriptive quantity and being connected with said calculating assembly and connected to be controlled by said keyboard, said calculating means operating to process at least the first autoscriptive quantity to an intermediate result termed a third autoscriptive quantity upon a given signal by said entry means for storing in said numeric value accumulator and said autoscriptive unit accumulator, wherein the numerical part and the autoscriptive unit of the third autoscriptive quantity are processed separately and independently from each other;
- output transformation means connected with said numeric value accumulator, said autoscriptive unit accumulator, and said exponent-1 register and cooperating with said calculating assembly and a prefix generator for transforming the processed autoscriptive quantities into homoscriptive quantities suitable for display by said display means;
- said prefix generator being connected with said calculating assembly, said numeric value accumulator, and said exponent-1 register for generating a prefix in dependence on the contents of said numeric value accumulator and the contents of said exponent-1 register, the output of said prefix generator being connected to said homoscriptive unit register for storing said generated prefix; and
- control means operably connected for controlling and timing the entry, transcription, processing, and display of quantities.

2. The device according to claim 1, wherein said entry means includes an input keyboard having digit keys, letter keys, symbol keys, and operating keys and further comprises a coder means for generating letter codes differing from the outputs of said digit keys and said special symbol keys by a predetermined bit, the output of said coder means being selectively connected through an input discriminator to the input of said numeric value register and the input of said homoscriptive unit register, thereby controlling the storage of a first partial sequence of characters representing the numerical part of the input homoscriptive quantity in said numeric value register and the storage of a second partial sequence of characters in said homoscriptive register, said second partial sequence beginning with a letter and representing the homoscriptive unit of the input homoscriptive quantity in an alphanumeric character sequence, whereby the output of said numeric value register and said homoscriptive unit register can be displayed.

3. The device according to claim 1, wherein said alphanumeric keyboard of said entry means comprises the input keyboard for quantities and commands, and includes at least one pressure-shift key for the input of quantities, said pressure-shift key being arranged for actuation before the entering of a homoscriptive quantity, said actuation continuing until an operational key or another pressure-shift key is activated.

4. The device according to claim 1, wherein said input transformation means comprises:

- a logic network connected between the output of said homoscriptive unit register and the input of a stringed unit register and the input of a factor exponent register to perform a separation of a predetermined character sequence in dependence on the last character transferred and on the next character to be transferred said separation including cyclically separating the homoscriptive unit stored as an exponential product in said homoscriptive unit register into stringed-together units and exponents for storage in said stringed unit register and said exponent register, respectively, the output of said logic network being connected to control an exponent-sign switch, a sign-next factors switch, a factor-end switch, and an analysis-end switch;

an elementary units read-only memory containing specific bit sequences for each elementary unit of a defined large set of elementary units, a prefixes read-only memory containing specific bit sequences for each prefix of a defined set of prefixes, wherein each specific bit sequence begins with a check character and further contains factors for relative addresses for a numeric values read-only memory, containing coefficients of incoherent elementary units, and for an exponents read-only memory containing groups of exponents to base units;

a check code generator, connected with the output of said stringed unit register and containing at least one 1-bit memory for generating at least a first check character from at least one character of said stringed unit register according to a predetermined bit pattern mask, and being further connected with the outputs of said elementary units read-only memory and said prefixes read-only memory to provide one bit marking equality between the generated check characters and the read check characters from said elementary units read-only memory and said prefixes read-only memory;

said calculating assembly being connected with the output of said stringed unit register and being controlled by said check code generator for cyclic determination of code sums to partial letter sequences from the letter sequence store in said stringed unit register for controlling an address register addressing said elementary units read-only memory and said prefixes read-only memory to separate a stringed unit into a prefix and an elementary unit, whereupon said calculating assembly in combination with the said numeric value register, said register for autoscriptive unit, said exponent register, said numeric values read-only memory, and said exponents read-only memory generates the autoscriptive quantity cyclically and in dependence on the status of said exponent-sign switch, said sign-next factors switch, said factor-end switch and said analysis-end switch, as controlled by said logic network.

5. The device according to claim 1, wherein said calculating means comprises a control network connected with said keyboard which includes at least an addition key, a subtraction key, a multiplication key, a division key, a power-raising key, and a root-extracting key, said keys being connected for starting the quantity processing by said calculating assembly, said control network being connected with said numeric value accumulator and said autoscriptive unit accumulator and having a byte-number equal to the number of base units of said quantity system for storing a first autoscriptive quantity and a second autoscriptive quantity and for processing at least one autoscriptive quantity in dependence on a predetermined signal by said entry means to an intermediate third autoscriptive quantity, wherein the numerical part and the autoscriptive unit of said third autoscriptive quantity are processed separately and independently from each other, and said control network being further connected for storage of said third autoscriptive quantity in said numeric value accumulator and in said autoscriptive unit accumulator.

6. The device according to claim 1, wherein said output transformation means for performing a controlled output transformation without qualitative limitation of the quantity stored in said numeric value accumulator and said autoscriptive unit accumulator, comprises:

said calculating assembly connected with the output of said autoscriptive unit accumulator in combination with an address register which determines in cycles a packed numerator unit and a packed denominator unit from the positive and negative numbers stored in said autoscriptive unit accumulator, the results being compounded in a compounder network transforming specified bit sequences for specified large numbers to specified bit sequences for specified small numbers for use as addresses, whereupon a homoscriptive unit is read out from the output of a homoscriptive units read-only memory into said homoscriptive unit register;

a unit generator having an input connected to the output of said autoscriptive unit accumulator and an output connected to the input of said homoscriptive unit register and operating to determine whether said homoscriptive units read-only memory contains a looked for homoscriptive unit and if not for transforming the positive and negative exponents to base units stored in said autoscriptive unit accumulator to a homoscriptive unit in the form of an exponential product of base units for storage in said homoscriptive unit register.

7. The device according to claim 1, wherein said output transformation means performs an optimal output transformation without qualitative limitation of the quantity stored in said numeric value accumulator, and said autoscriptive unit accumulator includes, wherein said transformation means includes said calculating assembly having an input coupled to said autoscriptive unit accumulator containing positive and negative numbers representing an autoscriptive unit to be transformed and being coupled with a unit generator, said unit generator including a reference unit memory containing a first sequence of bit combinations representing derived units of the International System of Units with special names, said reference unit memory including comparator means for performing a second sequence of bit combinations by switching on or switching off single bit combinations of said first sequence of bit combinations and by comparing the provided second sequence of bit combinations with the content of said autoscriptive unit accumulator, whereby the second sequence of bit combinations representing a homoscriptive unit contains a minimum number of bit combinations of the first sequence in the form of an exponential product of derived units of the International System of Units with special names and/or of base units.

8. The device according to claim 1, wherein said output transformation means performs a parameter controlled output transformation of a first autoscriptive quantity provided by said calculating means and stored in said numeric value accumulator and in said autoscriptive unit accumulator, wherein said output transformation means cooperates with said prefix generator for generation of a prefix without qualitative limitation of said first quantity, said output transformation means comprising a coefficient register for storing the numeric value of a second autoscriptive quantity and a unit regis- Best Available Copy ter for storing the homoscriptive unit, the autoscriptive unit of said second quantity is given as an output parameter to said first autoscriptive quantity, whereby said coefficient register and said unit register are connected with the output of said input transformation means, which has transformed the second homoscriptive unit;

said calculating assembly connected with the output of said autoscriptive unit accumulator and the output of said unit register to compare the autoscriptive unit of the first quantity with the autoscriptive unit of the second quantity, whereupon if equal said calculating assembly will be connected with said coefficient register and said numeric value accumulator for dividing the numeric value of the first autoscriptive quantity by the numeric value of the second autoscriptive quantity and the output of said unit register will be connected by said control means with said homoscriptive unit register for storing the second homoscriptive unit in said homoscriptive unit register.

9. The device according to claim 8, wherein said output transformation means for performing a parameter controlled output transformation of the first autoscriptive quantity provided by said calculating means and stored in said numeric value accumulator and said autoscriptive unit accumulator without generation of a prefix and without qualitative limitation of said first quantity, comprises control means for suppressing the activation of said prefix generator, whereby the second homoscriptive unit given as a parameter to said first quantity contains a prefix.

10. The device according to claim 1, wherein said homoscriptive unit register, said numeric value register, said autoscriptive unit register, said exponent-1 register, said numeric value accumulator, said autoscriptive unit accumulator, said prefix generator, said input transformation means, said calculating means, said output transformation means, said control means, and said calculating assembly, comprise a microprocessor system including an operably interconnected microprocessor, a programmable read-only memory, a read-only memory, and a read-write memory.

* * * * *